(12) United States Patent
Bernstein et al.

(10) Patent No.: US 11,847,158 B1
(45) Date of Patent: Dec. 19, 2023

(54) SYSTEMS AND METHODS FOR PROCESSING MEDIA TO GENERATE DYNAMIC GROUPS TO PROVIDE CONTENT

(71) Applicant: ShotSpotz LLC, Leesburg, VA (US)

(72) Inventors: Harley Bernstein, Milwaukee, WI (US); John Morgan, Falls Church, VA (US); Jeff Frederick, Leesburg, VA (US)

(73) Assignee: ShotSpotz LLC, Leesburg, VA (US)

( * ) Notice: Subject to any disclaimer, the term of this patent is extended or adjusted under 35 U.S.C. 154(b) by 0 days.

(21) Appl. No.: 17/871,097

(22) Filed: Jul. 22, 2022

Related U.S. Application Data

(63) Continuation of application No. 17/737,080, filed on May 5, 2022, which is a continuation-in-part of (Continued)

(51) Int. Cl.
  G06F 16/00 (2019.01)
  G06F 16/538 (2019.01)
  G06F 16/587 (2019.01)

(52) U.S. Cl.
  CPC .......... *G06F 16/538* (2019.01); *G06F 16/587* (2019.01)

(58) Field of Classification Search
  CPC .... G06F 16/9536; G06F 16/55; G06F 16/587; G06F 16/538
  See application file for complete search history.

(56) References Cited

U.S. PATENT DOCUMENTS

| 6,459,388 B1 | 10/2002 | Baron |
| 6,583,811 B2 | 6/2003 | Kinjo |
| (Continued) | | |

FOREIGN PATENT DOCUMENTS

| EP | 2393056 | 12/2011 |
| EP | 2581703 | 4/2013 |
| KR | 100997874 | 12/2010 |

OTHER PUBLICATIONS

Rehan Ullah Khan et al., "Media Content Access: Image-Based Filtering", International Journal of Advanced Computer Science And Applications, vol. 9, No. 3, 2018, pp. 415-419 (Year: 2018).

*Primary Examiner* — Jared M Bibbee
(74) *Attorney, Agent, or Firm* — Kenealy Vaidya LLP

(57) ABSTRACT

Systems and methods are provided to process a digital photo and other media. An apparatus to process digital photos can include a tangibly embodied computer processor (CP) and a tangibly embodied database. The CP can perform processing including: (a) inputting a photo from a user device, and the photo including geographic data that represents a photo location at which the photo was generated; (b) comparing at least one area with the photo location and associating an area identifier to the photo as part of photo data; and (c) performing processing based on the area identifier and the photo data. Processing can provide for (a) processing media with geographical segmentation; (b) processing media in a geographical area, based on media density; (c) crowd based censorship of media; (d) filtering media content based on user perspective, that can be for comparison, validation and voting; (e) notification processing; (f) processing to associate a non-fungible token (NFT) with a segmented area, which can be described more generally as "token" processing; (g) photo walk processing; and (h) dynamic group processing; for example.

17 Claims, 114 Drawing Sheets

Related U.S. Application Data application No. 17/200,753, filed on Mar. 12, 2021, now Pat. No. 11,436,290, which is a continuation-in-part of application No. 17/105,054, filed on Nov. 25, 2020, now Pat. No. 11,496,678.

(60) Provisional application No. 62/940,415, filed on Nov. 26, 2019.

(56) References Cited

U.S. PATENT DOCUMENTS

| | | |
|---|---|---|
| 7,082,365 B2 | 7/2006 | Sheha |
| 7,258,614 B1 | 8/2007 | Kates |
| 7,474,959 B2 | 1/2009 | Singh |
| 7,663,671 B2 | 2/2010 | Gallagher |
| 7,848,765 B2 | 12/2010 | Phillips |
| 7,991,283 B2 | 8/2011 | Chen |
| 8,073,461 B2 | 12/2011 | Altman |
| 8,295,589 B2 | 10/2012 | Ofek |
| 8,405,740 B2 | 3/2013 | Nichols |
| 8,407,225 B2 | 3/2013 | Lahcanski |
| 8,543,586 B2 | 9/2013 | Glachant |
| 8,581,997 B2 | 11/2013 | Lahcanski |
| 8,627,391 B2 | 1/2014 | Lahcanski |
| 8,660,358 B1 * | 2/2014 | Bergboer ............... G06V 20/30 382/199 |
| 8,843,309 B2 | 9/2014 | Kimchi |
| 8,996,305 B2 | 3/2015 | Kesar |
| 9,313,344 B2 | 4/2016 | Meike |
| 9,464,908 B2 | 10/2016 | Oel |
| 9,817,912 B2 | 11/2017 | Willis |
| 10,638,122 B1 | 4/2020 | Rao |
| 11,232,369 B1 | 1/2022 | Li |
| 11,436,290 B1 | 9/2022 | Bernstein |
| 11,455,330 B1 | 9/2022 | Bernstein |
| 11,461,423 B1 | 10/2022 | Bernstein |
| 11,496,678 B1 | 11/2022 | Bernstein |
| 11,513,663 B1 | 11/2022 | Bernstein |
| 2006/0120627 A1 | 6/2006 | Shiiyama |
| 2007/0047816 A1 | 3/2007 | Graham |
| 2007/0047818 A1 | 3/2007 | Hull |
| 2009/0034003 A1 | 2/2009 | Makino |
| 2009/0034836 A1 | 2/2009 | Shinchi |
| 2009/0162042 A1 | 6/2009 | Wexler |
| 2009/0171579 A1 | 7/2009 | Wu |
| 2009/0282346 A1 | 11/2009 | Bechtel |
| 2010/0171763 A1 | 7/2010 | Bhatt |
| 2010/0184451 A1 | 7/2010 | Wang |
| 2011/0184949 A1 | 7/2011 | Luo |
| 2011/0184953 A1 | 7/2011 | Joshi |
| 2011/0235923 A1 | 9/2011 | Weisenbuger |
| 2011/0307478 A1 | 12/2011 | Pinckney |
| 2012/0110031 A1 | 5/2012 | Lahcanski |
| 2012/0239663 A1 | 9/2012 | Tzruya |
| 2012/0303569 A1 | 11/2012 | Tuzhilin |
| 2013/0124653 A1 | 5/2013 | Vick |
| 2013/0185355 A1 | 7/2013 | Tseng |
| 2013/0222369 A1 | 8/2013 | Huston |
| 2013/0239056 A1 | 9/2013 | Ubillos |
| 2013/0332068 A1 * | 12/2013 | Kesar ................... G01C 21/367 345/589 |
| 2013/0332856 A1 | 12/2013 | Sanders |
| 2014/0372030 A1 | 12/2014 | Leader |
| 2015/0039630 A1 * | 2/2015 | Thomee ................ G06F 16/212 707/748 |
| 2015/0254042 A1 * | 9/2015 | Seitz .................... G06T 15/205 382/154 |
| 2016/0189042 A1 | 6/2016 | Gill |
| 2016/0294753 A1 | 10/2016 | Centner |
| 2017/0149795 A1 | 5/2017 | Day |
| 2017/0339466 A1 | 11/2017 | Patel |
| 2018/0219814 A1 * | 8/2018 | Maarek .................. G06Q 50/01 |
| 2018/0254914 A1 | 9/2018 | Bastide |
| 2018/0341877 A1 | 11/2018 | Panattoni |
| 2018/0349502 A1 | 12/2018 | Maycock |
| 2019/0361983 A1 | 11/2019 | Wang |
| 2020/0004291 A1 | 1/2020 | Wexler |
| 2020/0104962 A1 | 4/2020 | Aich |
| 2021/0158495 A1 | 5/2021 | Barnes |
| 2021/0192651 A1 | 6/2021 | Groth |

\* cited by examiner

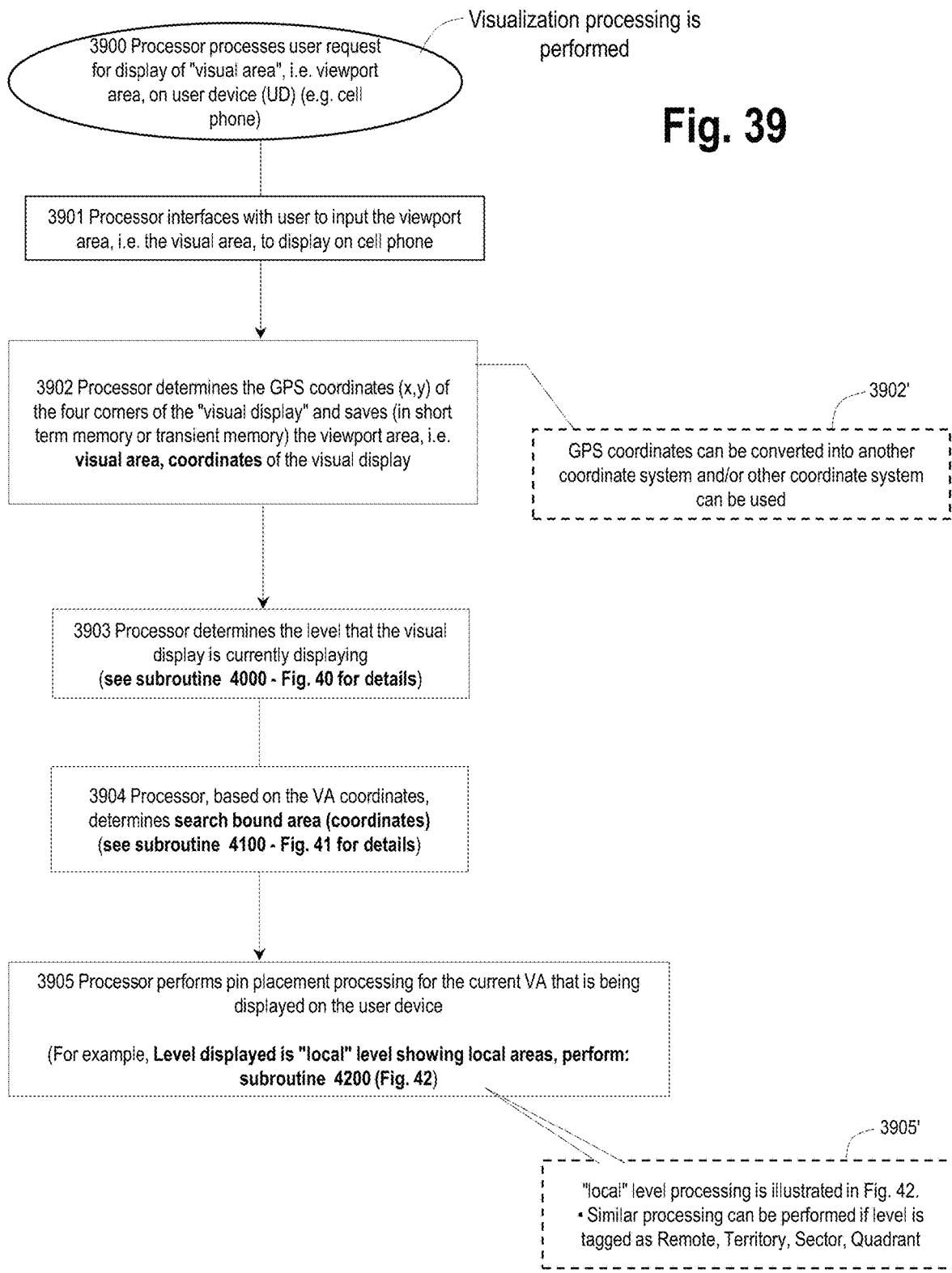

Fig. 40

4000 Processor determines the level that the viewport area (VA) is currently displaying
(Subroutine called from Fig. 39)

4001

CP determines the "level" that Viewport Area (VA) is currently displaying:

IF (1 ≥ Zoom level > 2); "Remote" level

IF (2 ≥ Zoom level > 3); "Territory" level

IF (3 ≥ Zoom level > 4; "Sector" level

IF (4 ≥ Zoom level > 5; "Quadrant" level

IF (5 ≥ Zoom level > 6); "Local" level

IF (6 ≥ Zoom level ≥ 7); "Patch" level

4011 CP tags the current level as "patch" level

4012 CP tags the current level as "local" level

4013 CP tags the current level as "quadrant" level

4014 CP tags the current level as "sector" level

4015 CP tags the current level as "territory" level

4016 CP tags the current level as "remote" level

4020 Processing returns to Fig. 39 step 3904 with the identified level in transient memory

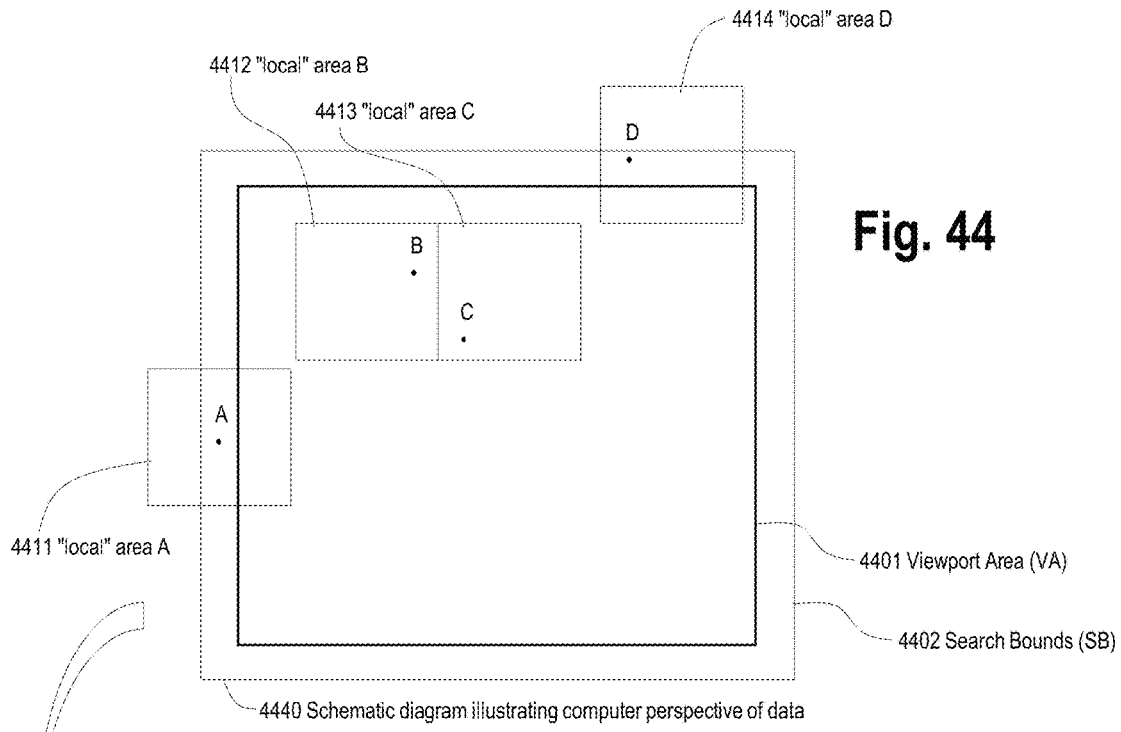
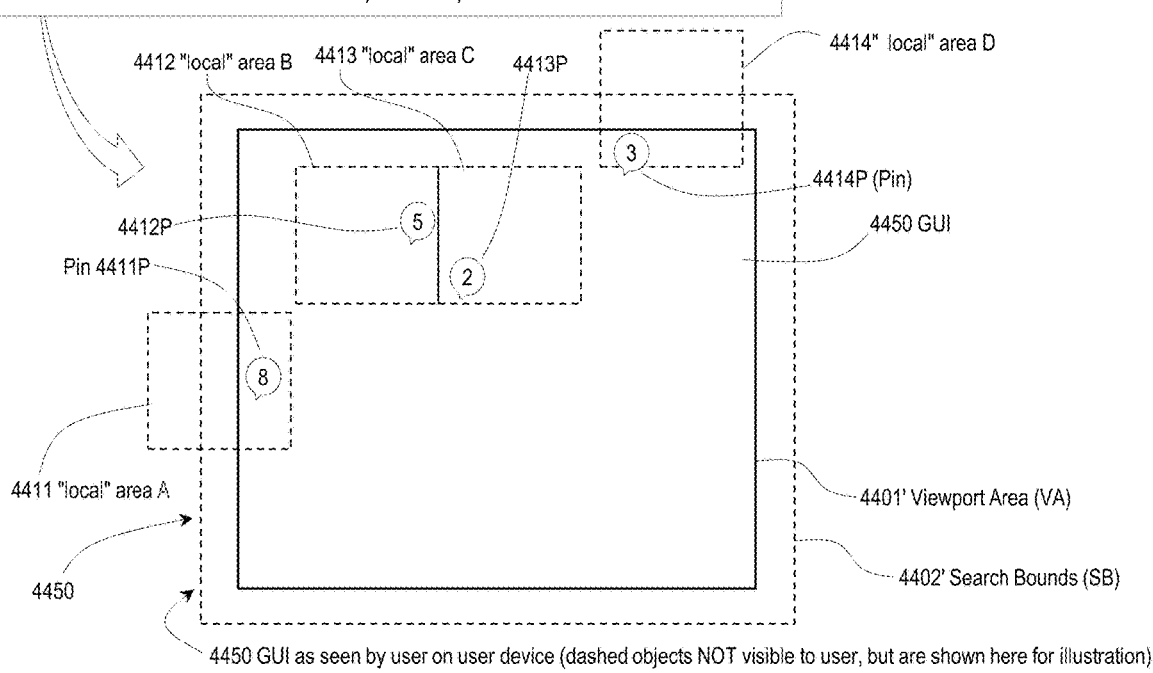
Fig. 44

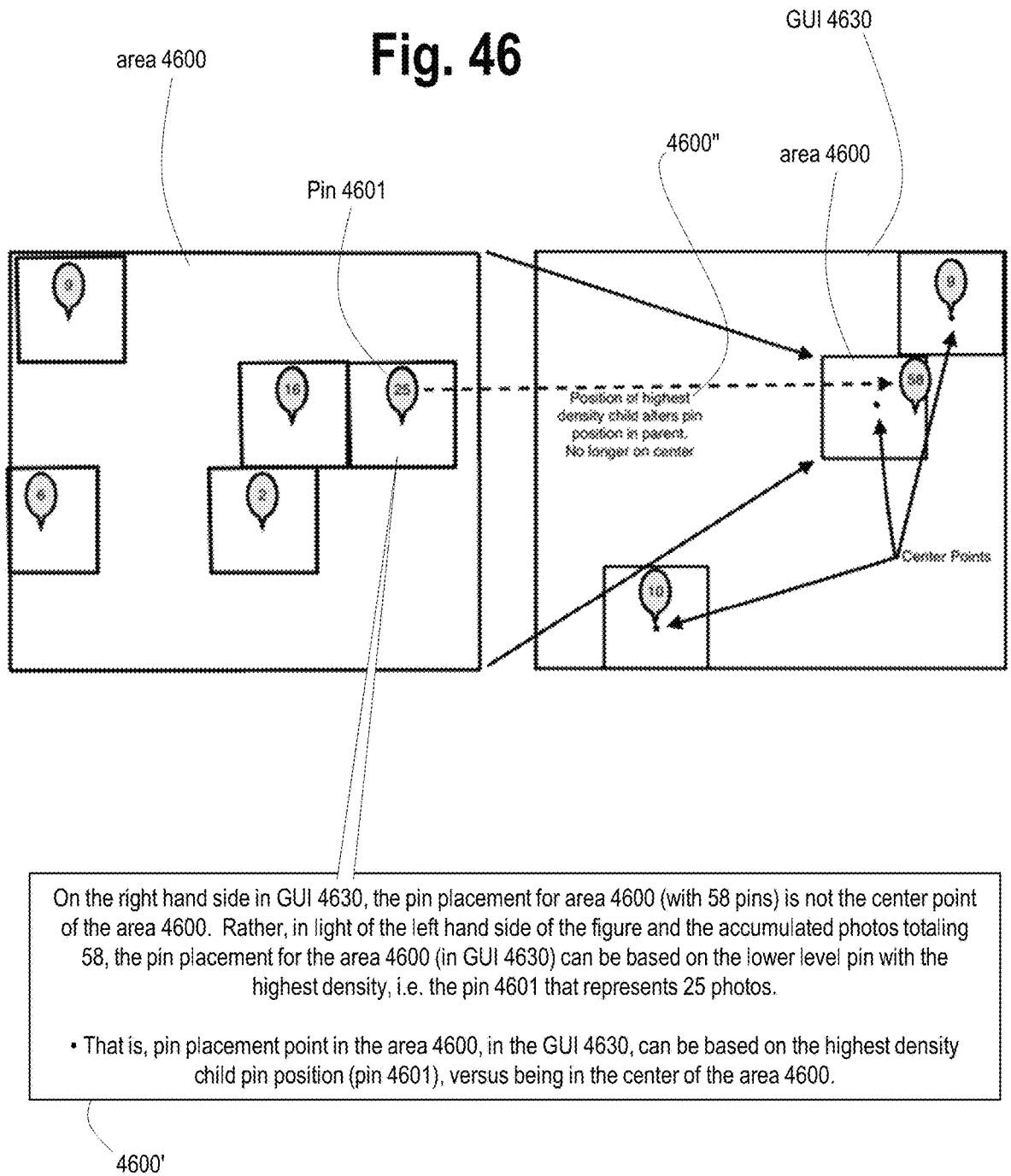

Fig. 46

On the right hand side in GUI 4630, the pin placement for area 4600 (with 58 pins) is not the center point of the area 4600. Rather, in light of the left hand side of the figure and the accumulated photos totaling 58, the pin placement for the area 4600 (in GUI 4630) can be based on the lower level pin with the highest density, i.e. the pin 4601 that represents 25 photos.

• That is, pin placement point in the area 4600, in the GUI 4630, can be based on the highest density child pin position (pin 4601), versus being in the center of the area 4600.

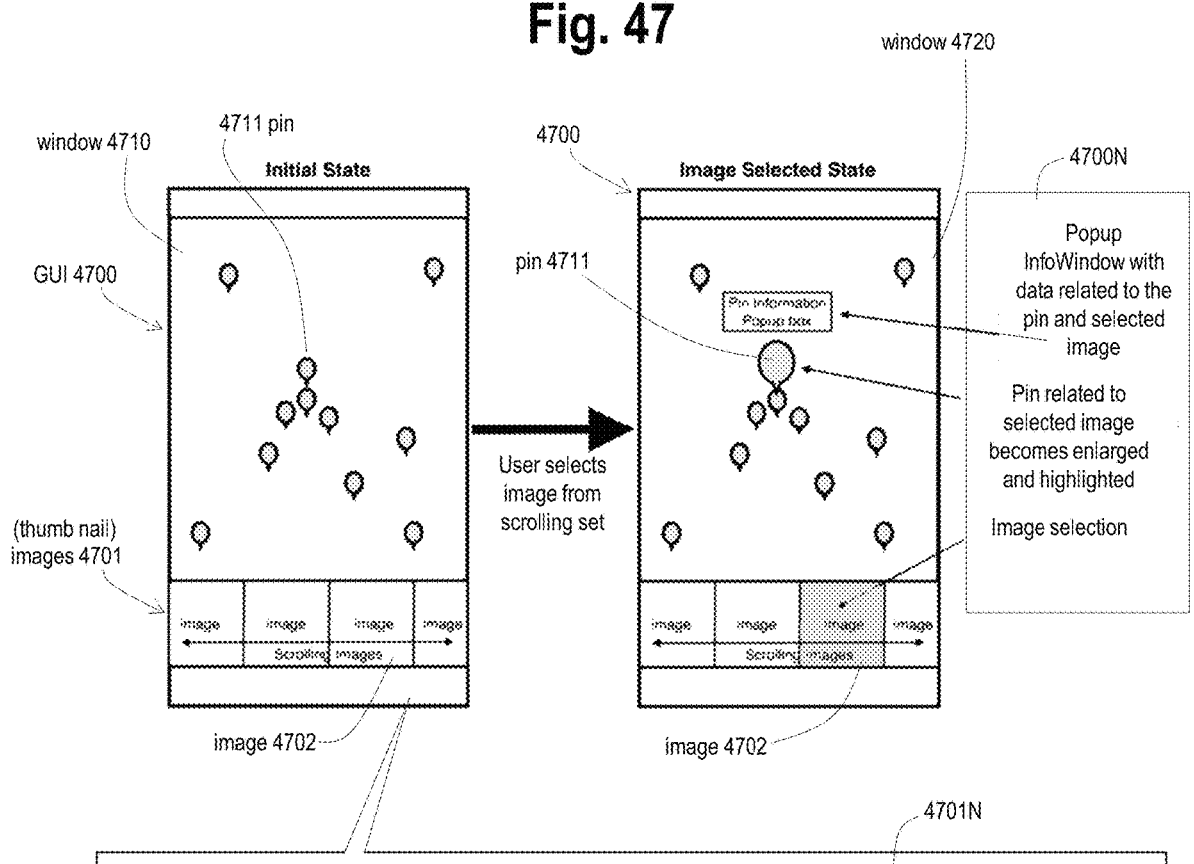

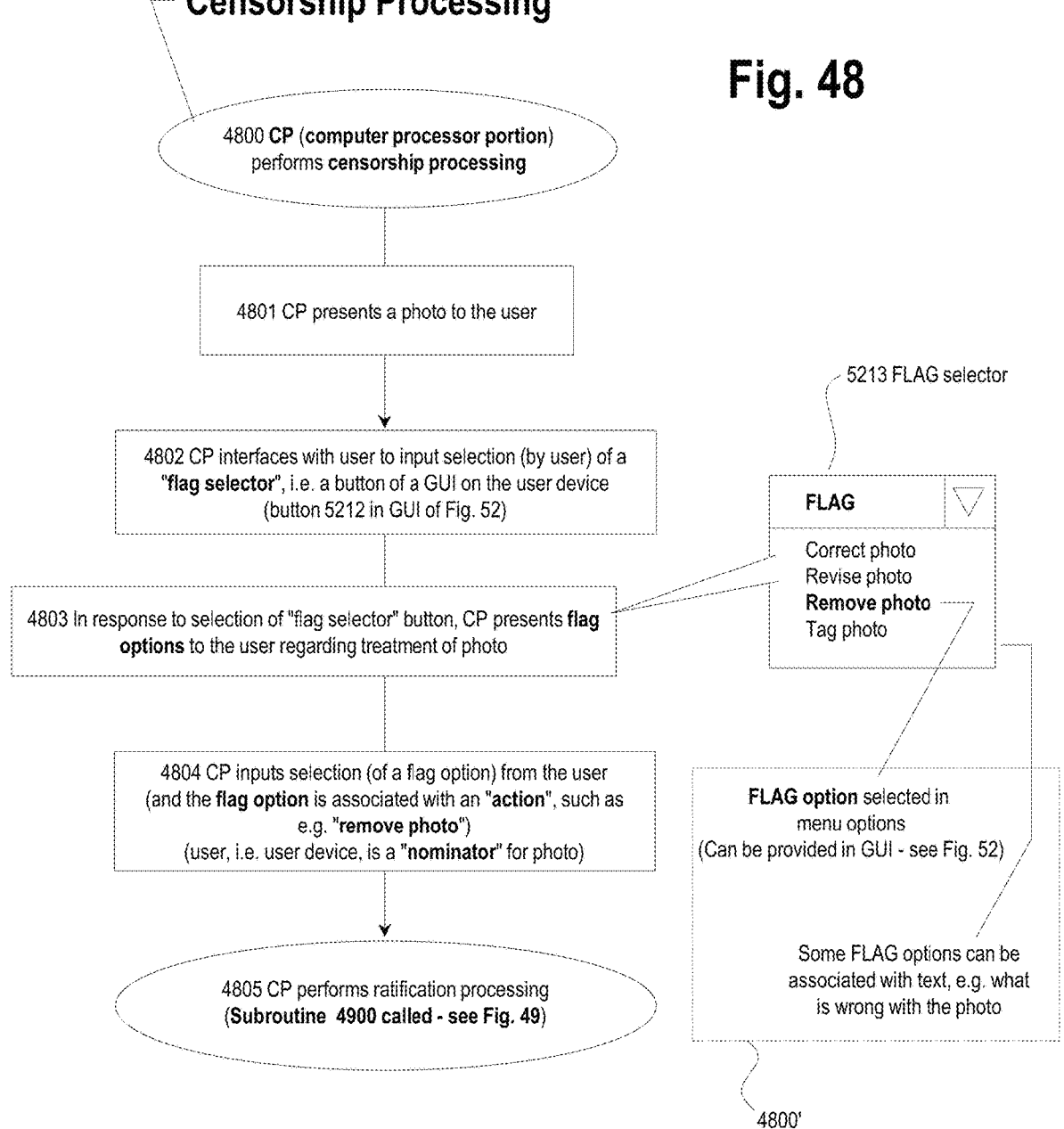

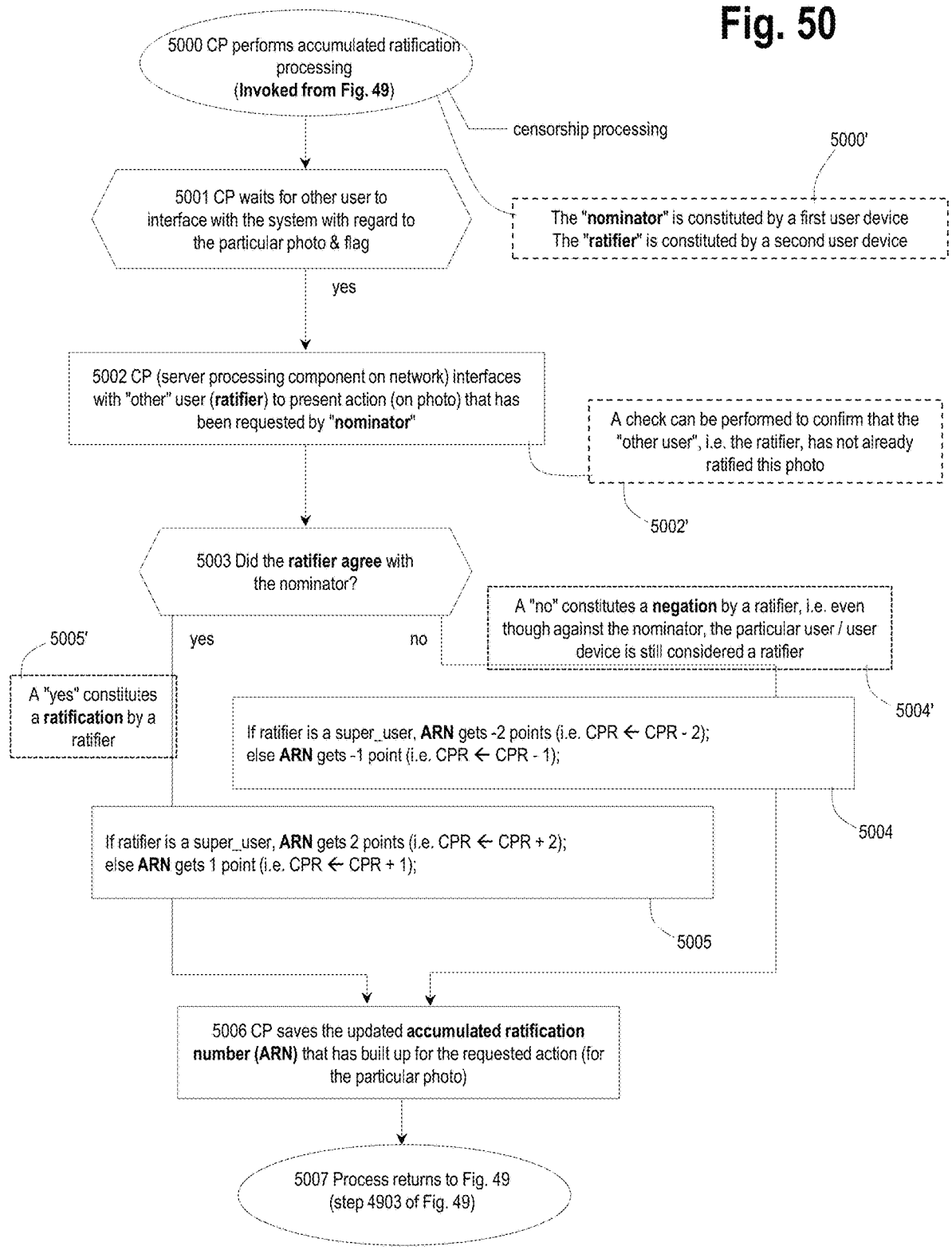

Fig. 51
(Censorship)

5100 Table
5101 Data records

| Censorship power rating (CPR) | Required Ratification Number (RRN) (Required Ratifiers) | Associated processing |
|---|---|---|
| $40 \leq CPR < 0$ | 20 | Action is performed on photo with 20 other users ratifying |
| $80 \leq CPR < 40$ | 10 | Action is performed on photo with 10 other users ratifying |
| $80 \leq CPR < 60$ | 5 | Action is performed on photo with 5 other users ratifying |
| $100 \leq CPR < 80$ | 0 | Action is performed on image with no other user input required (highest level - no ratification required). This user = super user |

5121
The CPR of the "nominator" is mapped to a particular RRN:
• the RRN can represent how strong the nominator is.
• a LOW RRN means that fewer (or no) other users have to ratify action, for such action to be applied to the photo 5122
The RRN can be different for different requested actions or flags (e.g. RRN requirement to comment on a photo is less demanding than RRN requirement to remove a photo 5123
The number of users that are needed to ratify a particular action can depend on the attributes of the user who is doing the ratifying and/or the particular flag or action that is being requested by the nominator (Censorship)

Fig. 56

5600 CP interfaces with a first user to establish a FF association (first FF association) between the first user and respective photos forming a first collection of photos, and the first collection of photos constituting a first filtered set of photos
(Subroutine called from Fig. 55)

5610 CP establishes Filtered Following (FF) association based on photos that were "taken" by the first user
(can include interfacing with the first user, i.e. a first user device)
(Subroutine 5700 called - see Fig. 57)

5620 CP interfaces with first user to establish FF association based on photos that were "liked" by the first user
(Subroutine 5800 called - see Fig. 58)

5630 CP establishes Filtered Following (FF) association based on photos that were "tagged" in a particular manner by the first user
(Subroutine 5900 called - see Fig. 59)

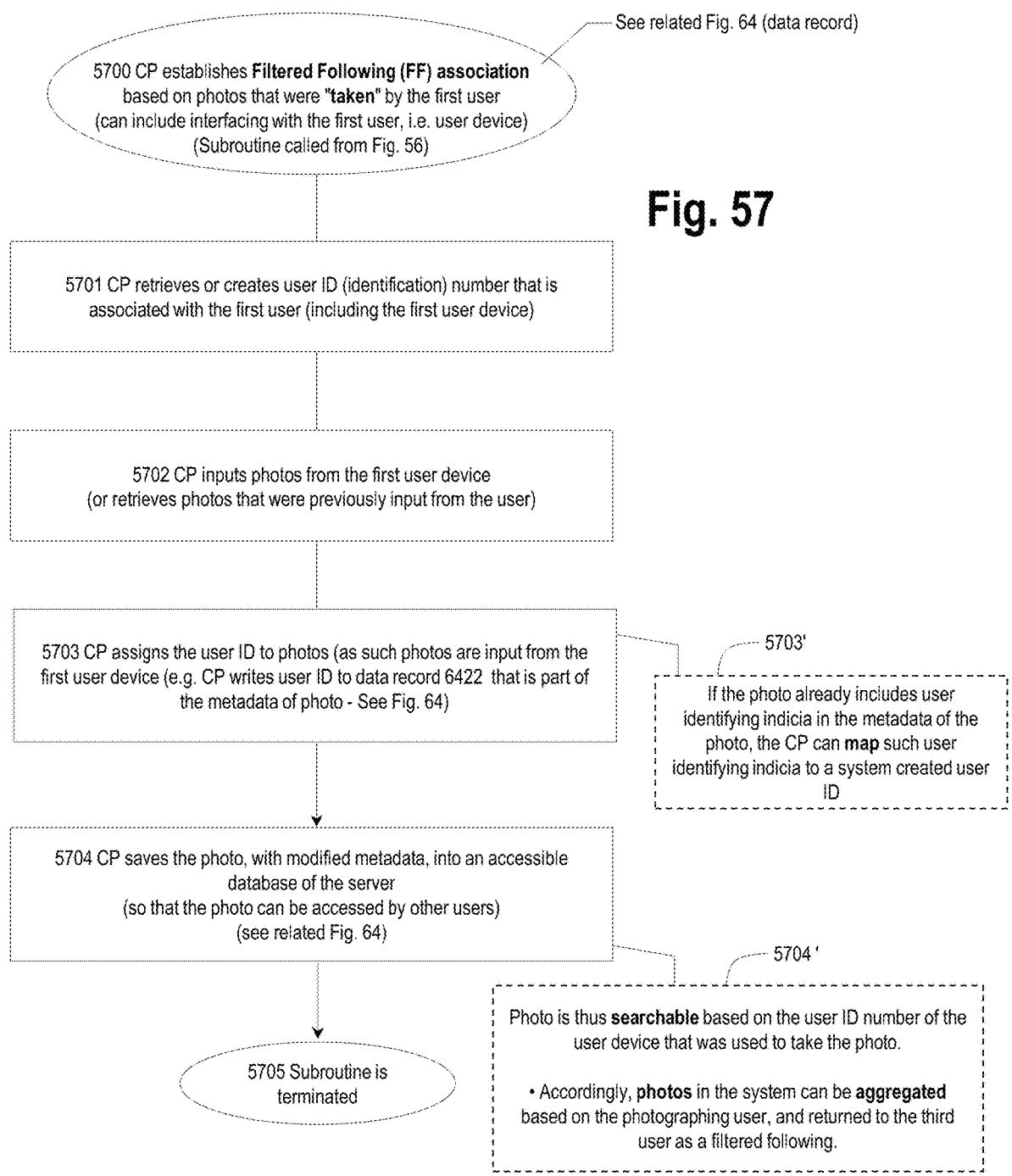

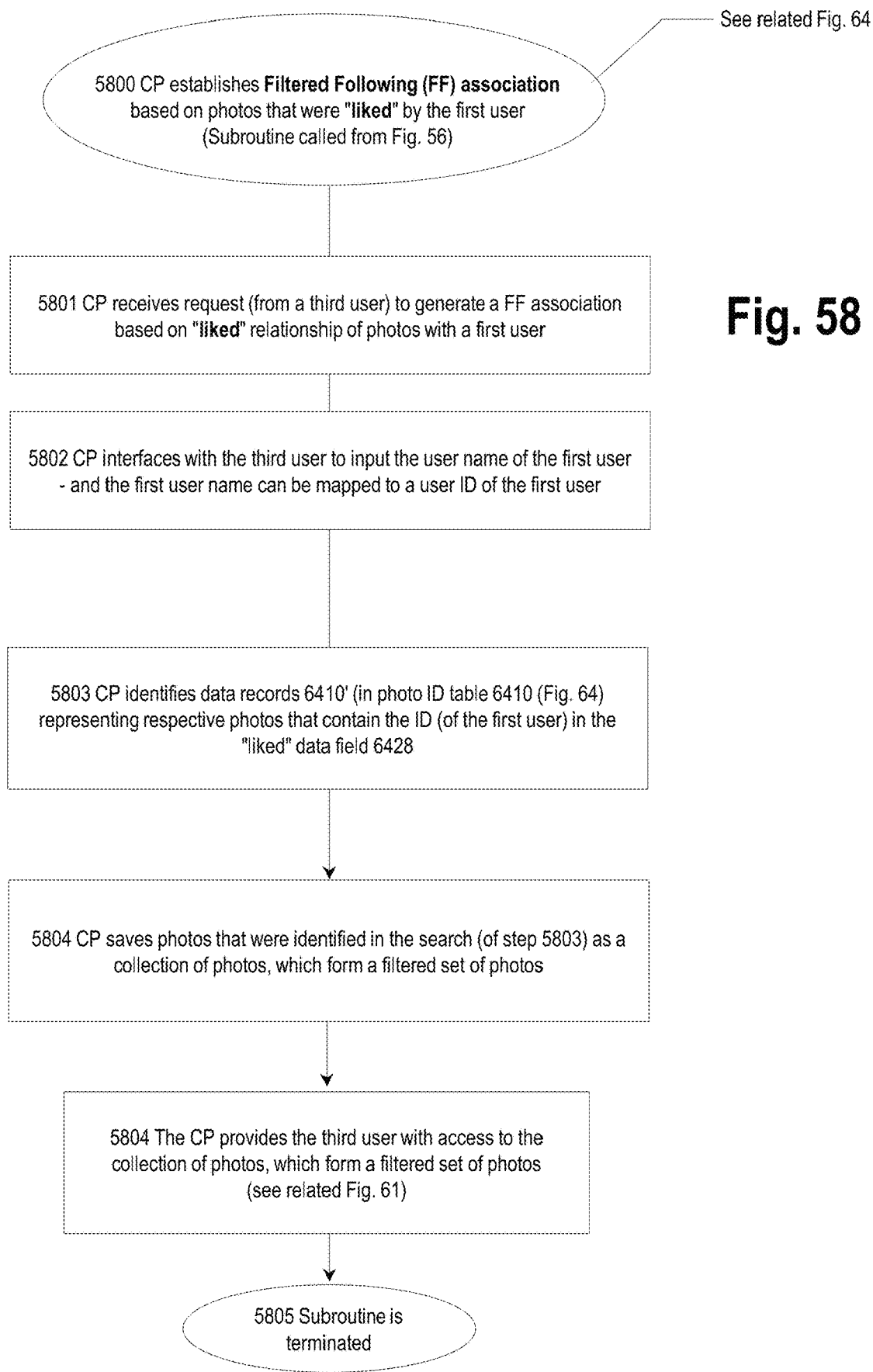

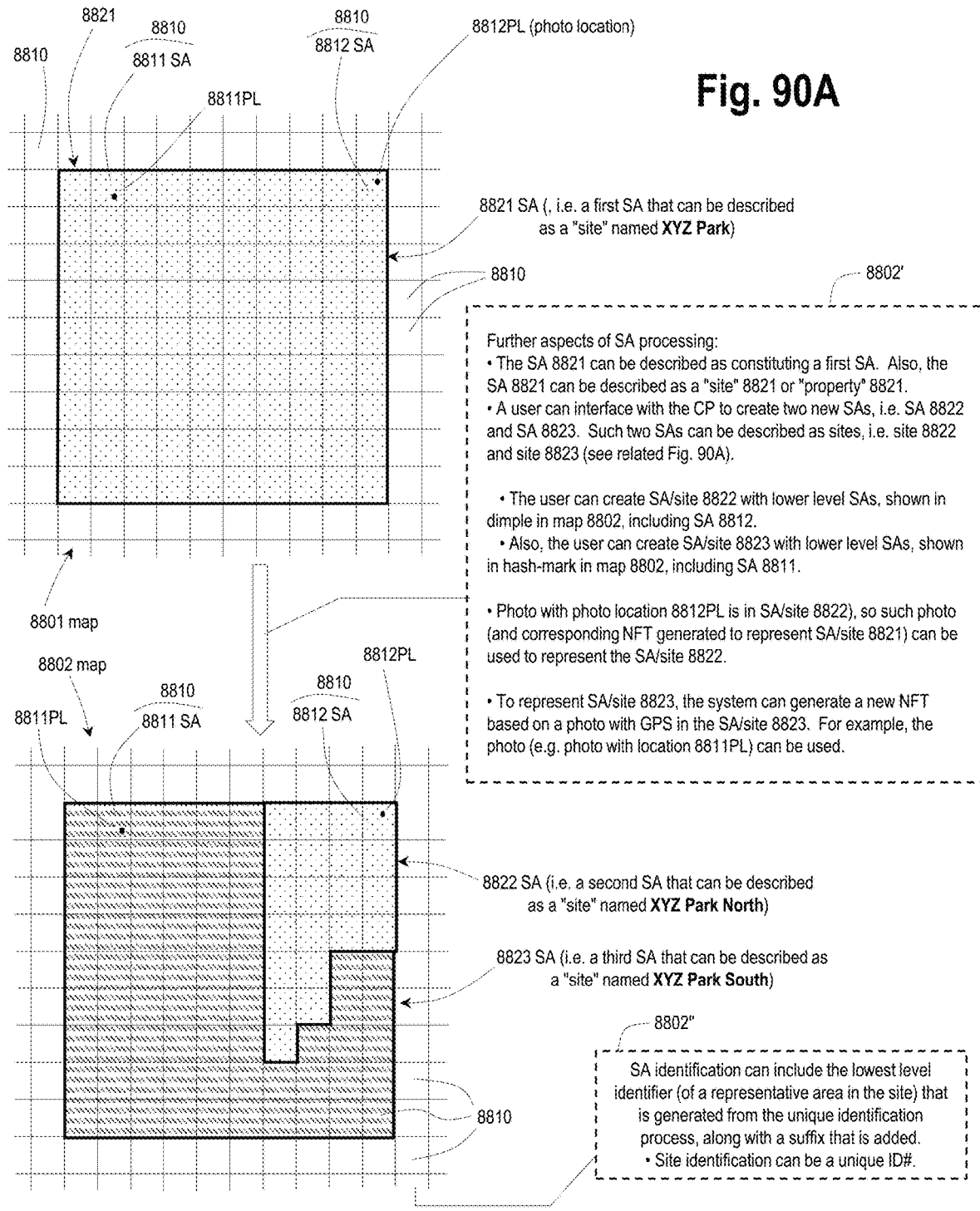

Fig. 91

8900 Registry Table (spreadsheet for a segmented area (area))

The registry table can include data that shows transactions relating to a "segmented area" (SA).
• The "SA", i.e. an area, can constitute a "site" or "property" that can be transacted, i.e. sold, leased, etc.
• An SA can be broken up in a transaction so as to be two SAs (see related Figs. 90A-90C)

| | A | B | C | D | E | F | G | H | I | J | K | L | M |
|---|---|---|---|---|---|---|---|---|---|---|---|---|---|
| 1 | Registry | | | | | | | | | | | | |
| 2 | ID_Registry_021 | | | | | | | | | | | | |
| 3 | Activity | Activity Date | Initiator | Owner | Standard Property Locations | Site Name (or Re-name) (If Applicable) | Site Assemblage ID (If Applicable) | NFT - Artist | NFT ID | Rights Granted | Rights Holder | Rights Duration | Transaction Value |
| 4 | Identification | 8/1/2023 | ABCD | Photer | [List ID #(s)] | XYZ Park | | | | | | | |
| 5 | Reservation | 8/1/2023 | ABCD | Photer | [List ID #(s)] | XYZ Park | | | | | | | |
| 6 | Site Assemblage | 8/15/2023 | Photer | Photer | [List ID #(s)] | XYZ Park | UID-Suffix-N | J. Jones | External 123 | | | | |
| 7 | Sale | 8/22/2023 | | ABCD | [List ID #(s)] | XYZ Park | UID-Suffix | J. Jones | External 123 | | | | |
| 8 | Rights Grant | 9/1/2023 | | ABCD | [List ID #(s)] | XYZ Park | UID-Suffix | J. Jones | External 123 | Advertisement | Pizza Joe | Perpetual | 1,000.00 |
| 9 | Site Subdivision | 9/15/2023 | ABCD | ABCD | [List ID #(s)] | XYZ Park North | UID-Suffix-N | J. Jones | External 123 | Advertisement | Pizza Joe | Annual | 500 |
| 10 | Site Subdivision | 9/15/2023 | ABCD | ABCD | [List ID #(s)] | XYZ Park South | UID-Suffix-S | P. Smith | External 214 | Advertisement | Pizza Joe | Annual | |
| 11 | Listed for Sale | 9/15/2023 | ABCD | ABCD | [List ID #(s)] | XYZ Park South | UID-Suffix-S | P. Smith | External 214 | | | | |
| 12 | Sale | 9/20/2023 | ABCD | TBDH | [List ID #(s)] | XYZ Park South | UID-Suffix-S | P. Smith | External 214 | | | | |
| 13 | Rights Grant | 10/4/2023 | TBDH | TBDH | [List ID #(s)] | XYZ Park South | | | | Leased to Artist | Photographer XXX | 3 Years | 15 |
| 14 | Rights Grant | 10/5/2023 | PZ34 | TBDH | [List ID #(s)] | XYZ Park South | | | | Trading Card | 1000 authorized | 3 Years | 30 |
| 15 | Rights Grant | 10/20/2023 | PZ234 | TBDH | [List ID #(s)] | XYZ Park South | | | | Trading Card | 100 issued (user n. | Annual | 900 |

8901 PK
(see related Fig. 85)

8920 field 8902 content 8910 record number

• A photo that is representative of the SA can be used to secure the NFT for the SA. That is, for example, once an SA is subdivided, a separate table (as shown in Fig. 91) can be generated for the one or more "child SA(s)". Such created table can be linked back to the "parent" SA table. A relational database can be used to store such data.

• If the SA is not associated with a photo, digital artwork, e.g. an IDM, can be created or retrieved by the system so as to represent such SA.

• In some processing embodiments, respective tables can be created for each SA.

Each data record can include fields, which can be populated, as follows:
A: Notices and activity description of segmented area(s) (SA), i.e. described as a "site(s)".
B: Date of activity
C: Initiator of activity
D: Owner of area
E: ID(s) of areas included in the SA are listed, i.e. the listed areas go to make up the SA.
F: SA, i.e. site, name
G: SA, i.e. site, assemblage ID includes ( (area ID of a representative area in the SA) + (a suffix) )
• the suffix distinguishes the SA from such representative area itself.
H: User "artist" that took the photo (such photo has been deemed to represent the SA)
I: NFT ID (i.e. a link) - a unique token, e.g. a unique identification number, algorithmic element of other representation, is created (or retrieved) that represents the site & associated attributes. The token uniquely links the site to the external world).
J: Data regarding the rights that have been granted to the site.
K: Data regarding the rights holder, i.e. the person or entity who owns the rights (listed in the particular record).
L: Data regarding duration of the listed rights.
M: Data regarding transaction value of the listed rights, i.e. the purchase price of the rights.

• The NFT can include additional data that provides communications between "Photer world" and the NFT system, i.e. the NFT processing.
• For example, a sale of the property in Photer world is communicated to predetermined parties in the external world, if it is determined that an ownership attribute of the property is required to be updated in NFT world.

9500 Registry Table (for SA(s))

9602'

Records can be created upon occurrence of an event, i.e. sequential records can reflect activity that the particular site has experienced over time. The following events, as represented by respective data records in spreadsheet 9500, are for purposes of example:

4: Initial site is identified (site includes areas) by a user ABCD. (Ownership of site is initially with Photer).
5: The user ABCD reserves the site, which can include an offer by ABCD to purchase the site.
6: The site undergoes "site assemblage" which can include Photer, the initial owner, approving sale of the site, with the included areas listed in Field E of data record 6 (i.e. Field 6E).
• the site is represented by ID of a lowest level area in the site + suffix
7: The site is sold to the purchaser, user ABCD, with the new owner listed in field 7D
8: A rights grant is conferred upon the site, XYZ Park.
9: The site is subdivided, i.e. a portion of XYZ Park is divided out so as to form XYZ Park North, as reflected in Field 9F (see related Fig. 90).
10: The site is subdivided, i.e. a portion of XYZ Park is divided out so as to form XYZ Park South, as reflected in Field 10F.
11: Data record 11 shows that site XYZ Park South has been listed for sale
12: Data record shows sale of the site XYZ Park South.
13: Data record 13 shows a particular rights grant to the site XYZ Park South, i.e. the site is leased to a photographer.
14: Data record 14 shows a further rights grant to the site XYZ Park South - trading cards with photo of historic diner, for example, are created and offered for sale.
15: Data record 15 shows a further rights grant to the site XYZ Park South - 100 of such trading cards are issued, i.e. sold. May be monthly fee to retain trading card.

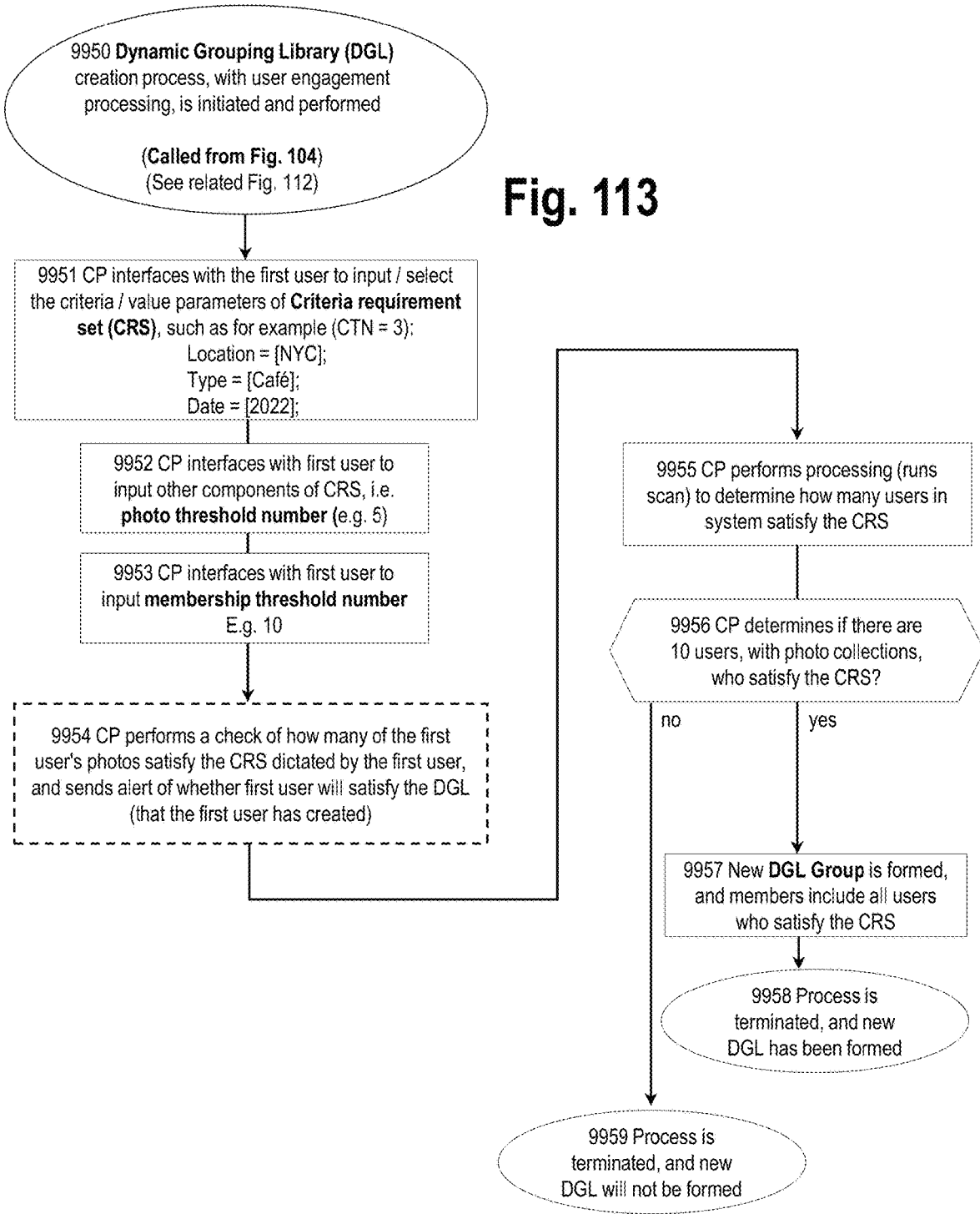

US 11,847,158 B1

SYSTEMS AND METHODS FOR PROCESSING MEDIA TO GENERATE DYNAMIC GROUPS TO PROVIDE CONTENT

RELATED APPLICATIONS AND PRIORITY

This application claims priority to and is a continuation patent application of U.S. patent application Ser. No. 17/737,080 filed May 5, 2022. Such U.S. patent application Ser. No. 17/737,080 is a continuation-in-part (CIP) patent application of U.S. patent application Ser. No. 17/200,753 filed on Mar. 12, 2021, the disclosure of which is hereby incorporated by reference in its entirety. Such U.S. patent application Ser. No. 17/200,753 is a continuation-in-part (CIP) patent application of U.S. patent application Ser. No. 17/105,054 filed on Nov. 25, 2020, which claims priority to U.S. Provisional Patent Application Ser. No. 62/940,415 filed Nov. 26, 2019, the disclosures of which are all hereby incorporated by reference in their entireties. The disclosure of U.S. patent application Ser. No. 17/737,080 is hereby incorporated by reference in its entirety.

BACKGROUND OF THE DISCLOSURE

Systems and methods described herein relate to processing photos and other media, and in particular to processing photos and other media in a geographical area.

Photography is popular with a wide variety of people. Photography can include taking pictures of points of interest, activities of interest, "selfies", and innumerable other items. Photography can include taking a picture with a camera or other device that is dedicated to photography. Photography can include taking a picture with a smart phone, cell phone, or other user device that provides picture taking abilities as well as various other abilities and uses. Websites and other electronic resources exist that provide the ability to upload or otherwise save pictures that have been taken by a person. Such websites can allow a user to access pictures and perform other manipulation of pictures. However, known technology is lacking in capabilities that such technology provides. The systems and methods of the disclosure address shortcomings that exist with known technology.

SUMMARY OF THE DISCLOSURE

Systems and methods are provided to process digital photos and other media. An apparatus to process digital photos and other media (and for processing digital photos and other media) can include a tangibly embodied computer processor (CP) and a tangibly embodied database. The CP can perform processing including: (a) inputting a photo from a user device, and the photo including geographic data that represents a photo location at which the photo was generated; (b) comparing at least one area with the photo location and associating an area identifier to the photo as part of photo data; and (c) performing processing based on the area identifier and the photo data. Processing of a photo and/or a collection of photos can include area segmentation, photo delivery processing including processing based on photo density, censorship processing, processing using filters. Processing can also include notification processing; processing to associate a non-fungible token (NFT), which can be described generally as "token" processing, with a segmented area; photo walk processing; and dynamic group processing. Various other features are described below.

Accordingly, systems and methods of the disclosure can provide for (a) processing media with geographical segmentation; (b) media delivery processing based on photo density and voter preference (c) crowd based censorship of media; and (d) filtering media content based on user perspective, that can be for editing, viewing, comparison, validation and voting, for example. For example, the systems and methods of the disclosure can provide for processing media in a geographical area based on media density. The systems and methods of the disclosure can provide for photo delivery processing including or based on photo density, vote preference, voter preference, or voting preference. Photo delivery processing can be based on photo density with photo density registering voter preference. Various additional features are described herein.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 39 is a flowchart showing "processor processes user request for display of "visual area" on user device (cell phone)" of subroutine 3900, in accordance with principles of the disclosed subject matter.

FIG. 40 is a flowchart showing "processor determines the level that the visual area (VA) is currently displaying" of subroutine 4000, as called from the processing of FIG. 39, in accordance with principles of the disclosed subject matter.

FIG. 44 is a schematic diagram also showing features of pin placement processing, in accordance with principles of the disclosed subject matter.

FIG. 46 is a schematic diagram showing further aspects of pin processing, in accordance with principles of the disclosed subject matter.

FIG. 47 is a schematic diagram showing yet further aspects of pin processing in conjunction with manipulation of thumbnails, in accordance with principles of the disclosed subject matter.

FIG. 48 is a flowchart showing details of a processor of the disclosure performing censorship processing, in accordance with principles of the disclosed subject matter.

FIG. 50 is a flowchart showing "processor performs accumulated ratification processing" of subroutine 5000 as invoked from FIG. 49, in accordance with principles of the disclosed subject matter.

FIG. 51 is a diagram showing aspects of censorship power rating (CPR) and required ratification number (RRN), in accordance with principles of the disclosed subject matter.

FIG. 56 is a flowchart showing details of subroutine 5600 as called from FIG. 55, in accordance with principles of the disclosed subject matter.

FIG. 57 is a flowchart showing details of "CP establishes filtered following (FF) association based on photos that were "taken" by the first user" of subroutine 5700 as called from FIG. 56, in accordance with principles of the disclosed subject matter.

FIG. 58 is a flowchart showing details of "CP establishes filtered following (FF) association based on photos that were "liked" by the first user" of subroutine 5800 as called from FIG. 56, in accordance with principles of the disclosed subject matter.

FIG. 90A is a schematic diagram showing further aspects of segmented area processing.

FIG. 91 is a schematic diagram showing a registry table.

FIG. 92 is a diagram that illustrates various data that can be stored in a registry table.

FIG. 113 is a flowchart showing a DGL creation process with user engagement processing.

DETAILED DESCRIPTION OF EXEMPLARY EMBODIMENTS

Figure 1:
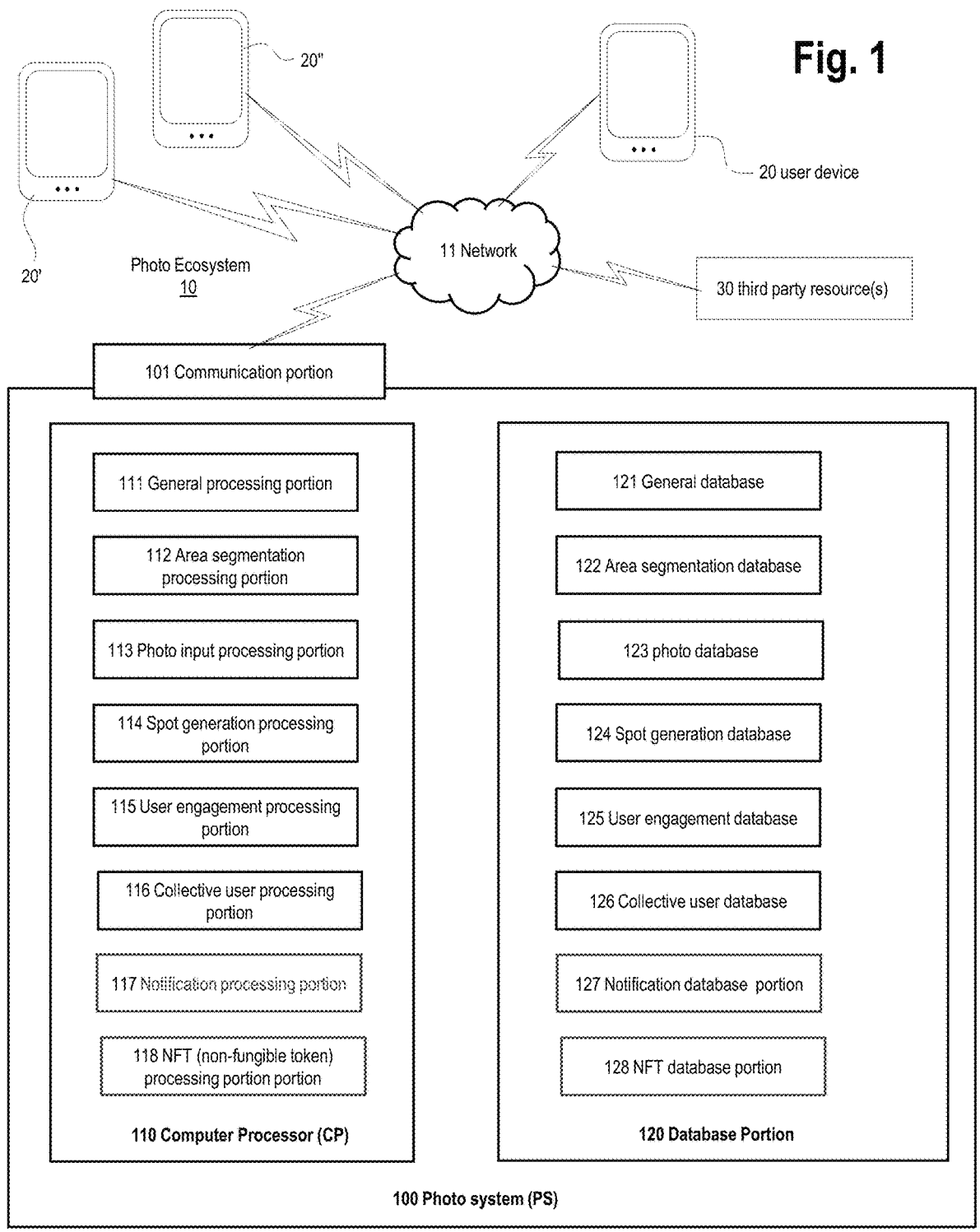
FIG. 1 is a diagram showing a photo ecosystem or ecosystem in accordance with at least one embodiment of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. FIGS. 1-113 show various details of the disclosure, in accordance with principles of the disclosed subject matter.

Locations exist that are popular for a variety of reasons and characteristics. Locations can be popular amongst local residents or travelers. Locations can be popular for sight-seeing, taking "selfies", taking photographs, or partaking in interesting activities. Interesting activities can include "seeing (taking pictures), eating, drinking, shopping, and various other activities including conceptual things. Conceptual things can include ideas or referendums, for example. A particular location can be "popular" or locations may become "popular" as a function of time. Locations that become popular as a function of time can be dependent on seasonal events, times of day, newsworthy developments that are related to such location, and trending items that are related to the particular patient.

However, visitors, travelers, and even local residents may not always be aware of these popular locations. A popular location can be marked with a physical sign or other marker so as to notify interested persons of the particular location. Also, some of these popular locations are identified on maps or in travel guides. However, such information is not always readily available to interested travelers or other persons. Such information may also become outdated. Further, signs and notifications may not provide information about the location that helps an interested person to determine appealing characteristics or other features of interest regarding the location.

It is one objective of the present disclosure to provide information by graphic display on a networked computer, mobile device or other processing system that a user can access to identify locations of interest. Such locations of interest can include popular locations. The information can be used for planning purposes when a user is planning a visit to the location of interest or near the location of interest. Another objective of the present disclosure is to provide a method and system for processing photos that determine popularity or registers a user vote of preference; and the popularity of a location or area can be identified by being referred to as a "spot". Thus, an area that has a predetermined density of photos can be deemed a "spot" by the PS (photo system) of the disclosure. Thus, for example, a "patch" (as described below) that has a predetermined density of photos can be deemed a "spot" by the PS. Other types of areas, e.g. a "local" may also be deemed a "spot". The method and system can determine the popularity of an area, for example the popularity of a patch, using various characteristics or attributes of interest, which can be associated with the area in a suitable database. Once identified as a "spot", the database can contain information that identifies the spot, conveys information regarding the particular location of the spot, and includes various other attributes of the spot. It is a further objective of the present disclosure to provide the user with photos previously captured at the spot in order to assist the user in determining if the characteristics of the spot are of interest. Another objective of the disclosure is to utilize user supplied content and preferences to assist in a determination in identification of "trusted critics" by establishing user power ratings by area of interest. Such user power ratings can include the establishment of user dashboards highlighting volume of activity, concentration of followers, areas of interest, and geographical proclivity. A further objective is to provide users the ability to identify and organize under "affinity groups." A further objective is to provide users the ability of "filtered following" that organizes content based upon user interests, preferences including trusted critics, affinity groups, geography, and other attributes. It is a further objective to allow users the ability to flexibly organize and reorganize content and perspectives, preferences, user following and/or affinity groups to validate or more generally perform an "assessment" of the popularity or other attribute of a spot. It is a further objective of the present disclosure to provide a system that supplies popular spot characteristics and other information to a user that is dynamically updated over time so as to be of increased relevance to the user. It is a further objective of the present disclosure to provide information to the user regarding a spot that is specifically customized to the user.

The systems and methods of the disclosure can provide the above objectives and can provide various other features as described in detail below. The system of the disclosure can include a computer, computer system or machine that can be in the form of or include one or more computer processors "CPs" and one or more databases. The computer can include or be in the form of or be connected to a network server. Processing can be performed that includes accessing a photo database containing photos, i.e. digital photos, and location data and determining one or more clusters of the digital photos based on the location data. Processing can further include associating time data and a variety of other data appended to the photo or cluster of photos. Processing can be performed to determine a popular spot location for representing the digital photo or cluster of digital photos and to generate results, which can be stored in a database for later access.

In at least one embodiment of the disclosure, the process of determining a popular location, herein referred to as a "spot", can begin with geographic segmentation of the globe or some other area. Geographic segmentation can include the establishment of uniquely identifiable areas, which can vary in size. The largest areas can be as large as the Pacific Ocean or the Antarctic. The smallest areas can be a point or an area of a few square feet. A smallest area, of the uniquely identifiable areas, can correspond to what is herein referred to as a "patch". A "patch" can become a "spot", i.e. a "patch-spot" if density of photos in the patch is sufficient. The methodology of the disclosure can initially establish larger location areas that are, for example, approximately 100 miles×100 miles in area. The smallest area that can be referred to as a patch, can be approximately 13 feet×13 feet. However, as described below, it should be appreciated that the particular areas processed, including the size of such areas, can vary in implementation of a system of the invention.

Geographic segmentation of an area under consideration, such as the world or globe, can start with a desired segmentation, such as the 100 mile×100 mile segmentation. Such areas that have been formed by segmentation, can be referred to as first level areas. Each of the first level areas can be divided into second level areas. Each of the second level areas can further be divided into third level areas. Further segmentation can be provided. The particular area to be processed, be it the world or some smaller area such as a trade show venue, can vary as desired. Additionally, the number of levels provided can vary as desired, as well as size of each of the areas. Accordingly, the particular number of levels of areas, size of the areas, and other attributes of areas as described herein are for purposes of illustration. The number of levels of areas can be varied as desired, the size of the areas can be varied as desired, the shape of the areas can be varied as desired, other attributes of the areas can be varied as desired, interrelationship between the areas can be varied as desired, and/or other aspects of geographic segmentation can be varied as desired. The size and shape of the area that constitutes or includes a spot can be varied as desired. The sizes as described herein are approximate and may well vary within thresholds. Such thresholds may include variance, of the size of the areas, by + or −5%, + or −10%, + or −15%, + or −20%, for example. For example, geographic segmentation areas or areas can be generally standardized into 6 size categories, in accordance with at least one embodiment of the disclosure. The segmentation areas can include 6 size categories. The 6 size categories can illustratively include:

(1) "Remote": 100 miles by 100 miles (19,700 across the earth);
(2) "Territory": 10 miles by 10 miles (1.97 Million (M) spots across the earth);
(3) "Sector": 1 mile by 1 mile (1 spot per square (sq) mile—197M spots across the earth);
(4) "Quadrant": ¼ mile by ¼ mile (1,340 ft by 1,340 ft—16 spots per square mile 3.15Billion (B) across earth); and
(5) "Local": 134 ft by 134 ft (1,600 spots per square mile—315B across the earth).
(6) "Patch": 13.4 foot by 13.4 foot areas (160,000 per square mile—31.5 trillion across the earth).

Accordingly, the remote areas can constitute first level areas, the territory areas can constitute second level areas, the sector areas can constitute third level areas, the quadrant areas can constitute fourth level areas, the local areas can constitute fifth level areas, and the patch areas can constitute sixth level areas. Accordingly, the largest of the areas can be the remote areas. The smallest of the areas can be the patch areas. The above naming or nomenclature is used for purposes of explanation and discussion herein. It should of course be appreciated that the areas can be named as desired.

As described herein, the areas as defined and processed in the system of the disclosure can be formed by various techniques and mechanisms. Area boundaries for each remote area, for example, can be established using longitude-latitude data. Various information can be used to determine the boundaries of the remote areas and/or to determine the longitude-latitude (long-lat) of a particular location or geographical feature. Such information can include natural landmass orientation boundaries, ocean or water boundaries, concentrations of populations, countries, states, provinces, counties, cities and other predefined sites or areas.

Once the first level areas are defined with boundaries of each of the "remote" can be defined using a 100 mile×100 mile, the second level areas (territories) can then be defined. The boundaries of each of the "territories" can be defined using a 10 mile×10 mile grid system that can be used for further tagging or identifying content for example. That is, the system of the disclosure can segment each of the "remote" areas by mathematically deriving longitudes and latitudes for each territory, i.e., such that each territory possesses a 10 mile×10 mile area.

Once the second level areas are defined, the third level areas (sectors) can then be defined. The boundaries of each of the sectors can be defined using a 1 mile×1 mile area grid system that can be used for further tagging or identifying content. That is, the system of the disclosure can segment each of the territory areas by mathematically deriving longitudes and latitudes for each sector, i.e., such that each sector possesses a 1 mile×1 mile area.

Once the third level areas are defined, the fourth level areas (quadrants) can then be defined. The boundaries of each of the quadrants can be defined using a ¼ mile×¼ mile grid system that can be used for further tagging or identifying content. That is, the system of the disclosure can segment each of the quadrant areas by mathematically deriving longitudes and latitudes for each quadrant, i.e., such that each quadrant possesses a ¼ mile×¼ mile area, i.e. a 1,340 feet×1,340 feet area.

Once the fourth level areas are defined, the fifth level areas (locals) can then be defined. The boundaries of each of the locals can be defined using a 134 feet×134 feet grid system that can be used for further tagging or identifying content, i.e. by breaking up each of the quadrants by using a 10×10 grid. That is, the system of the disclosure can segment each of the local areas by mathematically deriving longitudes and latitudes for each local, such that each local possesses a 134 feet×134 area.

Once the fifth level areas are defined, the sixth and lowest level areas (i.e. patches) can then be defined. The boundaries of each of the patches can be defined using a 13.4 feet×13.4 feet grid system that can be used for further tagging or identifying content, i.e. by breaking up each of the locals by using a 10×10 grid. That is, the system of the disclosure can segment each of the patch areas by mathematically deriving longitudes and latitudes for each patch, such that each patch possesses a 13.4 feet×13.4 area.

For purposes of description, processing has been described herein as processing a "photo". However, it should be appreciated that such processing described as performed on a "photo" can be performed on content described as a photograph, digital photograph, digital photo, picture, video, digital video, image, digital image, and/or other content described using similar terminology. In general, the processing of the disclosure can be utilized with content or digital content, including a video, as may be desired.

In an embodiment of the disclosure, the process of determining a popular spot can begin with geographic segmentation that starts with the identification of a known geographic area of interest that represents a "site". For example, a "site" can be the area that encompasses the Statue of Liberty. In such example, smaller "spots" of uniquely identified areas can provide different vantage points within the site. Accordingly, a "bottom up" approach can be used in which spots are identified and such identified "spots" can be accumulated into a site. Further, a first site can be geographically positioned next to or adjacent to a second site.

In accordance with at least one embodiment of the disclosure, the processing can include a determination of a "relevant universe" of all stored digital photos, i.e. "available photos" that can be used in the processing of the disclosure. Stored digital photos can be tied to an area with a related longitude and latitude with such point contained within the area. A photo can include or be associated with metadata that represents the location at which the photo was taken. Such location metadata can be in the form of a point defined in a coordinate system. For example, the point can be the longitude-latitude (i.e. "long-lat" or LL") at which the photo was taken. Parameters can be established for variables that can dictate whether a photo will or will not be included in the processing of the system, i.e. whether a photo will be an "active photo" or an "inactive photo". The parameters can include the current (age of photo) and definition or protocol that can be used to determine the current age of the photo, location type(s), various minimum volumes, popularity rankings, affinity groups, user identification and credentials, and other attributes of a photo. Such attributes can be adjustable or variable through user interface with the system. For example, a photo can be deemed relevant and included, as an active photo, if less than one year old as determined by the date that the photo was taken. Such parameters that control whether a photo is an active photo or an inactive photo, can be adjusted as desired. For example, with some spots, a photo might be relevant, and included as an active photo, if less than 10 years old. With other spots, a photo may only be an active photo if less than 5 years old, for example. Additionally, photos can be included in the processing of the system, as an active photo, dependent on an interrelationship of the photo with other photos. For example, a density of photos can be taken into consideration where the system performs processing to determine how many photos there are in a particular area. If a threshold number of photos in an area has been achieved, then all of such photos in the area can be included as an active photo. On the other hand, if a threshold number of photos in an area has not been achieved, then such photos may be deemed to be inactive photos. That is, illustratively, photos in an area that have not collectively achieved a predetermined density threshold can be maintained as inactive photos in a database. The photos can be maintained on a back end of the system for example. As more photos are added to the particular area, the density of photos is the particular area, such as a patch, will increase. Once the particular density threshold is attained in the area, the photos can be become active, i.e. by virtue that requisite density has been attained—and a patch is thus evolved into a spot, for example. Other variables or parameters can affect whether a particular photo is included in processing as an "active photo" or whether such photo is "inactive".

Inclusion of a photo or photos as active can be dictated, by the processing of the system, dependent on whether there are a sufficient number of photos of a particular patch or other location type or combination thereof. Inclusion of a photo or photos as active can be dictated by attributes of a populated matrix of attributes or characteristics. For example, a "location type" of a photo can include types such as see, do, eat, drink, stay, shop or conceptual. Such types can be associated with particular spots to see, particular activities to engage in, particular restaurants to eat at, particular restaurants to drink at, or particular hotels to stay at. Additionally, the inclusion or non-inclusion of a photo (as an active photo) can depend on attributes of surrounding areas. For example, photos in the top 20% of "local" areas, out of all local areas in a particular area, may be included in the processing as active photos. Such inclusion can be controlled by the processing of the system.

A further processing component of the system of the disclosure can include establishment or generation of "virtual containers". These virtual containers can provide placeholders for segregation and accumulation of photos. The virtual containers can correspond to and be defined by each of the areas described above—including remote, territory, sector, quadrant, local, and patch areas. In at least some embodiments of the disclosure, each of the photos can be segregated based on location of the photo vis-à-vis the particular area or areas in which such location (of the photo) falls within. Processing can be performed on an available photo to determine which area(s) or virtual container(s) the particular photo belongs in. In such processing, a photo can "cascade" down so as to be associated or tagged with the various virtual container(s) to which the photo belongs. More specifically, processing can be performed so as to associate or tag a photo with: a remote area that geographically bounds the location of the photo; a territory (within the tagged remote area) that bounds the location of the photo; a sector (within the tagged territory) that bounds location of the photo; a quadrant (within the tagged sector) that bounds location of the photo; a local (within the tagged quadrant) that bounds location of the photo; and a patch (within the tagged local) that bounds location of the photo.

A further processing component of the system of the disclosure can include an auto incremented and counting routine. For example, further photos can be added into a particular patch. As the photos are added in, a count associated with the particular patch can be automatically incremented. The patches can be then be ranked and processing performed based on such ranking A table of counts, for each patch, and rankings of the patches can be maintained by the system. A table of counts and rankings can be maintained based on the number of photos in patches. Additionally, a table of counts and rankings can be maintained based on attributes or characteristics of photos in the patches. For example, a table of counts and rankings can be maintained based on how many photos in each "patch" relate to places to eat. For example, a table of counts and rankings can be maintained based on how many photos in each patch relate to events to see. The table of counts and rankings can be maintained in a database for access by the system and updated or overwritten in some periodic manner—or based on additional data that is input into the system.

The processing as described herein, including components of the processing, can be executed periodically or at predetermined time(s). For example processing as described herein may be performed daily, hourly, weekly or other desired frequency and may be limited to or vary by particular identified geographic areas. Processing can be performed when a new photo is uploaded into the system, such as when a new photo is input from a user. Processing can be performed upon request by a requesting, authenticated user over an established network. Processing can be performed when a new photo or batch of photos is uploaded into the system from a user, a database, or a third party server, for example.

Hereinafter, further aspects of the systems and methods of the invention will be described.

In accordance with at least one embodiment of the disclosed subject matter, processing performed by the system can include accessing a photo database, which has been populated by photos from users and other sources. The photo database can contain location data regarding the photos. The processing can include determining popularity of specific areas based on photos associated with each respective area. The processing can include determining popularity of specific areas—such as the number of photos in a "patch". A patch that can be the smallest area demarcated by the processing of the system. An area, such as a patch, can include the relative strength of a preference provided by the user, positive or negative. Popularity of a particular area can be based on various attributes of one or more photos. Popularity can be based on the number of photos in a particular area or areas, such as in a patch. Popularity of an area can be based on attributes of a photo including location data associated with the photo, time data associated with the photo, and various other data associated or appended to the photo or to a cluster of photos.

The area of a "patch" has been described herein for purposes of illustration. For example, a "patch" can evolve into a "spot" if density of photos therein is sufficient. However, other areas can also be considered for and attain "spot" status, as described herein. For example, a geographic region such as a national state park might be processed to determine if such region possess sufficient density (of photos) such that the region should be deemed a spot.

Popularity of a particular area can also be based on "location type" and the number of photos in such area that are associated with such location type. Accordingly, a given area (which can be a "patch") can be saved in the database (of the system) and tagged with a particular location type. In other words, the area can be associated with an attribute that indicates the area is of the particular location type. Such association or tagging can be performed utilizing a relational database, for example. Then, a photo may be associated with the area based on the location (of the photo) being located within the boundaries of such given area. Processing can then be performed to determine what "type" or "types" is the photo that was input. It may be the case that the photo is of a "type" that is the same as the "location type". Accordingly, the input of such photo can contribute to a "location type count" or tally of how many photos of the particular "type" are in the area of the particular "location type". In other words, if a photo in a particular area is of a type that corresponds to a "location type" of the area—then that photo will contribute to what might be referred to as a "location type count" of that area. Such "count" processing can thus provide popularity of a particular area with regard to the particular type. Such data can then be used to compare different areas, such as to compare different patches for comparative ranking.

It should be appreciated that a given area is not limited to one "location type". Additionally, a given photo is not limited to be of one "type". Accordingly, a particular area can be, i.e. can possess an attribute of, one or more location types. A particular photo can be, i.e. possess an attribute of, one or more types. For example, a photo taken at a popular restaurant at Niagara Falls can be tagged as "where to see" and "where to eat". Relatedly, the "spot" in which such restaurant is located can be tagged as "where to see" and "where to eat". As a result, the particular photo can contribute to the "location type count" of the spot for both "where to see" and "where to eat".

In accordance with at least one embodiment of the disclosed subject matter, coding or instructions of the system can identify location types (of areas) and types (of photos) as may be desired. Location types that are available for association or tagging of an area can be different for different areas. For example, an area that has only one restaurant can be tagged with a more general "location type" that can include "where to eat". On the other hand, another area can be densely populated with restaurants. Accordingly, the more general "location type" of "where to eat" can be further broken out into additional location types such as "Where to eat—American", "Where to eat—Italian", "Where to eat—Mexican", and "Where to eat—fast food".

For purposes of illustration, "location types" can include (1) "places" that can be organized by common characteristics such as consumer driven activities. Such "places" location type can be further differentiated to additional location types or levels, or what might be referred to as sub-levels. The further levels or sub-levels can include: a) where to see; b) where to photograph; c) activities to do; d) where to eat; e) where to drink beverages; f) where to stay, and g) where to shop, for example.

The location types can further include (2) "events" that can be tied to locations that may be activity driven, group attended (like parades or festivals) or newsworthy items that can occur more randomly.

The location types can further include (3) "things" that may include tangible items like candidates tied to a geographic area or intangible conceptual items like a referendum.

The location types can further include (4) "virtual" that may include user defined or "other" items assessed for popularity, user or voter preference.

As described above, the system can process geographic demarcations that can be referred to as "areas". A particular type of area, i.e. the smallest type of area, can be a "patch". Each patch can have an attribute of one or more "location types". A patch can be deemed more popular as more photos are associated with either the patch in general or with a location type(s) of the patch. A patch can be deemed to possess sufficient density of photos, i.e. may be deemed to be popular enough, to be a spot. The more popular spots can be referred to as "top ranked spots". Popularity of an area/spot can be determined by photographic vote, where one or more users submit photos that yield popularity values. Popularity values for each of a number of characteristics of the area can be determined from the photos and associated clusters of photos. Data regarding each photo, clusters of photos, and various other data can be stored in a suitable database so as to perform processing as described herein. Accordingly, a user's photo can be the user's vote.

FIG. 1 is a diagram showing a photo ecosystem or ecosystem 10 in accordance with at least one embodiment of the disclosed subject matter. The ecosystem 10 can include a photo system 100; a plurality of user devices 20, 20', 20"; and a third-party resource(s) 30. The various components of the ecosystem 10 can be connected and in communication with each other utilizing a suitable network 11. For example, the network 11 can be in the form of or include the Internet, a private network, and/or some other network. The network 11 can be composed of a plurality of discrete networks that communicate with each other and with the components illustrated in FIG. 1. It should be appreciated that the diagram of FIG. 1 is for purposes of illustration. The photo system 100 can be in the form of one or more servers or in the form of a distributed computer system. While three user devices are illustrated in FIG. 1, the ecosystem 10 can include many more user devices—and may well include thousands or millions of user devices. Each of such additional user devices can interact with photo system 100. Additionally, while one third-party resource 30 is illustrated, it should be appreciated that many third-party resources can be utilized and included in the ecosystem 10. Additional systems, servers, processors, and other processing assets and/or database assets can be included in the ecosystem 10.

The photo system 100 can perform various processing as described herein based on instructions stored in the database portion 120. The photo system 100 can store instructions so as to provide the processing described herein and can store the various photos, i.e. photo data that can include digital image data (of the image itself—a reproduction of what would be viewed by the human eye) as well as metadata about the photo, that is processed by the photo system 100. The photo system 100 can be connected to the network 11 so as to receive data from a variety of devices. The devices can be stationary in nature, like a desktop computer used for planning future location visits across the earth. The devices can be mobilized to include data identifying a current location and for establishing an area that is proximate to the user—and that is of immediate interest to the user. The photo system 100 can interface with the user device 20 so as to provide a variety of features to the user device 20. The photo system 100 can input data from the user device 20. The photo system 100 can output data to the user device 20.

The photo system 100 can include a computer processor (CP) 110 and a database portion 120. The CP 110 can include a variety of processing portions as illustrated. Additionally, the database portion 120 can include a variety of database portions as illustrated.

The CP 110 can include a general processing portion 111. The general processing portion 111 can perform various general processing so as to perform general operations of the photo system 100. The general processing portion 111 can perform processing based on instructions contained in the database portion 120. The general processing portion 111 can perform any of the processing required or desired (so as to provide functionality of the photo system 100) that is not handled by the more specialized processing portions 112-116. However, it should be appreciated that the processing performed by the general processing portion 111 can be specialized in and of itself so as to provide the various functionality described in this disclosure.

The CP 110 includes the area segmentation processing portion 112. The area segmentation processing portion 112 can handle segmentation processing as described herein. Accordingly, the area segmentation processing portion 112 can handle segmentation of an area, for example the world, into first level areas, second level areas, third level areas and so forth. The area segmentation processing portion 112 can handle segmentation down to the level of a "patch". The area segmentation processing portion 112 can handle various related processing.

The CP 110 also includes the photo input processing portion 113. The processing portion 113 can handle photo input processing as described herein. Such processing can include various processing related to the input of a photo, interfacing with a user in conjunction with input of a photo, processing that is performed once the photo is input, processing of metadata associated with the photo, and various related processing. The CP 110 also includes the spot generation processing portion 114. The processing portion 114 can handle spot generation processing as described herein. Such processing can include generation of a "spot" once predetermined thresholds have been attained such that a particular area is to be identified as a spot, generation and saving of data in conjunction with generation of a spot, and various related processing.

The CP 110 can also include the user engagement processing portion 115. The processing portion 115 can handle user engagement processing as described herein. Such processing can include a wide variety of processing related to user engagement including using credentials to identify a current user, setting up a new user on the system, establishing preferences or settings of a user, and various related processing. The CP 110 can also include the collective user processing portion 116. The processing portion 116 can handle collective user processing as described herein. Such processing can include various processing related to crowd sourced information, user review processing, user rating processing, user feedback processing, other processing that relates to interfacing with a plurality of users or other persons on an aggregated basis, and various related processing.

The photo system 100 can include the database portion 120. The database portion 120 can include a general database 121. The general database 121 can include various data used by and/or generated by the general processing portion 111.

The database portion 120 can include an area segmentation database 122. The area segmentation database 122 can include various data used by and/or generated by the area segmentation processing portion 112.

The database portion 120 can include a photo database 123. The photo database 123 can include various data used by and/or generated by the photo input processing portion 113.

The database portion 120 can include a spot generation database 124. The spot generation database 124 can include various data used by and/or generated by the spot generation processing portion 114.

The database portion 120 can include a user engagement database 125. The user engagement database 125 can include various data used by and/or generated by the user engagement processing portion 115. The database portion 120 can include a collective user database 126. The collective user database 126 can include various data used by and/or generated by the collective user processing portion 116.

The photo system 100 can be in the form of or include one or more computer processors and one or more database portions 120. The photo system 100 can include or be in the form of a server. Various further details of the photo system 100 and the processing performed thereby are described below.

Figure 2:
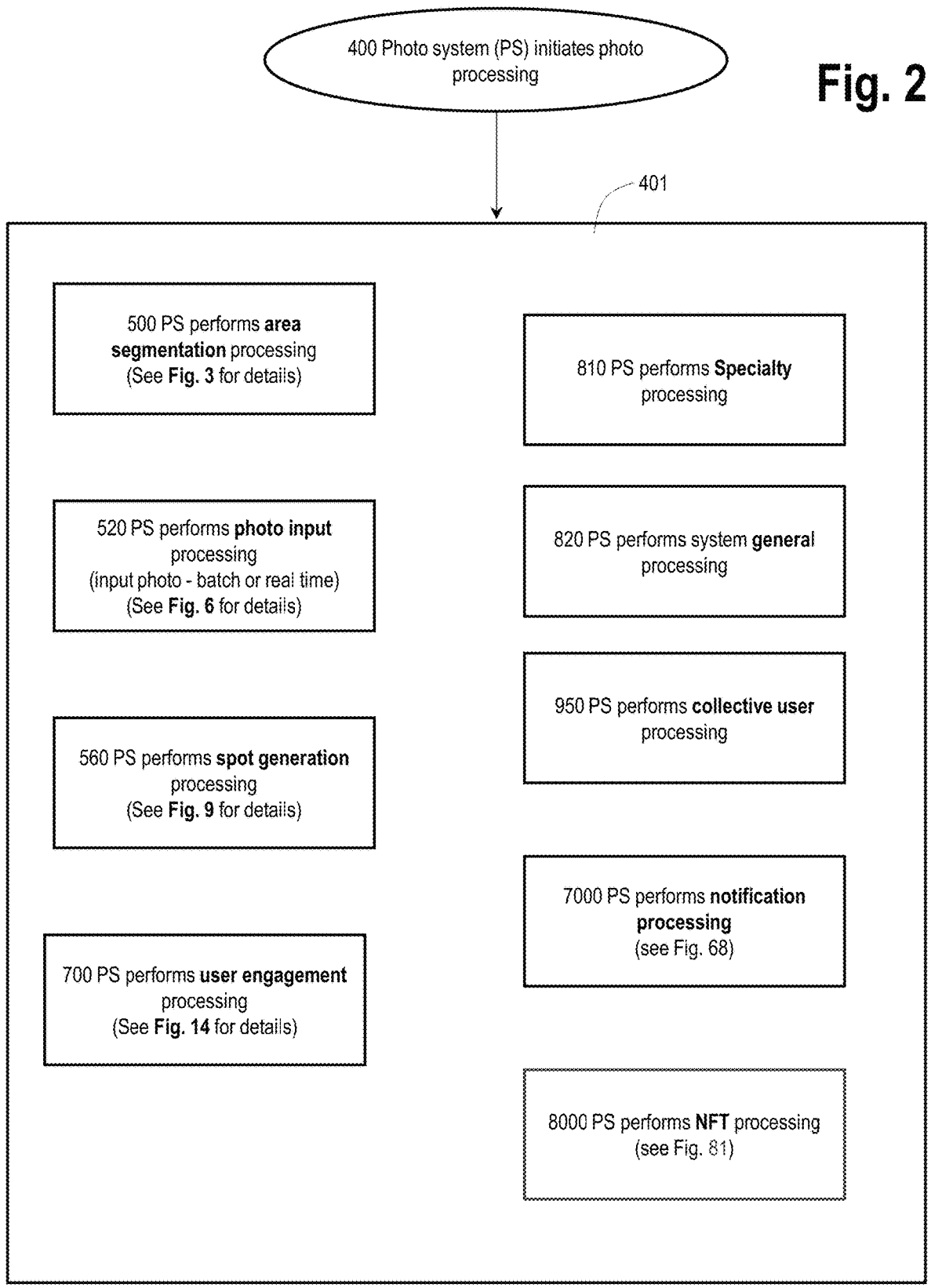
FIG. 2 is a high level flowchart illustrating processing that can be performed by the photo system (PS), in accordance with principles of the disclosed subject matter.

FIG. 2 is a high level flowchart illustrating processing that can be performed by the photo system 100, in accordance with principles of the disclosed subject matter. The processing can start in step 400 with initiating of photo processing. For example, step 400 can include enabling the system 100 or turning the photo system 100 "on".

The processing of FIG. 2 can pass from step 400 onto step 401. Step 401 illustrates various processing that can be performed by the system 100. The processing illustrated in step 401 can be performed in serial or in parallel relative to each other and need not be performed in the particular order illustrated in FIG. 2. In a particular implementation of the system 100, some processes of FIG. 2 can be performed or enabled and other processes may not be performed or enabled.

With reference to step 401 of FIG. 2, in step 500, the system can perform area segmentation processing. Further details are described below with reference to FIG. 3. In step 520, the system 100 can perform photo input processing. Such processing can include the input of photos in real time or in batch manner, for example. Further details are described below with reference to FIG. 6. In step 560, the system 100 can perform spot generation processing. Further details are described below with reference to FIG. 9. In step 700, the system 100 can perform user engagement processing. Further details are described below with reference to FIG. 14. In step 810, the system 100 can perform specialty processing. In step 950, the system 100 can perform collective user processing wherein the system engages with a plurality or mass of users to perform affinity groups processing, user following processing, assessment of ratings view processing, and related processing. In step 820, the system 100 can perform general processing. The various processing performed in step 401 can be performed by one or more of the processing portions in the CP 110. Further details are described below.

Figure 3:
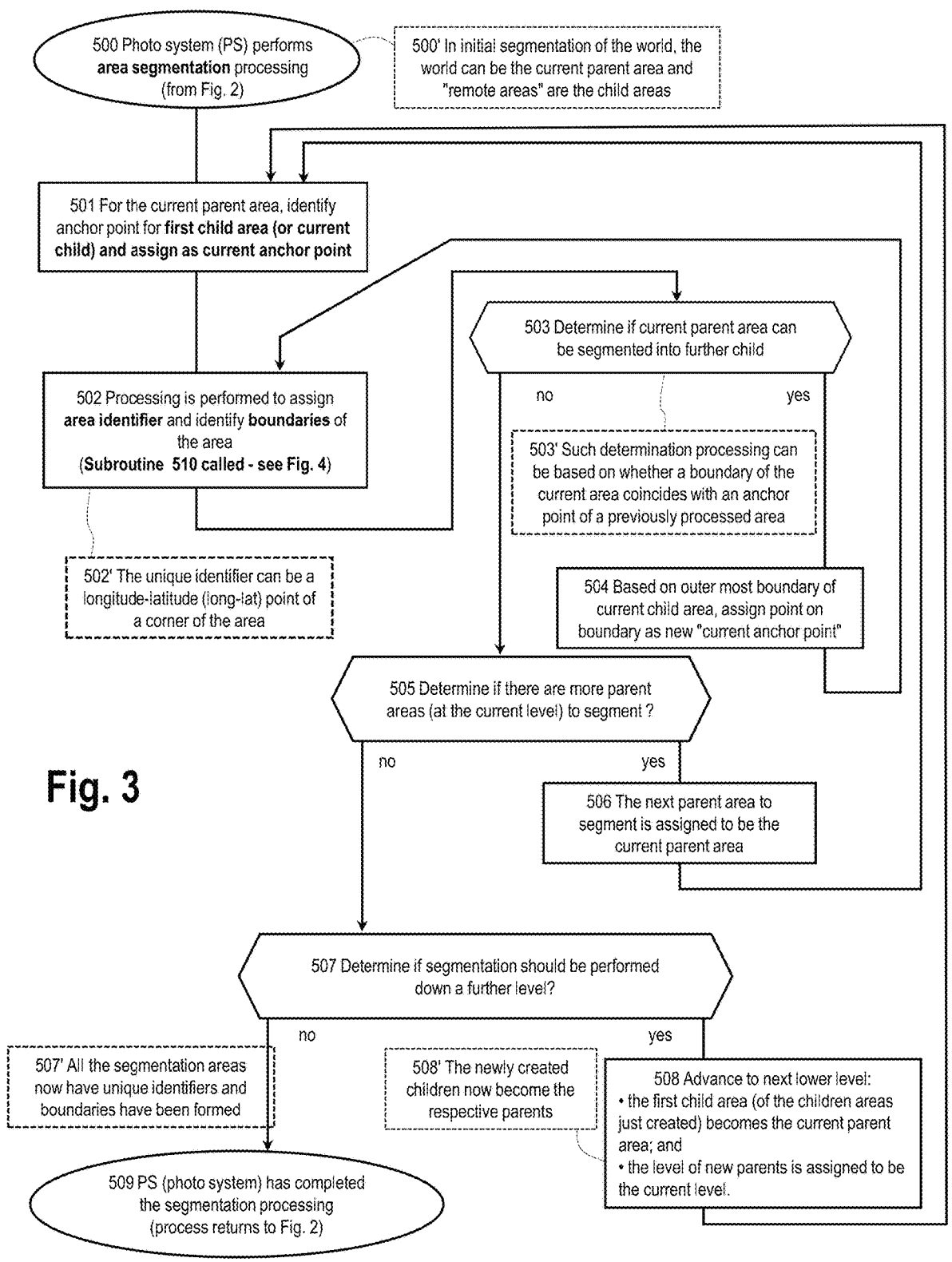
FIG. 3 is a flowchart showing further details of area segmentation processing, in accordance with principles of the disclosed subject matter.

FIG. 3 is a flowchart showing further details of the system 100 performs area segmentation processing, which can be called from the processing of FIG. 2, in accordance with principles of the disclosed subject matter. As illustrated, the processing starts in step 500 with segmentation of a predetermined geographic area, i.e., the world in this illustrative case. As reflected at 500', in initial segmentation of the world, the world can be a current parent area and "remote areas" can be child areas. That is, the processing of FIG. 3 illustrates processing in which a top down approach is utilized. In such processing, an initial area to be segmented can be segmented at a first level, each of the first level segmentations can then be segmented at a second level, and so forth—so as to attain a desired segmentation. Alternatively, a bottom up approach can be utilized. In a bottom up approach, the lowest level area can be segmented, a predetermined number of the lowest level areas can then be aggregated together so as to form a next higher up level, areas in the next higher up level area can then be aggregated so as to perform a further next higher up level, and so forth.

In such manner, a desired segmentation can be attained. Accordingly, with bottom up segmentation processing, the system builds up from smallest child to largest parent. With top-down segmentation processing, the system builds down from largest parent to smallest child. In accordance with at least one embodiment of the disclosure, the largest parent can be the world, whereas the smallest child can be demarcated as a "patch" as described herein.

After the processing is initiated in step 500, the process passes onto step 501. In step 501, for the current parent area, the system can identify an anchor point for the first child area (or for the current child) and assign such anchor point as a current anchor point. The anchor point can be long-lat coordinates or other coordinates.

After step 501, the process passes onto step 502. In step 502, processing is performed to assign an area identifier and identify boundaries of the area. In such processing, subroutine 510 of FIG. 4 can be called. As reflected at 502', the area identifier can be a unique identifier that can be a longitude-latitude point (long-lat) of a corner of the area. Accordingly, in one embodiment of the disclosure, one anchor point can identify location of the area and a height, width, or other geometrical extent can be used to identify boundaries of the particular area. In some embodiments of the disclosure, an upper left (in long-lat coordinates) and lower right (in long-lat coordinates) of the area can be used so as to define the area. With either approach, a unique identifier can also be assigned to each area so as to be used in processing of the area. After step 502, processing passes onto step 503.

In step 503, the process determines if the current area, which can be referred to as a parent area, can be segmented into a further child (i.e. in addition to the children that have already been formed out of the parent area). Such processing component is indicative of a top down approach, in contrast to a bottom up approach. In other words, the decision processing of step 503 determines if the current area has been fully segmented out such that no further segmentation is needed (in order to segment the current area).

As reflected at 503', such determination processing of step 503 can be based on whether a boundary of the current area coincides with an anchor point of a previously processed area. If a boundary of the current area does coincide with an anchor point, such can indicate that the processing has reached the end or limit of the current area. In some embodiments, the processing can advance in a horizontal manner—to segment across an area—until a boundary is reached. Then, the processing can start a new "row" below the row that was just segmented. In such manner, for a given area, the processing can advance across and drop down a row; across and drop down a row; across and drop down a row; and so forth until the particular area has been fully segmented. However, other methodologies can be used.

With further reference to step 503 of FIG. 3, if the decision of step 503 is yes, then the processing passes onto step 504. In step 504, based on an outer most boundary of the current child area, the process can assign a point on such boundary as a new "current anchor point". More specifically, the process may assign the upper point on a right boundary line as the new "current anchor point". If the upper point on the right boundary line has already been assigned to be an anchor point, or is positioned outside the current area being processed—then the system can know that the particular row is completed. Upon such determination, the process can "drop down" a row so as to segment the next row.

Once the new current anchor point is identified/determined in step 504, the processing passes back to step 502. In step 502, processing continues as described above.

On the other hand, it may be determined in step 503, that the current parent area cannot be segmented so as to form a further child. In other words, a no determination in step 503 indicates that the current parent area has been fully segmented into child areas. As a result, the process passes from step 503 onto step 505.

In step 505, the processing determines if there are more parent areas (at the current level) to segment. If yes, then the process passes onto step 506.

In step 506, the next parent area to segment is assigned to be the current parent area. The process passes from step 506 back to step 501. Processing then continues as described above. On the other hand, it may be determined that there are not more parent areas (at the current level) to segment. Such no determination in step 505 indicates that all the areas at the current level have been segmented out, i.e. such that children of the current parent have been created. Accordingly, the process passes from step 505 onto step 507.

In step 507, the processing determines if segmentation should be performed down a further level. If yes in step 507, the processing passes onto step 508. In step 508, the process advances to the next lower level. Accordingly, the first child area (of the children areas just created) becomes the current parent area. Also, the level of the new parents is assigned to be the current level. More generally, as reflected at 508', the newly created children now become the parents. The processing passes back to step 501. In step 501, the processing continues as described above.

It may be determined in step 507, that segmentation is not to be performed down a further level, i.e. that the segmentation processing has indeed attained the lowest level to be segmented. Such lowest level can be the "patch" level as described herein. As reflected at 507', a no determination in step 507 reflects that all of the segmentation areas now have unique identifiers and that all boundaries of the areas have been formed. Accordingly, the process passes from step 507 onto step 509. In step 509, the system has completed the segmentation processing. Accordingly, the process returns to FIG. 2.

Figure 4:
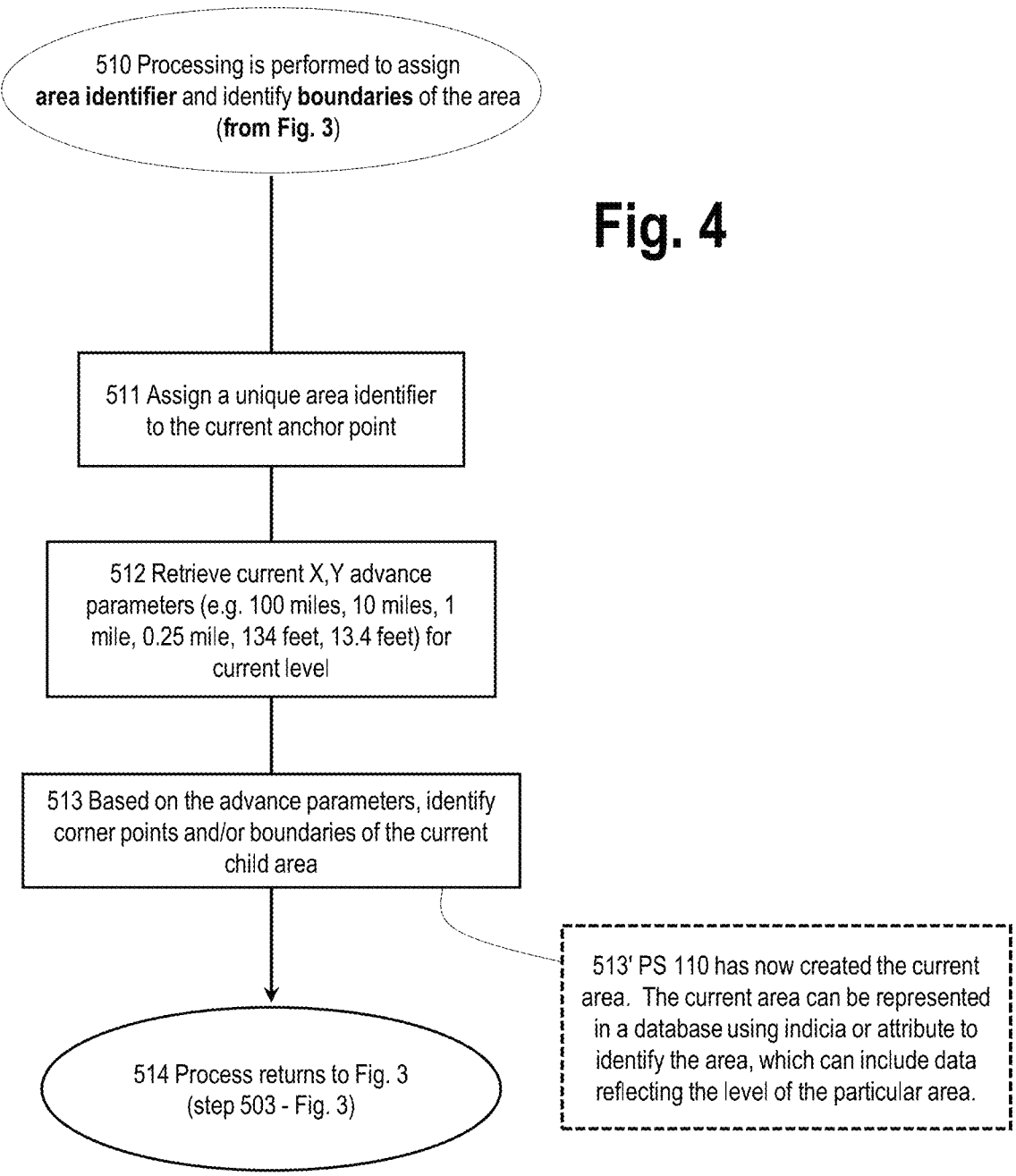
FIG. 4 is a flowchart showing details of "processing is performed to assign area identifier and identify boundaries of the area" in accordance with principles of the disclosed subject matter.

FIG. 4 is a flowchart showing details of "processing is performed to assign area identifier and identify boundaries of the area" of subroutine 510 as called from FIG. 3, in accordance with at least one embodiment of the disclosed subject matter. As shown, the process starts in step 510 and passes onto step 511. In step 511, the system assigns a unique area identifier to the current anchor point. In one embodiment, the unique area identifier can correspond to one corner of the area using longitude and latitude values. Then, the process passes onto step 512.

In step 512, the system can retrieve current X, Y advance parameters for the current level. The current advance parameters can dictate magnitude of a new area to be formed, or in other words to be segmented out. If the X, Y advance parameters are 10 miles, 10 miles, respectively—then an area that is 10 miles wide and 10 miles high will be created. Such X, Y advance parameters can be utilized to create the segmentation areas described above. Such segmentation areas can include remote, territory, sector, quadrants, local, and patch. Accordingly, it should be appreciated that as the system performs segmentation processing, the system can retrieve the particular X, Y advance parameters that correspond to the current level being processed. The X, Y advance parameters can be selected so as to evenly segment a current parent area into children areas. In at least some embodiments, it may be the case that all the children areas are not of the same magnitude in square miles or in square feet, for example. Additionally, the advance parameters can be more complex than X, Y advance parameters. More complex advance parameters can be used when segmenting more complex geographical areas, such as the circular curvature of the world or globe.

After step 512, the process passes onto step 513. In step 513, based on the advance parameters, the system identifies corner points and/or boundaries of the current child area. As a result, as reflected at 513', the CP 110 has now created a new current area.

After step 513, the process passes onto step 514. In step 514, the process returns to FIG. 3. Specifically, the process passes onto step 503 of FIG. 3.

Figure 5:
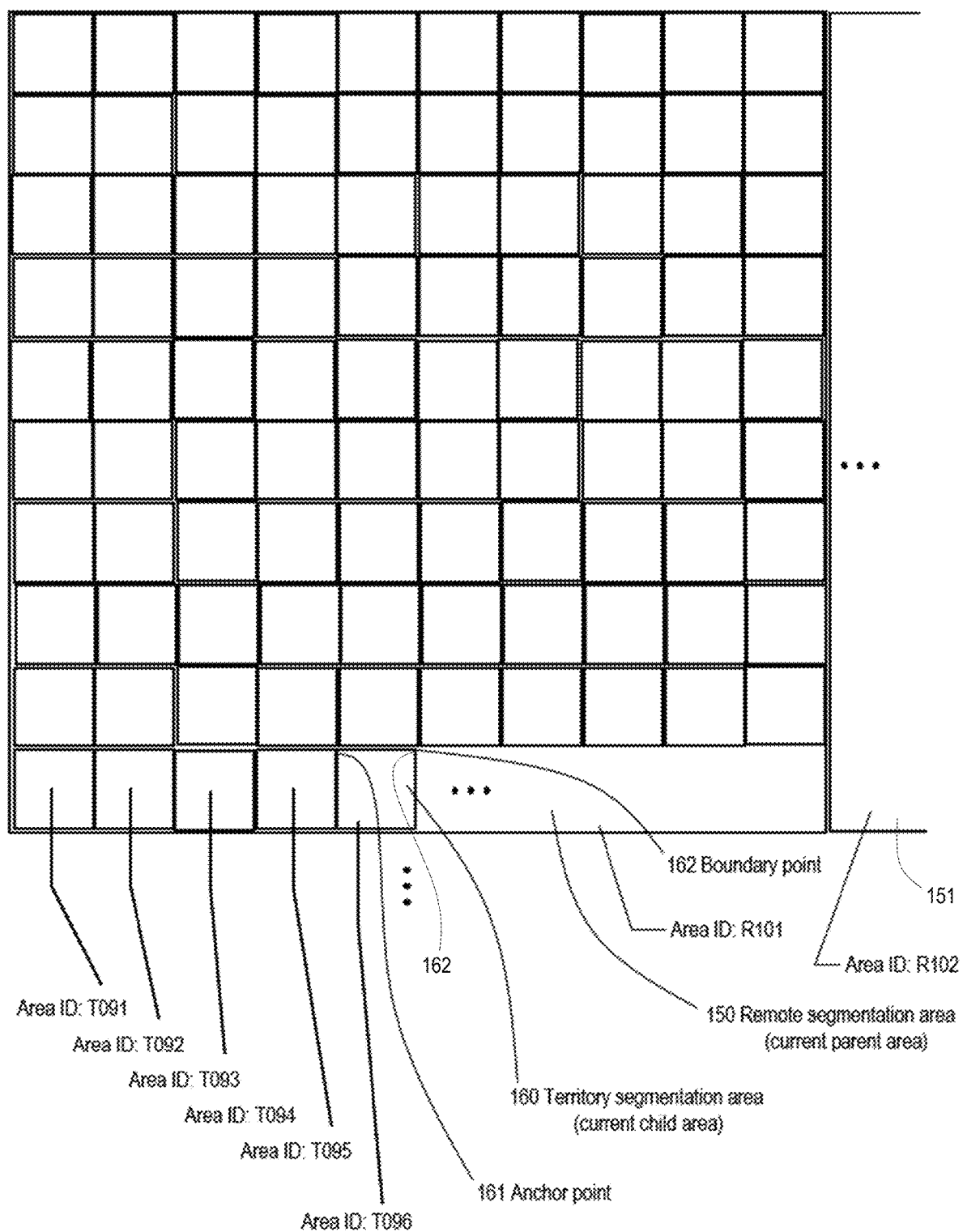
FIG. 5 is a diagram showing segmentation of a remote segmentation area, in accordance with principles of the disclosed subject matter.

FIG. 5 is a diagram showing segmentation of a remote segmentation area 150. In the example, a "remote" area is the current parent area and "territory" children areas are being formed/segmented out of such parent area 150. As shown in FIG. 5, segmentation of the area 150 (current parent area) into children areas is almost complete, i.e. with five children areas to be formed or further segmented out. The current child area 160 has been assigned an area ID (i.e. an area identification or area identifier) of T096. Such area T096 possesses an anchor point 161. In this example, the anchor point 161 can be an upper left hand corner (in long-lat coordinates) of the area T096. The area T096 can also include a boundary point 162. The boundary point 162 can be provided at the upper right-hand corner of the area T096. The boundary point 162 may have been identified by the current X, Y advance parameters as described above with reference to step 512 of FIG. 4. Once the territory area 160 is saved into memory, the processing can then use the boundary point 162 as the next anchor point—for the next territory area to be segmented out. Such is illustrative of the processing of step 504 of FIG. 3. The area 160 can be defined based on a predetermined height (as shown in FIG. 5) so as to define the two-dimensional area. The area can be defined so as to be square—and thus the distance between the points 161 and 162 can also serve to define the height (as shown in FIG. 5) of the two-dimensional area 160, as well as the height.

As illustrated in FIG. 5, after the formation of the area 160, the system has five more territory levels to form (in the remote area 150) in order to fully segment out the remote area 150. The system, i.e. the CP 110, can determine that segmentation is complete once (1) an upper right boundary point 162 of an area corresponds to a right hand boundary of the area 150 and (2) a lower right boundary 162 corresponds to a lower boundary of the area 150, for example.

Once segmentation of the current parent area 150 is completed, then the processing can advance to the next parent area (at the current level). That is, the processing can advance from the remote area 150 onto the remote area 151.

Figure 6:
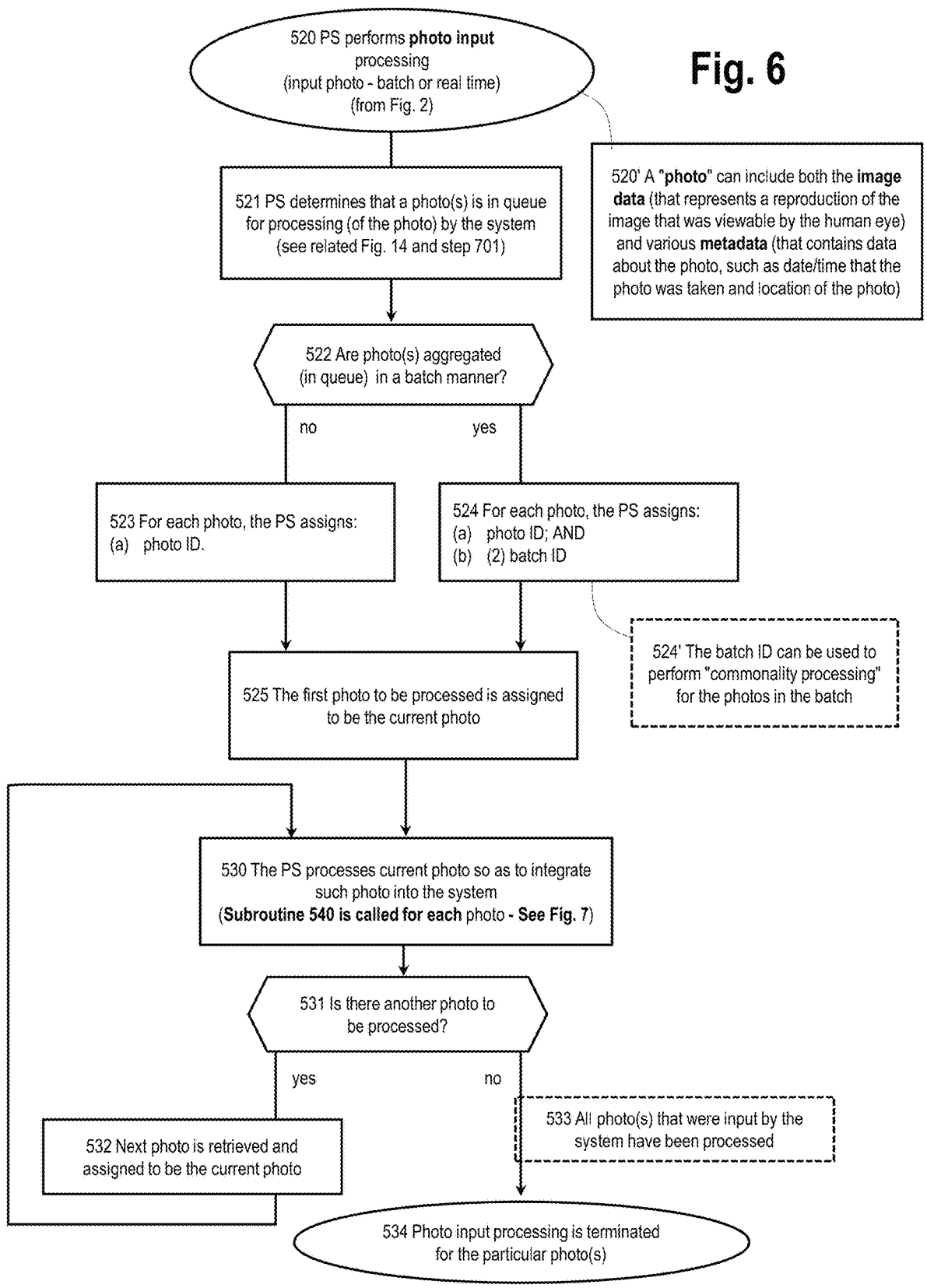
FIG. 6 is a flowchart showing details of the "photo system performs photo input processing", in accordance with principles of the disclosed subject matter.

FIG. 6 is a flowchart showing details of the "photo system (PS) 100 performs photo input processing" of step 520 of FIG. 2, in accordance with principles of the disclosed subject matter. Such processing can include the inputting of a photo or photos with either batch or real time processing, for example. As shown, the process starts in step 520 and passes onto step 521.

As reflected at 520', a "photo" or "photo data" can include both image data (that represents a reproduction of the image that was viewable by the human eye) and various metadata (that contains data about the photo, such as date/time that the photo was taken and location of the photo). The location data of a photo can be in the form or include a point or geographical point. For example, the point can be the longitude-latitude (long-lat) at which the photo was taken.

In step 521 of FIG. 6, the system determines that one or more photos are in queue for processing of the one or more photos by the system 100. Accordingly, the processing of step 521 assumes that one or more photos are in queue for processing. After step 521, the process passes onto step 522.

In step 522, the system determines if the one or more photos are aggregated (in queue) in a batch manner. In other words, processing can determine if a group of photos has been uploaded to the system in a batch manner. In such situation, it may be desirable or beneficial to capture the fact that such photos were input together in a batch manner. In other words, it may be beneficial to capture such interrelationship between such uploaded photos. The processing of step 524 provides such capture of interrelationship between the photos. That is, if yes in step 522, the process then passes onto step 524. In step 524, for each photo, the system assigns both a photo ID (identification or identifier) and a batch ID. The batch ID can be common to all photos in the particular batch. Accordingly, the interrelationship or association between the photos in the batch can be captured in the database portion 120. As shown at 524', the batch ID can be used to perform "commonality processing" for the photos in the batch. After step 524, the processing passes onto step 525.

On the other hand, it may be the case in step 522 that the photos are not aggregated in a batch manner or that there is only one photo in queue for processing. As a result, the process passes from step 522 onto step 523. In step 523, for each photo, the system assigns a photo ID. The process then passes onto step 525.

In step 525, the first photo to be processed is assigned to be the current photo. Then, in step 530, the system processes the current photo so as to integrate such photo into the system. Such processing can include integration into the database and photo inventory of the system. Subroutine 540, of FIG. 7, can be called upon so as to process each photo. Then, after step 530, the processing passes onto step 531. In step 531, a determination is performed by the system of whether there is another photo to be processed. If yes, then the processing passes onto step 532.

In step 532, the system retrieves the next photo and assigns such retrieved photo to be the "current photo" in the processing. Processing then passes back to step 530. Processing then continues as described above.

Alternatively, it may be determined in step 531, that there is not another photo to be processed. Accordingly, a no determination is determined in step 531. As shown at 533, such reflects that all photo or photos that were input by the system have been processed. With such determination, the processing passes from step 531 onto step 534. In step 534, photo input processing is terminated for the particular photo(s) or for the particular batch of photos.

Figure 7:
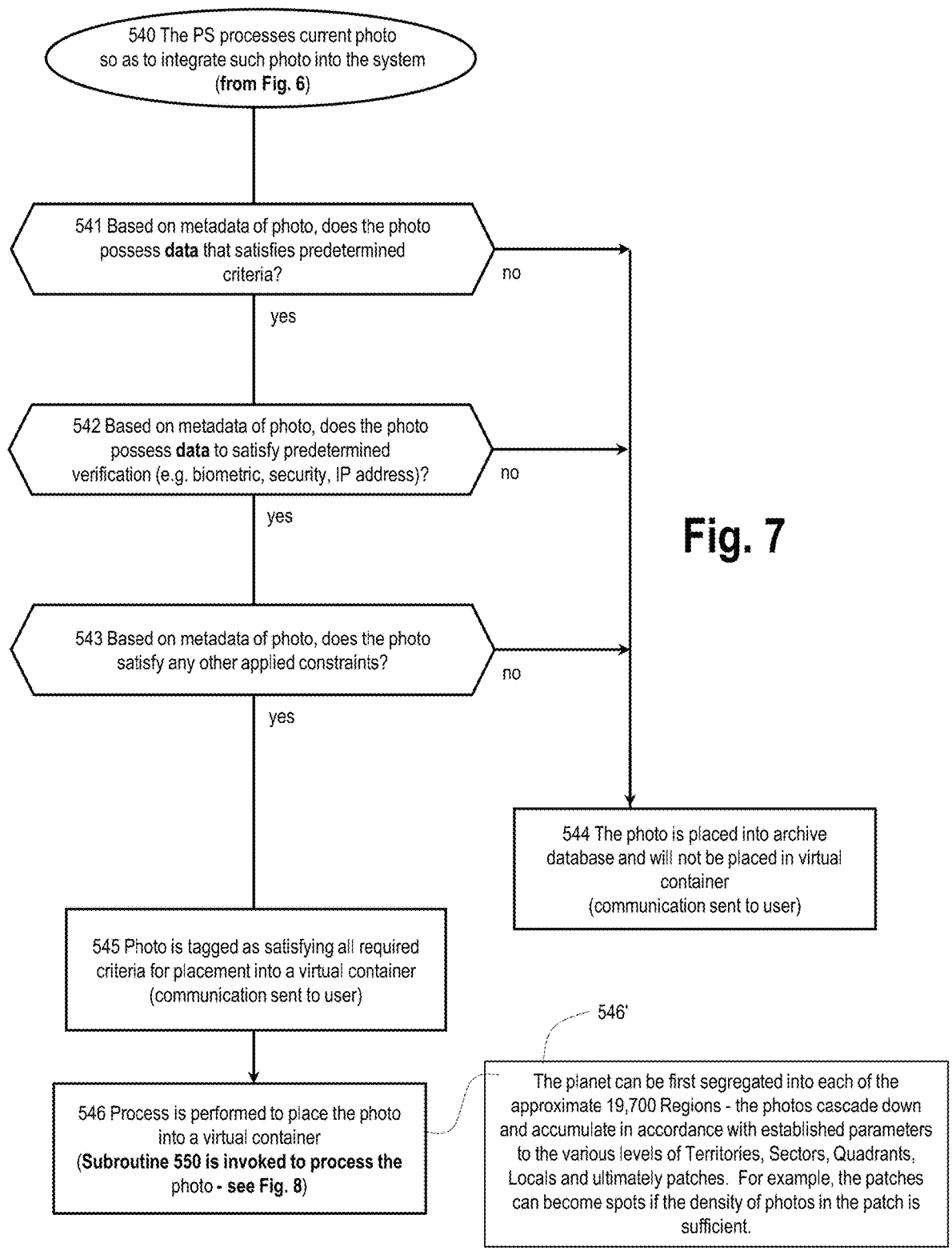
FIG. 7 is a flowchart showing further details of the system "processes current photo so as to integrate such photo into the system" in accordance with principles of the disclosed subject matter.

FIG. 7 is a flowchart showing further details of the system "processes current photo so as to integrate such photo into the system" of subroutine 540 as called from FIG. 6, in accordance with at least one embodiment of the disclosed subject matter. As shown, the process starts in step 540 and passes onto step 541. In step 541, the system determines, based on metadata of the photo, does the photo possess metadata that satisfies predetermined criteria. For example, the processing of step 541 can relate to determining whether the metadata contains appropriate location data that can include longitude and latitude data, appropriate date and time data, data indicating a source of the image such as a particular user, and other requisite data. If no in step 541, the process passes onto step 544. In step 544, the photo can be placed into an archive database or other suitable database and will not be placed in a virtual container, in at least one embodiment of the disclosure. In other words, the photo will not be placed into the active inventory of the system. A communication can be sent to the originating user indicating that the metadata associated with the photo was insufficient to be included in the photo system.

If a yes determination is determined in step 541, then the process passes onto step 542. In step 542, based on metadata of the photo, the system determines whether the photo possesses data to satisfy predetermined verification requirements. For example, was appropriate biometric data included with the photo for verification of the photo, were other security protocols satisfied, and/or was an appropriate IP address of a source user device received. If no, than the processing passes to step 544. In step 544, processing is performed as described above.

If yes in step 542, the process passes onto step 543. In step 543, the processing can determine, based on the metadata of the photo, does the photo satisfy any other applied constraints. If no, then the processing again passes to step 544.

On the other hand, if yes in step 543, then the process passes onto step 545. In step 545, the photo is tagged as satisfying all required criteria for placement into a virtual container or in other words for the photo to be placed in the active inventory of the system as an active photo. As a result, a communication can be sent to the user. Such communication can be of a congratulatory nature indicating that his or her input photo has been successfully input into the photo system 100. Then, the processing passes onto step 546.

Figure 8:
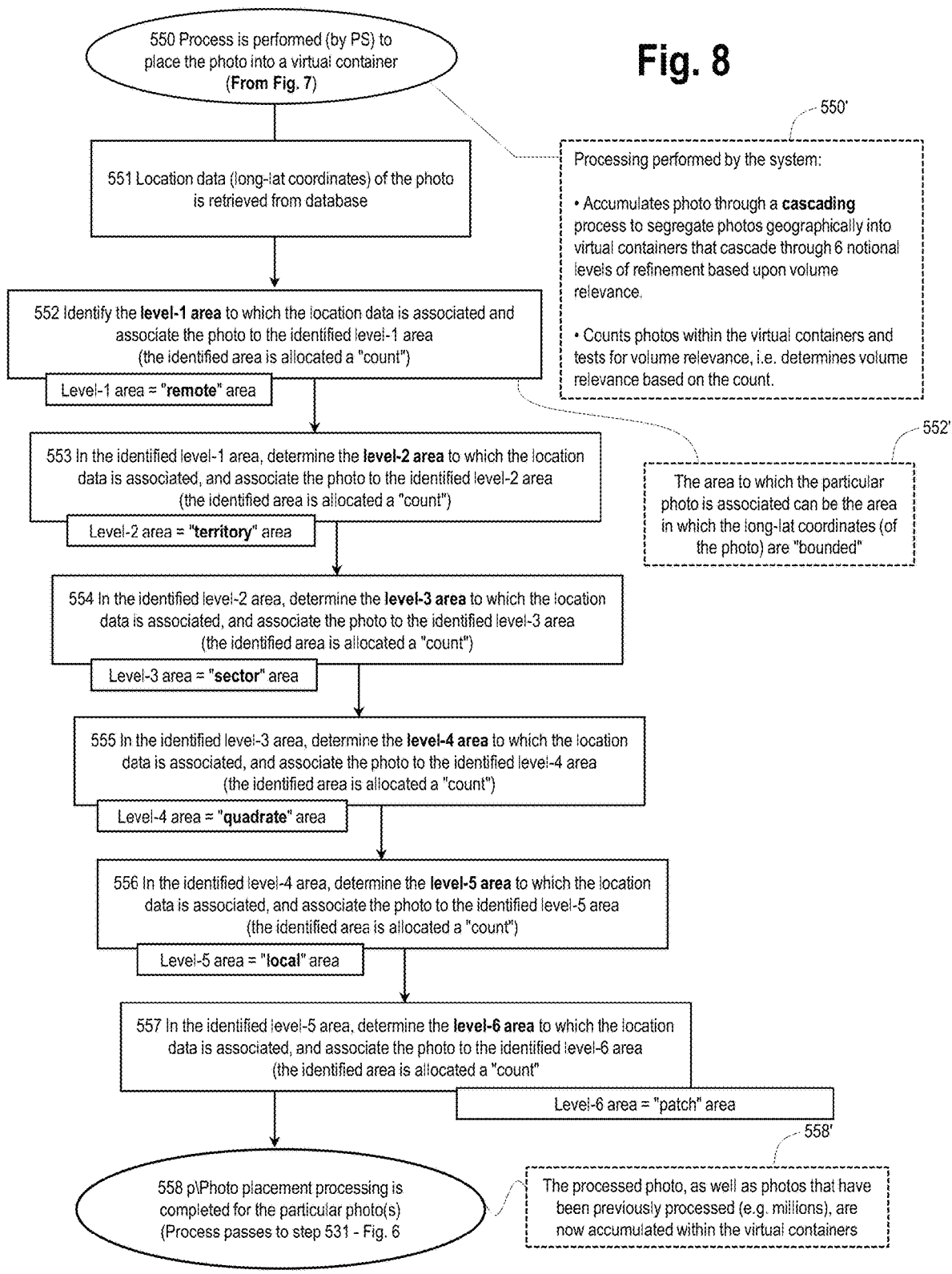
FIG. 8 is a flowchart showing processing "to place a photo into a virtual container," in accordance with principles of the disclosed subject matter.

In step 546, processing is performed to place the photo into a virtual container. Subroutine 550 can be invoked to process the photo, as shown in FIG. 8. As shown in FIG. 7 and reflected at 546', a particular area, such as the world or planet, can be first segregated into one of the approximately 19,700 remote areas. The input photos can cascade down and accumulate in accordance with established parameters to the lower levels of territories, sectors, quadrants, locals, and ultimately patches.

FIG. 8 is a flowchart showing in further detail subroutine 550 (called from the processing of FIG. 7) that can include processing to place the photo into a virtual container, in accordance with at least one embodiment of the disclosure. As is shown at 550', the processing of FIG. 8 can include various components. The processing can accumulate photos through a cascading process to segregate photos geographically into virtual containers that cascade through 6 levels of refinement based upon volume relevance. The processing can count the photos within each of the virtual containers and test for volume relevance. In other words, the processing can determine volume relevance based on a count of photos in a virtual container.

The processing of FIG. 8 starts in step 550 and passes onto step 551. In step 551, location data of the photo is retrieved from the appropriate database. Then, in step 552, the process identifies the particular level-1 area to which the location data is associated and associates the photo to the identified level-1 area. The level-1 area can be one of the "remote" areas as described herein. As reflected at 552', the area to which the particular photo is associated can be the area in which the longitude and latitude coordinates of the photo are bounded. In other words, the area to which the particular photo is associated can be the area in which the photo is located. Then, the process passes onto step 553.

In step 553, in the identified level-1 area, which was identified in step 552, the processing determines the level-2 area to which the photo is associated. The processing then associates the photo to the identified level-2 area. Such identified area is then allocated a count.

In step 554, in the identified level-2 area, which was identified in step 553, the processing determines the level-3 area to which the data is associated. The processing then associates the photo to the identified level-3 area. Such identified area is then allocated a count.

In step 555, in the identified level-3 area, which was identified in step 554, the processing determines the level-4 area to which the photo is associated. The processing then associates the photo to the identified level-4 area. Such identified area is then allocated a count.

In step 556, in the identified level-4 area, which was identified in step 555, the processing determines the level-5 area to which the photo is associated. The processing then associates the photo to the identified level-5 area. Such identified area is then allocated a count.

In step 557, in the identified level-5 area, which was identified in step 556, the processing determines the level-6 area to which the photo is associated. The processing then associates the photo to the identified level-6 area. Such identified area is then allocated a count. The level 6 area can be a patch or patch area. Accordingly, as shown in FIG. 8, cascade processing can be utilized so as to associate an input photo into a respective virtual container for each of the levels. After step 557 of FIG. 8, the processing passes onto step 558. In step 558, photo placement processing is completed for the particular photo. As reflected at 558', the processed photo, as well as photos that have been previously processed are now accumulated within the various virtual containers. Such photos can be in the many to thousands or millions.

Each "area", as described herein, can constitute or include a "virtual container" and/or be represented by a virtual container. Accordingly, for example, each of the "patches" as described herein can constitute a virtual container. In step 558, the processing can pass back to step 531 of FIG. 6. Processing can then continue as described above.

Figure 9:
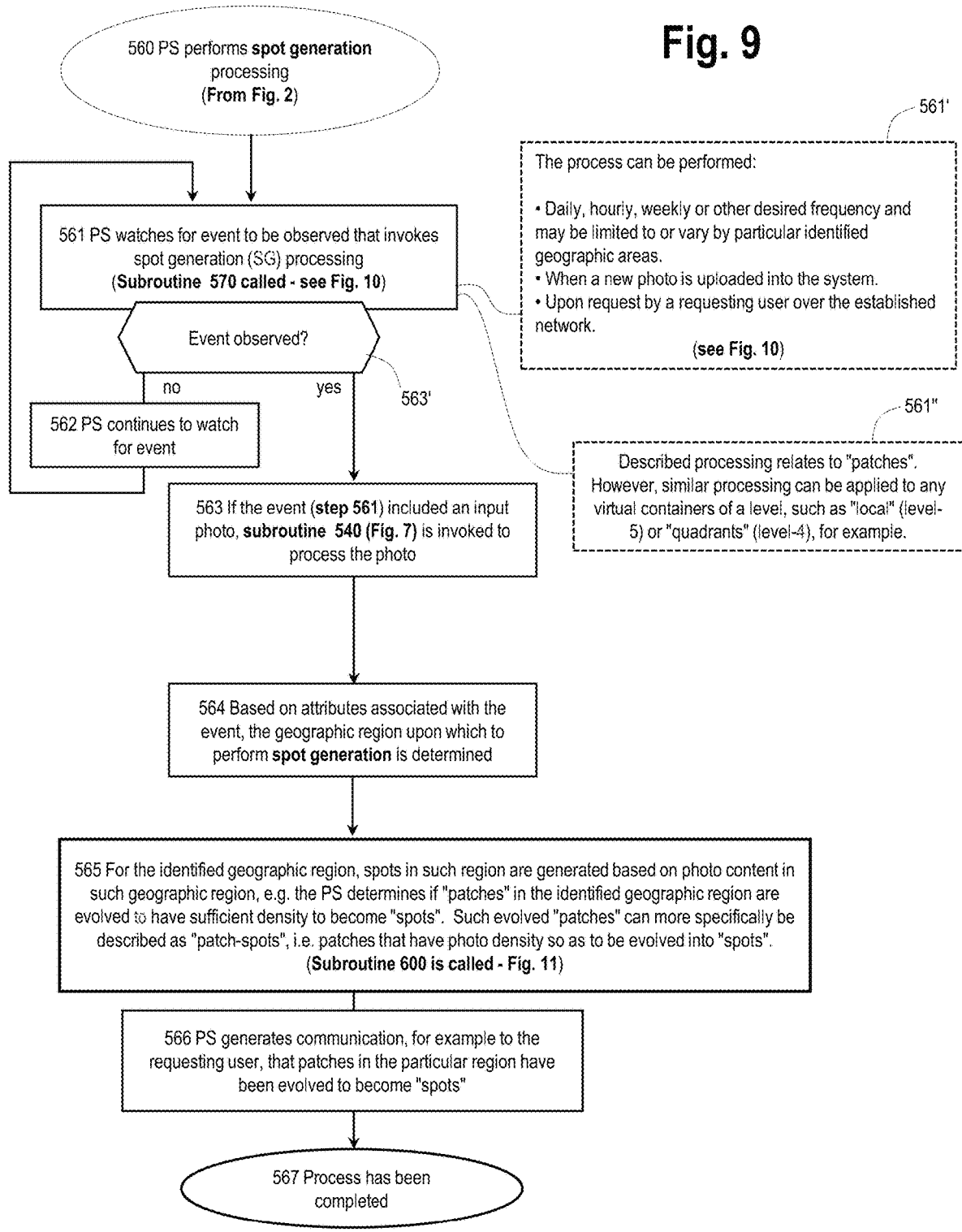
FIG. 9 is a flowchart showing further details of the "system performs spot generation processing", in accordance with principles of the disclosed subject matter.

FIG. 9 is a flowchart showing further details of the "system performs spot generation processing" subroutine 560 of FIG. 2, in accordance with principles of the disclosed subject matter.

As described above, a "patch" can be a smallest area of the various areas that are segmented out. A "patch" can be approximately 13×13 feet, for example. In "spot" generation processing, a "patch" can be elevated to a "spot"—depending on attributes of the particular patch. Such attributes can include the density of photos in the particular patch. If the density of photos surpasses a predetermined threshold, the "patch" can be elevated to the stature of a "spot". Once elevated, such spot can be subject to various processing, such as being identified in search results and/or be given a higher ranking or rating.

As shown in the processing of FIG. 9, the process starts in step 560 and passes onto step 561. In step 561, the system watches for an event to be observed that invokes spot generation (SG) processing. In performing such processing of step 561, subroutine 570 can be called upon or invoked. Further details are described with reference to FIG. 10 below.

Relatedly, as is shown at 561', the process of step 561 can be performed at various times. For example, the processing of step 561 can be performed daily, hourly, weekly, or at other desired frequency and may be limited to or vary by particular identified geographic area. The processing of step 561 can be performed when a new photo is uploaded into the system. The processing of step 561 can be performed upon request by a requesting user over an established network. Further details are described below with reference to FIG. 10.

Based upon the system watching for an event in step 561, in step 563', the system can perform a determination of whether an event was indeed observed. If no in step 563', the system continues to watch for an event as reflected at 562. Accordingly, the processing loops back to step 561 and continues as described above.

On the other hand, if yes in step 563', the process passes onto step 563. In step 563, if the event, which was identified in step 561, included an input photo—then a subroutine can be invoked to process the photo. Specifically, the subroutine 540 of FIG. 7 can be invoked to process the photo. Then, the process passes onto step 564. In step 564, based on attributes associated with the event, the geographic region upon which to perform spot generation is determined. Then, the process passes onto step 565.

In step 565, for the identified geographic region, spots in such region are generated based on photo content in such geographic region. In other words, patch areas in the identified geographic region can be evolved to be spots. Subroutine 600 can be called as shown in further detail in FIG. 11 and described below.

After step 565, the process passes onto step 566. In step 566, the system generates a communication that patches in the particular region have been involved to spots. For example, a communication can be generated and output to a requesting user or to a user that submitted a photo that contributed, in some particular way, to the promotion of a patch to spot. Then, the process passes onto step 567. Step 567 reflects that the processing has been completed. In other words, the processing of the subroutine 560, as shown in FIG. 9, is completed. It should be appreciated that various other processing and subroutines as shown in FIG. 2 can be continued or further called upon as otherwise described herein.

As reflected at 561", the described processing relates to "patches". However, similar processing can be applied to any virtual containers of a level, such as "local" (level-5) or "quadrants" (level-6), for example. A "local" area that has evolved into a spot can be described as a "local-spot".

Figure 10:
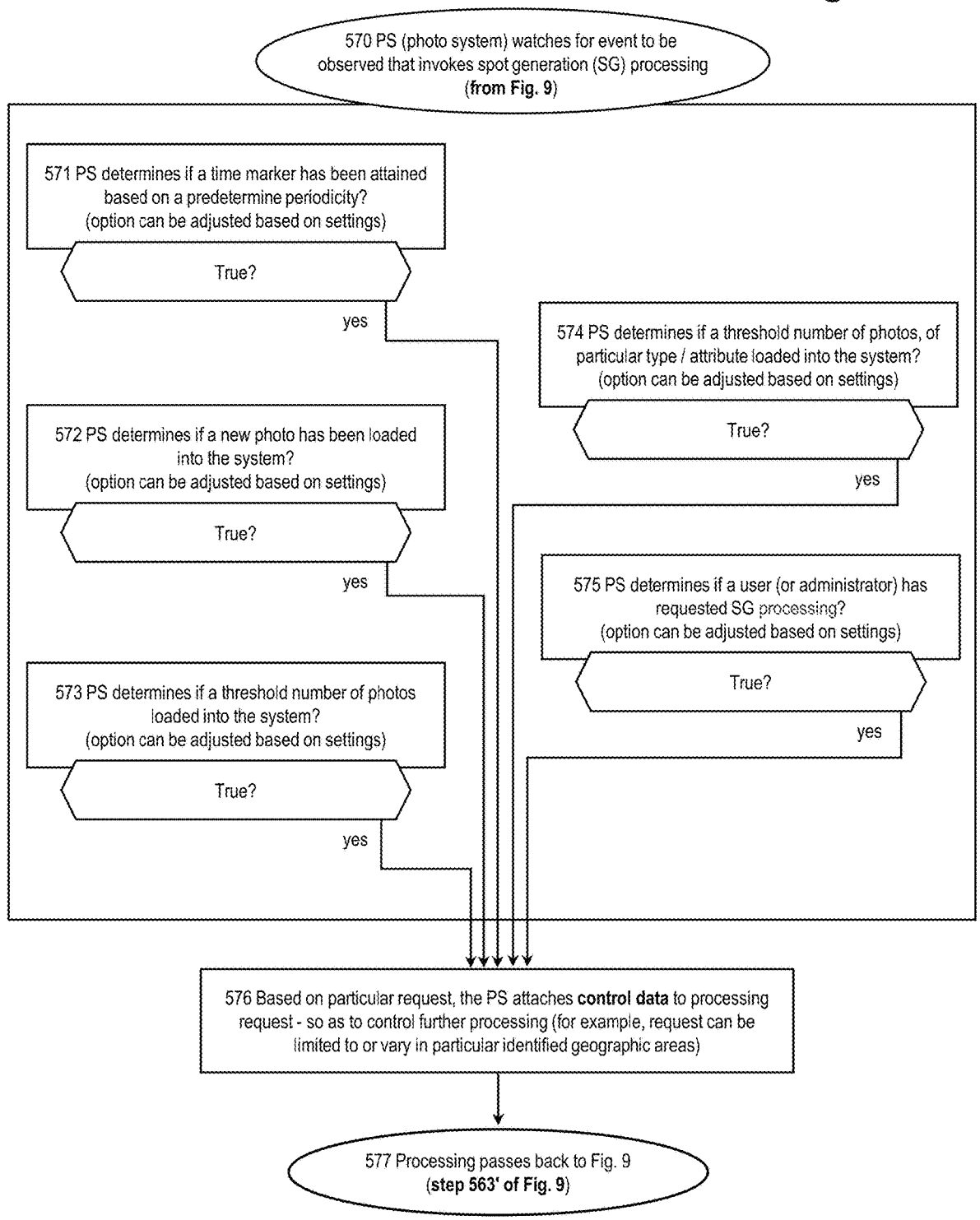
FIG. 10 is a flowchart showing in further detail the "system watches for an event to be observed that invokes spot generation processing" in accordance with principles of the disclosed subject matter.

FIG. 10 is a flowchart showing in further detail the "system watches for an event to be observed that invokes spot generation processing" subroutine 570, as called from FIG. 9. The processing of step 570 of FIG. 10 can include various components 571, 572, 573, 574, and 575. These various processing components can be performed in parallel using respective subroutines that can be performed by the system 100. In step 571, the system can determine if a time marker has been attained based on some predetermined periodicity. In step 572, the system can determine if a new photo has been loaded into the system. In step 573, the system can determine if a threshold number of photos have been loaded into the system. In step 574, the system can determine if a threshold number of photos of a particular type or attribute have been loaded into the system. In step 575, the system can determine if a user or administrator has requested spot generation (SG) processing.

Accordingly, the system can determine if various "triggers" of steps 571, 572, 573, 574, and 575 have been satisfied—so as to enable or activate the processing of each of such steps. Enablement (i.e. whether the processing of such steps is available) of any of such steps 571, 572, 573, 574, and 575 can be performed through suitable settings, which can be controlled by an administrator or user. Additionally, thresholds, parameters, or other attributes of any of the steps 571, 572, 573, 574, and 575 can be adjusted by an administrator or user as may be desired. It should be appreciated that processing of some of the steps 571, 572, 573, 574, and 575 may be enabled, whereas other steps are not enabled.

With further reference to FIG. 10, if a yes determination is determined in any of the various steps 571, 572, 573, 574, and 575, the processing can pass onto step 576 of FIG. 10. In step 576, based on the particular request, the system can attach control data to the processing request. This control data can control processing of the request. For example, the request can be limited to a particular geographic area, such that only "patches" in such geographic area are processed for possible elevation to spot status.

After step 576, the process passes onto step 577. In step 577, the processing passes back to FIG. 9—and specifically passes to step 563'.

Figure 11:
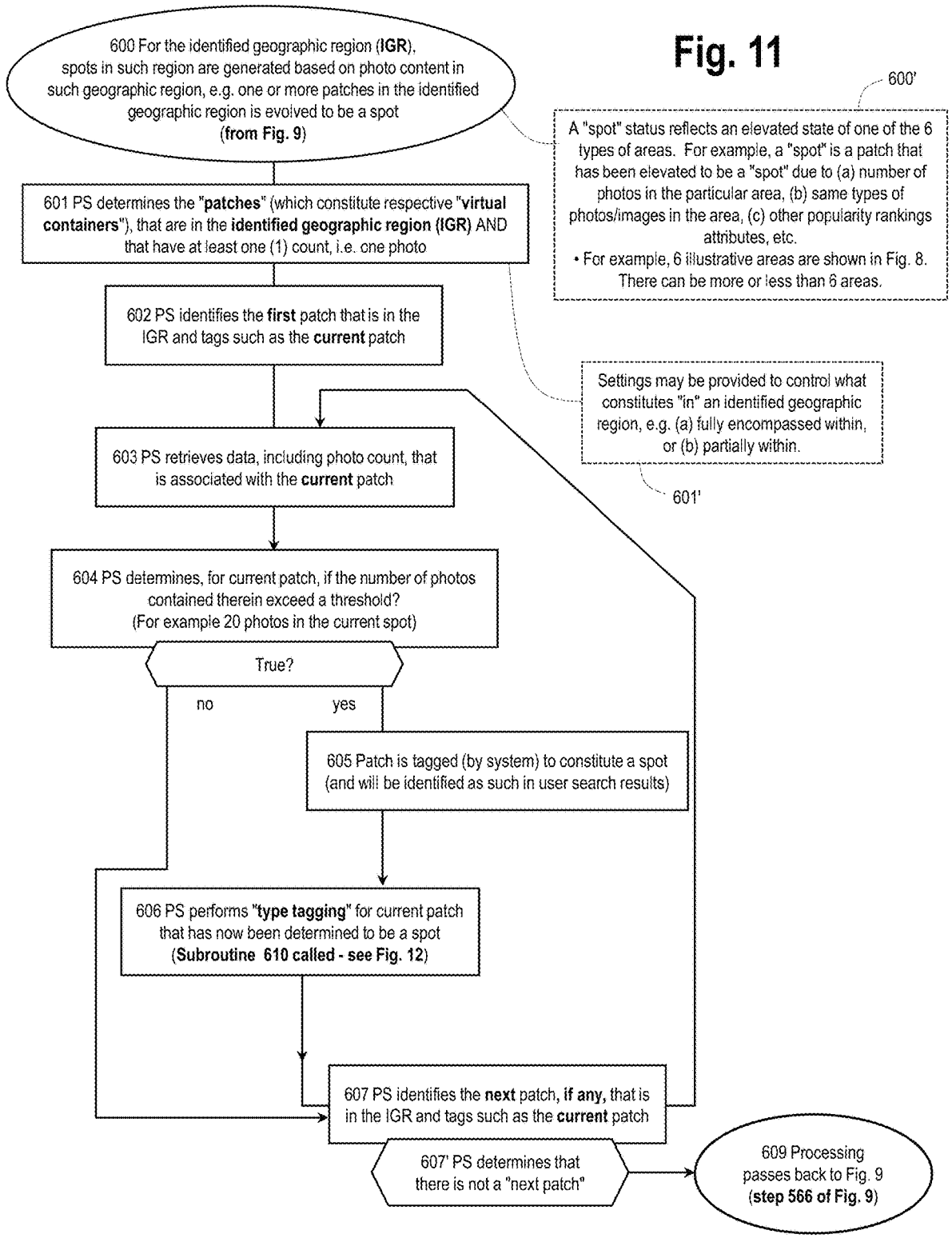
FIG. 11 is a flowchart showing further details of a "spot generation processing" subroutine, in accordance with principles of the disclosed subject matter.

FIG. 11 is a flowchart showing further details of a "spot generation processing" subroutine 600, as called from FIG. 9, in accordance with principles of the disclosed subject matter.

More specifically, the processing of FIG. 11 relates to the consideration of patches, in a predetermined geographical region, that may be promoted to the status of spots. The patches in the particular geographic region, or in other words an "identified geographic region (IGR)", can be considered for promotion based on photo content in such geographic region.

The processing of FIG. 11 starts in step 600 and passes to step 601. In step 601, the system determines the various "patches" that are in the identified geographic region (IGR) AND that have at least one (1) count, i.e. at least one photo associated with the patch, in accordance with at least one embodiment of the disclosed subject matter. As described above, a patch can be in the form of or include a virtual container in which photos are placed (or associated with). An identified geographic region may be all the patches in a particular "local"; all the patches around a particular point of interest; all the patches in a particular geographic region, such as along a coast line; or all patches that have some other common attribute or that are identified for processing and some suitable manner Additionally or alternatively, patches can be processed in some sequential manner. Accordingly, the processing of step 601 contemplates that not all patches in the world or country, for example, will be processed at the same time. Rather patches can be carved out and processed in groups and/or processed sequentially dependent on processing capabilities and bandwidth that is available.

After the processing identifies the patches to processed in step 601, the processing passes onto step 602. In step 602, the system identifies the first patch that is in the IGR and tags such as the current patch. Such tagging can identify the particular patch as being the next patch to be processed. After step 602, the process passes onto step 603. In step 603, the system retrieves data, including photo count, that is associated with the current patch. In other words, how many photos have been associated with the particular patch. Then, the process passes onto step 604.

In step 604, the system determines, for the current patch, if the number of photos contained therein exceed a threshold. For example, the threshold could be 20 photos that have been associated with the current patch. If 20 photos have not been associated with the current patch, then a no is rendered in the processing of step 604. As a result, the process passes from step 604 onto step 607.

On the other hand, a yes determination may be rendered in the processing of step 604. Such yes determination reflects that the current patch has indeed attained 20 photos associated therewith. Based on the yes determination in step 604, the process passes onto step 605. In step 605, the current patch is tagged (by the system) to constitute a "spot". In accordance with at least one embodiment of the disclosure, a patch designated as a spot will then be rendered in search results, as further described below. On the other hand, a patch that has not been involved to be a spot may not be rendered in search results. After step 605 of FIG. 11, the process passes onto step 606. In step 606, the system performs "type tagging" for the current patch, which has now attained spot status. Such elevated patches can be deemed a "patch-spot". To perform the processing of step 606, subroutine 610 can be called as described below with reference to FIG. 12. The type tagging of step 606 can also be performed for patches that have not attained the predetermined threshold (step 604). After step 606, the process passes onto step 607.

In step 607, the system identifies the next patch, if any, that is in the identified geographic region (IGR) and tags such next patch as the current patch. As reflected in the processing of step 607', the system may determine that there is not a next patch. As a result, the process passes onto step 609. In step 609, the processing passes back to FIG. 9—and specifically passes onto step 566 of FIG. 9.

With further reference to FIG. 11, and in the situation that there is indeed a further patch or next patch identified in step 607, the processing passes from step 607 back to step 603. In step 603, the system retrieves data, including photo count, that is associated with the current patch. Processing then continues as described above.

As shown at 600' (FIG. 11), a "spot" status can reflect an elevated state or status of any of the 6 types of areas, and not just a "patch". Relatedly, the processing of FIG. 11, and in particular step 604, is based on whether a particular photo count has been attained by a particular patch. However, the systems and methods are not limited to such particulars. For example, a "spot" can be a local or other area that has been elevated to be a "spot" due to (a) number of photos in the particular area, (b) same types of photos in the particular area that exceed some threshold, and/or (c) based on other popularity rankings, attributes, etc. that have been attained in the particular area.

In accordance with principles of the disclosed subject matter, the location of a photo can be a point, i.e. a longitude/latitude point (long/lat point). The area to which the photo is to be associated can be determined mathematically—by determining the particular area in which the photo is bounded. Relatedly, there may by a case in which an area, such as a patch, is not fully encompassed with an identified geographic region (IGR). For example, an area might be generated to be around a landmark or an area might be drawn or designated by a user. Such area might be split or cross-over two or more IGRs. In such a situation, settings may be provided to control what constitutes "in" an identified geographic region, e.g. (a) fully encompassed within, or (b) partially within. Thus, for example, if a particular patch is only partially in an IGR to be processed (step 601 of FIG. 11), then such patch may indeed be processed based on an inclusive setting. However, it may be that another setting dictates that a particular patch has to be fully within an IGR. Other parameters and/or attributes of a patch (or other area) and/or a particular IGR can be utilized so as to dictate whether a patch will be processed or will not be processed in a particular IGR.

Figure 12:
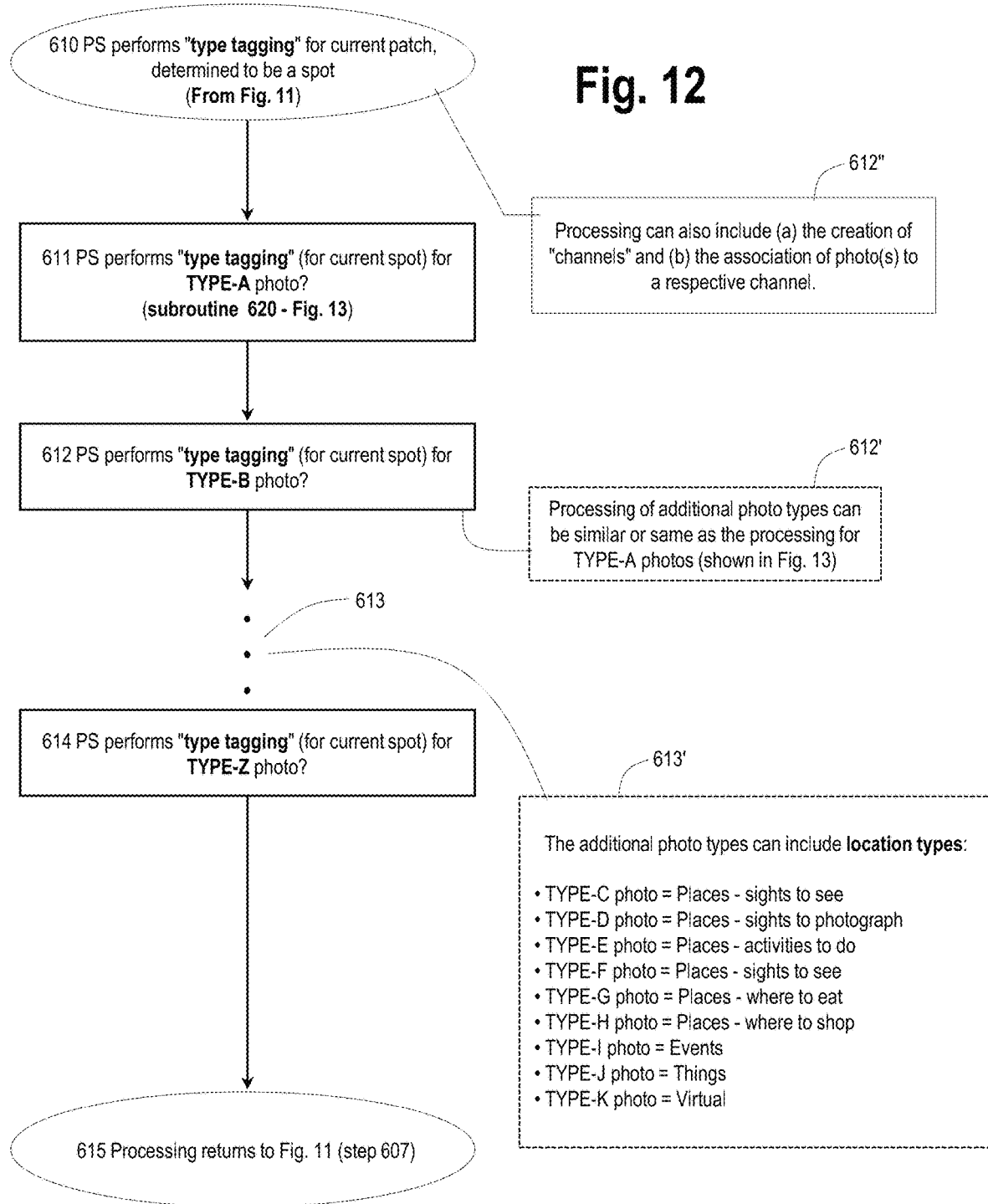
FIG. 12 is a flowchart showing in further detail the system performs "type tagging" for a current patch, in accordance with principles of the disclosed subject matter.

FIG. 12 is a flowchart showing in further detail the system performs "type tagging" for the current patch of subroutine 610 of FIG. 11, in accordance with principles of the disclosed subject matter.

The process begins in step 610 and passes onto step 611. In step 611, the system performs "type tagging" for the current patch for a type-A photo. The processing of step 611 can call upon the subroutine 620 of FIG. 13. Then, the process passes onto step 612.

In step 612, the system performs "type tagging" for the current spot for a type-B photo. In step 614, the system performs "type tagging" for the current spot for a type-Z photo. As reflected at 613 of FIG. 12, it should be appreciated that processing can be performed for any desired number of "types" of photos. For example, as shown at 613', additional photo types can include a variety of location types.

Figure 13:
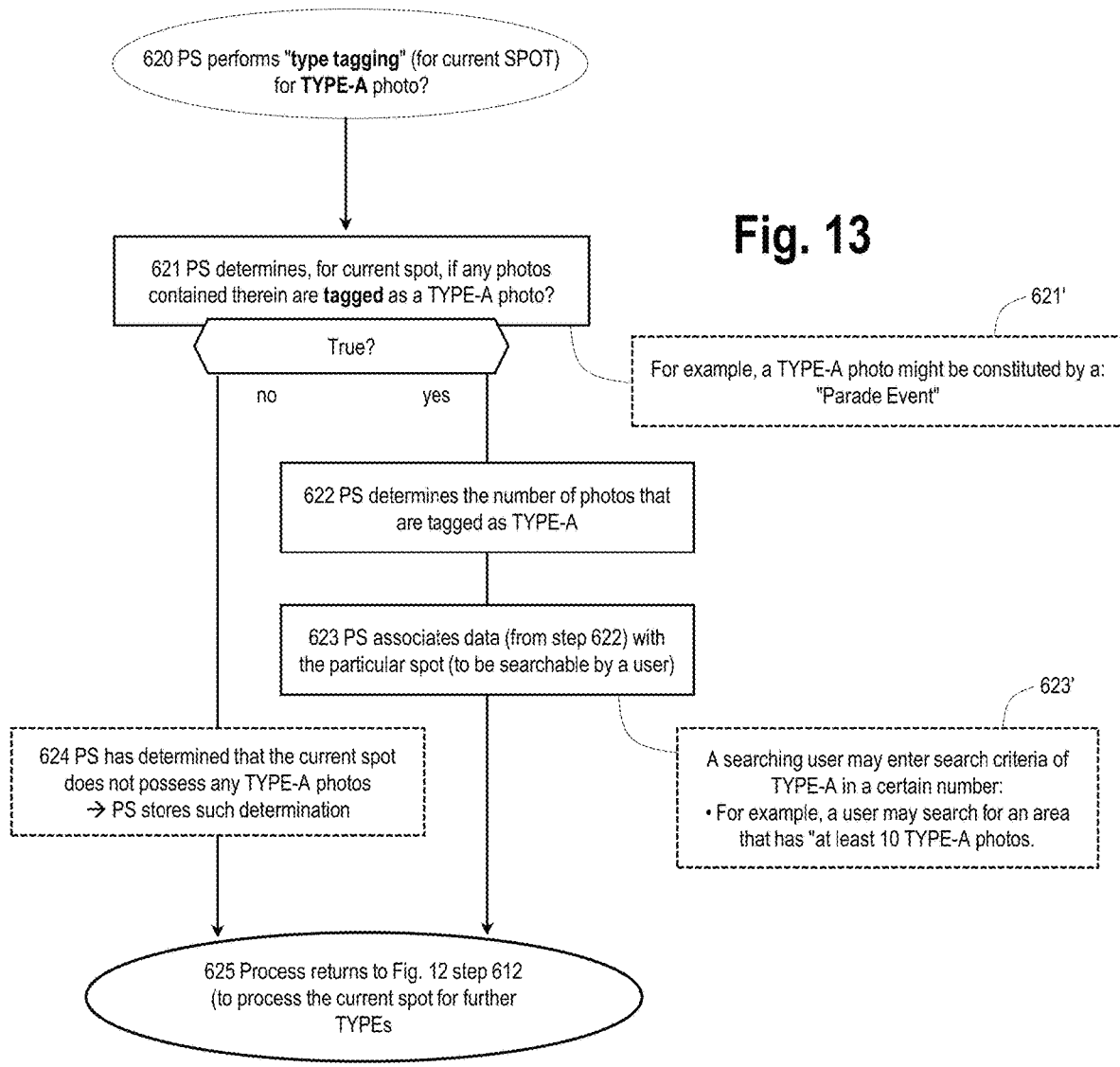
FIG. 13 is a flowchart showing further details of the system performs "type tagging" for a current spot for a type-A photo, in accordance with at least one embodiment of the disclosed subject matter.

For purposes of illustration, subroutine 620 of FIG. 13 shows type tagging to determine whether a particular spot has one or more type-A photos. However, the processing as illustrated in FIG. 13 can be applied to any of the types illustrated in FIG. 12 or other types, as may be desired.

Accordingly, in the various processing of FIG. 12, the system determines what type of photos are associated with the particular spot. As described above, a particular one photo can be tagged as two or more types. Thus, for example, a particular photo might be tagged in both step 611 and step 612 of FIG. 12.

After all the types have been processed in FIG. 12, the process passes onto step 615. In step 615, the processing returns to FIG. 11—and specifically passes onto step 607 of FIG. 11.

FIG. 13 is a flowchart showing further details of the system performs "type tagging" for the current spot for a type-A photo of subroutine 620, in accordance with at least one embodiment of the disclosed subject matter. As shown, the process starts in step 620 and passes onto step 621.

In step 621, the system determines, for the current spot, if any photos contained therein are tagged as a type-A photo. For example, a type-A photo might be a "parade event", for example, as reflected at 621'. However, it is appreciated that a photo can be possess or be attributed with any of a variety of types. Such "type" can include any "thing" or attribute that is associated with the particular photo. For example, the "thing" that is associated with the photo might be a particular time window in which the photo was taken.

If yes in step 621, the process passes onto step 622. In step 622, the system determines the number of photos that are tagged as type-A. Then, in step 623, the system associates data (from step 622) with the particular spot so as to be searchable by a user. Then, the processing passes onto step 625. In step 625, the processing returns to FIG. 12 and step 612. In step 612, the processing continues as described above—to process the current spot to identify further types of photos in such spot.

On the other hand, a no determination may be rendered in step 621. Accordingly, the processing passes from step 621 onto step 624. In step 624, the system has determined that the current spot does not possess any type-A photos. The system can then store such determination. Then, processing passes onto step 625. Processing then continues as described above.

As reflected at 623' of FIG. 13, a searching user may enter search criteria of type-A in a certain number. For example, a user may search for a particular area, i.e. a particular geographical area, that has at least 10 type-A photos. Additionally, search criteria may not be constrained or dictated by a certain number of a particular type of photo in a spot. Rather, search criteria can utilize top ranked spots or other areas. In such processing, the top ranked spot or spots can be returned as search results regardless of the particular number of a particular type of photo associated with such spot.

Figure 14:
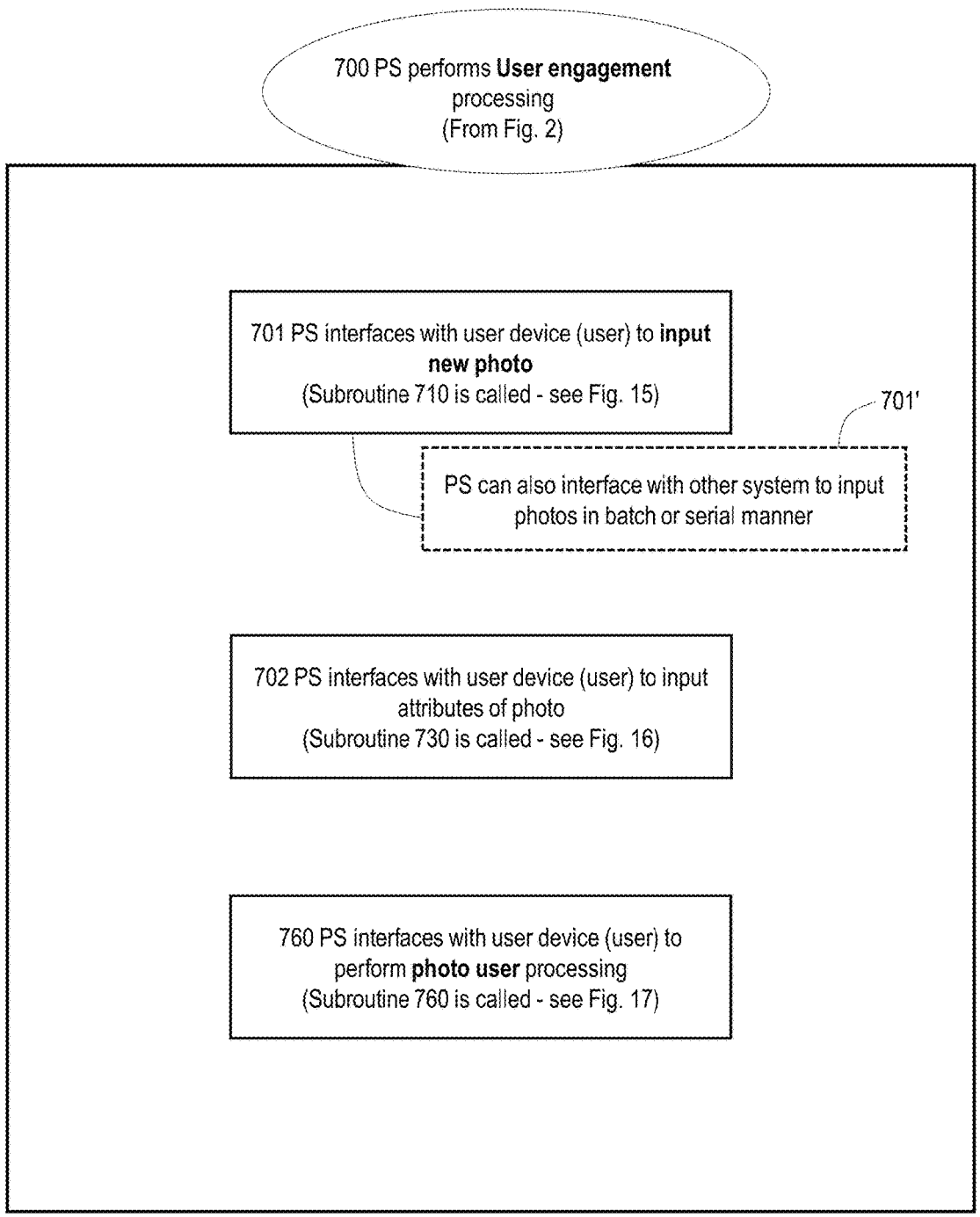
FIG. 14 is a flowchart showing in further detail the system performs "user engagement processing," invoked or called upon from FIG. 2, in accordance with principles of the disclosed subject matter.

FIG. 14 is a flowchart showing in further detail the subroutine 700, system performs user engagement processing, invoked or called upon from FIG. 2. The processing of subroutine 700 can include both step 701 and step 702, in accordance with embodiments of the disclosed subject matter. In particular, the processing of FIG. 14 relates to interfacing with a user device, which is associated with a human user, to input both a new photo that can include image data and attributes or metadata regarding such new photo. The processing of steps 701 and 702 can be performed in parallel or in serial and need not be performed in the particular manner illustrated in FIG. 14.

In step 701 of FIG. 14, the system interfaces with a user device to input a new photo. In such processing, subroutine 710 can be called upon or invoked. Such subroutine 710 is illustrated in further detail below with reference to FIG. 15. As reflected at 701 of FIG. 14, the system 100 can also interface with other systems to input photos in batch or serial manner, for example.

In step 702 of FIG. 14, the system interfaces with a user device to input attributes of the photo. In such processing, subroutine 730 can be called upon or invoked. Such subroutine 730 is illustrated in further detail below with reference to FIG. 16.

In step 760 of FIG. 14, the PS interfaces with the user device, i.e. the user, to perform photo user processing. In performing such processing, a subroutine 760 can be called or invoked. Such subroutine 760 is illustratively shown in FIG. 17.

Figure 15:
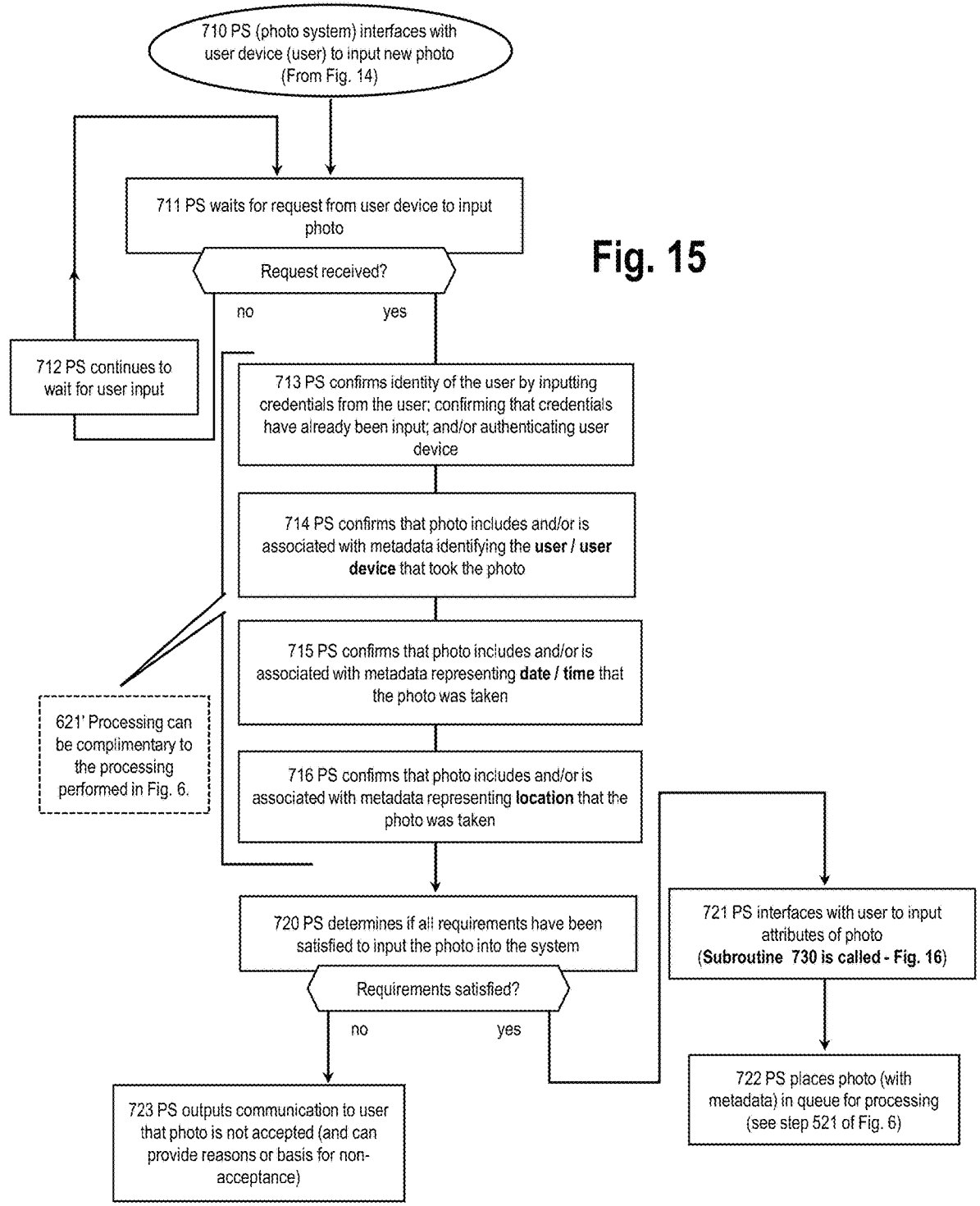
FIG. 15 is a flowchart showing in further detail the photo system "interfaces with a user device to input a new photo", in accordance with principles of the disclosed subject matter.

FIG. 15 is a flowchart showing in further detail the photo system "interfaces with a user device to input a new photo" of subroutine 710 that can be called upon or invoked from the processing of FIG. 14. As shown, the process starts in step 710 and passes onto step 711. In step 711, the system waits for a request from a user device to input a photo. If no is rendered, then the process passes onto step 712. In step 712, the system continues to wait for user input.

On the other hand, a yes determination may be rendered in the processing of step 711, indicating that the system has indeed received a request from a user device to input a photo. Accordingly, the process passes onto step 713. In step 713, the system confirms identity of the particular user by inputting credentials from the user, confirming that credentials have already been input from the user, and/or authenticating the user device in some manner Any suitable authentication mechanism, arrangement, or technology can be utilized so as to allow the system to confirm identity of the user device and/or human user. For example, biometrics can be utilized so as to authenticate the user device and/or human user. After step 713, the process passes onto step 714.

In step 714, the system confirms that the photo includes and/or is associated with metadata identifying the user and/or user device that took the photo. Then, the process passes onto step 715.

In step 715, the system confirms that the photo includes and/or is associated with metadata representing date and time that the photo was taken. Then, in step 716, the system confirms that the photo includes and/or is associated with metadata representing location that the photo was taken. After step 716, the process passes onto step 720.

In step 720, the system determines whether or not all requirements have been satisfied so as to input the photo into the system. If no, then the process passes onto step 723. In step 723, the system outputs a communication to the user that the photo, which the user submitted, is not accepted. Such communication can provide basis for not accepting the photo, so as to be helpful to the user.

If the processing determines that all requirements have been satisfied to input the photo into the system, in step 720 of FIG. 15, then a yes is rendered in step 720. Accordingly, the processing passes onto step 721. In step 721, the system interfaces with the user to input attributes of the photo. In such processing, subroutine 730 of FIG. 16 can be called upon or invoked. Accordingly, it should be appreciated that the system can interface with a user so as to input attributes of the photo subsequent to input of the photo (step 721 of FIG. 15) or independently of input of the photo (step 702 of FIG. 14), i.e. at some later time relative to input of the photo itself. After step 721 of FIG. 15, the process passes onto step 722. In step 722, the system places the photo, with metadata, in queue for processing. Accordingly, with the processing of step 722, the processing of FIG. 15 can be terminated. Once photo(s) are identified or observed as being in queue, the system can invoke or call upon the processing of step 521 of FIG. 6. Accordingly, in the processing of steps 713, 714, 750, 716, various steps can be performed so as to determine if the photo possesses required attributes or metadata so as to be processed by the system 100. As reflected at 621' of FIG. 15, such processing can be complementary to the processing performed in FIG. 6.

Figure 16:
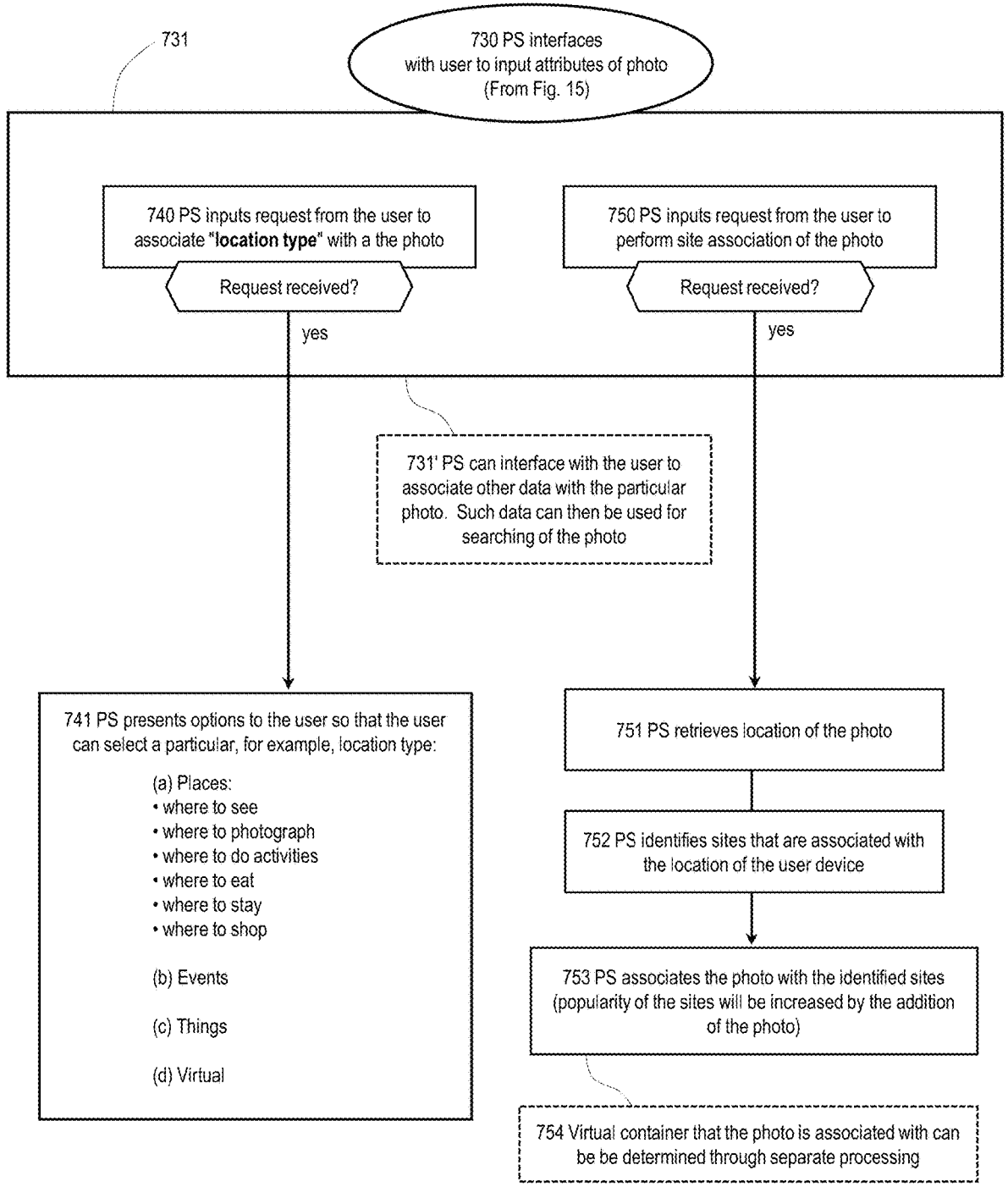
FIG. 16 is a flowchart showing in further detail the "photo system interfaces with a user to input attributes of a photo" in accordance with principles of the disclosed subject matter.

FIG. 16 is a flowchart showing in further detail the "PS interfaces with a user to input attributes of photo" subroutine 730 as called from the processing of FIG. 15. The process of FIG. 16 is initiated and the processing passes to step 731. In step 731, the PS waits for a request from the user via either of step 740 or step 750. In step 740, the PS monitors for an input request from the user to associate "location type" with the photo. In step 750, the PS monitors for an input request from the user to perform site association of the photo. For example, the "wait" processing of FIG. 16 can include the PS waiting for a user to log on or sign into the system, i.e. the PS (photo system)—and engage with the PS so as to render a yes in step 740 or step 750. In the processing of step 731, as reflected at 731', the PS can interface with the user to associate other or additional data with the particular photo that is being processed. Such data, which is then associated with the photo, can be used in various processing. For example, the additional data associated or appended to the photo can be used by the PS to perform searching based on a user query, i.e. based on a user search. The additional data can be used to determine if a patch can be elevated to the disposition of a spot.

With reference to step 740, upon a request being received in step 740 such that a "yes" is rendered in the processing, the process passes to step 741. In step 741, the PS presents options to the user so that the user can select a particular location type, for example. That is, in the processing of step 741, the user can associate a photo with a location type. For example, the PS can interface with the user so as to present a photo to the user. The user might select the photo in some suitable way such as from an index of photos, a listing of photos, or in some other manner Once a particular photo is selected, the user may be presented with a list of possible location types which may be associated with the particular photo. For example, "location types" that are presented to the user (as an option to associate with a photo) can include places, events, things, or virtual. Other location types can be provided as may be desired. The location type "places" can provide the user the ability to associate a photo with a particular place. The location type "events" can provide the user the ability to associate a photo with a particular event. The location type "things" can provide the user the ability to associate a photo with a particular thing. The location type "virtual" can provide the user the ability to associate a photo with a virtual concept, such as to provide an association of a photo with a game based event, for example.

With reference to step 750, the CP can determine that a request was indeed received from a user to perform site association of a photo. Accordingly, a yes is rendered in step 750. The processing then passes to step 751. In step 751, the PS retrieves location of the photo. For example, the PS may retrieve the location of the photo from metadata associated with the photo. Then, the process passes onto step 752. In step 752, the PS identifies sites that are associated with the location of the photo, i.e. the location that was retrieved in step 751. Then, the process passes onto step 753. In step 753, the PS associates the photo with the identified sites. For example, one "site" might be New York City. Another "site" might be Times Square. Accordingly, a photo taken in Times Square can be associated (in step 753) with both the Times Square site and the New York City site. As reflected in step 753, popularity of the sites will be increased by the addition of the photo to that site, in accordance with at least some embodiments. As reflected at 754 of FIG. 16, the virtual container that the photo is associated with can be performed through separate processing vis-à-vis processing of step 751-753. Relatedly, a site can be composed of a plurality of spots.

Figure 17:
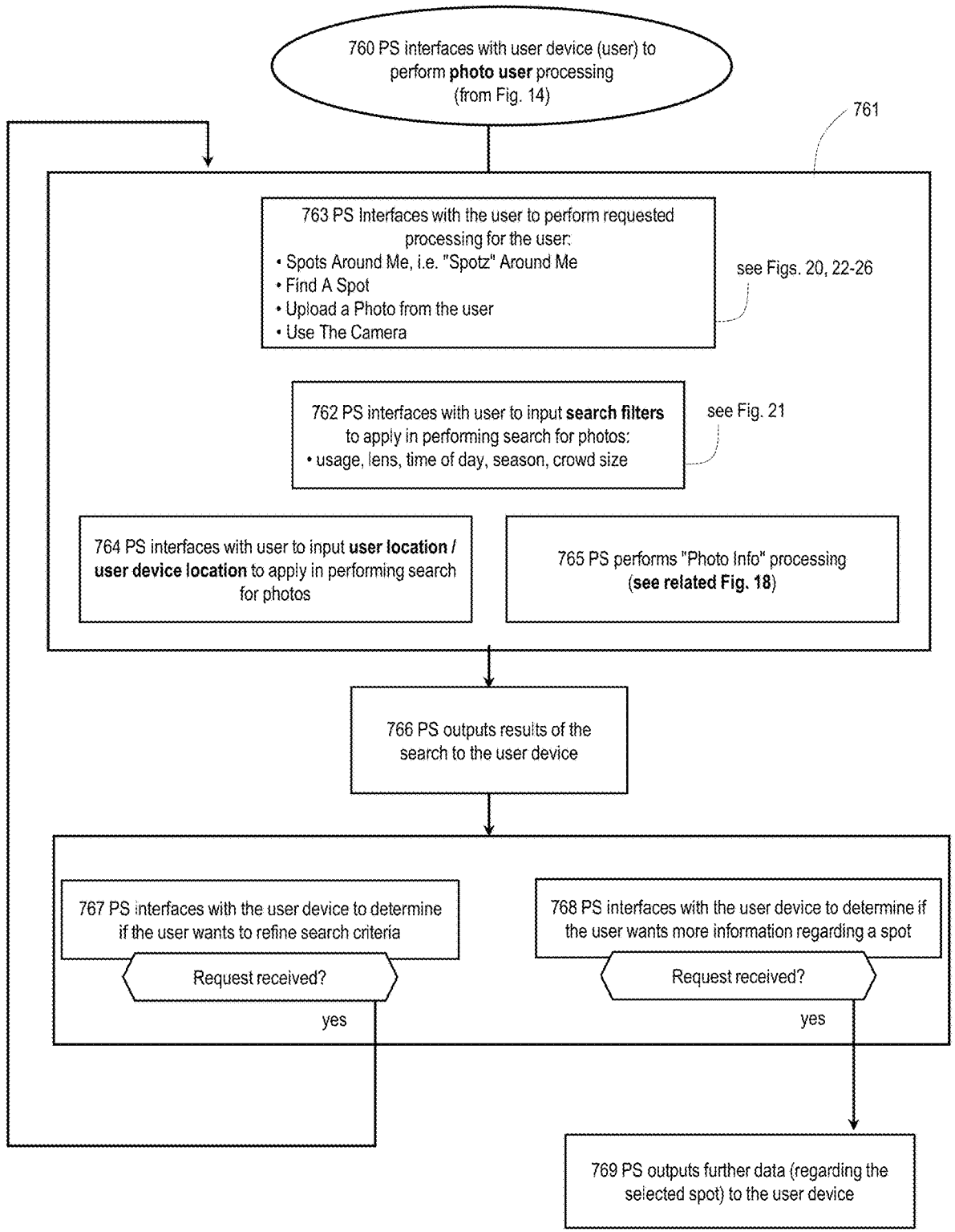
FIG. 17 is a flowchart showing in further detail the "photo system interfaces with a user device to perform photo user processing, in accordance with principles of the disclosed subject matter.

FIG. 17 is a flowchart showing in further detail the "PS interfaces with a user device to perform photo user processing subroutine 760 of FIG. 14. The process is initiated and passes to step 761. In step 761, various processing can be performed in step 762, 763, 764, and 765. Such processing can be requested or invoked through user interface.

Figure 18:
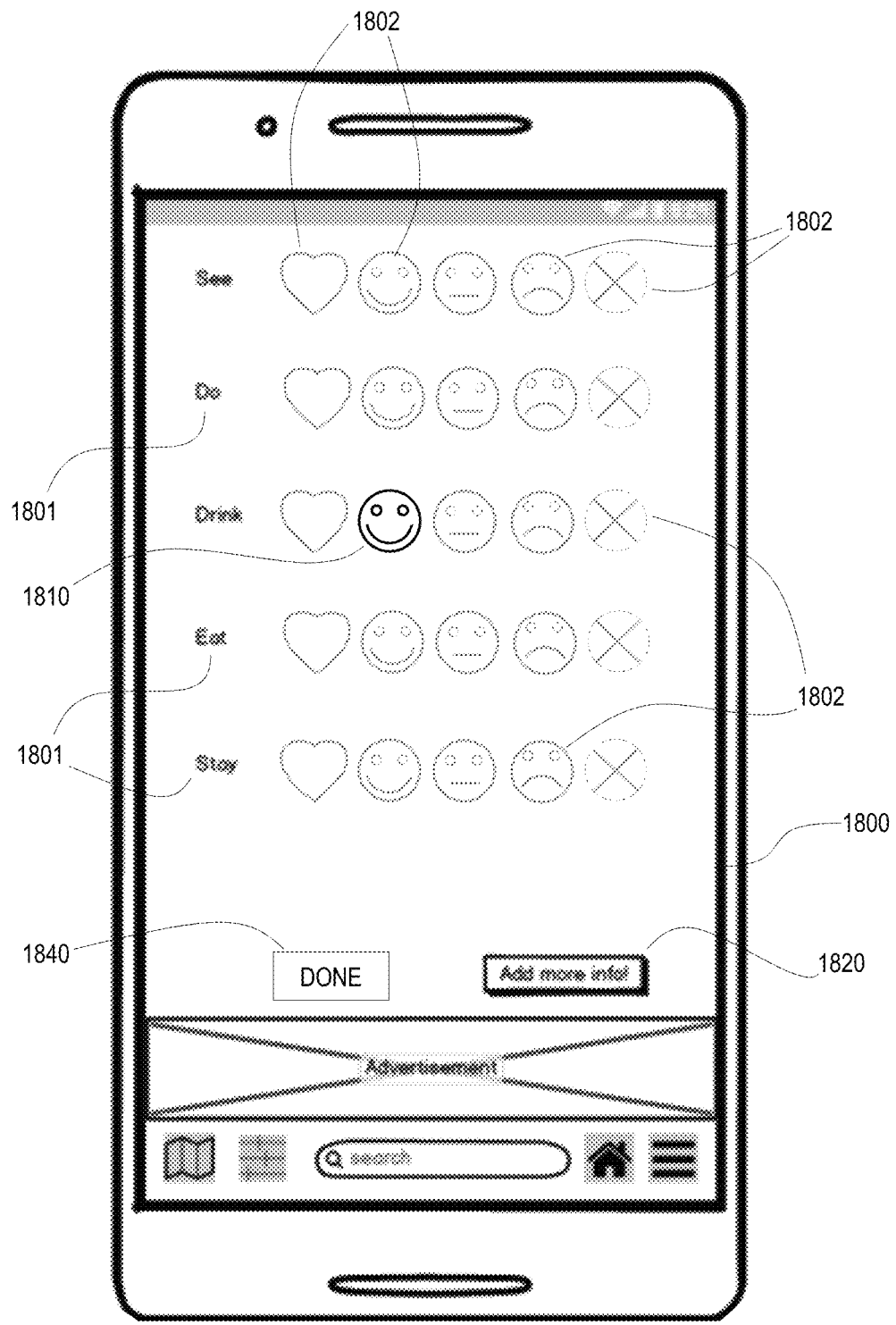
FIG. 18 is a diagram that includes a GUI (graphical user interface) that illustrates aspects of "photo info" or "photo information" processing, in accordance with principles of the disclosed subject matter.
Figure 20:
FIG. 20 is a diagram that includes a GUI 2000 that can be utilized so as to launch or invoke processing in accordance with principles of the disclosed subject matter.

In step 763 of FIG. 17, the PS can interface with the user to perform requested processing for the user. For example, the PS can interface with the user to perform "spots around me" or "spots near me" processing for the user. Such processing can also be described as "Spotz Around Me" processing. The term "spotz" can be used interchangeably with the term "spots" so as to reflect the novel processing of the disclosure. Additionally, the term "ShotSpotz" can be used to mean, be a part of, or include the photo system 100, in accordance with at least one embodiment of the disclosed subject matter. In such processing of FIG. 17, the PS can retrieve or input the geographical location of the user device so as to identify spots that are proximate to the user. The proximity can be determined based on predetermined thresholds. That is, settings can be provided that can control whether "proximate" means within 1 mile of the user, 10 miles of the user, or 100 miles of the user, for example. The processing of step 763 can also include "find a spot" processing. In find a spot processing, the user can enter search criteria or search terms that contain criteria of what the user is looking for either in a photo or in a spot. For example, a GUI 1800 as shown in FIG. 18 can be utilized so as to input search criteria from the user. In regard to "find a spot" processing—such processing can include or be associated with planning, planning a trip, organizing a plurality of spots, saving a collection of spots, retrieving one or more spots, and related processing and functionality. Additionally, the processing of step 763 can include "upload a photo" processing. In such processing, a photo can be uploaded from a user device of the user. The photo can then be processed as otherwise described herein. Additionally, step 763 can include the option "use the camera". With such option, the camera of the user device can be activated. FIG. 20 illustrates a GUI 2000 that can be utilized so as to launch or invoke the processing of step 763 (FIG. 17).

Figure 21:
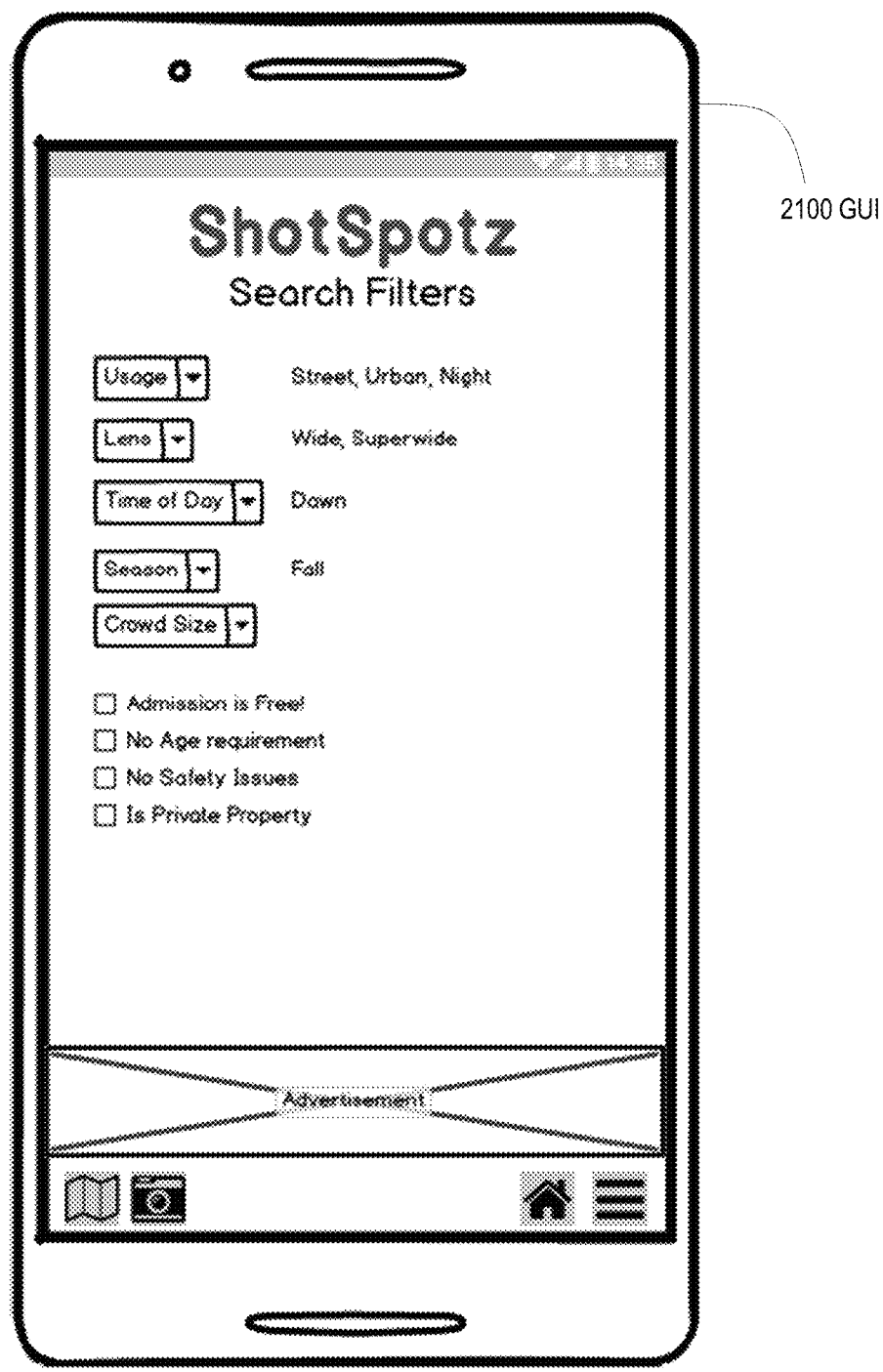
FIG. 21 is a diagram that includes a GUI 2100 that can be utilized so as to interface with the user so as to input selection of search filters, in accordance with principles of the disclosed subject matter.

In step 762 of FIG. 17, the PS can interface with the user to input search filters to apply in performing search for photos. Such search filters can include such items as usage, lens, time of day, season, and crowd size. The processing of step 762 can provide functionality to allow a user to specify the things that the user wants to see, where to drink e.g., provide a filter for image types, filter an image based on metadata or attributes associated with the image, and/or provide other functionality. FIG. 21 illustrates a GUI 2100 that can be utilized so as to interface with the user so as to input selection of search filters. For example, a particular search filter option or options can be provided via a drop-down menu. For example, a usage option can be provided via which the user chooses a particular usage option, which might be Street, urban, or night. The lens option can provide the user, searching for a particular photo, to request photos that have been taken with a particular type of camera, such as a wide lens camera or a superwide lens camera. For example, an option can be provided in which the user indicates he or she would like to search for photos that were taken in a particular season of the year.

In accordance with at least one embodiment of the invention, "spot" generation can be correlated with the search filter options provided in the GUI 2100. For example, a patch can be processed to determine if the patch is associated with at least 20 pictures that were taken in the summer. If such patch does indeed include 20 pictures that were taken in the summer, then that patch would be deemed (by the photo system (PS)) to be a "spot" for that particular search criteria. More generally speaking, a particular area, such as a patch, can be assessed to determine if such area possesses density of photos with certain attributes, such as usage, lens, time of day, season, or crowd size. An area that does indeed possess density of a particular attribute can then be deemed a spot for that attribute. The user can then search for spots with such attribute, i.e. as shown in the GUI of FIG. 21.

FIG. 17 can also include the processing of step 764. In step 764, the PS interfaces with the user to input user location or user device location to apply in performing search for photos. For example, the PS can input the user device location in step 764. Then, additional processing can be requested by the user that uses such input user device location. For example, the "spots around me" processing can be performed after the PS inputs user device location in step 764.

FIG. 17 can also include the processing of step 765. In step 765, the PS performs "photo info" processing. FIG. 18 is a GUI 1800 that illustrates such processing. Further details of the GUI 1800 are described below.

In accordance with an embodiment, the PS can identify when the user has input search criteria and has selected that the PS should perform a search based on such search criteria. The search criteria can be a wide variety of criteria such as spots around the user, spots having a certain photo density, spots having photos of a particular type, spots having photos of a particular attribute, spots that are associated with a particular site, and other criteria as may be desired. Accordingly, once the PS identifies that the user has interfaced (with the PS) so as to provide both search criteria and a request to perform the search, then the process passes onto step 766. In step 766, the PS outputs the results of the search to the user device. The results of the search can be one or more spots, from which the user can select, which match the input criteria. The results of the search can be one or more photos that match the input criteria. The results of the search can be one or more sites that match the input criteria. Additional processing can then be provided by the PS.

Figure 28:
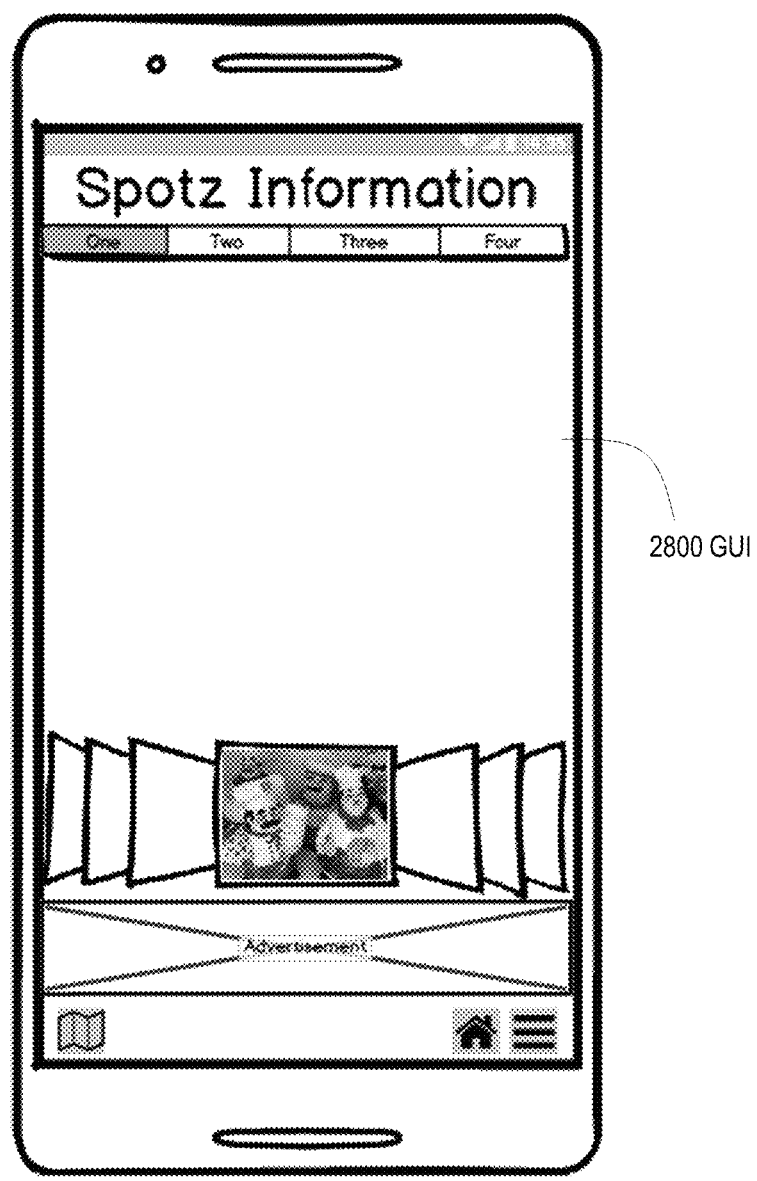
FIG. 28 is a diagram that includes a GUI 2800 that can provide various information regarding one or more spots, in accordance with principles of the disclosed subject matter.

That is, in step 767, the PS can interface with the user device to determine if the user wants to refine the search criteria. If yes, then the process passes back to step 761. Processing then continues as described above. In step 768, the PS can interface with the user to determine if the user wants more information regarding an identified spot, for example. More specifically, the processing of step 768 can include a situation in which the user is presented with a spot or spots that matches the search criteria input by the user. Upon being presented with spots that match the search criteria, the user can select a particular spot. Upon selection of the particular spot, the PS can provide additional information to the user regarding the selected spot. FIG. 28 is a GUI 2800 that can be presented to the user—to provide a collection of spots that satisfy search criteria of the user. Upon selection of a particular spot in the GUI 2800, of FIG. 28, various information regarding the selected spot can be presented. Details of a selected spot that can be presented to the user includes number of photos in the spot, various attributes of those photos, the types of photos in the particular spot, attributes of users who took the photos that are in a particular spot, and various other information regarding the spot and photos that are associated with the spot.

In the processing of step 768, a yes request can be received. Accordingly, the process passes onto step 769. In step 769, the PS outputs further data, regarding the selected spot, to the user device.

As described above, FIG. 18 is a GUI that illustrates aspects of "photo info" processing. The GUI 1800 can be utilized or a variation of the GUI 1800, to perform a variety of processing. The GUI 1800 can be presented to the user in various operating situations. For example, the GUI 1800 can be presented to the user in conjunction with inputting a photo from the user. For example, the GUI 1800 can be utilized to provide the processing of step 741 of FIG. 16. The GUI 1800 can include a plurality of criteria 1801. For example, the criteria 1801 can constitute the "location type" of step 741 (FIG. 16). Each criteria can then be associated with a ranking 1802. The ranking 1802, for each criteria 1801, can be selected by the user so as to input data regarding attributes of the particular photo (that is being input or uploaded from the user). For example, in the example GUI 1800, the user has selected a particular ranking 1810 that corresponds to a "drink" location type. The user can tap such item 1810. Upon tapping such item 1810, the PS can highlight the item, bold the item, or provide some other change in appearance of the item so that the user can see that such item has been selected. The user can select any number of items in the GUI 1800. Additionally, the GUI 1800 can be provided with a button 1820. The button 1800 can take the user to additional GUIs or user interface mechanisms by which the user can input additional information regarding the particular photo. Accordingly, the GUI 1800 provides a quick and efficient way for the PS to input information regarding a photo from the user. Upon a user completing his or her selection in the GUI 1800, the user can tap the button 1840 so as to indicate to the PS that the user has completed selection—and that the PS can process the uploaded or input photo based on the user's selections. Accordingly, the GUI 1800 of FIG. 18 can be utilized in conjunction with a user uploading a photo—to provide the user with a mechanism to input attributes of such uploaded photo. However, the GUI 1800 can also be utilized to perform other processing. That is, the GUI 1800 can be presented to the user so that the PS can input search criteria from the user. The user can make selections in the "matrix" of the GUI 1800 as may be desired. The PS can then perform a search based on the input criteria. In such processing, the button 1820 can be utilized by the user so as to allow the user to input more detailed search criteria information. In such processing, the button 1840 can be selected by the user upon the user completing his or her selection(s), for example ranking 1810, of the various items in the GUI 1800. Thus, upon the user tapping the button 1840, the PS can perform the requested search.

Figure 19:
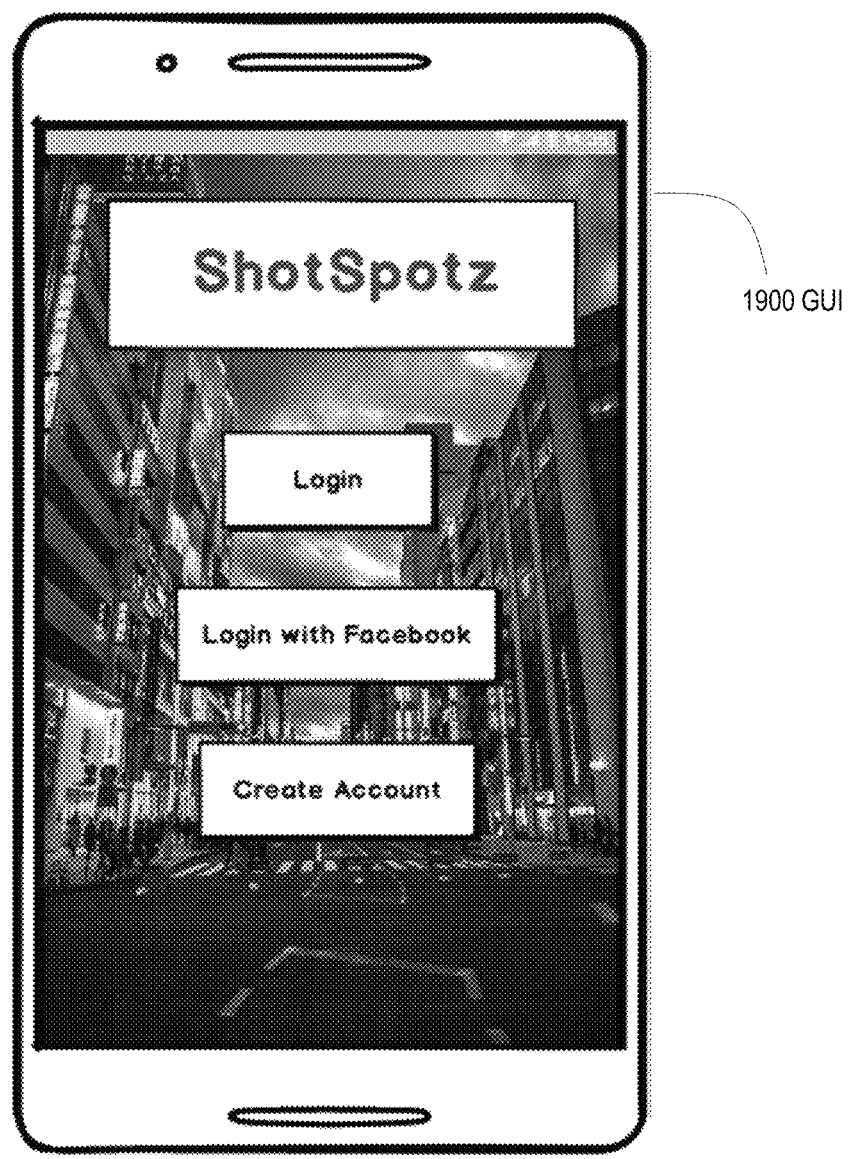
FIG. 19 is a diagram that includes a GUI that can be presented to a user or potential user in conjunction with the user signing on or logging into photo system, in accordance with principles of the disclosed subject matter.

FIG. 19 shows a GUI 1900. The GUI 1900 can be presented to a user or potential user in conjunction with the user signing on or logging in to the PS (photo system). The GUI 1900 can include a login option. The GUI 1900 can include a login via Facebook option. The GUI 1900 can also include a create account option, i.e. in the situation that the user has not yet created an account in the PS. It should be appreciated the options shown in the GUI 1900 are illustrative. Additional options or mechanisms can be provided so as to input credentials from the user and allow the user access to his or her account.

Features of FIG. 20 are described above. In accordance with at least one embodiment of the disclosure, the GUI 2000 of FIG. 20 can provide a main landing page. That is, the user might be presented with the GUI 2000 upon first logging on to or in 2 the system.

Figure 22:
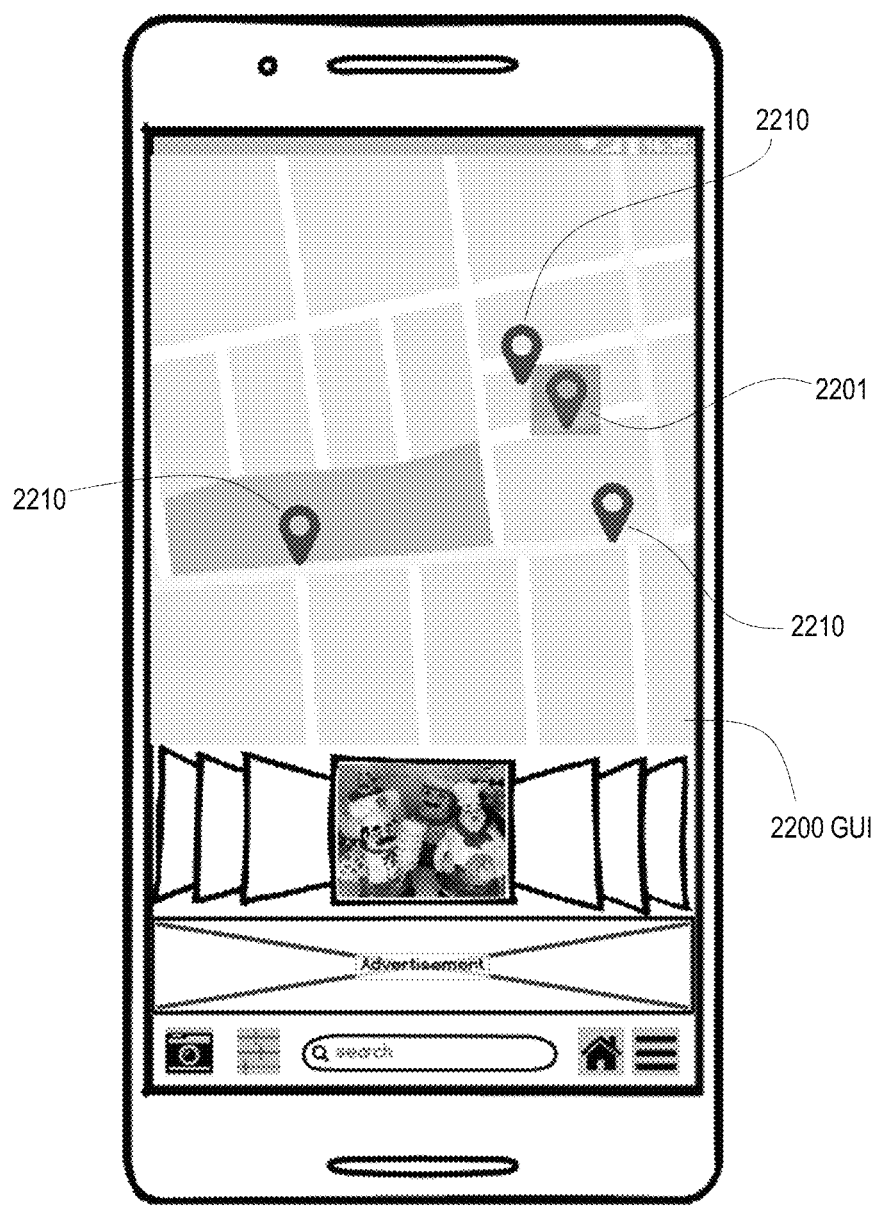
FIG. 22 is a diagram that includes a GUI 2200 that can be utilized to provide the user "spots around me" functionality in accordance with principles of the disclosed subject matter.

As described above, a processing option provided by the PS can include "spots around me" or what might be described as "spots near me". In such processing option, the PS can generate a GUI 2200 such as shown in FIG. 22. The GUI 2200 can include first indicia 2201 that reflects user location or user device location. The GUI 2200 can also include second indicia 2210 that reflects "spots" around the user that the PS has identified. For example, the user might hover his or her cursor over a particular indicia 2210 so as to invoke the system to present additional information regarding the particular spot that is thereby selected. A user can select a particular spot in some manner, such as by clicking the particular spot, as represented by indicia 2210. In clicking a particular spot, the PS can present the user with various photos 2220 that are contained in the selected spot. The PS can interface with the user so as to allow the user to "flip through" the various presented photos 2220.

Figure 23:
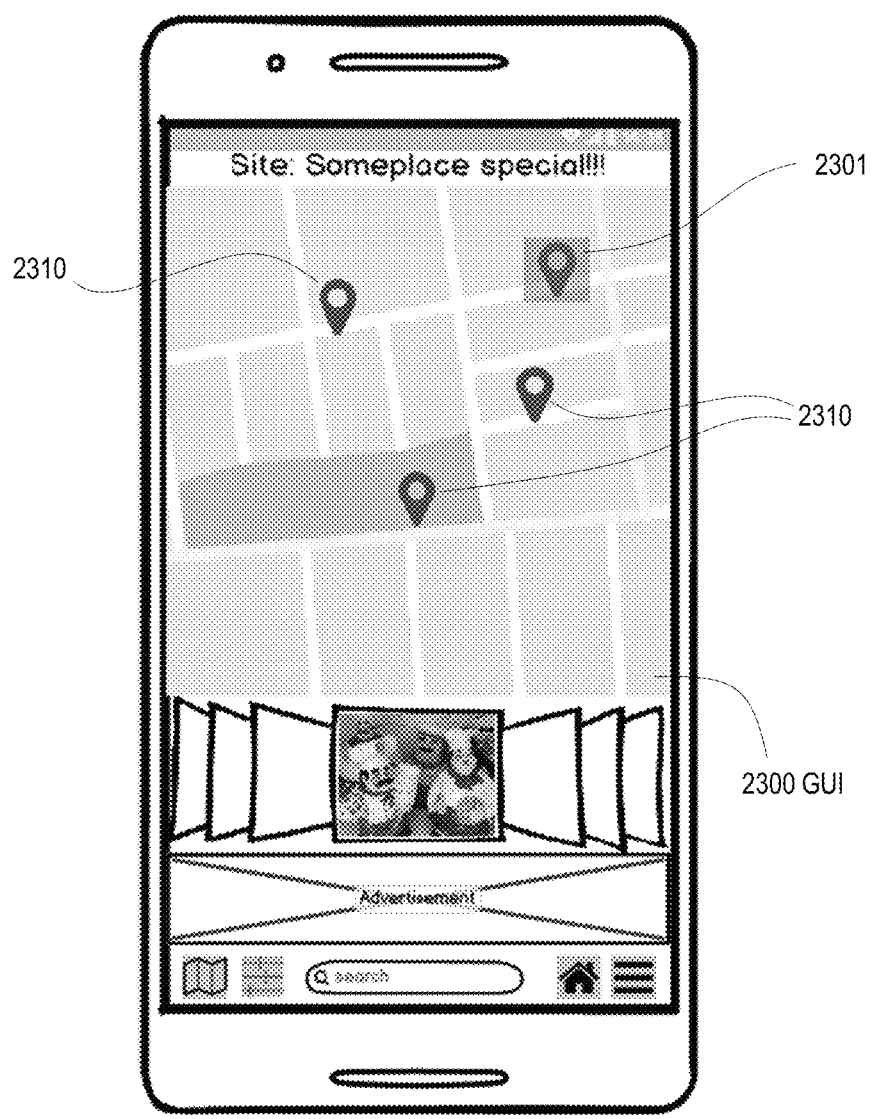
FIG. 23 is a diagram that includes a GUI 2300 that can be utilized to provide the user information regarding a "site", with such site including a plurality of spots, in accordance with principles of the disclosed subject matter.

As described herein, the PS can perform various processing related to a spot. A spot can be generated based on a particular area, such as a patch, having sufficient photo density. Relatedly, a plurality of spots can be collectively form a "site". In such processing, the PS can generate a GUI 2300 such as shown in FIG. 23. The GUI 2300 can include first indicia 2301 that reflects user location or user device location. The GUI 2300 can also include second indicia 2310 that reflects "sites" around the user—that the PS has identified. The user might hover his or her cursor over a particular indicia 2310 so as to invoke the system to present additional information regarding the particular site that is thereby selected. A user can select a particular site in some manner, such as by clicking. In clicking the particular site, the PS can present the user with various photos 2320 that are contained in the particular selected site. The PS can interface with the user so as to allow the user to "flip through" the various presented photos 2320 that are associated with the selected site.

Figure 24:
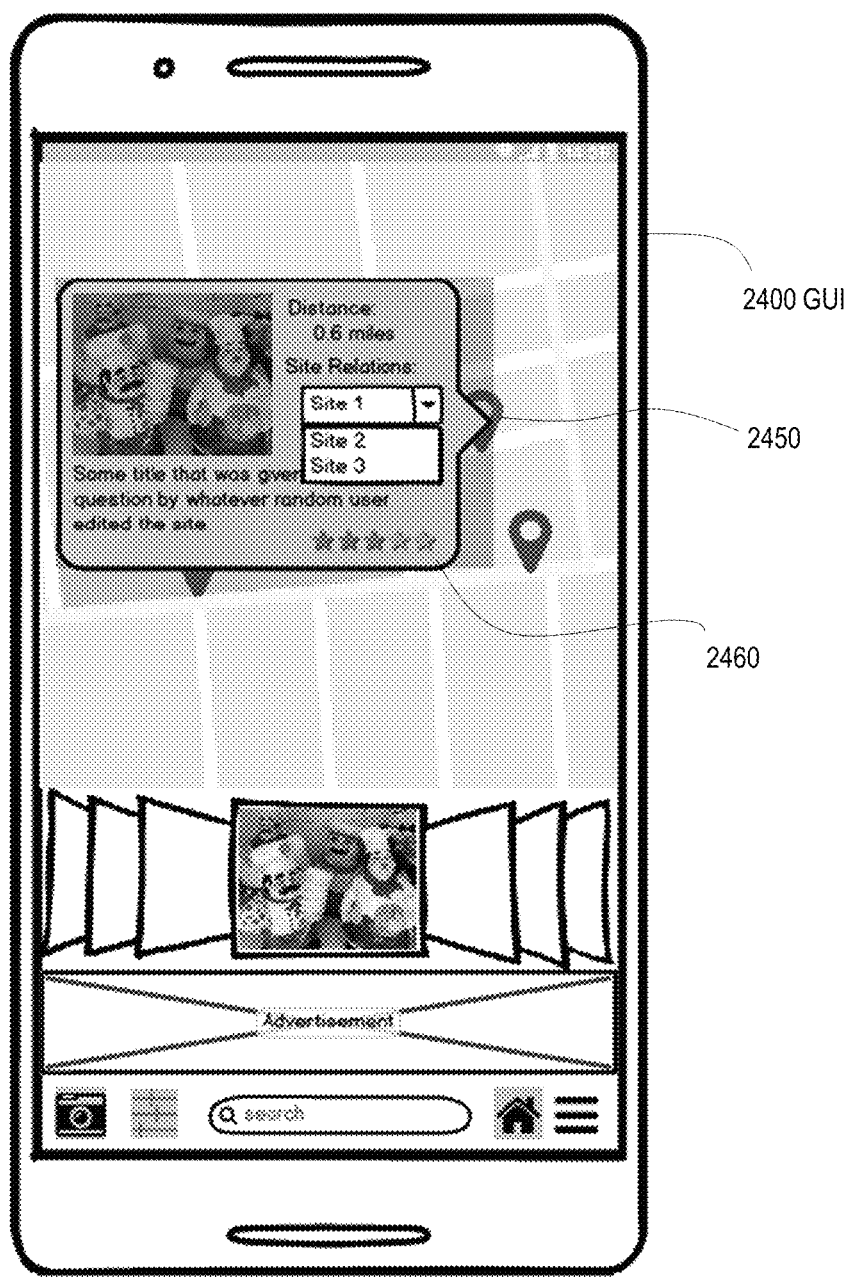
FIG. 24 is a diagram that includes a GUI 2400 that illustrates "spots around me" functionality, in accordance with principles of the disclosed subject matter.

In accordance with a further aspect of the disclosure, FIG. 24 shows a GUI 2400 that illustrates "spots around me" functionality. The GUI 2400 can provide information to the user regarding spots around the user—and more specifically provide a map view of spots around the user. A user can select a particular spot, for example as represented by indicia 2450. Once selected, information regarding the particular spot can be displayed to the user in a display box 2460. A distance between the user and the spot can be displayed. For example, such distance might be based on a center point of the particular spot. As described above, a "spot" can be an area, such as a patch, that has attained a threshold density of photos or that has attained a threshold density of photos of a particular type or attribute, for example. The display box 2460 can also include additional information. Such additional information can include sites that are associated with the particular selected spot. The user might select a particular site so as to result in the PS to display yet further information regarding the particular site.

Figure 25:
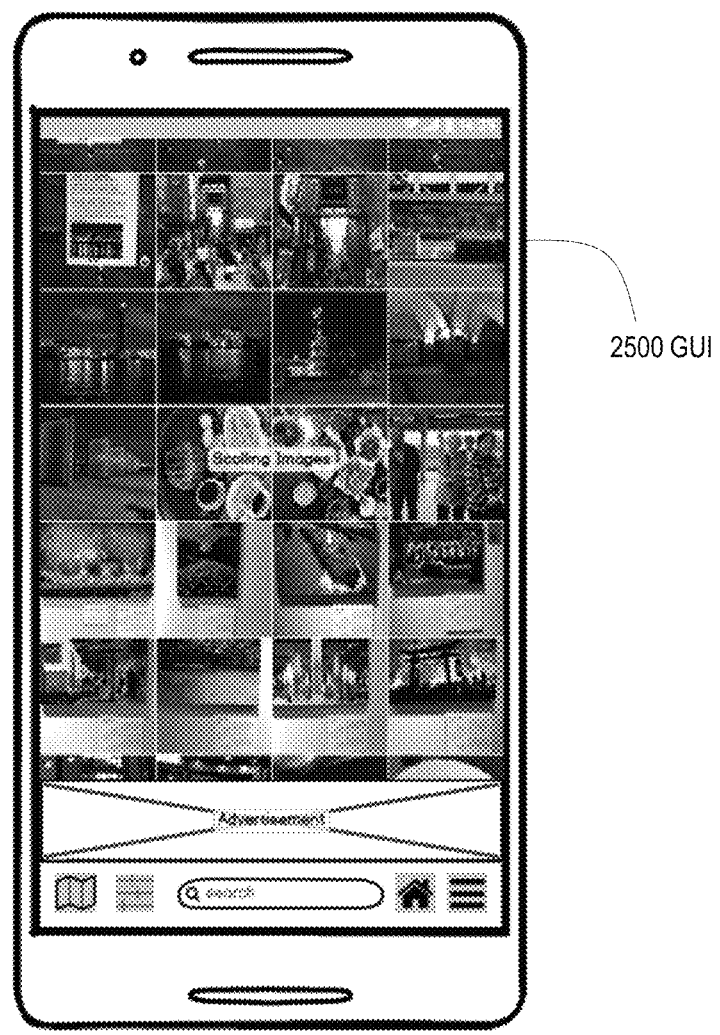
FIG. 25 is a diagram that includes a GUI 2500 that can be presented to the user to provide additional information to the user regarding spots around the user or user device, in accordance with principles of the disclosed subject matter.
Figure 26:
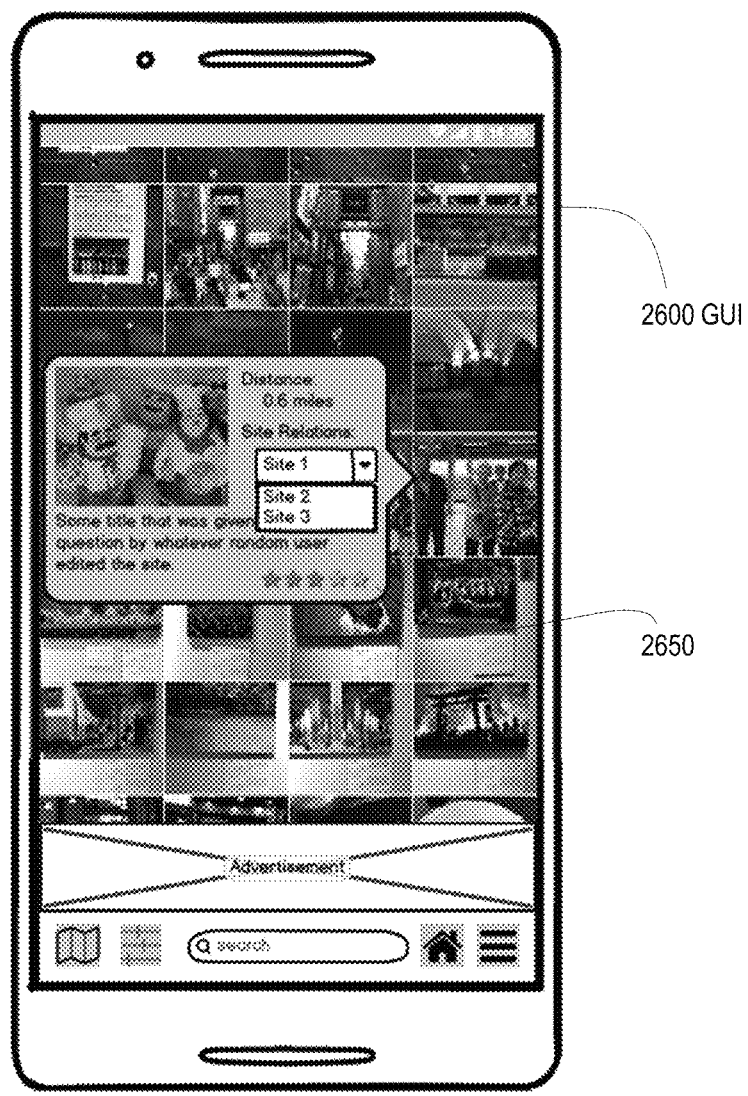
FIG. 26 is a diagram that includes a GUI 2600 that shows further details of "spots around me" functionality in accordance with principles of the disclosed subject matter.

FIG. 25 shows an additional GUI 2500 that can be presented to the user to provide additional information to the user regarding spots around the user or user device. The selection of photos can be presented based on various options or criteria. For example, a representative photo for each spot can be presented to the user. For example, all photos from a particular spot or spots can be presented to the user. The user can be provided the ability to select a photo. Selection of the photo can result in additional information being displayed to the user, such as particulars of the spot to which the photo is associated. Such additional information is illustrated by display box 2650 in the GUI 2600 of FIG. 26. Such data can include a distance that the user is from the selected spot or the selected photo. Such data can include sites that are associated with the selected spot or the selected photo.

Figure 27:
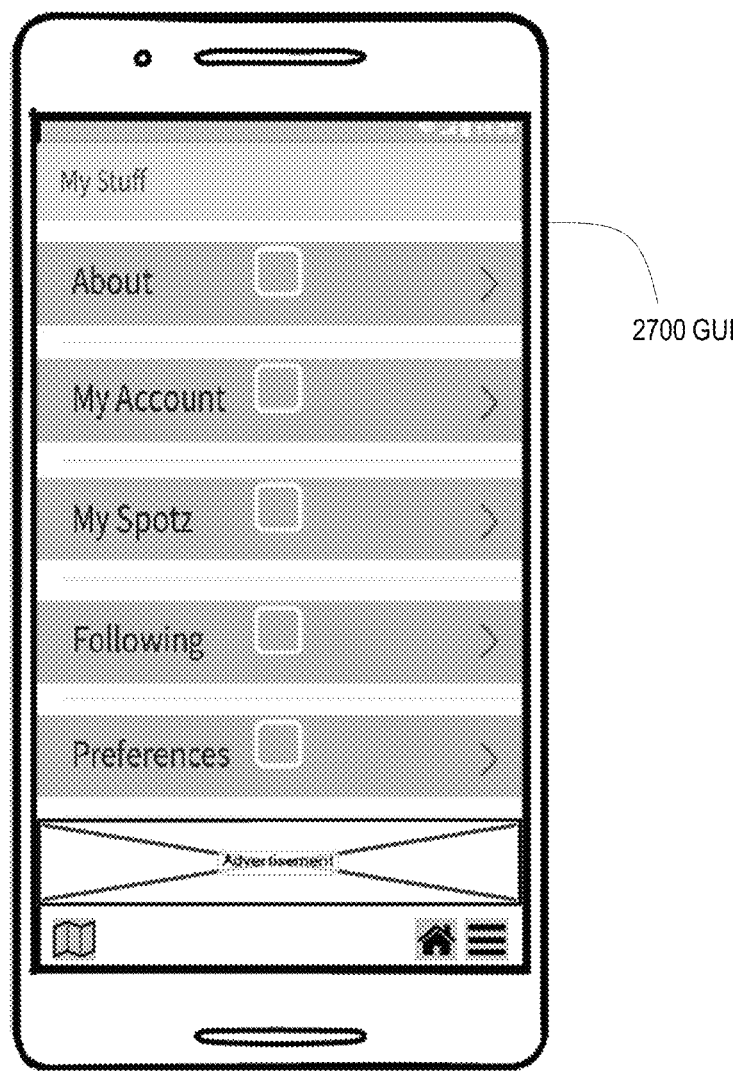
FIG. 27 is a diagram that includes a GUI 2700 that can be presented to the user to provide various menu selection items in accordance with principles of the disclosed subject matter.

FIG. 27 shows a GUI 2700 that can be presented to the user via a suitable menu selection. The GUI 2700 can include various options including about, my account, my spots, following, and preferences. The about option can provide various information about the user. The my account option can provide various information to the user regarding her account, as well as functionality so that the user can change attributes of their account. For example, the my account option might provide the user with the ability to change a phone number associated with her account. The my spots option can provide various information regarding the spots, i.e. that can be described as "Spotz", that are associated with the user account. For example, the my spots option can provide the user with details regarding spots to which the user has contributed photos. The my spots option can provide the user functionality so that the user can opt to receive updates regarding particular spots, i.e. favorite spots.

Additionally, the GUI 2700 can include a "following" option. The following option can provide functionality by which the user can select spots that the user desires to "follow". For example, a user following a spot can mean that the system can identify any changes or updates to the followed spot. For example, if photos are added to the particular spot, then the user (who is following the spot) can be notified of such added photos. Additionally, the "following" functionality can include various other options. For example, the following functionality can include an association between the particular user and a second user. For example, a first user might follow a second user so as to be updated regarding where the second user has taken photos, spots with which the second user has engaged with, or other information. The PS can interface with each of the involved users so as to input authorization and/or acceptance to share related data.

Figure 30:
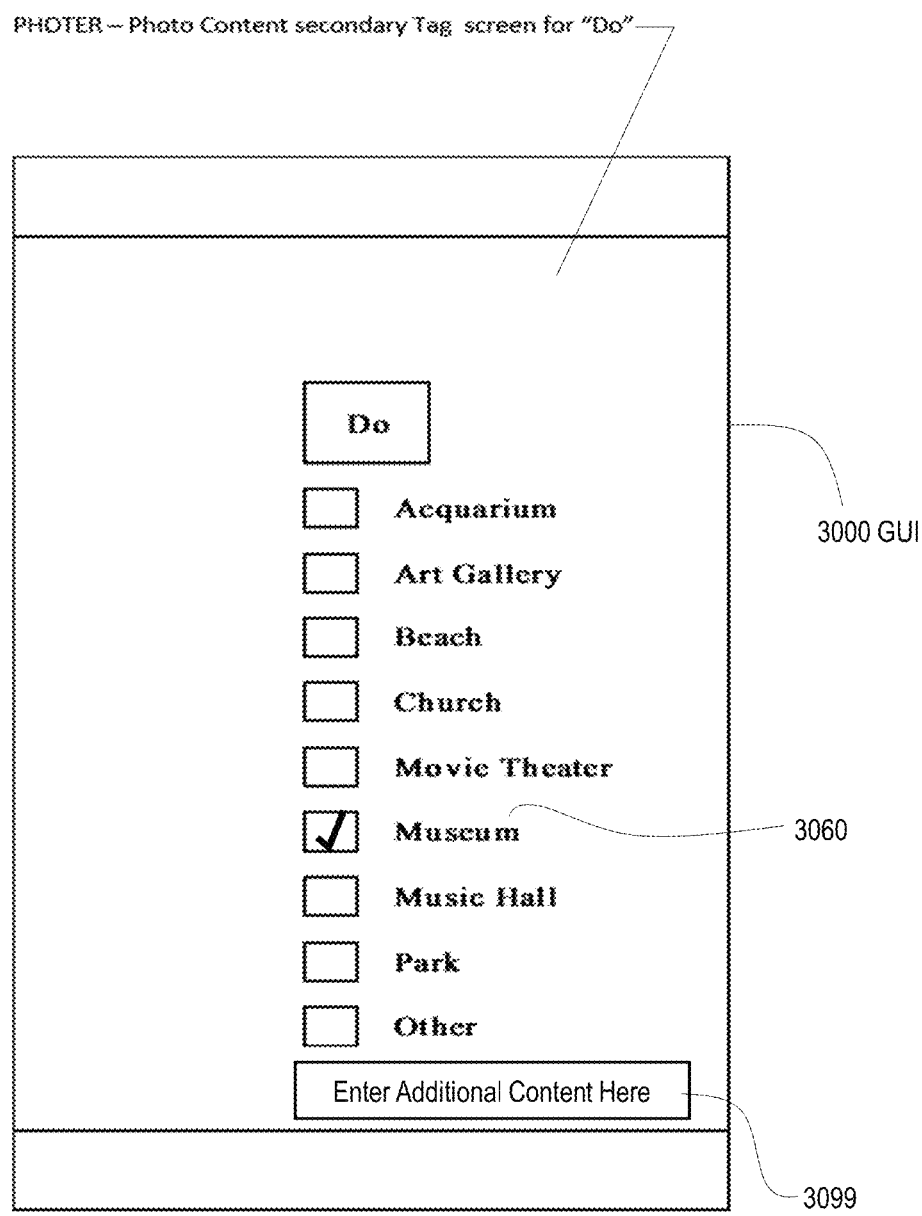
FIG. 30 is a diagram that includes a GUI 3000 that can be displayed as a result of the user tapping or selecting a suitable button for further tagging of photos or allowing users to identify additional content that can be added to or associated with a photo, for example, in accordance with principles of the disclosed subject matter.

As described above, FIG. 28 shows a GUI 2800 that can provide various information regarding one or more spots. In particular, FIG. 28 can provide the user access to photos associated with a particular spot. As described above, FIG. 18 is a GUI (graphical user interface) 1800 that illustrates aspects of "photo info" processing. The GUI 1800 can provide an interface by which the PS can input various information regarding a photo, a group of photos, a collection of photos, a spot, or a site, for example. As described above, the GUI 1800 can also include the button 1820. The button 1820 can be selected by the user so as to input additional information. Relatedly, FIG. 30 shows a GUI 3000 that can be displayed as a result of the user tapping or selecting the button 1820. In other words, the GUI 3000 can be presented to the user so as to provide the user the ability to add additional information above and beyond that input via GUI 1800. The GUI 3000 can be presented to the user via suitable menu option. The GUI 3000 might be selected by the user tapping the criteria or location type "do" 1801 in the GUI 1800 of FIG. 18. The GUI 3000 allows the user to input additional particulars regarding the "do" location type. For example, if an input photo relates to activities associated with a museum, then the user might select the appropriate item 3060 as illustrated in FIG. 30. The GUI 3000 can include dialogue box 3099 into which a user can input comments, i.e. text, regarding the user's selection in the GUI 3000, one or more associated photos, and/or the user, for example.

Figure 29:
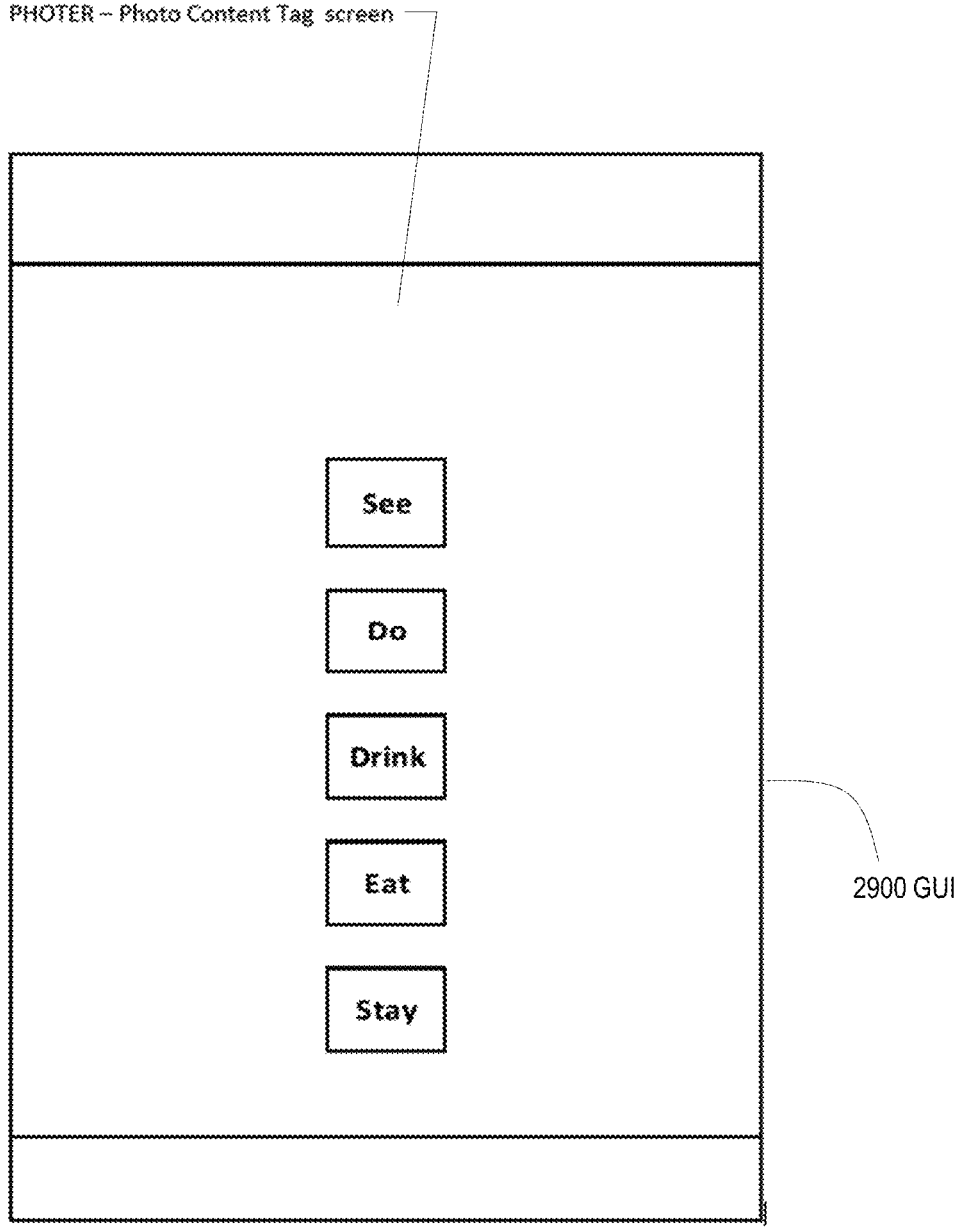
FIG. 29 is a diagram that includes a GUI 2900 that can provide tagging of photos or allowing users to identify additional content that can be added to or associated with a photo, for example, for future search options in accordance with principles of the disclosed subject matter.

FIG. 29 is a further GUI 2900 in accordance with principles of the disclosed subject matter. The GUI 2900 can be presented to the user in connection with either tagging a photo that is to be uploaded to the photo system or in connection with searching for a particular type of photo or spots having a particular type of photo. Using the GUI 2900, the user can specify whether the user wants to tag a particular photo as see, do, drink, eat, or stay, for example—or to search for a photo having such attributes.

Figure 31:
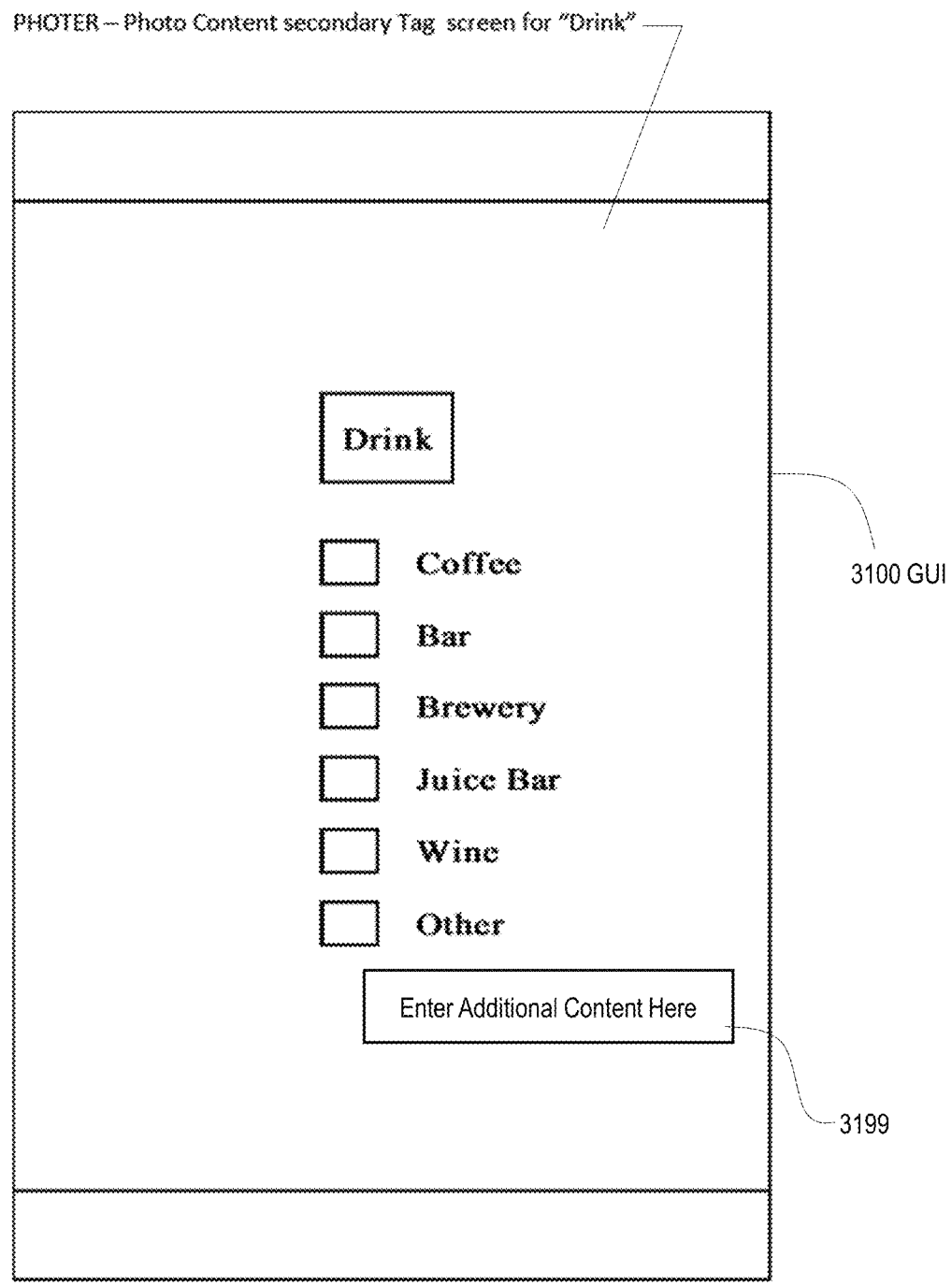
FIG. 31 is a diagram that includes a GUI 3100 for further tagging of photos or allowing users to identify additional content, which can be added to or associated with a photo, that can be generated by the photo system and presented to the user, in accordance with principles of the disclosed subject matter.
Figure 32:
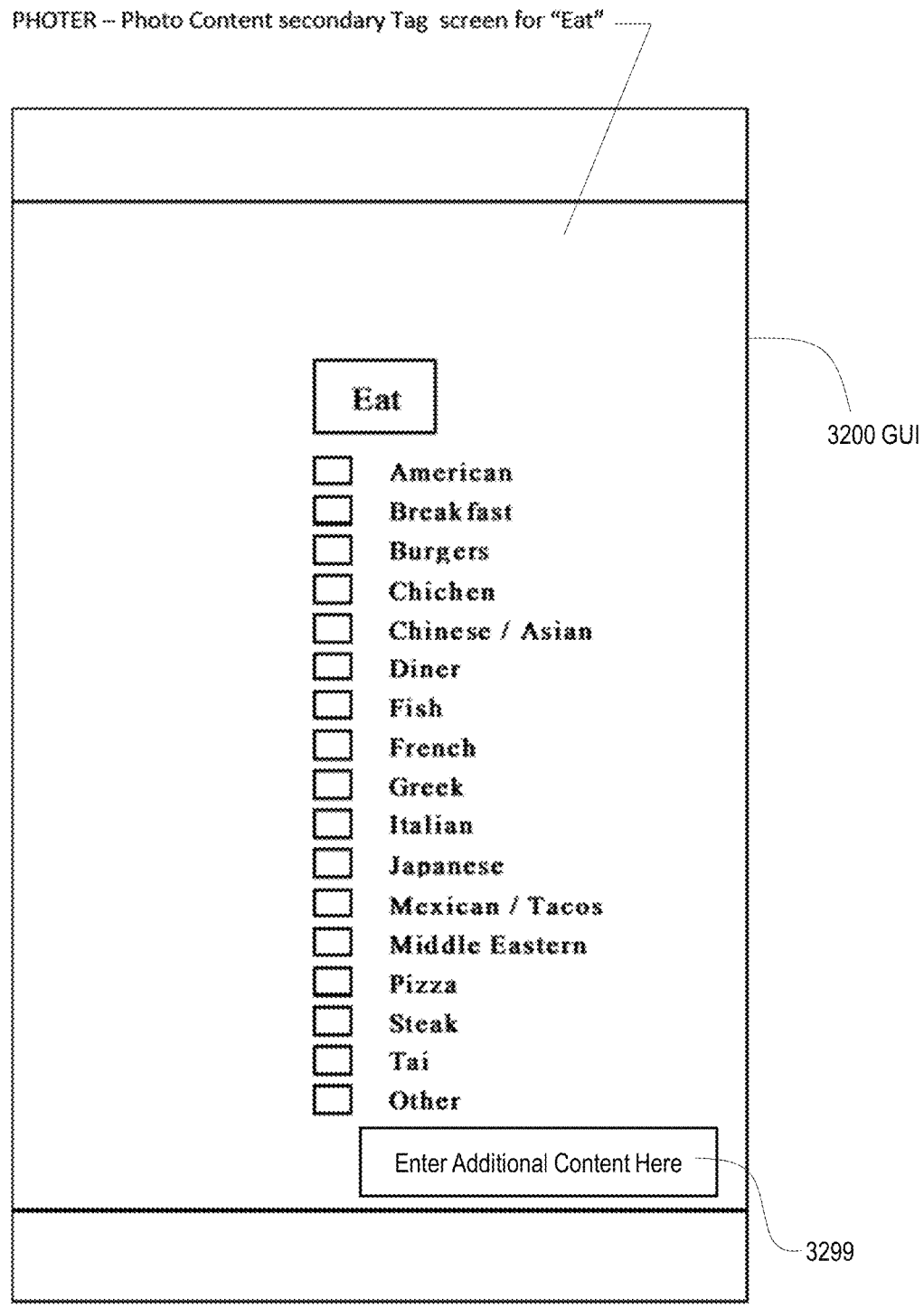
FIG. 32 is a diagram that includes a GUI 3200 for further tagging of photos or allowing users to identify additional content, which can be added to or associated with a photo, that can be generated by the photo system and presented to the user, in accordance with principles of the disclosed subject matter.
Figure 33:
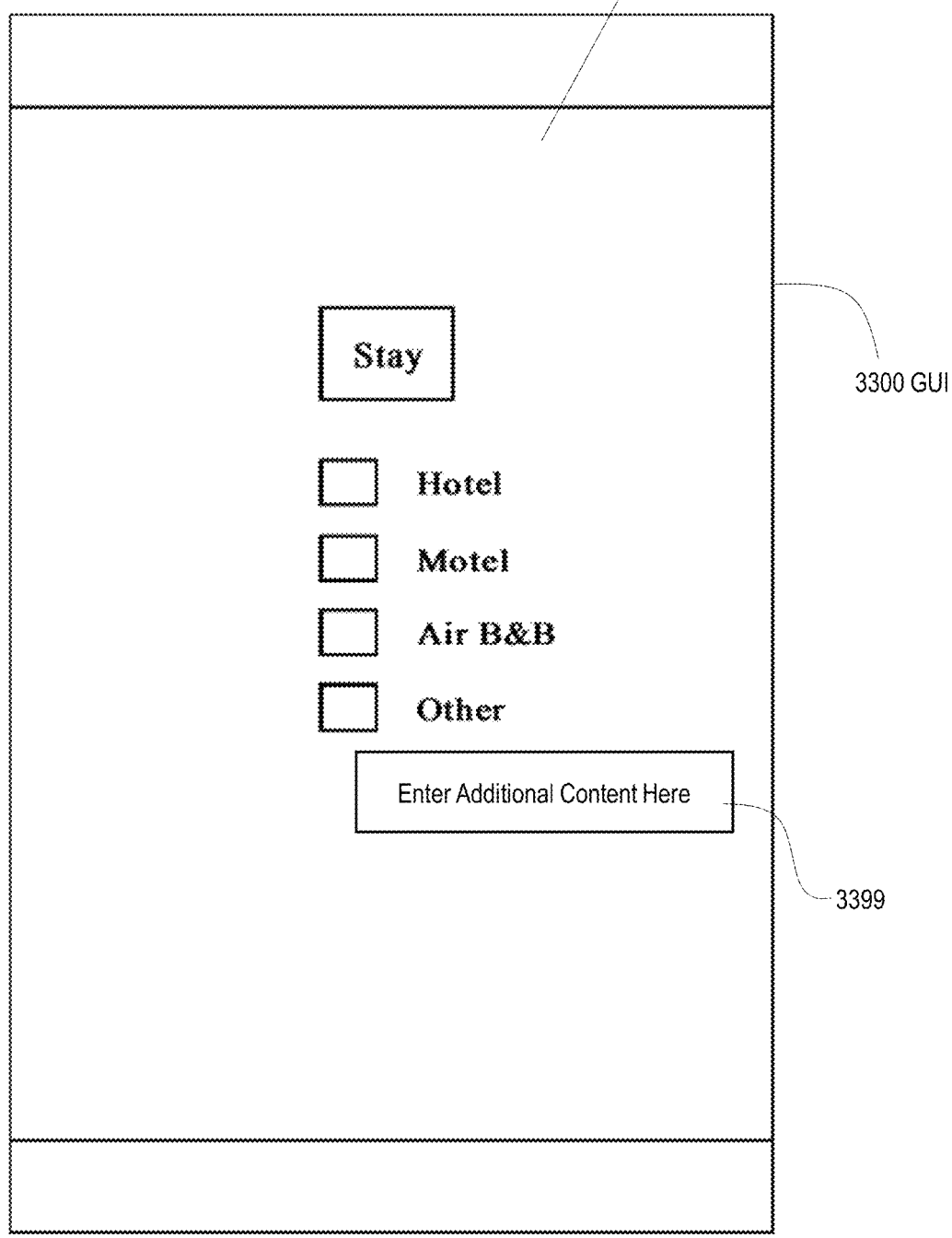
FIG. 33 is a diagram that includes a GUI 3300 for further tagging of photos or allow users to identify additional content, which can be added to or associated with a photo, that can be generated by the photo system and presented to the user, in accordance with principles of the disclosed subject matter.

FIG. 31 illustrates a further GUI 3100 that can be generated by the PS and presented to the user. The further GUI 3100 allows the user to input additional information regarding a "drink" location type. The GUI 3100 can include dialogue box 3199 into which a user can input comments, i.e. text, regarding the user's selection in the GUI 3100, one or more associated photos, and/or the user, for example. FIG. 32 illustrates a further GUI 3200 that can be generated by the PS and presented to the user. The further GUI 3200 allows the user to input additional information regarding an "eat" location type. The GUI 3200 can include dialogue box 3299 into which a user can input comments, i.e. text, regarding the user's selection in the GUI 3200, one or more associated photos, and/or the user, for example. FIG. 33 illustrates a further GUI 3300 that can be generated by the PS and presented to the user. The further GUI 3300 allows the user to input additional information regarding a "stay" location type. The GUI 3300 can include dialogue box 3399 into which a user can input comments, i.e. text, regarding the user's selection in the GUI 3300, one or more associated photos, and/or the user, for example.

Hereinafter further features of the systems and methods of the disclosure will be described.

As described above, a particular area can achieve a predetermined density of photos so that the area can be elevated to the status of a spot. The predetermined density of photos can include a determination of how many photos of any type are disposed in the particular area. The predetermined density of photos can include a determination of how many photos of a particular type are disposed in a particular area. In response to a search query by a user, search results can be provided based on whether an area has or has not attained the status of a spot. Further functionality can be provided so as to distinguish between different spots. For example, spots can be ranked so as to be compared with other spots. For example, a predetermined threshold to attain spot status can be 20 photos in a particular area, such as in a particular patch. However one spot can include 21 photos. Another spot can include 55 photos. Accordingly, functionality can be provided so as to differentiate the relevancy of such 2 different spots. For example, data can be provided to the user, in response to a search query, so as to advise the user of such different density in spots. For example, a spot can be ranked so as to be able to be compared with other spots. Additionally, the criteria or thresholds used to determine if density of an area is sufficient to deem the area a "spot" can depend on various criteria. For example, in a highly populated area, the threshold to elevate an area to a spot can be different than the threshold (to elevate an area to a spot) in a very rural area. Thus, in New York City, a patch might be required to have 50 photos associated with a patch so as to attain spot status. On the other hand, a patch in a rural area may only be required to have 10 photos associated with such patch so as to attain spot status. Further, patches in respective regions, such as rural versus urban, can be of different size, in accordance with at least one embodiment of the disclosed subject matter.

Relatedly, various attributes of a particular photo can be used so as to determine whether the photo should or should not count toward elevating a particular area to a spot. For example, date data or metadata that is associated with a particular photo can dictate whether the photo should be counted towards elevating an area to spot status. For example, for a particular area, if the date of the photo is more than 6 weeks old, then the photo might not count. In a high-traffic area, such threshold date might be much more recent than a more rural area. Various factors can be considered in determining such threshold date for whether a photo is or is not counted towards spot status. Additionally, date "Windows" can be utilized. For example, a particular event may have occurred over a particular week. Accordingly, only photos that bear a date of that week might be deemed to count towards spot status. Additionally, attributes relating to upload of the photo can also be taken into account in whether a photo should or should not be counted towards spot status. For example, if a photo is taken at a particular location, in a particular area, and uploaded within 5 minutes—then such photo may be deemed a "recent" or "live" photo. In such processing, both data regarding when the photo was actually taken and when the photo was uploaded can be used. For example, if the photo was not uploaded until after some predetermined time, such as two days, then the photo might not be counted towards spot status. Accordingly, predetermined thresholds can be used that relate to when a photo was taken and when the photo was uploaded to the photo system, for example.

As described herein, a spot can be generated in any of a variety of manners. A spot can be generated based on pure number of photos within a particular area. A spot can be generated based on number of photos of a particular type within a particular area. Thus, a single geographical area can be associated with a plurality of spots that correspond to that area. For example, a particular area may be deemed a spot based on such area including 20 photos that have been tagged as location type "drink". That same area may be deemed a spot based on such area including 20 photos that have been tagged as location type "eat". Additionally, that same area may be deemed a spot based on such area including a total number of 30 photos, i.e. in the situation that a threshold number of photos to attain spot status might be 25. Accordingly, the PS provides the ability for a user to search or assess "spots" in a variety of different manners. Such different manners might be described as different "lenses" through which the user might look to assess details of a particular area. Relatedly, functionality provided by the PS may allow for the observation of correlation, or lack thereof, between attributes of spots associated with a particular area. For example, a particular "area X" may have gained spot status by virtue of a sufficient number of photos being tagged as location type "eat". Indeed, the number of photos may have far exceeded the threshold to attain spot status. However, that same area X may not have attained spot status based on number of photos being tagged as location type "drink". Accordingly, such disparity can be observed. In such situation, it may be the case, for some reason, that a correlation is expected between drink location type and location type. However, in this example, such correlation is not observed. Accordingly, such disparity may be flagged and appropriate action taken and/or appropriate research performed so as to determine the reason behind such disparity. Appropriate action can be taken in some automated manner by the photo system.

Relatedly, the upload or submission of a photo associated with a particular area may indeed constitute a "vote" by the user for that area. As the user uploads a further photo associated with an area, that photo constitutes a further vote for the area. Such functionality can be described as "your picture is your vote" or such functionality can be described as "the picture is your vote".

In accordance with principles of the disclosed subject matter, a submitted photo can relate to various aspects of ranking and popularity. Popularity can include or relate to volume of submitted photos and/or a preference strength as determined by submitted photos and can be flexible for location type, etc. Therefore, a submitted photo by a user can led to related ranking processing and attributes, such as the ranking of a spot or area. Accordingly, a user's photo can constitute a vote and that vote can vary by location and/or purpose. The viewpoint of a "spot" can be presented in a variety of methods, whether by volume ranking, user following strength, affinity group, etc. Such processing can be described as an "assessment" that can include assessment of "ratings" based upon varying ranking viewpoints, different lenses, lenses of different rankings and dominant lens, for example.

To describe further, processing can be performed that provides an "assessment" of a spot or other area. Such "assessment" can include verification of attributes of an area, and such attributes can include popularity of an area. Assessment can include performing processing to provide multiple viewpoints of the same thing, such as the popularity of a coffee house based on input photos that are input from two different affinity groups. Assessment can reveal differing or divergent viewpoints of an area. Assessment can include the aggregation or analysis of an area from different perspectives or from different lenses or from different affinity groups, i.e. based on respective data that is input from such different affinity groups. Assessment can reveal both (1) validation of an attribute of an area and/or (2) identification of divergence of opinion regarding an attribute of an area.

For example, some users might be associated with a first affinity group and some users might be associated with a second affinity group. Association of a particular user to an affinity group can be based on user interaction and/or attributes of the user. For example, the user might input data to the system indicating that the user is a "hiker" or a "climber". A GUI might be presented to the user via which the user inputs such data. Also, attributes of a user might dictate an affinity group to which the user will be associated, i.e. for example, the system might identify locations that the user frequents and, based thereon, tag the user as a hiker or a climber.

In one scenario, the hiker affinity group might collectively submit photos, which can be described as votes, so as to deem a particular restaurant popular. The climber affinity group might also collectively submit photos so as to deem the same restaurant popular. Based on such data that is input by the system, the system can assign a level of validation to such restaurant as truly being popular, i.e. since there was correlation between the hiker group and the climber group.

In a different scenario, the hiker affinity group might collectively submit photos, which can be described as votes, so as to deem a particular restaurant popular. The climber affinity group might also collectively submit photos so as to deem the same restaurant NOT popular. Based on such data that is input by the system, the system can assign a level of divergence or an indication of divergence to such restaurant as questionably being popular, i.e. since there was NOT correlation between the hiker group and the climber group.

Accordingly, "assessment" processing of the disclosure can (1) determine popularity of an area, (2) determine unpopularity of an area, and/or identify divergent perspectives of different affinity groups, for example. Assessment processing of the disclosure can include (1) determination of a popularity of an area, (2) validation of a popularity of an area, (3) substantiation of a popularity of an area, and/or (4) identify divergence (of popularity or unpopularity) amongst different viewpoints or amongst different affinity groups.

Such "assessment" might also be described as a "triangulation" of a spot or area or might also be described as including "triangulation" or "validation" of a spot or area.

In accordance with principles of the disclosed subject matter and as described above, the world or planet can be divided into areas in accordance with principles of the disclosed subject matter. The areas can include 6 levels in accordance with one embodiment of the disclosed subject matter. The areas can be divided in a hierarchical manner—with each area of a particular level being divided into subareas. Such might be in the form of a parent and child interrelationship as described above. However, the disclosure is not limited to such particulars. For example, instead of the planet being broken down into areas and subareas, a venue might be broken into areas. For example, the venue of a tradeshow might be an area to be broken down, i.e. such that the venue of the tradeshow is analogous to the planet. The venue of a tradeshow might be broken down into different levels of areas as desired, such as 4 levels. The lowest level might be termed a "patch" akin to the patch described above. Each of the patches at the tradeshow might correspond to a respective booth. As each booth receives a threshold number of photos, that booth/patch is elevated to be a "spot". Each photo can be viewed as a vote. The systems and methods of the disclosure can be applied in many other uses. For example, the systems and methods of the disclosure can be applied to zip codes and/or voting wards.

The systems and methods of the disclosure can also include functionality related to monitoring or censoring that can be performed by the photo system (PS) or by users of the PS. For example, such censoring can include a user censoring for inappropriate photo content or other content (for example explicit content or violence) being uploaded. Another example of censoring can include a user censoring for photos that have been tagged with an inaccurate or inappropriate location type. For example, a user might observe a number of photos that have been tagged as location type "places to eat". However, upon review of such photos, the photos may not in any way be related to restaurants or eating. Accordingly, the user may interface with the system so as to de-tag or un-tag the particular photo or photos. In at least some embodiments, such un-tagging can result in the photo immediately being removed from such "places to eat" status. In other embodiments, an administration person or functionality may be required prior to the photo being removed or un-tagged from such "places to eat" status. In some embodiments, a user can be provided with the ability to quarantine a photo or a group of photos.

Relatedly, functionality can be provided so as to censor the censoror, i.e. the user doing the censoring. Such functionality can be provided by the photo system (PS) assessing correlations between various data or data sets. For example, a user that is observed as censoring outside or in excess of a norm can be scrutinized or constrained in some manner. For example, a user can be constrained based on some predetermined threshold(s). For example, if a user is observed by the system to de-tag or un-tag allegedly inappropriate photos at twice average rate—such might constitute a threshold. Based on exceeding such threshold, a user's ability to de-tag or un-tag additional photos might be disabled. Such disabling might be performed in some automated manner by the photo system. In accordance with principles of the disclosed subject matter, such a user can be identified as an outlier, based on predetermined criteria and/or thresholds, and as a result, the user's censoring abilities be constrained or disabled in some manner Systems and methods are provided to process a digital photo. An apparatus to process digital photos can include a tangibly embodied computer processor (CP) and a tangibly embodied database, the CP implementing instructions on a non-transitory computer medium disposed in the database, and the database in communication with the CP. The apparatus can include (A) a communication portion for providing communication between the CP and an electronic user device; (B) the database that includes a non-transitory computer medium, and the database including the instructions, and (C) a cascading framework that includes framework areas, and the framework areas include: first level areas, and each of the first level areas divided into second level areas, the second level areas being divided into third level areas; and (D) the CP. The CP can perform processing including: (a) inputting a photo from the user device, and the photo including geographic data that represents a photo location at which the photo item was generated; (b) comparing the first level area, of the first level areas, in which the photo location is located and associating a first level area identifier to the photo as part of the photo data; (c) comparing the photo location with the second level areas to determine a second level area in which the photo location is located and associating a second level area identifier to the photo as part of the photo data; (d) comparing the photo location with the third level areas to determine a matching third level area in which the photo location is located and associating a third level area identifier to the photo as part of the photo data; (e) assigning the photo to the matching third level area; and (f) performing photo processing, and the photo processing including aggregating a photo count of the matching third level area.

In accordance with principles of the disclosed subject matter, the disclosure provides systems and methods to perform geographic identification of an area combined with using a photo, which is associated with the area, as a vote for one or more popularity determinations of the geographic area. The geographic area can be used for a variety of other purposes. The geographic area and/or a photo associated with the geographic area can be tagged so as to associate content or attributes to the geographic area and/or to the photo.

Hereinafter, further aspects of the systems and methods of the disclosure will be described.

Figure 34:
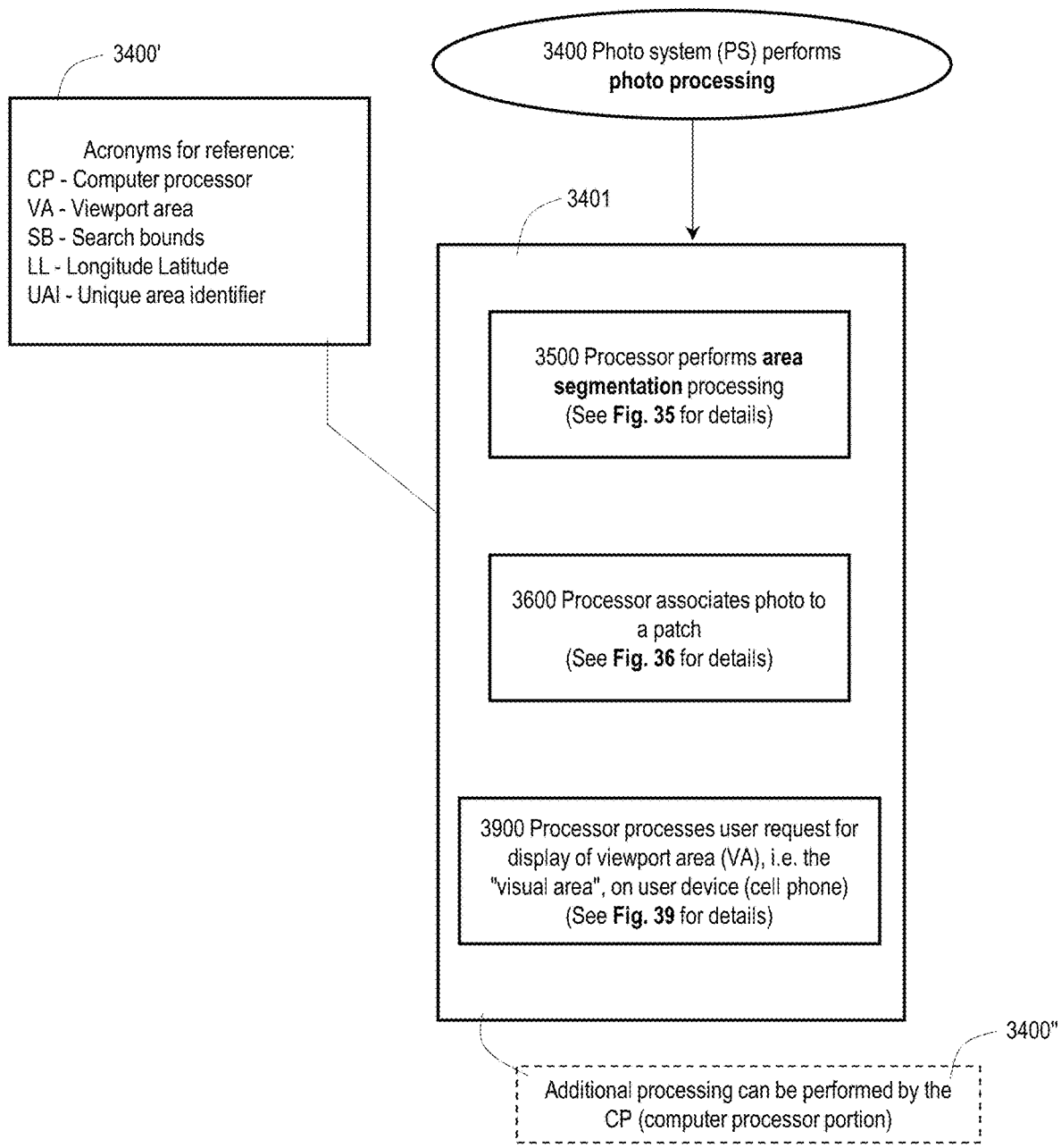
FIG. 34 is a high level flowchart showing additional processing of the disclosure in accordance, with principles of the disclosed subject matter.

FIG. 34 is a high level flowchart showing additional processing of the disclosure in accordance, with principles of the disclosed subject matter. The additional processing relates to further aspects of segmentation, association of a photo to a patch, visual display of information, and various related features. Details are described below.

As shown, the high level processing can begin in step 3400 which reflects that the photo system (PS) performs photo processing. Once initiated or launched, the processing passes onto step 3401. In step 3401, various additional processing can be performed. Acronyms described for reference, as reflected at 3400' in FIG. 34, include CP—computer processor; VA—viewport area; SB—search bounds; LL—longitude Latitude; and UAI—unique area identifier.

The processing of step 3401 can include step 3500. In step 3500, the processor or computer processor (CP) performs area segmentation processing. In such processing, an area such as the world or globe is segmented into identifiable areas. Further details are described with reference to FIG. 35. The processing of step 3401 can also includes step 3600 and step 3900. In step 3600, the processor associates a photo to a patch. In other words, the processor associates a photo that is input into the system into a designated area or framework of the system. Further details are described with reference to FIG. 36.

Figure 35:
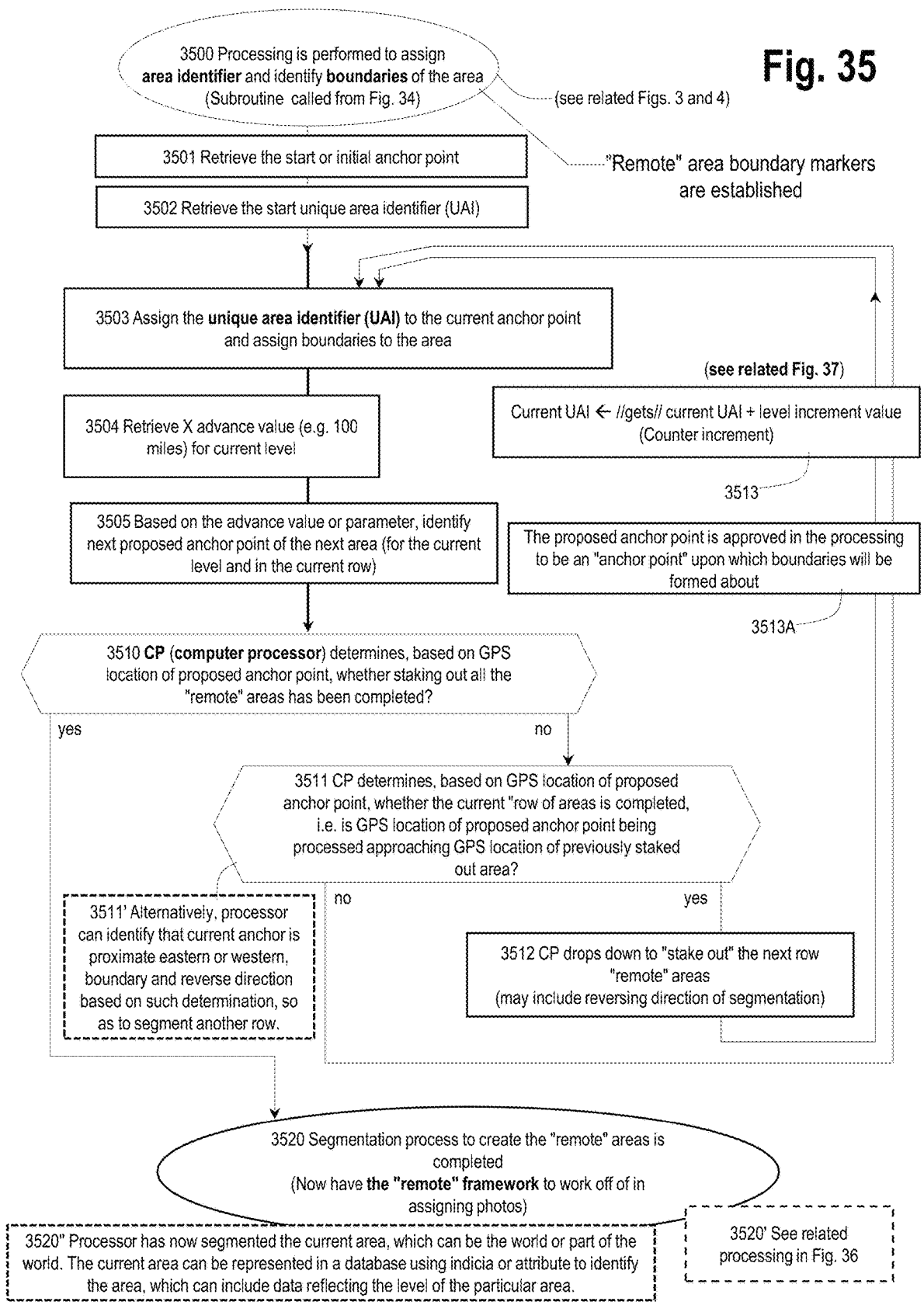
FIG. 35 is a flowchart showing details of "processing is performed to assign area identifier and identify boundaries of an area" of step 3500 of FIG. 34, in accordance with principles of the disclosed subject matter.

The processing can also include step 3900. In step 3900, the processor processes a user request for display of a "visual area", i.e. that can be described as a viewport area (VA) on a user device (UD). The user device can include a cell phone. Further details are described below with reference to FIG. 39. As reflected at 3400", various additional processing can be performed by the CP in conjunction with the particular processing shown in FIG. 34. Such additional processing is otherwise described herein. FIG. 35 is a flowchart showing details of "processing is performed to assign area identifier and identify boundaries of an area" of step 3500 of FIG. 34, in accordance with principles of the disclosed subject matter. As shown, the process starts in step 3500. The processing of FIG. 35 or portions of such processing can be used in lieu of the processing of FIGS. 3 and 4 described above, in accordance with at least some embodiments of the disclosed subject matter. The processing of FIG. 35 can be used in combination with features of the processing of FIGS. 3 and 4, as may be desired. In this illustrative embodiment of the disclosure, the processing of FIG. 35 can be used to establish a framework of "remote" areas. That is, in other words, what are described as "remote" areas can be generated that include both identifiers and boundaries of each respective remote area that is generated. Accordingly, a framework can be generated. Subsequent processing can then build on such initial framework.

After the processing starts in step 3500 of FIG. 35, the process passes onto step 3501. In step 3501, the CP can retrieve the start or initial anchor point for a first area to demarcate. For example, anchor points can be identified by latitude and longitude where a first anchor point can be 0 latitude and 0 longitude, i.e. off the East Coast of Africa in the Atlantic Ocean. However, the initial anchor point can be any location as desired. Then, the process passes onto step 3502.

In step 3502, the CP retrieves an initial or start unique area identifier (UAI). Further details of the UAI are described below with reference to FIG. 37. After step 3502, the process passes onto step 3503. In step 3503, the CP assigns a UAI to the current anchor point or other identifying reference point or attribute of the particular area. Also in step 3503, the CP assigns boundaries to the current anchor point, which corresponds to the current UAI. The assignment of boundaries is described further below.

Then, the process passes to step 3504. In step 3504, the CP retrieves an advance parameter for the current level, i.e. in the present example the "remote" level is the current level. In this example, each remote area is 100 miles×100 miles. Accordingly, the processing can advance or move 100 miles east of a current anchor point so as to advance to the next anchor point. That is, after step 3504, in which the advance parameter is retrieved, the process passes onto step 3505. In step 3505, based on the X-coordinate advance parameters or value, the CP identifies the next proposed anchor point of the next area (for the current level) and in a current row. Accordingly, the processing of step 3505 reflects that "remote" areas can be carved out or demarcated by going east around the globe or world. As described above, once an anchor point for a particular remote area is identified, the CP can then advance 100 miles to the east so as to identify the next anchor point for the next area. It should be appreciated that areas can be generated, i.e. "carved out," in other directions as may be desired.

After step 3505, with a next potential anchor point identified, the process passes onto step 3510. In step 3510, the CP determines based on GPS (global positioning system) location (or longitude/latitude) of the current area, whether demarcating or staking out the remote areas has been completed. In other words, has the globe or world (or some other area that has been designated for segmentation) been fully demarcated or carved out into discrete "remote" areas. For example, such processing can compare GPS locations of areas that have been carved out versus GPS data of the entire globe. If the entire globe is populated with carved out areas, then the determination of step 3510 renders a yes. Alternatively, the GPS locations of areas that have been carved out or "staked out" can be compared to a specific area that is desired to be "staked out". If the complete area desired to be staked out is fully populated with areas, in this illustrative example "remote" areas, then a "yes" would be rendered in the processing of step 3510. On the other hand, a "no" may be rendered in step 3510.

If a "no" is rendered in step 3510, the process then passes onto step 3511. In step 3511, the CP determines, based on GPS location of the current area, whether the current "row" of areas is completed. That is, the processing can determine whether the GPS location of the current area being processed is approaching a GPS location of a previously staked out area. For example, if a new anchor point is identified—and such new anchor point is identified to be within 100 miles of a previously identified anchor point—than the processor can determine that the particular "row" circling the globe has been completed. Accordingly, a "yes" can be rendered in the processing of step 3511. The process then passes onto step 3512.

In step 3512, the CP drops down, i.e. since in this example the segmentation is advancing in a southern direction, to "stake out" the next row of "remote" areas. The amount of the CP drops down can be dictated by a Y-coordinate advance value or parameter. In this example, the described "remote" areas are 100 miles×100 miles. Accordingly, the Y-coordinate advance value is the same as the X-coordinate advance value, i.e. 100 miles, in this example. After step 3512, the process passes onto step 3513A.

On the other hand, a "no" may be rendered in the determination of step 3511. Such "no" determination indicates that there are still additional "remote" areas that are to be carved out or demarcated in the particular row of areas. Accordingly, the next remote area can be determined by advancing in eastern direction according to the X-coordinate advance value. In this example, the X-coordinate advance value can be 100 miles. After step 3511, upon a no being rendered, the process passes to step 3513A.

Accordingly, step 3511 or step 312 are reflective that a proposed anchor point has been determined that can be associated with or identify a further area. If the further anchor point "runs up against" a previously identified anchor point or other row ending identifier, then the CP knows that the particular row of anchor points has been completed, and step 3512 is performed. If the further anchor point does not "run up against" a previously identified anchor point, then the CP knows the particular row of anchor points has not been completed, and the process passes directly from step 3511 to step 3513A. Either way, a further anchor point has been identified that is to be associated with a further identifier. Accordingly, in step 3513A, the proposed anchor point is approved in the processing to be an "anchor point" upon which boundaries will be formed about. Then, in step 3513, the CP increments the current unique area identifier (UAI) so as to generate a new unique area identifier. Such increment processing can be performed by adding a level increment value on to the current UAI value. Further details are described with reference to FIG. 37 regarding a particular numbering scheme that can be utilized in the processing of the disclosure. Accordingly, step 3513 results in the generation of a new UAI. Then, the process passes back to step 3503. In step 3503, the processor indeed assigns that newly determined UAI to represent the current anchor point. Processing then advances to step 3504. Processing then continues as described above. With further reference to FIG. 35, it may be determined in step 3510, that the processor has determined that the "staking out" of the remote areas has been completed. That is, a yes is rendered in step 3510. As a result, the process passes onto step 3520.

In step 3520, segmentation processing to create the "remote" areas in the area to be segmented has completed. Thus, the system now has a "remote" area framework to work off of to assign photos in manner as described below. As noted at 3520", step 3520 reflects that the processor has now segmented the current area, which can be the world or part of the world. The current area can be represented in a database using indicia or attribute to identify the area, which can include data reflecting the level of the particular area.

Figure 36:
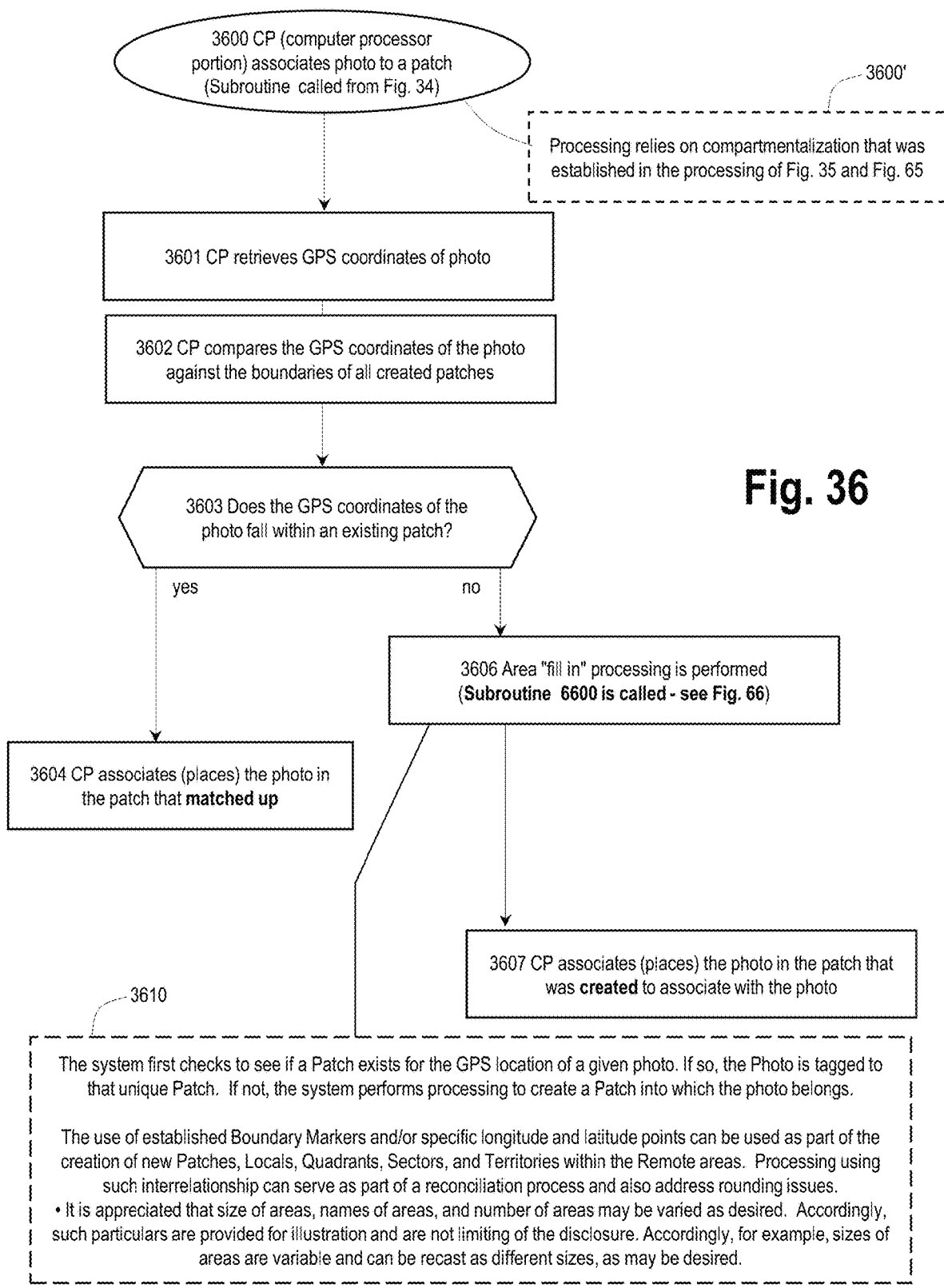
FIG. 36 a flowchart showing details of "CP associates photo to a patch" of subroutine 3600 as called from FIG. 34, in accordance with principles of the disclosed subject matter.

It should be appreciated that the description herein has been described in the context of a "remote" area. In this example, such remote area is the highest level area or largest area that the framework includes. The "remote" area is illustratively 100 miles×100 miles, though such distance can be varied as desired. It is appreciated that the term "remote" area could be renamed as desired, and is used herein for purposes of description. Once the framework has been established, various related processing can be performed. As reflected at 3520' in FIG. 35, FIG. 36 shows related processing that can utilize the framework created by the processing of FIG. 35.

As described above, the CP can assign boundaries to each anchor point that is represented by a corresponding UAI. Such boundaries can be assigned or demarcated in different manners. In one embodiment, once an anchor point is established for reference to a particular area, then other points or corner points of the area can also be established.

Figure 65:
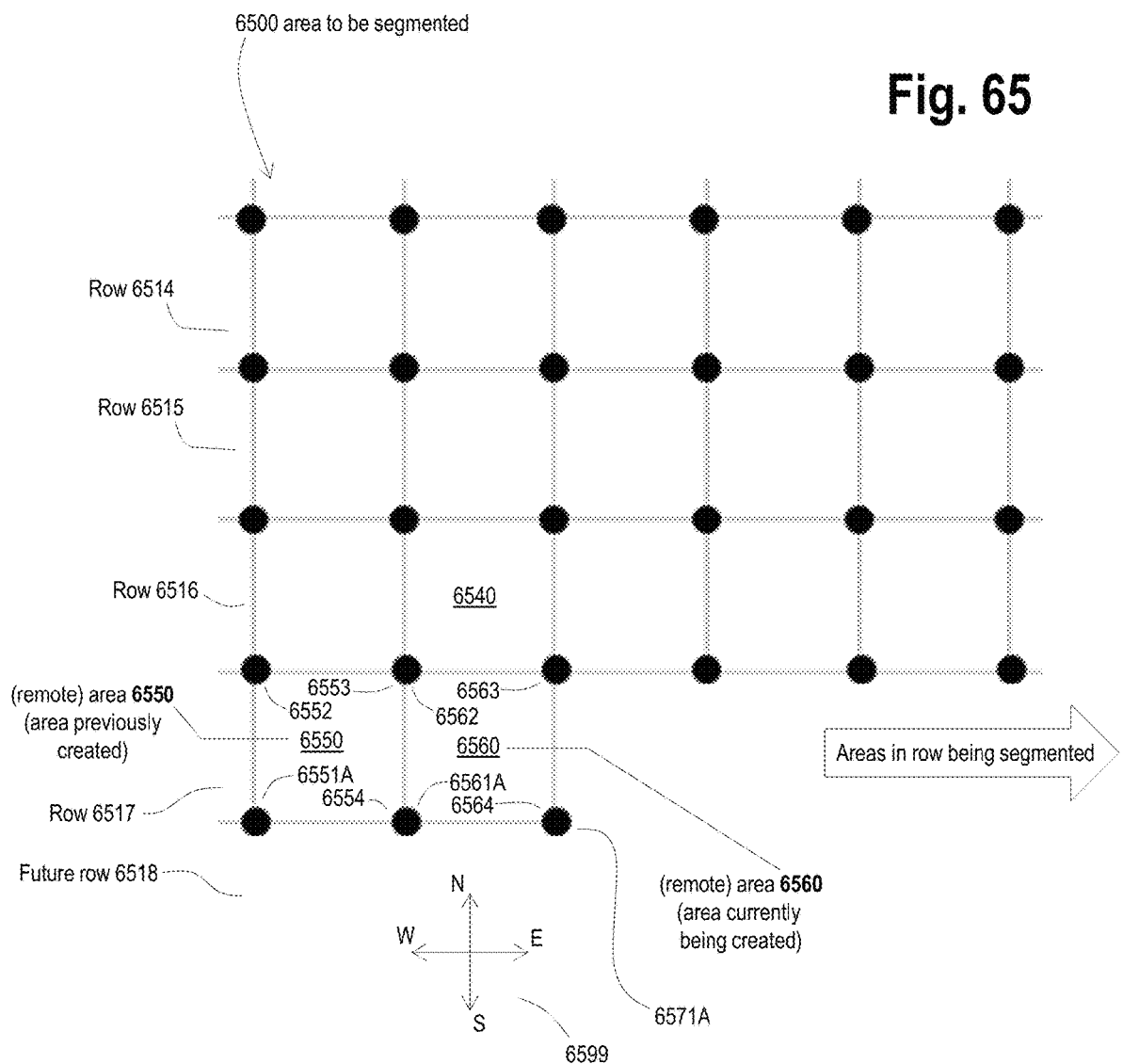
FIG. 65 is a diagram further illustrating segmentation of an area 6500, in accordance with principles of the disclosed subject matter.

FIG. 65 is a diagram further illustrating segmentation of an area 6500, in accordance with principles of the disclosed subject matter. For reference, FIG. 65 includes coordinates 6599. As shown, an area 6550, within the area 6500, has been segmented. The area 6550 is in a row 6517. The area 6550 can be identified by an anchor point 6551A. The area 6560 can include NW corner point 6552, NE corner point 6553, and SE corner point 6554. Processing can then be performed to generate a new area 6560.

In accordance with at least one embodiment of the disclosed subject matter, the processor can retrieve the SE corner point 6554, i.e. of the previously generated area 6550. The processor can assign coordinates (of such SE corner point of the area 6550) to be the coordinates of proposed anchor point 6561A of the new area 6560. As described above with reference to FIG. 35, such proposed anchor point 6561A can be checked to determine proximity to other previously created anchor points and/or checked to determine proximity to a border to the area to be segmented, such as a quadrant of the globe, for example.

If such proposed anchor point 6561A is not proximate in such manner, then such proposed anchor point 6561A is deemed a full fledged or approved "anchor point". Accordingly, the processor can advance to assign boundaries to such anchor point.

In the processing to assign boundaries to such anchor point, the processor can perform the following.

Retrieve the anchor point 6561A of the current area 6560 from memory.

The SE corner point 6564 of the new area 6560 can then be determined by "adding" 100 miles, i.e. the advance value in the x-direction, on to the anchor point 6561A in the east direction.

The NW corner point 6562 of the new area 6560 can then be determined by "adding" 100 miles, i.e. the advance value in the y-direction, on to the anchor point 6561A in the North direction.

The NE corner point 6563 of the new area 6560 can then be determined by "adding" 100 miles on to the NW corner point 6562 in the east direction.

Once segmentation of the row 6517 is completed, the processor can proceed with segmenting the row 6518, i.e. future row 6518.

The segmentation can be described as taking 100 mile square chunks of area moving due east along a line, in a row, in accordance with at least one embodiment of the disclosed subject matter. The processor can determine that a row, e.g. row 6516, has been completed based on (1) comparison of area to be segmented versus the GPS location of the current proposed anchor point being generated and/or (2) that the GPS location of the current anchor point being generated is approaching a previously generated anchor point. Once segmentation of the row 6516 is complete, the processor can advance down to segment a further row 6517, as shown. As shown in FIG. 65, rows 6514 and 6515 have been already segmented.

In alternative processing, the corner point 6562 might be deemed as the new anchor point 6562, and a new SW corner point 6561A be generated based on the newly deemed anchor point 6562. It is appreciated that any corner point (or a center point) might be used as the reference or anchor point, as may be desired. As shown, segmentation can proceed in a down or south direction. Segmentation could instead proceed up or north, or indeed in any direction as desired.

Accordingly, in this manner, the boundaries, of the area 6560 that is associated with the anchor point 6561A, can be determined. Also, the anchor point 6561A can be identified or associated with a unique area identifier (UAI) as described further below.

Accordingly, each anchor point can be associated with a distinct area. Relatedly, the generation of anchor points, for each respective area, can be performed. In the segmentation processing, the anchor point can be established in advance of boundaries associated with a given anchor point. In the example of FIG. 65, the anchor point 6561A has been established. Once the anchor point 6561A has been established, the boundaries associated with the anchor point 6561A can be established as described above. Then, the processing can determine the next proposed anchor point for the particular row being processed. Such corresponds to the processing described in step 3505 of FIG. 35. In this example, a next anchor point 6571A can be determined by moving the advance distance in a direction to the east (from anchor point 6561A), as reflected in coordinates 6599.

It is appreciated that the processing that is utilized to demarcate areas of the particular framework can be varied. In the example of FIG. 65, remote areas can be carved out in rows progressing in an eastern direction. As one row is completed around the globe or world, then the processing drops down (or advances down) to complete the next row. Such processing is reflected in step 3512 of FIG. 35.

However, other approaches and methodologies may be used. For example, an area can be segmented by going back and forth over the area. Thus, as the processor identifies that a proposed anchor point has been established proximate to or at a boundary, the direction of segmentation can be reversed. That is, for example, as segmentation approaches an eastern boundary of the area to be segmented, the processing can be reversed so as to proceed in a western direction. Then, at a point, the segmentation will reach a western boundary of the area to be segmented. Then segmentation can again be reversed so as to again advance in the eastern direction carving out remote areas, in this example. Such alternative processing is reflected at 3511' in FIG. 35. Accordingly, the globe or some other predetermined area can be segmented in what might be described as ribbons or layers. As one ribbon or layer is completed, i.e. segmented, the processing drops down (or up) to the next layer. As a final ribbon or layer is completed in a particular area, the GPS position of the anchor point 6511 can be identified as approaching the southern or bottom extent of an area to be segmented. Accordingly, akin to step 3510 of FIG. 35, the processor can identify if the segmentation of the particular area has been completed.

As described above, segmentation can be performed by going around the entire global world in ribbons or layers. Once an anchor point is identified as being sufficiently proximate a previously created anchor point in a row, i.e. a ribbon around the world has been completed, then the processing can drop down to "stake out" the next row as reflected in step 3512 of FIG. 35. However, instead, the world could be broken into discrete areas and each discrete area segmented separately. For example, the world could be broken into quadrants including a northwest quadrant, a northeast quadrant, a southwest quadrant, and a southeast quadrant. Each demarcated area can be identified by its quadrant. For example, an area in the northeast quadrant could include the indicia NE in its unique area identifier. Further details are described below. In one embodiment of the processing described above, the southeast corner point, i.e. the coordinates of such point, can be used to generate the anchor point 6561A for the next area to be generated, i.e. the area 6560, as shown in FIG. 65. Such processing methodology to generate a row of segmented areas can be utilized even in the situation that there is not a row above the current row being segmented. That is, the methodology could be utilized even if row 6516 had not previously been generated. That is, such methodology can be utilized if there is a row running above the current row being generated, as well as if there is not a row running above the current row being generated.

However, in some embodiments of segmentation, it can be advantageous to rely on an adjacent row, if indeed such adjacent row does indeed exist. For example, coordinates of the southwest corner point of an area 6540, shown in FIG. 65, could be utilized to generate the northwest corner point 6562 for the area 6560. Such interrelationship in forming a new row based on coordinates of an existing row can decrease inconsistencies, inaccuracies, and prevent drift. In general, it is appreciated that the generation of a new area in segmentation can utilize any existing area, anchor point, corner point, or other reference point as may be desired.

As described above, in steps 3510 and 3511 of FIG. 35 for example, a proposed anchor point can be generated. Once the proposed anchor point is generated, the processor can determine whether that proposed anchor point is proximate a boundary of the area to be segmented or whether the proposed anchor point is proximate to another anchor point previously generated to form an area. Such a border or previously generated anchor point can be generally described as an "impediment" to the current proposed anchor point, i.e. in that such impediment impedes the proposed anchor point being deemed an anchor point—and impedes the proposed anchor point being subsequently associated with boundaries and a unique area identifier.

To explain further, in generation of remote areas, the advance value in the X-direction can be 100 miles. For example, the segmentation of a row can be approaching the end of the row. As result, a proposed anchor point can be, for example, 67 miles from the anchor point of the first area in the particular row. In such situation, a fractional or shortened "remote" area can be generated. Such a fractional remote area can include the 67 miles that has to still be allocated to a particular area. Such fractional remote area can still be 100 miles in "height". Accordingly, the particular row can be fully completed using such a mini area or fractional area. The segmentation could be engineered such that such a fractional area could be in a remote location unlikely to receive photos. In addition, a user might be alerted to any such fractional area by a GUI alert on the user device (UD). Relatedly, in a segmentation map, such as is shown and rendered in FIG. 37, a fractional area on the right end of a row can complement a fractional area on the left end of the same row, so as to collectively form a complete area, such complete area being equal in area to other areas along the length of the row.

Accordingly, various processing to perform segmentation of the world or other geographical area is described above with reference to FIGS. 35 and 65.

FIG. 36 a flowchart showing details of "CP associates photo to a patch" of subroutine 3600 as called from FIG. 34, in accordance with principles of the disclosed subject matter. As reflected at 3600', the processing of FIG. 36 relies on the segmentation of compartmentalization that was established in the processing described with reference to FIGS. 35 and 65. That is, the processing of FIG. 36 relies on the remote areas that are created in the processing of FIGS. 35 and 65.

The subroutine is initiated in step 3600 and passes onto step 3601. In step 3601, the CP retrieves the GPS coordinates of the photo. For example, the photo may have just been input from a user. Then, the process passes onto step 3602. In step 3602, the CP compares the GPS coordinates of the photo against the boundaries of all created patches. Then in step 3603, the CP determines if the GPS coordinates of the photo fall within an existing patch. For example, if a previous photo has been added into the system from a GPS location proximate the new photo, then it may well be that a patch will already exist for the new photo. Accordingly, a "yes" may be rendered in the determination of step 3603—and the process passed onto step 3604. In step 3604, the CP associates or places the photo in the identified patch that matched up. The photo has thus found a "home" in a patch that was previously created.

On the other hand, a "no" may be rendered in the determination of step 3603. As a result, the process passes onto step 3606. In step 3606, area "fill in" processing is performed. Such processing is performed to create a patch into which the photo may be placed. Subroutine 6600 can be utilized to perform such fill in processing. Details are described below with reference to FIG. 66.

Accordingly, a result of the processing of step 3606 is to create a patch area, i.e. a patch, into which the new photo can be placed. After step 3606 as shown in FIG. 36, the process passes onto step 3607. In step 3607, the CP proceeds with associating or placing the photo into the appropriate patch, which was created in step 3606.

As reflected at 3610 in FIG. 36, and in summary, the system can first check to see if a Patch exists for the GPS location of a given photo. If so, the Photo is tagged or associated to that unique Patch. If not, the system performs processing to create a Patch into which the photo belongs.

The use of established Boundary Markers and/or specific longitude and latitude points (or GPS location) can be used as part of the creation of new Patches, Locals, Quadrants, Sectors, and Territories within the Remote areas. Processing using such interrelationship can serve as part of a reconciliation process and also address rounding issues. It is appreciated that size of areas, names of areas, and number of areas may be varied as desired. Accordingly, such particulars as described herein are provided for illustration and are not limiting of the disclosure.

Figure 66:
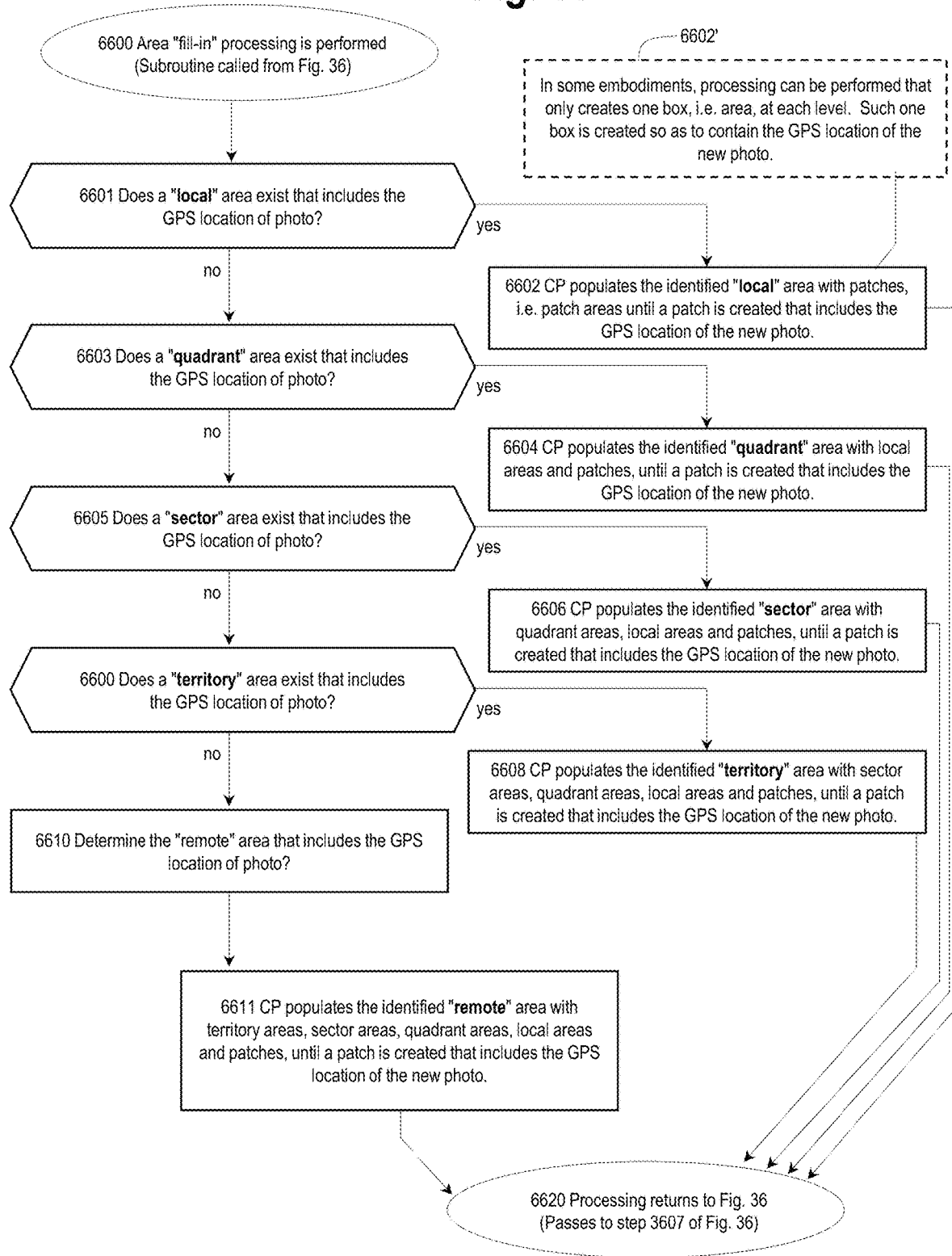
FIG. 66 is a flowchart showing details of "area fill-in processing is performed" of subroutine 6600 as called from FIG. 36, in accordance with principles of the disclosed subject matter.

FIG. 66 a flowchart showing details of "area fill-in processing is performed" of subroutine 6600 as called from FIG. 36, in accordance with principles of the disclosed subject matter. The process is initiated in step 6600 and passes to step 6601. In summary, it is appreciated that the processing of FIG. 66 is invoked in the situation that a photo is input into the system and the GPS coordinates of that photo do not match up within an existing patch area. In such situation, as described below, the processing can include going "up" the segmentation framework until an area is identified that includes the GPS location of the new photo. Once the area is identified, the processing then "fills in" such identified area until a patch is generated that includes the GPS location of the new photo. In this manner, the new photo is provided a "home".

FIG. 66 illustrates such processing. In step 6601, the processor or CP determines if a local area exists that includes the GPS location of the photo. If "yes", then the processor populates the identified local area with patches, until a patch is created that includes the GPS location of the new photo. That is, in some embodiments, patches will only be created in the local area until a patch is created that contains the GPS location of the new photo. However, in other embodiments, the entire local area can be segmented into patches—after which the particular patch that contains the GPS location of the photo will be identified. Such alternative processing may require additional processing capacity as compared to a situation where patch generation is terminated upon the patch, containing the GPS location of the photo, being identified. After step 6602, the processing passes onto step 6620.

Relatedly, as reflected at 6602' in FIG. 66, in some embodiments, processing can be performed that only creates one box, i.e. area, at each level. Such one box is created so as to contain the GPS location of the new photo. To explain further, in the processing of steps 6602, 6604, 6606, and 6608, the CP can, at each level, start at a starting point and create areas, i.e. boxes, until an area (at the particular level) is created that contains the GPS location of the new photo. However, in an other embodiment, only one box can be created at each level. That is, in such other embodiment, only one box, i.e. area, at each level can be created—with such one area being created to contain the GPS location of the new photo. The one box, in each area, can be created.

For example, the processing to create an area within a higher level area, e.g. a patch within a local, can include the following. If a photo, having a photo GPS position, is determined to be in a local area, but no patch has been created that contains the photo within its boundaries, a new patch can be created. The processor (i.e. the CP) can determine the local, i.e. the local area, in which the new photo is disposed. The processor can then demarcate out divisions within the local area. For example, the local area can be broken into 10 divisions in the x direction and 10 divisions in the y direction. Each division can be identified with a marker. The processor can identify which two x-markers the photo GPS position is between in the x-direction, as well as which two y-markers the photo GPS position is between in the y-direction. Accordingly, the CP can then create a patch area based on which four (4) markers are identified, i.e. which two x-markers bound the photo GPS position, and which two y-markers bound the photo GPS position.

The highest value x-marker and the highest value y-marker can define a northeast corner of the patch. The lowest value x-marker and the lowest value y-marker can define a southwest corner of the patch. If any of the markers and/or the corners of the patch are proximate a previously created marker and/or corner—then the previously created marker and/or corner can be used, so as to provide consistency and smooth continuity of segmentation. This described processing can be applied to other levels of areas, as desired.

With further reference to FIG. 66, on the other hand, it may be determined in step 6601 that a local area does not exist that includes the GPS location of the photo. Accordingly, the process passes to step 6603. In step 6603, the processor determines if a quadrant area exists that includes the GPS location of the photo. Accordingly, the processor will go to higher-level and larger areas to determine an area that contains the GPS location of the new photo. If a "yes" is rendered in step 6603, then the process passes onto step 6604. In step 6604, the processor populates the identified quadrant area with local areas and patches, until a patch is created that includes the GPS location of the new photo. Once a matching patch is created and identified, then the processing of step 6604 is terminated. After step 6604, the process passes onto step 6620. On the other hand, a "no" may be rendered in the processing of step 6603. As a result, the process passes onto step 6605.

In step 6605, the processor determines if a sector area exists that includes the GPS location of the photo. If "yes," then processing passes onto step 6606. In step 6606, the CP populates the identified sector area with quadrant areas, local areas and patches, until a patch is created that includes the GPS location of the new photo. Then, the process passes onto step 6620. On the other hand, a "no" may be rendered in step 6605. Thus, the process passes onto step 6600.

In step 6600, the processor determines if a territory area exists that includes the GPS location of the new photo. If "yes," then the process passes onto step 6608. In step 6608, the CP populates the identified territory area with sector areas, quadrant areas, local areas and patches. Such processing is performed until a patch is created that includes the GPS location of the new photo. On the other hand, a "no" may be rendered in the processing of step 6600. As a result, the process passes onto step 6610.

In step 6610, the processor determines the remote area that includes the GPS location of the photo. Step 6610 reflects that all remote areas have previously been created, in this embodiment of the disclosure. Accordingly, the particular remote area that contains the GPS location, of the new photo, can be determined in step 6610. Then, in step 6611, the processor populates the identified remote area with the territory areas, sector areas, quadrant areas, local areas, and patches. Such processing to populate the identified remote area is performed until a patch is identified that includes the GPS location of the new photo. That is, processing is performed until a patch is identified as a "home" to the new photo. After step 6611, the process passes onto step 6620.

In step 6620, the processing returns to FIG. 36 with a patch having been created that includes the GPS location of the new photo. As described above, in step 3607 of FIG. 36, the processor then associates or places the photo into the patch that has been created.

It is appreciated that any of the framework generation processing, the segmentation processing and/or other related processing described herein can be utilized in conjunction with the processing of FIG. 66. As described above, in step 6602, 6604, 6606, 6608, and 6611, processing can be performed until a patch is identified that matches up with the GPS location of the new photo. On the other hand, in another variation of the processing, if a remote area is identified as containing the new photo, then it might be the case that the entirety of such remote area is populated with territories, sectors, quadrants, locals, and patches. Other selective processing can be utilized so as to identify a matching patch as quickly as possible and with minimal processing, if such is desired. For example, the processing might include determination of where a patch is located in a particular remote area. If a patch is located adjacent a corner of such remote area, then generation of areas within such remote area might be initiated proximate to the identified corner. Other "efficient" processing techniques might be utilized as desired.

Figure 37:
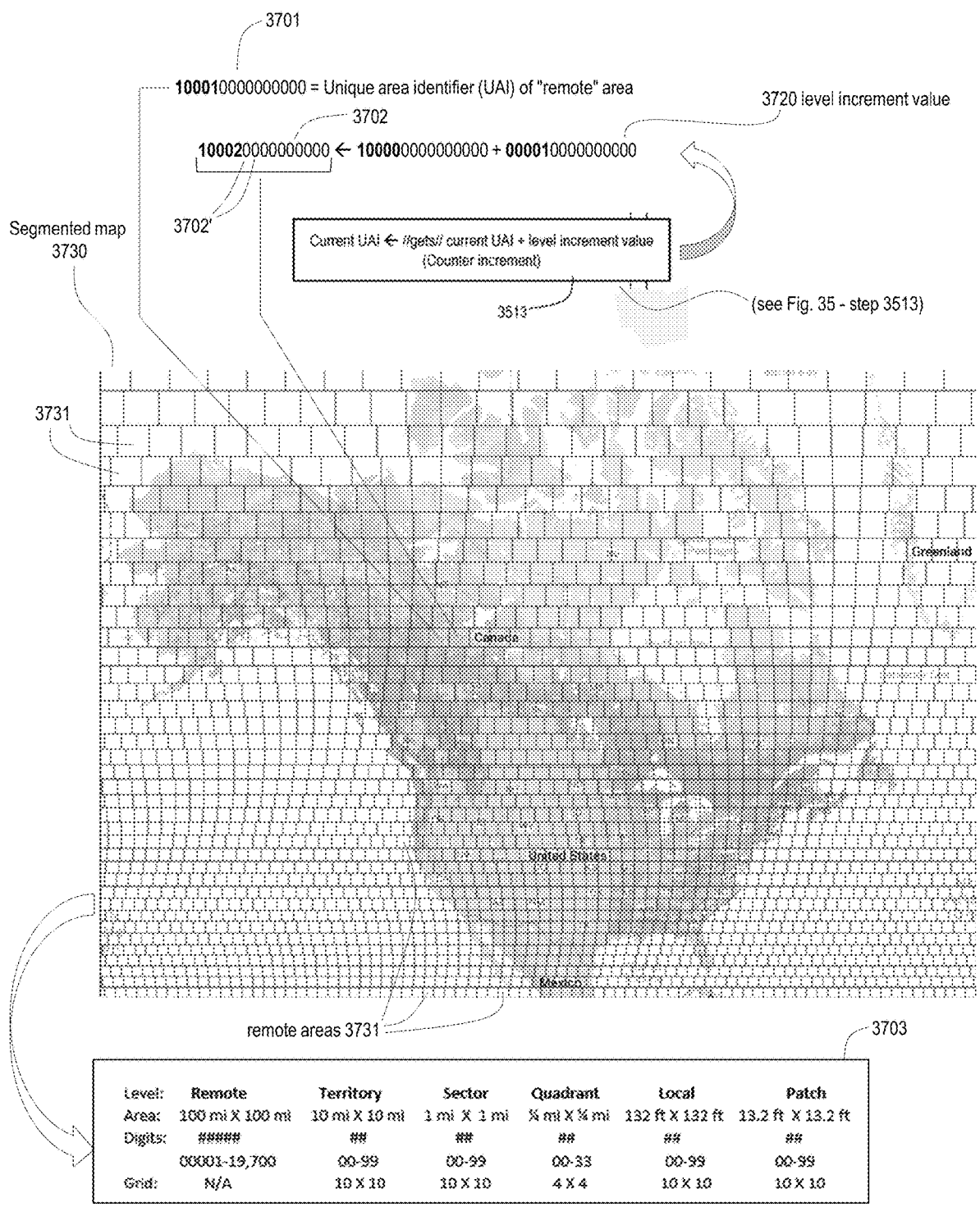
FIG. 37 is a diagram showing aspects of unique area identifier (UAI) generation, in accordance with principles of the disclosed subject matter.
Figure 38:
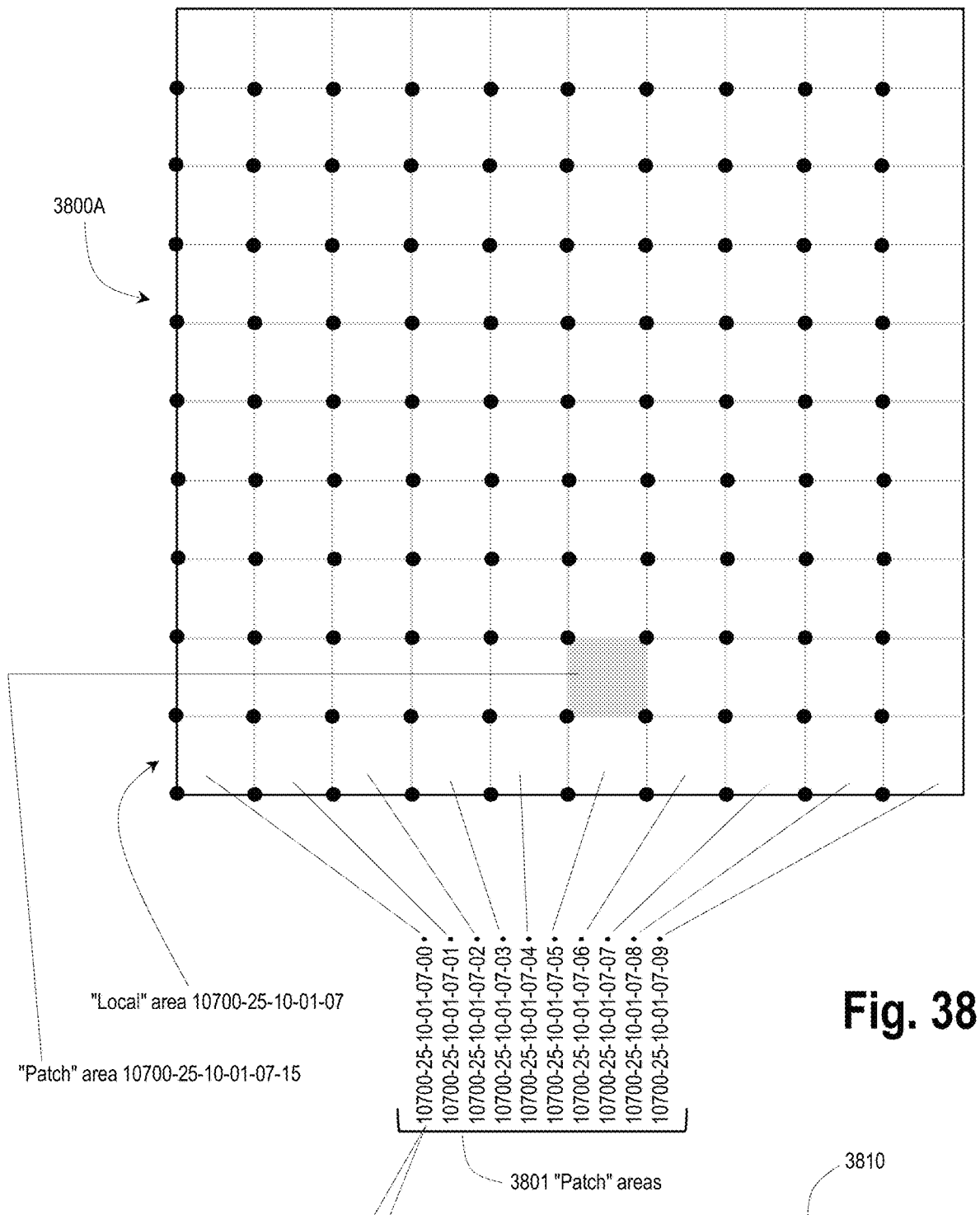
FIG. 38 is a further diagram showing further aspects of UAI generation, in accordance with principles of the disclosed subject matter.

As described above, each patch can be identified by a unique area identifier (UAI). FIG. 37 is a diagram showing aspects of unique area identifier (UAI) generation, in accordance with principles of the disclosed subject matter. Additionally, FIG. 38 is a further diagram showing further aspects of UAI generation, in accordance with principles of the disclosed subject matter.

In accordance with the disclosure, the disclosed methodology can establish and utilize a unique numbering system.

The unique numbering system can include the use of unique area identifiers (UAIs). Each UAI can include a sequence of characters. The sequence of characters can be alpha characters, numerical characters, and/or any other character as may be desired. In the example of FIG. 37, an illustrative UAI 3701 is provided. For purposes of illustration, the UAI 3701 includes a sequence of numbers. Predetermined numbers in the sequence represent a respective area.

To explain, the UAI 3701 includes 5 initial numbers or digits. Such 5 initial numbers can correspond to a particular remote area, as illustrated in box 3703 of FIG. 37. The next two numbers (in the UAI 3701) correspond to a particular territory area. The next two numbers can correspond to a particular sector area. The next two numbers can correspond to a particular quadrant area. The next two numbers can correspond to a particular local area. And lastly, the final 2 numbers of the UAI 3701 can correspond to a particular patch. Box 3703 in FIG. 37 also provides illustrative dimensions for various areas. For example, a territory area can be 10 miles×10 miles. Such dimensions are for purposes of illustration, and the disclosure is not limited to such particulars.

The methodology of the UAI can be powerful in its implementation. The UAI can identify patches or any other area in an efficient and effective manner. Accordingly, use of the UAIs can assist in processing efficiency and in storage of data in an effective and efficient manner.

In one embodiment of the disclosure, the globe or world can be broken into 4 quarters. Segmentation processing can be performed for each of the 4 quarters independently. Indicia can be utilized so as to signify a particular quarter of the globe. Accordingly, each UAI can include two alpha characters at the beginning of the character sequence for each UAI, for example. The two alpha characters might include NW for an area in the northwest quarter, NE for an area in the northeast quarter, SW for an area in the southwest quarter, and SE for an area in the southeast quarter. In the situation that an area is broken up into different or additional areas, than other alpha or alphanumeric character sequences can be utilized. For example, Times Square in New York City might be represented by the UAI:

NW32111928018078, which corresponds to the latitude and longitude (Lat-Long) coordinates:
40.7599638889,−73.9848416667.

Accordingly, embodiments can include segmentation of the globe (i.e. world) for example into quadrants such as NW; NE; SW; SE quadrants. The particular quadrant that an area is located in can be represented as alpha characters. Such alpha characters can be added as a prefix to the Unique Area Identifiers, for example. Such is illustrated above by the above New York City UAI. Any character sequence can be used to represent an area in the form of a UAI.

FIG. 37 also illustrates a further unique area identifier (UAI) 3702. FIG. 37 shows segmented map 3730. The segmented map 3730 includes portions of Mexico, the United States, and Canada. Accordingly, this example illustrates that the processing of the disclosure need not be in the context of the entire globe or world. Rather other smaller areas can be segmented and the processing limited to such smaller areas, if such is desired. The map 3730 shows hundreds or thousands of remote areas 3731. Each remote area can be represented by a UAI. As shown, the UAI 3701 represents a first remote area in Canada. The UAI 3702 represents a second remote area in Canada, which is adjacent to the first remote area. The UAI for both remote areas can include a 15 digit number as shown. The first 5 digits of such number can be dedicated to identification of a remote area.

Accordingly, the UAI of the first remote area 3701 is one (1) digit off of the UAI 3702 that represents the second remote area. Assignment of a respective UAI to each remote area is described above with reference to FIG. 35, for example. In particular, step 3513 of FIG. 35 relates to incrementing a current UAI (for a current remote area) and incrementing that current UAI by a level increment value so as to generate a UAI for the adjacent or next remote area. FIG. 37 shows level increment value 3720. The level increment value 3720 is crafted so as to increment the appropriate "digits" for the particular area to which the UAI relates. For example, in segmentation processing, a remote area can be broken into 100 territories. Assignment of a UAI to each territory can include incrementing the appropriate digits of the UA. In the example of FIG. 37, such appropriate digits can include the digits 3702' as shown in FIG. 37. Further, as smaller areas are segmented and UAIs are assigned, the appropriate digits, which represent such smaller area, can be incremented based on the schema shown at 3703 of FIG. 37.

The segmented map 3730 of FIG. 37 shows many remote areas. Each of the remote areas, in this example, is 100 miles×100 miles. The segmented map 3730 is graphically expanded at the top so as to render the map shown in FIG. 37 to be square. As a result, the areas 3731 toward the top of the map appear larger than areas at a lower portion of the map. This is a result of the rendering of the map 3730 so as to be in the rectangular geometry as shown. Thus, it is appreciated that the areas 3731 at the top of the map are indeed the same geographical 100 miles×100 miles as the areas 3731 at the bottom of the map.

As described above, in segmentation of a particular area, if segmentation reaches the end of a row and/or attains a boundary of the area to be segmented, an area can be segmented so as to be smaller, i.e. so as to accommodate the residual area of the particular row that is remaining. Accordingly, this is apparent from the segmented map 3730 in which areas on opposing ends of the rows may be of different size than internal areas within the rows.

In further explanation of the UAI, FIG. 38 is a diagram that illustrates the UAI of a local area 3800A, in accordance with principles of the disclosed subject matter. The UAI is 10700-25-10-01-07 for the particular local area, in this example. Dash separators can be used so as to better visually decipher a particular UAI. In processing, the processor can disregard such dash separators.

As reflected at 3810 in FIG. 38, each UAI can correspond to an area of specific coordinates. For example, a patch area—the smallest area—can be represented by a 15 digit number. A local area can be represented by a 13 digit number or in other words the first 13 digits of the UAI. Further, a remote area can be represented by 5 digit number or in other words the first 5 digits of the UAI. Further, determination of child areas in a parent area can be determined by searching and comparison of UAIs. FIG. 38 shows a plurality of patch areas 3801 in a row. In processing, it should be appreciated that UAIs can be utilized and manipulated in various ways. For example, in the local area shown in FIG. 38, the UAI for each patch in the local area is the same. Accordingly, different UAIs can be compared to determine if they are indeed from the same remote area, territory, sector, quadrant, or local area. Further, the entire UAI can be transferred in processing components and stored in databases—and portions of the UAI be used as desired. For example, if it is desired in processing to determine which patches are in a particular remote area, then only the first 5 digits of searched UAIs might be utilized. Other processing and manipulation of UAIs may be performed.

The 15 digit UAI, to represent a particular remote area—and areas within such remote area—is for purposes of illustration. As shown, a specific digit or group of digits in the UAI can correspond to a particular area, as is the case with the UAIs illustrated in FIGS. 37 and 38. The particular format of the UAI may be varied as desired.

Hereinafter, further details of the systems and methods of the disclosure relating to visualization processing will be described. Such processing relates to the effective and efficient display of a variety of data, including image data, on a user device, for example. Accordingly, FIG. 39 is a flowchart showing "processor processes user request for display of "visual area" on user device (cell phone)" of subroutine 3900, in accordance with principles of the disclosed subject matter. As shown in FIG. 39, the processing is initiated in step 3900. For example, the processing of FIG. 39 might be initiated when a user zooms in on a particular area of interest, so as to view photos in the particular area of interest. Once initiated, the processing passes onto step 3901 of FIG. 39. In step 3901, the processor interfaces with the user to input a visual area to display on the user device. The processor can be located on a server remote from the user device and in communication with user device. The processor can be located on the user device. The processor can be located partially on the user device and partially on a remote server. After step 3901, the process passes onto step 3902. In step 3902, the processor determines or retrieves the GPS coordinates of the 4 corners of the visual display of the user device. The GPS coordinates can be saved in short-term memory or in transient memory for further processing. Such GPS coordinates can be described as visual area coordinates. Further, a visual display, on a user device, can be described as a "drawn map". As reflected at 3902', the GPS coordinates can be converted into another coordinate system and/or other coordinate systems can be utilized in the processing of the invention. For example, a longitude and latitude coordinate system; x and y coordinate system, or other coordinate system can be utilized in the systems of the disclosure. In some embodiments, two opposing corners (e.g. southwest corner and north east corner coordinates) can be input and the visual display or area of display be determined based on such coordinates.

Figure 41:
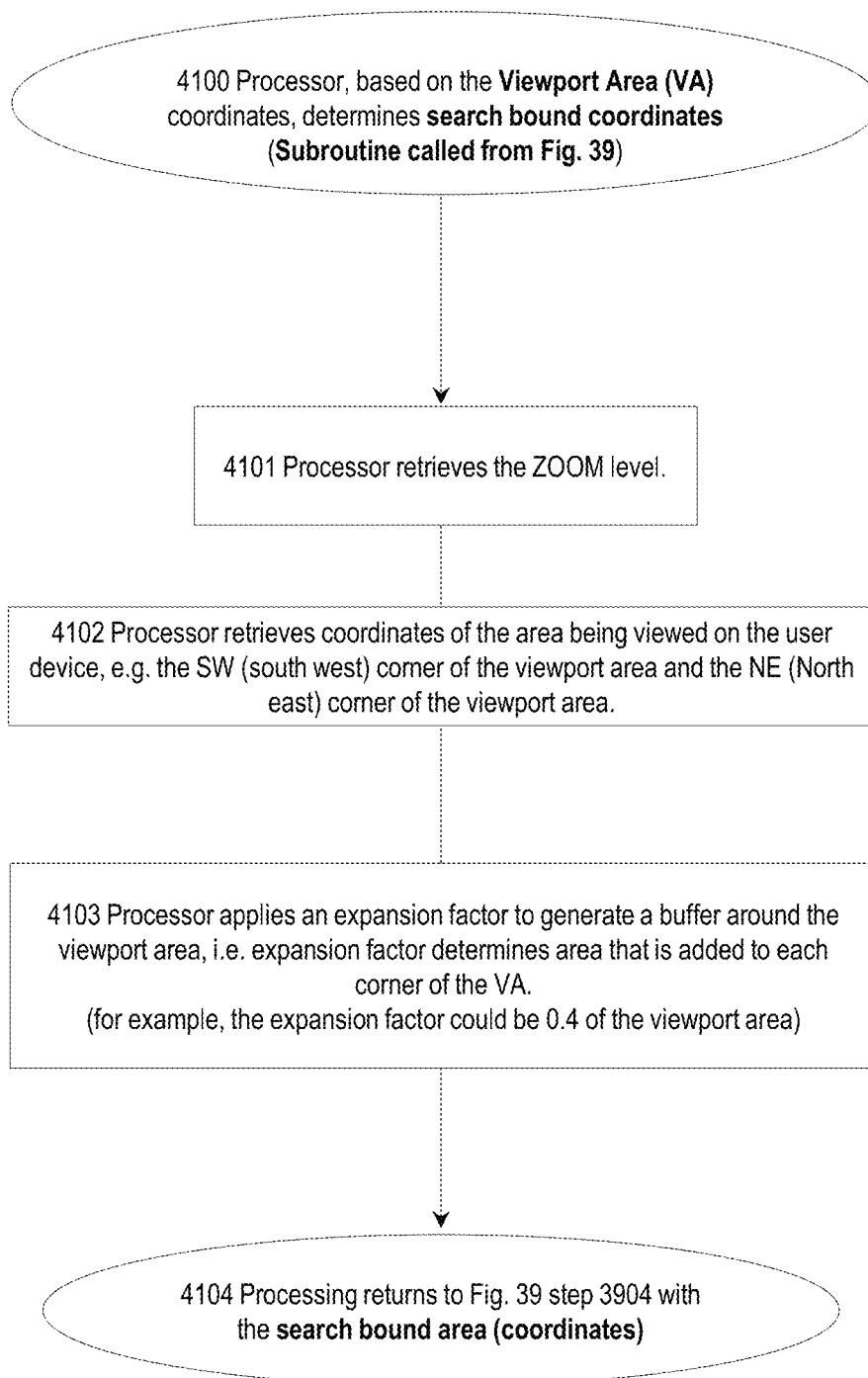
FIG. 41 is a flowchart showing "processor, based on the coordinates of the Viewport Area (VA), determines search bound coordinates" of subroutine 4100 as called from the processing of FIG. 39, in accordance with principles of the disclosed subject matter.

After step 3902, the process passes onto step 3903. In step 3903, the process determines the level that the visual display is currently displaying. Subroutine 4000 as shown in FIG. 40 can be invoked. Then, the process passes onto step 3904. In step 3904, the processor, based on visual area (VA) coordinates, determines a search bound area. Such search bound area can be represented in coordinates. Subroutine 4100 as shown in FIG. 41 can be invoked for such processing.

After step 3904, the process passes onto step 3905. In step 3905, the processor performs pin placement processing for the current visual area (VA) that is being displayed on the user device. Such processing can be performed for the particular zoom level that is being displayed on the user device. Depending on the particular zoom level being displayed on the user device, details of different levels can be displayed. For purposes of illustration, it is assumed in step 3905 that the particular zoom level being displayed on the user device is the "local" level, i.e. meaning that a plurality of local areas are displayed on the user device, in this example. If a plurality of sector levels are displayed on the user device, such might be described as—the particular zoom level being displayed is the "sector level". However, for this particular example, the local level is being displayed. As a result, subroutine 4200 of FIG. 42 can be called upon or invoked. Accordingly, subroutine 4200 is illustrative of pin processing at the local level. However, as reflected at 3905' similar respective processing can be performed if it is determined that another level is being displayed on the user device, i.e. as a result of the particular zoom setting on the user device.

FIG. 40 is a flowchart showing "processor determines the level that the visual area (VA) is currently displaying" of subroutine 4000, as called from the processing of FIG. 39, in accordance with principles of the disclosed subject matter. As shown, the subroutine is launched in step 4000 and passes onto step 4001. In step 4001, the processor determines the "zoom level", or more generally the level of resolution, that the viewport area is currently displaying. It is appreciated that the illustrated zoom levels are for purposes of illustration. The zoom level can be input from the user device as a zoom level or number. The zoom level can be input from the user device as a percentage value, for example. Depending on the particular zoom level identified, the processor can determine which level is to be displayed on the user device and can determine other attributes of the processing to be performed. For example, if the zoom level is between 6 and 7, the process passes onto step 4011. In step 4011, the processor tags the current level as being at the patch level.

If the zoom level is between 5 and 6, the process passes onto step 4012. In step 4012, the processor tags the current level as being at the local level. As noted above, processing at the local level is illustratively shown in subroutine 4200 described below with reference to FIG. 42. If the zoom level is between 4 and 5, the process passes onto step 4013. In step 4013, the processor tags the current level as being at the quadrant level.

If the zoom level is between 3 and 4, then the process passes onto step 4014. In step 4014, the processor tags the current level as being the sector level. If the zoom level is between 2 and 3, then the process passes onto step 4015. In step 4015, the processor tags the current level as the territory level. Further, if the zoom level is between 1 and 2, then the process passes onto step 4016. In step 4016, the processor tags the current level as the remote level. As shown in FIG. 40, after identifying the particular level (that processing is occurring at) in one of steps 4011, 4012, 4013, 4014, 4015, 4016—the process then passes onto step 4020. In step 4020, the process returns to FIG. 39. Specifically, the process passes onto step 3904 with the identified level in transient memory, for later processing.

FIG. 41 is a flowchart showing "processor, based on the coordinates of the Viewport Area (VA), determines search bound coordinates" of subroutine 4100 as called from the processing of FIG. 39, in accordance with principles of the disclosed subject matter. As shown, the subroutine is initiated in step 4100 and passes onto step 4101. In step 4101, the processor retrieves the zoom level from transient memory, as such zoom level was determined in the processing of FIG. 40. After step 4101, the process passes onto step 4102. In step 4102, the process retrieves coordinates of the area being viewed on the user device. For example, coordinates retrieved can be the southwest corner coordinates of the viewport area and the northeast corner coordinates of the viewport area. Such corner coordinates can convey the particular viewport area being displayed on the user device. Other coordinates and/or attributes of the displayed image can be used to determine the area being viewed on the user device.

Then, the process passes onto step 4103. In step 4103, the processor applies an expansion factor to the viewport area. The expansion factor is applied to generate a buffer or "search bounds (SB)" around the viewport area. In other words, the expansion factor might be described as determining an area that is added to each corner of the viewport area. The expansion factor might be described as determining an area that is added around the edge of the viewport area, so as to frame the viewport area. Such processing effectively adds a band, i.e. the search bounds, around the viewport area. As described below, "pins" and/or photos that are identified in the search bounds can affect display of data in the viewport area. For example, the expansion factor could be 0.4 or 40% of the viewport area.

After step 4103, the process passes onto step 4104. In step 4104, the processing passes onto step 3904 (FIG. 39) with the coordinates of the search bound area in transient memory.

Figure 42:
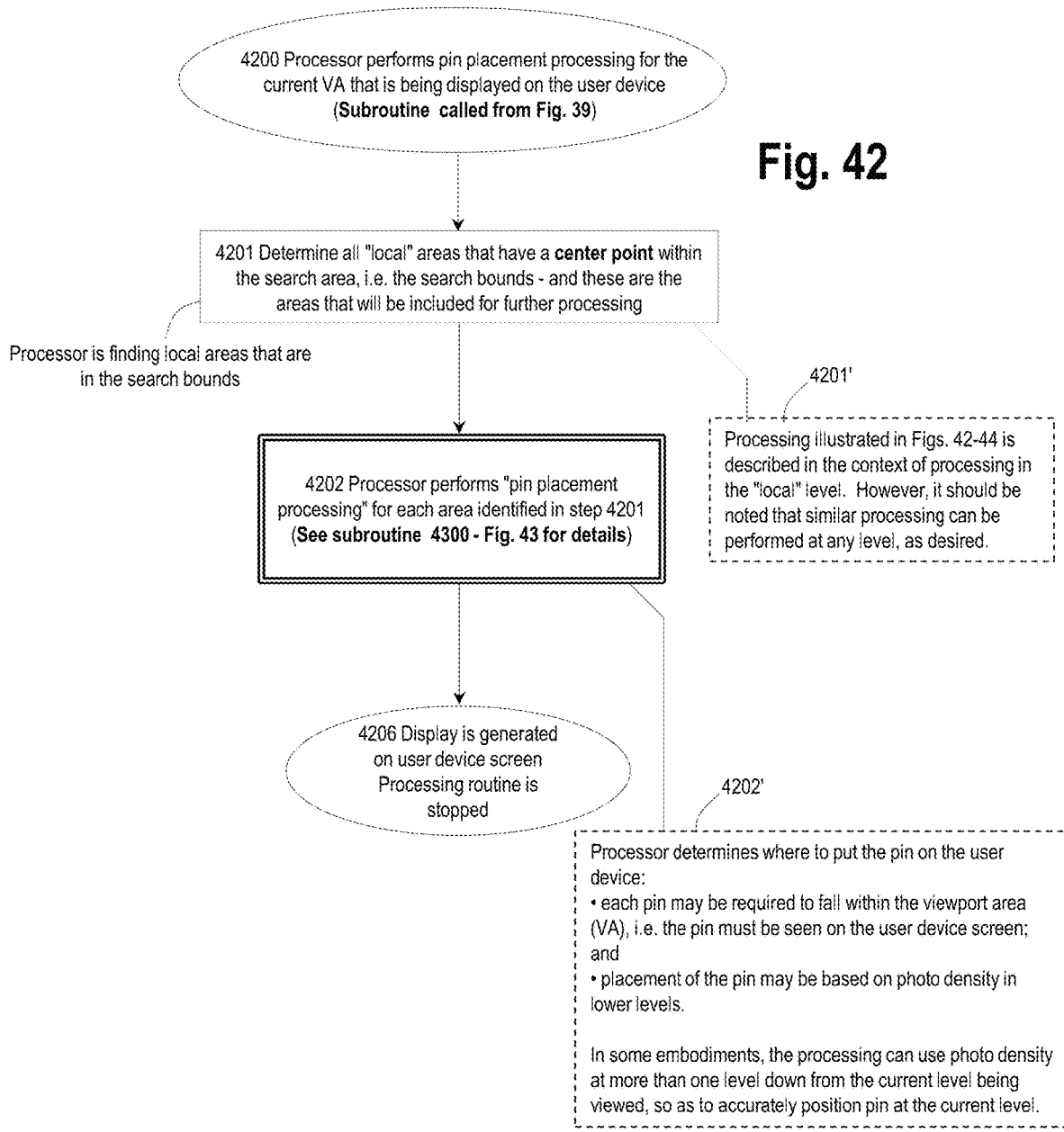
FIG. 42 is a flowchart showing "processor performs pin placement processing for the current viewport area that is being displayed on the user device" of subroutine 4200 as called from the processing of FIG. 39.
Figure 43:
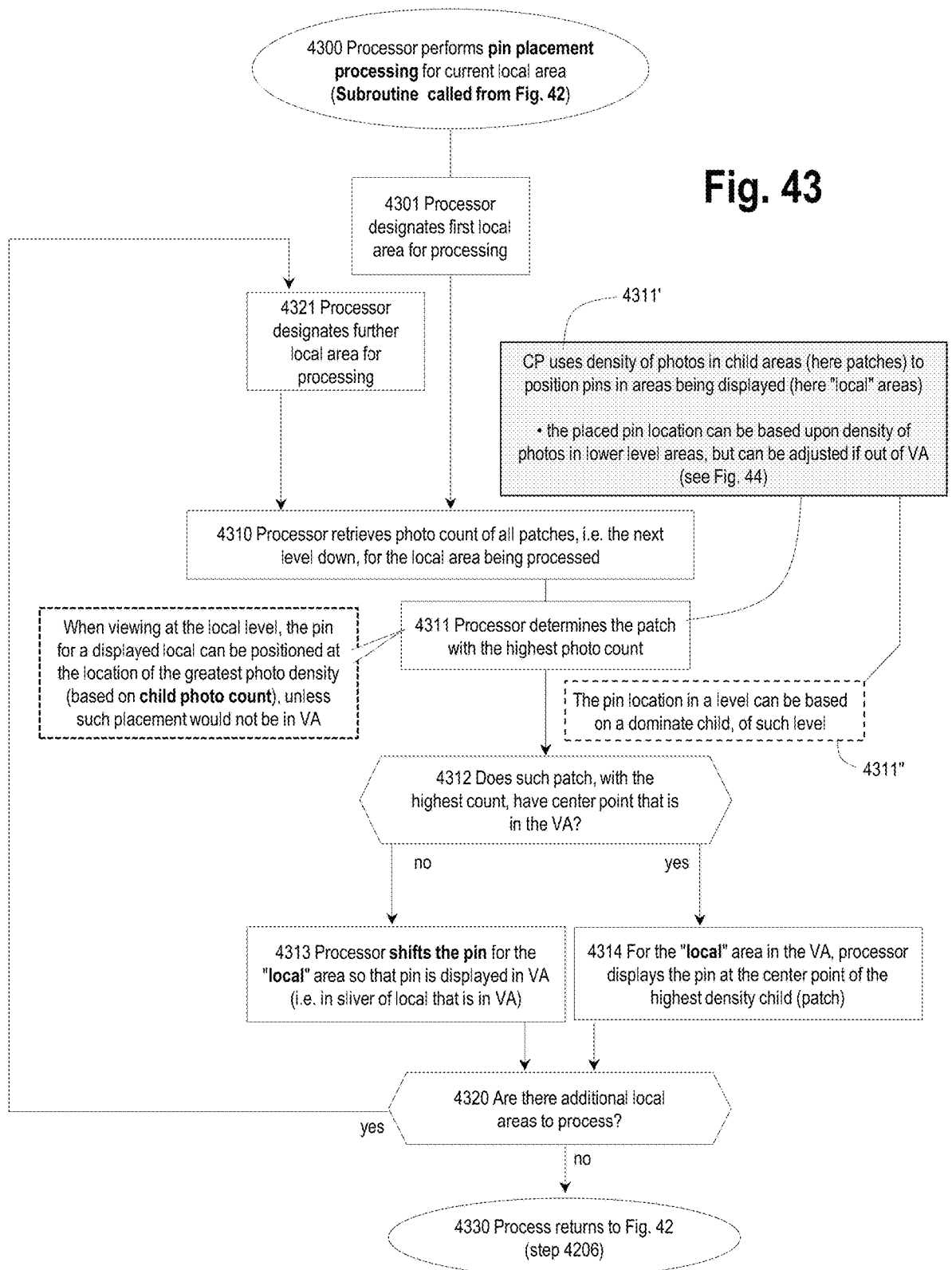
FIG. 43 is a flowchart showing "processor performs pin placement processing for area" of subroutine 4300, as called upon from the processing of FIG. 42, in accordance with principles of the disclosed subject matter.

FIG. 42 is a flowchart showing "processor performs pin placement processing for the current viewport area that is being displayed on the user device" of subroutine 4200 as called from the processing of FIG. 39. As described above, the processing of FIG. 42 is set forth in the context of "local" level processing. However, it is appreciated that similar processing can be applied to other levels as may be desired. As shown in FIG. 42, the subroutine 4200 is launched in step 4200 and passes onto step 4201. In step 4201, the processor determines all the local areas that have a center point within the search area, i.e., within the search bounds (SB) as determined in the processing of FIG. 41. These local areas, which are identified as having a center point within the search area, are saved into transient memory for further processing. Such local areas can be described as "identified areas" and can be identified by their respective UAI and boundaries. As reflected at 4201' in FIG. 42, processing illustrated in FIGS. 42-44 is described in the context of processing in the "local" level. However, it should be noted that similar processing can be performed at any level, as desired. The particular level at which processing is performed can depend on the particular zoom level at which the user is viewing a segmented map, for example.

After step 4201, the process passes onto step 4202. In step 4202, the processor performs "pin placement processing" for each area identified in step 4201. To perform such processing, subroutine 4300 can be called upon or invoked. Such subroutine 4300 is described below with reference to FIG. 43. In the processing of step 4202, (and as reflected at 4202') the processor can determine where to put or place a pin on the user device. In accordance with some embodiments, each pin can represent at least one photo. In some embodiments, in particular in areas more densely populated with photos, a pin might only be generated if a threshold number of photos are in a particular area. For example, a local area might only display a pin if 10 photos are in the particular local area.

In some embodiments, each pin, so as to be viewed, may be required to fall within the viewport area. In other words, the pin may be required to fall within the viewport area so as to be seen on the user device. Placement of the pin on the user device can be based on pin density and/or photo density in lower levels. Accordingly, placement of a pin at a given level can be based on density of photos at one level below such given level. Placement of a pin at a given level can be based on density of photos at multiple levels below such given level. Thus, for example, placement of a pin (in the situation that the local level is being displayed) may depend on density of photos at the patch level. In other words, in some embodiments, processing can use photo density at more than one level down from the current level being viewed, so as to accurately position a pin(s) at the current level. Each pin can include a displayed number so as to convey the number of photos that the particular pin represents. Further details are described below.

After step 4202, the process passes onto step 4206. In step 4206, the generated display is displayed on the user device, and the processing routine is stopped.

FIG. 43 is a flowchart showing "processor performs pin placement processing for area" of subroutine 4300, as called upon from the processing of FIG. 42, in accordance with principles of the disclosed subject matter. The process of FIG. 43 is directed to pin placement processing at the "local" level, for purposes of illustration. Relatedly, FIG. 44 is a schematic diagram also showing features of pin placement processing, in accordance with principles of the disclosed subject matter.

The subroutine 4300 is launched in step 4300 and passes onto step 4301. In step 4301, the processor designates the first local area for processing. For example, the local area 4411, shown in the illustrative display of FIG. 44, might be designated as the first area for processing. Then, the process passes onto step 4310.

In step 4310, the process retrieves a photo count of all patches, i.e. the next level down, from the "local" area that is being processed. Then, the process passes onto step 4311. In step 4311, the processor determines the patch with the highest photo count. To explain further with reference to tag 4311', in this processing, the processor uses density of photos in child areas (here patches) to position pins in areas being displayed (here local areas). Accordingly, a placed pin location can be based upon density of photos in a lower level area or even multiple lower level areas, e.g. two levels down from the current level. Note, as described below, pin placement can be adjusted if the pin would otherwise be placed out of the viewport area. In other words, as reflected at 4311, pin location in a level can be based on a dominant child, of a given level.

After step 4311, the process passes onto step 4312. In step 4312, a determination is made of whether the patch with the highest photo count does indeed have a center point that is in the viewport area. Accordingly, at this point in the processing, the patch (having highest density of photos) that will dictate pin placement has been determined. However, it is still to be determined whether such patch has a center point in the viewport area. If the center point is not in the viewport area, then adjustment is needed, else the pin will not be visible to the user. Accordingly, if a "yes" is rendered in the determination of step 4312, then the process passes onto step 4314.

In step 4314, for the local area in the viewport area, the processor displays the pin at the center point of the highest density child, here a patch. On the other hand, a "no" may be rendered in step 4312. If a "no" is rendered in step 4312, the process passes to step 4313. In step 4313, the processor shifts the pin for the local area so that the pin is indeed displayed in the viewport area, otherwise the user would not see the pin on the user device. In other words, such processing can be described as identifying that, without adjustment, the pin would be displayed in a sliver that is outside of the viewport area of the user device. Accordingly, adjustment is made such that position of the pin is moved inside or just inside the viewport area. This processing, of adjustment of pin placement, occurs with areas 4411 and 4414, shown in FIG. 44 After either of steps 4313, 4314, the process passes onto step 4320. In step 4320, the process determines whether there are additional local areas to process. For example, in the viewport area 4401 of FIG. 44, there are four local areas to process. If "yes" in step 4320, the process passes to step 4321. In step 4321, the processor designates the further local area for processing. Then, the process passes onto step 4310. Processing then proceeds as described above. On the other hand, if a "no" is rendered in step 4320, the process passes onto step 4330. In step 4330, the process returns to FIG. 42. Specifically, the process passes to step 4206 of FIG. 42.

As described above, FIG. 44 is a diagram showing features of pin placement processing, in accordance with principles of the disclosed subject matter. FIG. 44 provides a schematic diagram 4440 illustrating a computer perspective of data 4440.

As reflected at 4420 in FIG. 44, pin positions of a displayed area can be based on child density. In other words, pin positions of a displayed area can be based on density of photos in child areas, of the area being displayed. As shown in FIG. 44, the diagram shows a viewport area 4401. The viewport area 4401 includes a plurality of local areas, in which photos have been identified. The local areas include areas 4411, 4412, 4413, and 4414. FIG. 44 also shows a search bounds 4402. With reference to the viewport area 4401, the point A represents the location (in local area A) of the patch, of local area A, having the highest density of photos. The point B represents the location (in local area B) of the patch, of local area B, having the highest density of photos. The point C represents the location (in local area C) of the patch, of local area C, having the highest density of photos. The point D represents the location (in local area D) of the patch, of local area D, having the highest density of photos. Accordingly, the viewport area 4401 illustrates a computer perspective of data.

FIG. 44 also shows representation of a GUI 4450. As reflected at 4450', the dashed objects in the GUI 4450 would not be seen by the user in the GUI, but are shown in FIG. 44 for illustration from the perspective of processing. The GUI 4450 shows a pin 4412P. The location of the pin 4412P is based on, in this embodiment, the patch having highest density of photos in the local area B. However, such pin 4412P can reflect the count of all photos in the local area B. Thus, to reiterate, while the location of the pin 4412P can be based on the patch with the highest density of photos, the count of the pin 4412P indeed reflects all the photos in the particular local area. Similarly, the pin 4413P reflects location of the patch having highest density in the local area C and also reflects the total count of photos in local area C.

The GUI 4450 also shows pin 4411P and pin 4414P. However, the position of such pins in the GUI 4450 have been altered or adjusted vis-à-vis position of the points A and D, respectively, in the search bounds 4402, i.e. as shown in the upper diagram 4440 of FIG. 44. That is, the processing adjusts the location of the pins 4411P, 4414P since such pins would not otherwise be viewable in the viewport area 4401'. Accordingly, the processing of the disclosure can adjust the position of pins that are identified in a search bounds 4402. The position of such pins can be adjusted so as to be just inside the viewport area 4401'. That is, in the processing of the disclosure, a pin can be placed as close as possible to the highest density, in terms of photos, of a child area, yet still be in a viewport area 4401'. Even though a pin may be adjusted in position, such pin can still reflect the total number of photos in the patch, or other area, that the pin represents. As shown, all the pins have been adjusted to not be present in the search bounds 4402', which surrounds the viewport area 4401'. As otherwise noted herein, the processing of FIGS. 43 and 44 could be applied to areas of other levels, as desired.

Figure 45:
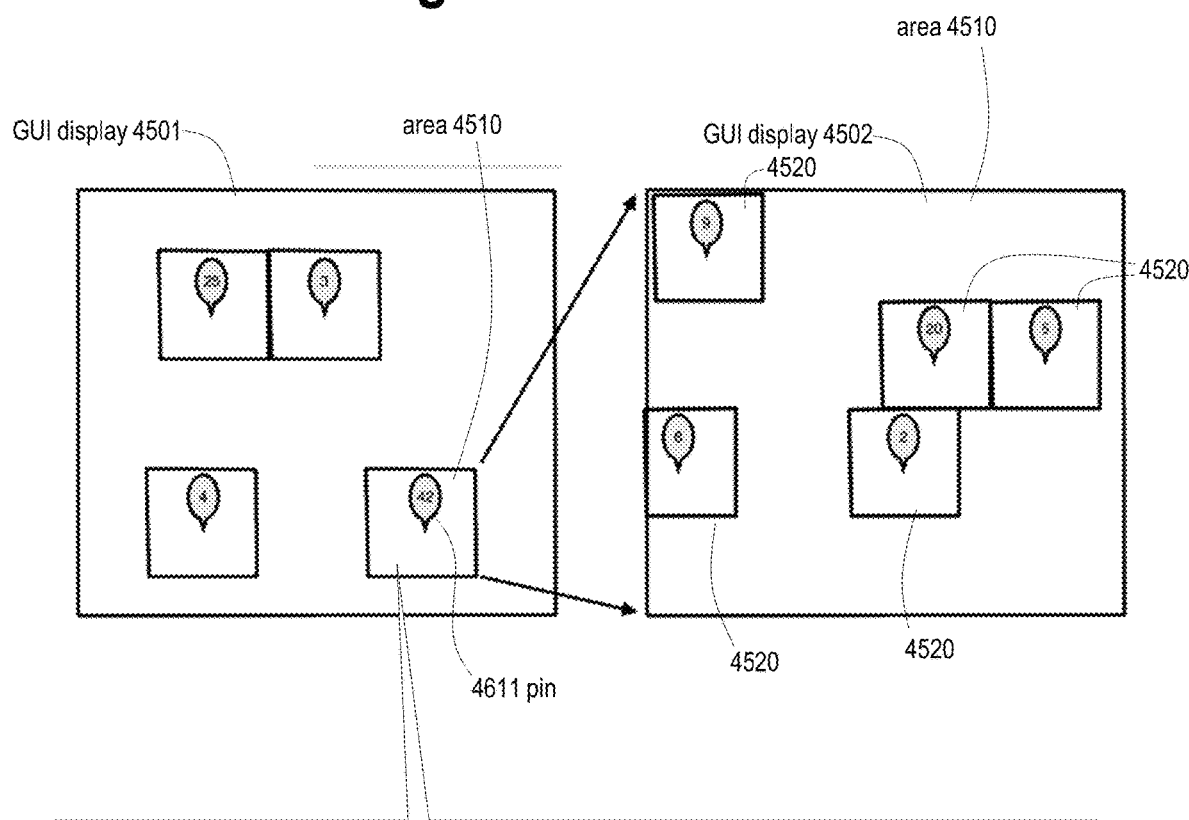
FIG. 45 is a schematic diagram showing further aspects of pin processing, in accordance with principles of the disclosed subject matter.

FIG. 45 is a schematic diagram showing further aspects of pin processing, in accordance with principles of the disclosed subject matter. The diagram shows a GUI display 4501 and GUI display 4502. As reflected at 4500', a pin 4611 is shown on the left, in GUI display 4501, with 42 photos. Other pins can also be displayed in the GUI display 4501. The particular pin 4611 represents the number of photos in area 4510. A user can zoom in on the pin 4611. When a user "zooms" in on the pin 4611, the GUI display 4502 is generated, i.e. the display on the right is generated. That is, the GUI display 4502 shows the area 4510 expanded or "zoomed in on". In the display 4502, the pin 4611 is seen to represent photos of a plurality of child areas 4520. The total sum of photos of the child areas are represented in the pin 4611. There are 42 photos represented by the pin 4611. This count of photos can be seen by the plurality of pins in the GUI display 4502. Accordingly, the diagram of FIG. 45 demonstrates that count shown, in a pin 4611, can reflect an aggregation or accumulation of pins in lower areas, e.g. pins 4520 included in lower areas of the area 4510. Relatedly, as a user "zooms" OUT of an area, the count of photos as represented by a pin, i.e. pin count, may increase since an area represented by such pin can increase, so as to accumulate or aggregate more photos to the particular pin. Inversely, as a user zooms IN, pin count (as represented by a particular pin) may go down. Relatedly, a pin might only be shown in a particular area if the photo density, in such area, satisfies a predetermined threshold.

FIG. 46 is a schematic diagram showing further aspects of pin processing, in accordance with principles of the disclosed subject matter. In particular, FIG. 46 illustrates pin placement in an area based upon density of photos in a lower level area. Accordingly, FIG. 46 is provided to supplement other related disclosure herein. On the right hand side of FIG. 46, in the GUI 4630, the pin placement for area 4600 (with 58 pins) is not the center point of the area 4600, as reflected at 4600'. Rather, in light of the left hand side of FIG. 46 and the accumulated photos totaling 58, the pin placement for the area 4600 (in GUI 4630) can be based on the lower level pin with the highest density, i.e. the pin 4601 that represents 25 photos. That is, pin placement point in the area 4600, in the GUI 4630, can be based on the highest density child pin position (pin 4601), versus being in the center of the area 4600. Accordingly, as reflected at 4600", position of a highest density child can alter pin position in a parent area. That is, pin position in the parent can be altered from being in the center of the area. Accordingly, pin placement at a particular "zoom" level, displayed on a user device, can be based on density of pins one level down from the particular level being displayed. In some embodiments, pin placement can be based on one, two, or more levels down from the level that is being displayed. An advantage of basing pin placement on pin density and/or photo density at a lower level (than is being displayed) is to position pins more in line with actual position of photos that are driving the particular pin. Alternatively, a pin displayed in a particular area such as a "local" area (to represent the count of photos in the area) could be displayed at some default position. For example, the pin could be displayed at the center of a particular area. However, such default position of a pin may be mis-leading as to where in such area the photos are indeed concentrated. Further, it is appreciated that pin placement in an area at the lowest level, for example a "patch" area, can be based on photos at that lowest level, i.e. since there is no lower level.

Relatedly, a pin might only be generated in a particular area if photo density in the particular area exceeds a predetermined threshold, for example, if photos in the area exceed 10 photos. However, in some embodiments, a pin might be generated based on only one photo in a particular area.

FIG. 47 is a schematic diagram showing yet further aspects of pin processing in conjunction with manipulation of thumbnails, in accordance with principles of the disclosed subject matter. FIG. 47 shows processing relating to a GUI 4700. The GUI 4700 is transformed from an "initial state" to an "image selected state" as shown in window 4710 and window 4720, respectively. The GUI 4700 can include pin 4711. Other pins can be displayed as shown in the GUI 4700. The GUI 4700 can also include a plurality of images 4701 provided in a bottom portion or window of the GUI 4700. The images 4701 can include or be in the form of thumbnail photos. The images 4701 can include image 4702. The user can select the image 4702 from the scrolling set of images in the window 4710. As a result, the display shown in window 4720 is generated. The image 4702 can be dynamically linked to the pin 4711. When the user clicks the image 4702, the pin 4711 can become enlarged, change color, or in some other manner be distinguished from the other pins. As shown, a pop-up information window can be provided in the window 4720. Such information window can relate to the pin 4711 and the corresponding selected image 4702.

Relatedly, various features provided by the systems and methods of the invention are illustrated in note box 4701N. Scrolling thumbnails or images 4701 at the bottom of the GUI 4700 can be dynamically linked to pins in the windows 4710, 4720. Once a user clicks a pin 4711 in the window 4710, at least one image can be shown that corresponds to such clicked pin. For example, the most popular images can be shown that correspond to the pin that was clicked. A user can toggle between pin to thumbnail. A user can toggle between thumbnail to pin. Color change, change in size, or other distinguishing characteristic can be used to distinguish a selected image 4701 or pin 4711. Accordingly, as reflected at 4700N of FIG. 47, a popup InfoWindow with data related to a pin and selected image can be generated upon clicking an image 4702—and the pin related to the selected image 4702 can become enlarged and highlighted. Accordingly, thumbnails at the bottom of a generated GUI can be associated with pins represented on the screen of the GUI. Thumbnails can be arranged by algorithm at the bottom of the screen. For example, thumbnails can be ranked based on a number of associated photos that are associated with the particular thumbnail. A user can be provided the ability to scroll through thumbnails ranked in order of pins in the window 4710. Touch of a thumbnail can highlight the pin so as to differentiate the particular pin. Touch of a thumbnail can toggle to a related pin location in the window 4710. Additionally, a user can touch pin display ranked thumbnails related to the pin. Thumbnails can be presented in a variety of orders, starting with the most popular thumbnail. The ability to toggle from thumbnail to spot, for example, can be provided. That is, a spot can be a patch area that has attained a predetermined threshold of photos contained in such patch. The ability to toggle from spot to detailed information, about the spot, can be provided. It is appreciated that the functionality described with reference to FIG. 47 can similarly be applied to a level as desired. That is, the system of the disclosure can provide similar functionality for any of the levels described herein, as desired.

Hereinafter, further features of the disclosure will be described that relate to censorship processing. FIG. 48 is a flowchart showing details of a processor of the disclosure performing censorship processing, in accordance with principles of the disclosed subject matter. The censorship processing can relate to a nominating process to "flag" a photo for various reasons. The processing is not limited to photos. That is, the censorship processing can be applied to comments or other media or content, including a video, sound media, and/or text content, for example. As shown, the process starts in step 4800 and passes onto step 4801.

Figure 52:
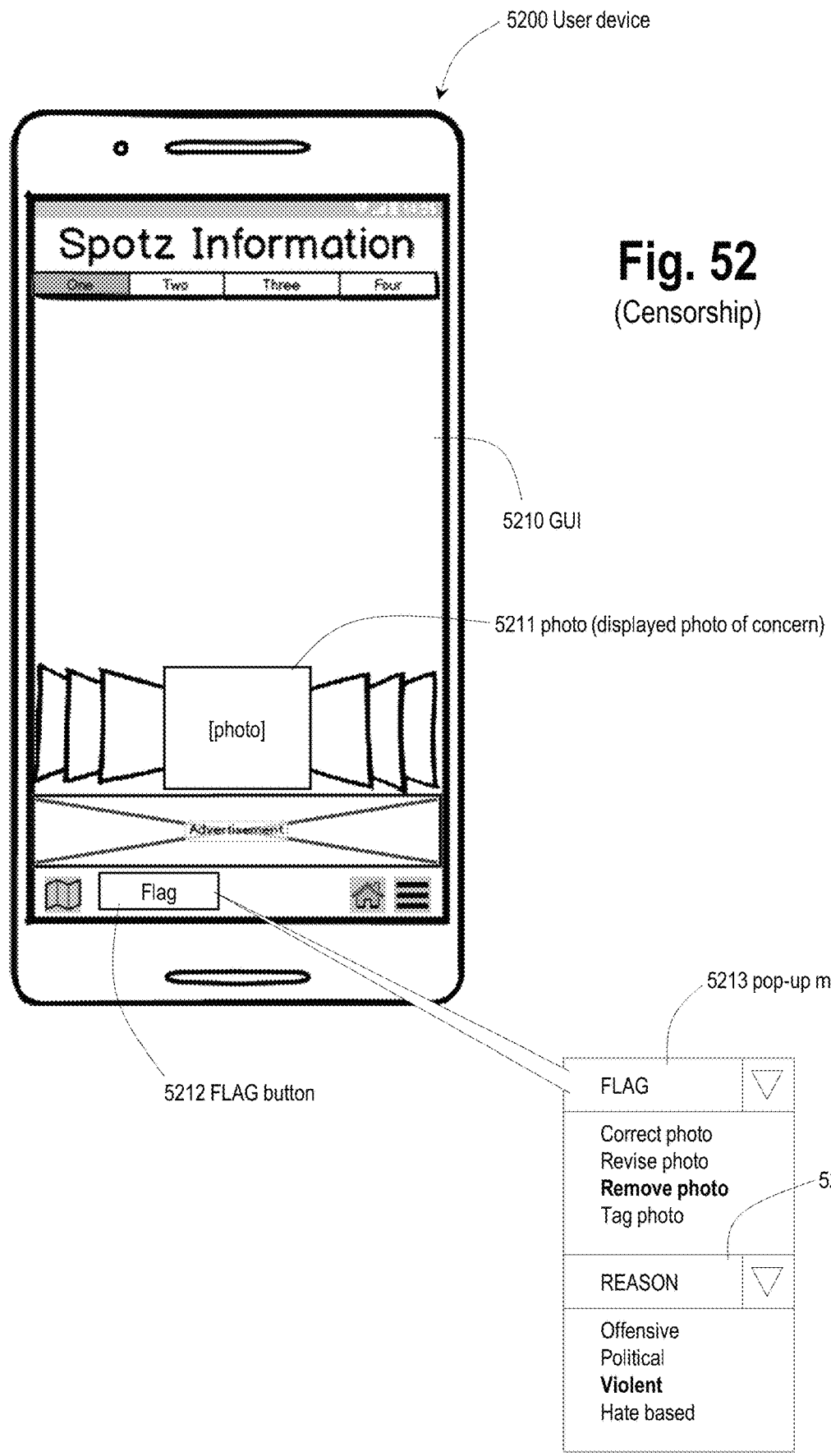
FIG. 52 is a schematic diagram of a user device with GUI, in accordance with principles of the disclosed subject matter.

In step 4801, the processor presents a photo to the user. For example, such presentation of a photo may be performed via a display on a user device, such as a cell phone shown in FIG. 52. FIG. 52 is a schematic diagram of a user device with GUI, in accordance with principles of the disclosed subject matter. After step 4801, in step 4802, the processor interfaces with the user to input selection of a flag selector. The flag selector may be in the form of a button 5212 of a GUI 5210 on a user device 5200. A photo 5211 can be displayed on the GUI 5210. The user can identify some deficiency or concern with the photo 5211. Accordingly, the user can tap the flag button 5212, so as to flag, in some manner, the photo 5211. It is appreciated that the particular photo, about which the user wishes to flag, could be identified in some other manner that is different from the visual selection shown in FIG. 52.

With further reference to FIG. 48, after step 4802, the process passes onto step 4803. In step 4803, in response to selection of the flag selector button, the processor presents flag options to the user. Such flag options reflect different possible treatment of the particular photo that was selected. Such flag options can be presented utilizing a flag selector or menu 5213 as shown in FIG. 48 and FIG. 52, and noted at 4800' in FIG. 48. As shown in the menu 5213, options can be provided including correct photo, revise photo, remove photo, and tag photo, for example. It should be appreciated that various other options might also be provided regarding possible treatment of the photo. The flag options may include additional information as to the rationale for such treatment. For example, the user may flag to "remove photo" and provide the reason. For example, the reason may include violent content, pornography or bullying, as shown in a related menu 5214. The flag selector or menu, with further delineation in a series of subsequent flag selector rationale or menu(s) can be provided in the form of respective pop-up menus 5213 and 5214, as shown in FIG. 52. Alternatively, such tagging can be input from the user in some other manner. As reflected in FIG. 48, some flag options, such as correction or removal for example, can be associated with text. For example, if a user, i.e. a nominator, is flagging a particular photo for correction—such user might also provide comment/text regarding basis for correction. Accordingly, a "flag" can be selected from the "flag" pop-up menu 5213—and once a particular flag is selected, a corresponding "reason" pop-up menu 5214 can be generated. The user can then select a reason from the "reason" pop-up menu 5214. The user might also be able to "type in" their own flag and/or reason. The functionality can provide further depth of understanding as to why a user objects to a particular photo or other media. After step 4803, the process passes onto step 4804. In step 4804, the processor inputs the selection, of the flag option, from the user. The flag option can be associated with a desired action. For example, the flag option "remove photo" can be associated with the action of removing the photo from one or more collection of photos in the system. For example, the photo might be removed from public access. The user who flags the photo can be described as a "nominator" for the photo. As described below, the nominator can be associated with particular attributes. Attributes of a nominator can vary depending on the particular flag type. For example, a nominator may be "stronger" with respect to one flag type as opposed to another flag type. After step 4804, the process passes onto step 4805. In step 4805, the processor performs ratification processing. Such ratification processing can be performed by subroutine 4900 of FIG. 49.

Figure 49:
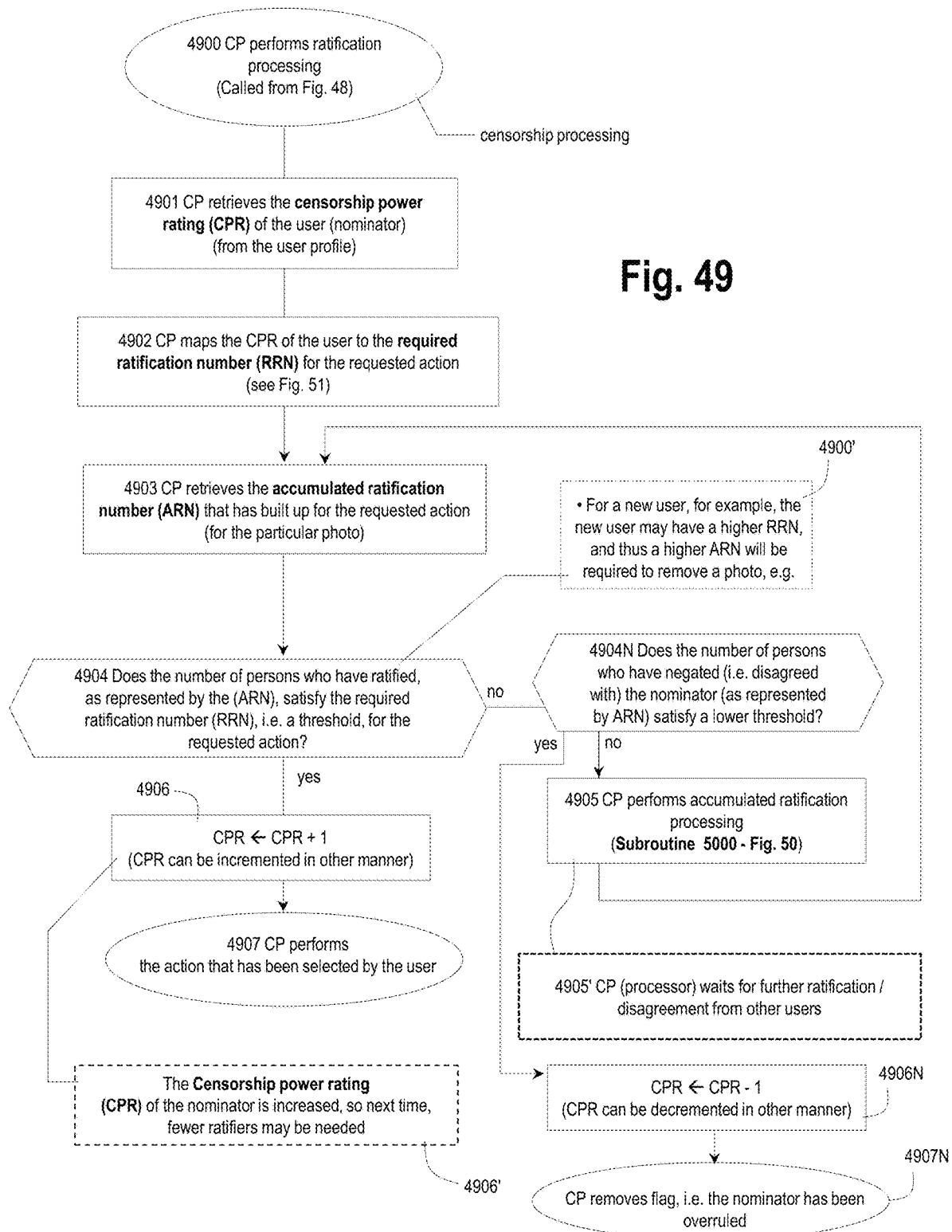
FIG. 49 is a flowchart showing "processor performs ratification processing" of subroutine 4900, in accordance with principles of the disclosed subject matter.

Accordingly, FIG. 49 is a flowchart showing "processor performs ratification processing" of subroutine 4900, in accordance with principles of the disclosed subject matter. Such subroutine can be called from the processing of FIG. 48. The subroutine is launched in step 4900 and passes onto step 4901.

In step 4901, the processor retrieves a censorship power rating (CPR) of the user, who is a nominator, from the user profile. The censorship power rating can be based on the particular flag that was selected. That is, power ratings can vary, for a particular user, based on what flag is selected. A particular flag can include sub flags or other underlying delineation. Also, channels can be provided and a particular flag (or sub-flag) can be allocated to a particular channel. The flag, sub flag, underlying delineation and/or established "channels" can be based upon "location types" as shown in FIG. 12 step 613, for example. A user might be very weak with regard to one type of flag (or sub-flag), and very strong with regard to another type of flag (or sub-flag). Such variation(s) in strength of a user may also be provided whereby a user is weak in one flag type in a given "channel" and very strong in the same flag type in another "channel". Also, different user bases can be provided. Each user base can be associated with, i.e. include, a particular group of users. A user base for a given "channel" may have differing norms or settings for censorship, as compared to a user base for another channel. Accordingly, the censorship power rating (CPR) of the user (and other parameters that are used in censorship processing and related processing), can be dictated by a variety of attributes including flag associated with a photo, sub-flag associated with a photo, underlying delineation associated with the photo, channel in which a flag is disposed, channel in which the photo is disposed, user base to which the user is associated, and other attributes.

With further reference to FIG. 49, after step 4901, the process passes onto step 4902. In step 4902, the processor maps the CPR of the user to the required ratification number (RRN) for the requested action. Such mapping can be performed utilizing the processing of FIG. 51. Then, the process passes onto step 4903. In step 4903, the processor retrieves the accumulated ratification number (ARN) that has built up for the requested action, for the particular photo. If ratification processing has just begun for the particular photo, the accumulated ratification number may be 0. Then, the process passes onto step 4904. In step 4904, the processor determines whether the number of persons who have ratified, as represented in the accumulated ratification number, satisfy the required ratification number. That is, has the threshold for the predetermined action been attained or not attained. If a "yes" is rendered in step 4904, the process passes onto step 4906.

In step 4906, the censorship power rating (CPR) of the user is incremented (for a positive ratification) in some manner. In this example, the CPR is incremented by the value of 1. However, it is appreciated that other methodologies can be utilized so as to increase the CPR of the user. Accordingly, as reflected at 4906' of FIG. 49, the CPR of the nominator, i.e. the user who nominated the flag, can be increased for a positive ratification. As a result, the next time that the nominator nominates a photo, for a particular flag, fewer ratifiers may be needed. This is because the nominator's strength, as to the particular flag, has increased as reflected in his or her CPR. Relatedly, as reflected at 4900' in FIG. 49, for a new user, for example, the new user may have a higher required ratification number (RRN), as compared with an older user with a strong CPR, and thus a higher accumulated ratification number (ARN) may be required in order to perform the particular action requested by a selected flag. After step 4904, the process passes onto step 4907. In step 4907, the processor performs the action that has been selected by the user. That is, the processor performs the action that is associated with the flag selected by the nominator user.

On the other hand, a "no" may be rendered in the processing of step 4904. Such a no indicates that a sufficient number of ratifiers has not been attained so as to perform the action requested by the nominator. Accordingly, the process passes onto step 4904N in FIG. 49. In step 4904N, the processor determines: does the number of persons who have negated (i.e. disagreed with) the nominator (as represented by ARN) satisfy a lower threshold? If "yes", then the process passes onto step 4906N.

In step 4906N, the censorship power rating (CPR) of the user is decremented (for a negative ratification) in some manner. In this example, the CPR is decremented by the value of 1. However, it is appreciated that other methodologies can be utilized so as to decrease the CPR of the user. Accordingly, the CPR of the nominator, i.e. the user who nominated the flag, can be decreased for a negative ratification. As a result, the next time that the nominator nominates a photo, for a particular flag, MORE ratifiers may be needed. This is because the nominator's strength, as to the particular flag, has decreased as reflected in his or her CPR.

Then, in step 4907N, the processor removes the flag. That is, the nominator has been overruled.

As noted herein, other methodologies can be utilized so as to increase or decrease the CPR of the user, such as in steps 4906, 4906N, 5004 (FIG. 50) and/or 5005 (FIG. 50). Such other methodologies can include other additive processing, multiplicative processing, use of thresholds, and/or use of absolute values. For example, step 4904 can include determining if the accumulated ratification reaches an absolute value of "X" and/or a multiplicative value of "Y". For example, step 4904N can include determining if the accumulated ratification reaches an absolute value of "X" and/or a multiplicative value of "Y".

On the other hand, if no in step 4904N of FIG. 49, the process passes onto step 4905 of FIG. 49. In step 4905, the CP or processor performs accumulated ratification processing. Subroutine 5000 of FIG. 50 can be called upon to perform such processing. In such ratification processing, as reflected at 4905', the processor waits for further ratification from other users and/or waits for further disagreement from other users. Once ratification processing has been performed in step 4905, the process loops back to step 4903. Processing then continues as described above.

Accordingly, FIG. 50 is a flowchart showing "processor performs accumulated ratification processing" of subroutine 5000 as invoked from FIG. 49, in accordance with principles of the disclosed subject matter. The subroutine is launched in step 5000 and passes to step 5001. In step 5001, the processor waits for other users to interface with the system with regard to the particular photo and particular flag. As reflected at 5000', a nominator can be constituted by a first user device, and ratifiers can be constituted by additional respective user devices.

Once a user interfaces with the system, a "yes" is rendered in the determination of step 5001. Thus, the process passes onto step 5002. In step 5002 using a suitable GUI window, the processor interfaces with the user (a ratifier) to present action, on the photo, that has been requested by the nominator. Relatedly, as reflected at tag 5002', a check can be performed by the processor to confirm that the other user, i.e. a potential ratifier, has not already ratified this photo for this particular flag. After step 5002, the process passes onto step 5003. In step 5003, the processor determines whether or not the ratifier did indeed agree with the nominator.

If the determination of step 5003 renders a "yes," then such "yes" constitutes a ratification by a ratifier, as reflected at 5005' in FIG. 50. The process then passes to step 5005. Step 5005 reflects processing functionality that action by the ratifier may be magnified. That is, some ratifiers may carry more weight than other ratifiers. In the example of step 5005, if the ratifier is a superuser, then the ARN gets 2 points. If the ratifier is not a superuser, then the ARN gets only one point. It is appreciated that other methodologies can be utilized so as to magnify the decision of a favored ratifier. For example, other summation techniques could be utilized and/or other multiplication techniques could be utilized so as to magnify the decision of a favored ratifier, in a magnitude and manner as desired. In the processing of step 5005, such processing may or may not be based on flag type. That is, the CPR of the user might only be increased for that particular type of flag. After step 5005, the process passes onto step 5006.

On the other hand, a "no" may be rendered in the determination of step 5003. As reflected at 5004' of FIG. 50, a "no" constitutes a negation by a ratifier. That is, such negation will count against the action requested by the nominator. Note, even though the decision or "vote" is against the nominator, the particular user or user device is still considered a ratifier for purposes of description herein. Accordingly, a "ratifier" can either agree with a nominator with respect to a flagged photo or disagree with the nominator with respect to a flagged to photo.

The processing then passes onto step 5004. Similar to step 5005, but in reverse, step 5004 is provided to magnify the negation of some users. That is, if the ratifier is a superuser, then the ARN is decremented minus 2 points. Otherwise, the ARN is decremented minus 1 point. Other mathematical processing can be used so as to decrement the ARN. In the processing of step 5004, such processing may or may not be based on flag type. That is, the CPR of the user might only be decreased for that particular type of flag. Thus, the process can include censoring the censurer, i.e. censoring the nominator user. In some embodiments, a user's privilege to flag a photo can be disabled. For example, if a threshold number of flags, which were flagged by a particular nominating user, are not ratified—then the user's ability to flag a photo might be disabled. Such disablement might apply to that particular flag. Further. a user might be disabled in general, i.e. the user is not allowed (by the system) to flag a photo with any flags.

After step 5004 of FIG. 50, the processing passes onto step 5006. In step 5006, the processor saves the updated ARN that has built up for the requested action, for the particular photo. Then, the process passes onto step 5007. In step 5007, the process returns to FIG. 49—and in particular to step 4903 of FIG. 49. Processing then continues as described above.

FIG. 51 is a diagram showing aspects of censorship power rating (CPR) and required ratification number (RRN), in accordance with principles of the disclosed subject matter. FIG. 51 shows table 5100. The table 5100 includes a plurality of data records 5101. The data records 5101 include various data that can be used in censorship processing.

As reflected at 5121, the CPR of a nominator can be mapped to a particular RRN. The RRN can correlate to how strong the nominator is. A low RRN can mean that fewer or no other users have to ratifier a particular action for a particular flag, with regard to a particular photo. As reflected at 5122, an RRN can be different for different requested actions, i.e., for different flags the RRN can be different. For example, a RRN requirement to submit a comment on a photo can be less demanding than an RRN to remove a photo entirely. Additionally, as described above and reflected at 5123, the number of users who are needed to ratify a particular action, for a particular flag, can depend on the attributes of the user(s) who is doing the ratifying.

With further reference to FIG. 51, each of the data records 5101 include a censorship power rating (CPR), a required ratification number (RRN), and a description of associated processing. For example, if the CPR of the nominator is between 0 and 40, then the required ratification number is 20 in this example. This means that action is performed on the photo with 20 other users ratifying. Such required number of ratifiers can be decreased if 1 of the ratifiers is a superuser or super ratifier, such that his or her ratification is magnified.

For example, if the CPR of the nominator is between 40 and 60, then the required ratification number is 10 in this example. That is, a CPR of 40 to 60 is mapped to a required ratification number of 10. This means that action is performed on the photo with 10 other users ratifying. As shown in the table 5100, it may be the case that the CPR of the nominator is between 80 and 100. Such reflects a very strong nominator. In this situation, the required ratification number might indeed be 0. Accordingly, no ratification might be required to complete the action that is requested by the particular nominator. Accordingly, the number of ratifying users needed to ratify a particular action (e.g. removal of a photo) can depend on (a) strength or censorship power rating (CPR) of the nominator user, and (b) strength of the ratifying users who can agree or disagree with the nominator. Relatedly such strength of the nominating user and strengths of the ratifying users can be different for different flags, i.e. different for different requested actions. Thus, a weak nominating user may require more ratifying users, as compared with a strong nominating user.

Figure 53:
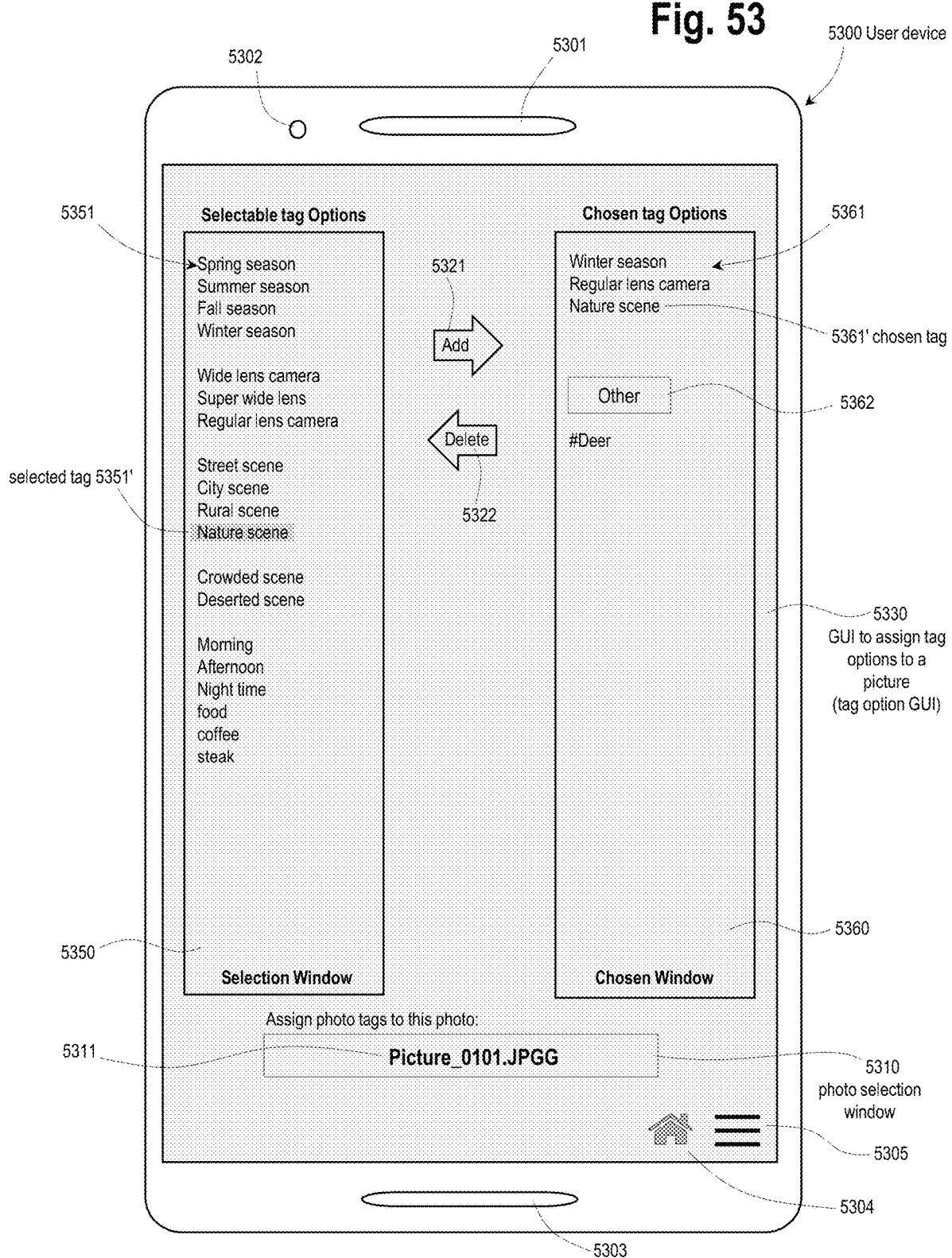
FIG. 53 is a schematic diagram showing a user device 5300 with the GUI 5330, in accordance with principles of the disclosed subject matter.

Various features of censorship processing are described above. Censorship processing of the disclosure can include a nomination by one user and then ratification by additional users. The additional users can either follow or not follow the nominator. Successful or unsuccessful censorship can be logged into user profiles to determine a censorship power rating over time, where the censorship power rating gets stronger with ratification and weaker with negation, as described herein. The power rating can be integrated and considered in the nomination and ratification processing associated with censorship of a photo. Censorship can include removing a particularly offensive photo, for example. Censorship can include any of a variety of other action items. Censorship can include corrections to a photo, revisions to a photo, removal or deletion of a photo, or other action items as desired. Censorship processing can address offensive content and/or undesirable content and provide a mechanism by which users of the system can control such content. Undesirable content can include sexually suggestive photos, cruelty, violence, promotion or solicitation, hate or discriminating comments, political debate, and/or other offensive content and may be reflected in pop-up menus as represented by menu 5214 shown in FIG. 52. FIG. 53 is a schematic diagram showing a user device 5300 with the GUI 5330, in accordance with principles of the disclosed subject matter. The GUI 5330 includes a selection window 5350 that displays selectable tag options. The GUI includes a chosen window 5360 that displays chosen tag options 5361. The GUI includes a photo selection window 5310. Using the photo selection window 5310, a user can select a particular photo for processing. In this example, a photo 5311 that has been selected is Picture_0101.JPGG. Selection of such photo 5311 can include searching for the photo, retrieving the photo from a folder, clicking on the photo in a particular GUI, using a drop-down menu, and/or other mechanism to identify the particular photo for processing. The selection window 5350 includes various tag options 5351, i.e. selectable tag options. For example, the window 5350 includes a selected tag 5351', "Nature scene". The user can identify that the photo 5311 relates to a nature scene. Accordingly, the user might select the tag 5351'. The user can then tap an add button 5621 in the GUI 5330. Such action results in the "Nature scene" identifier 5361' being added into the chosen window 5360. As shown, the tag options winter season and regular lens camera have already been added into the chosen window 5360. A user may also remove items from the chosen window 5360. A user can select an item in the chosen window 5360, and tap the delete button 5322. As result, the CP will remove the selected item from the chosen window 5360. As shown, an "Other" button 5362 can be provided on the GUI 5330. The user can tap the "Other" button 5362 which allows for the addition of user freeform tag entries. Freeform tag entries can be entered as hashtags and in the example the user has entered #Deer. Such hashtag is shown in the chosen window 5360. Users can enter multiple freeform tags so as to tag a selected picture. The windows 5350 5360 and GUI 5330 of FIG. 53 can also be provided with other visual mechanisms and/or selection mechanisms, such as drop down menus.

As shown in FIG. 53, the GUI 5330 can include a home icon 5304 by which a user can access a landing page of the system. A menu icon 5305 can be provided. A user can tap the menu icon 5305 so as to access any of a variety of menu options or features as described herein. The user device 5300 can also include functional items including a speaker 5301, a camera 5302, and a microphone 5303. A camera can also be provided on the opposing side of the user device 5300. The user device 5300 can include known features that can be used in conjunction with the novel features of the disclosure.

Figure 54:
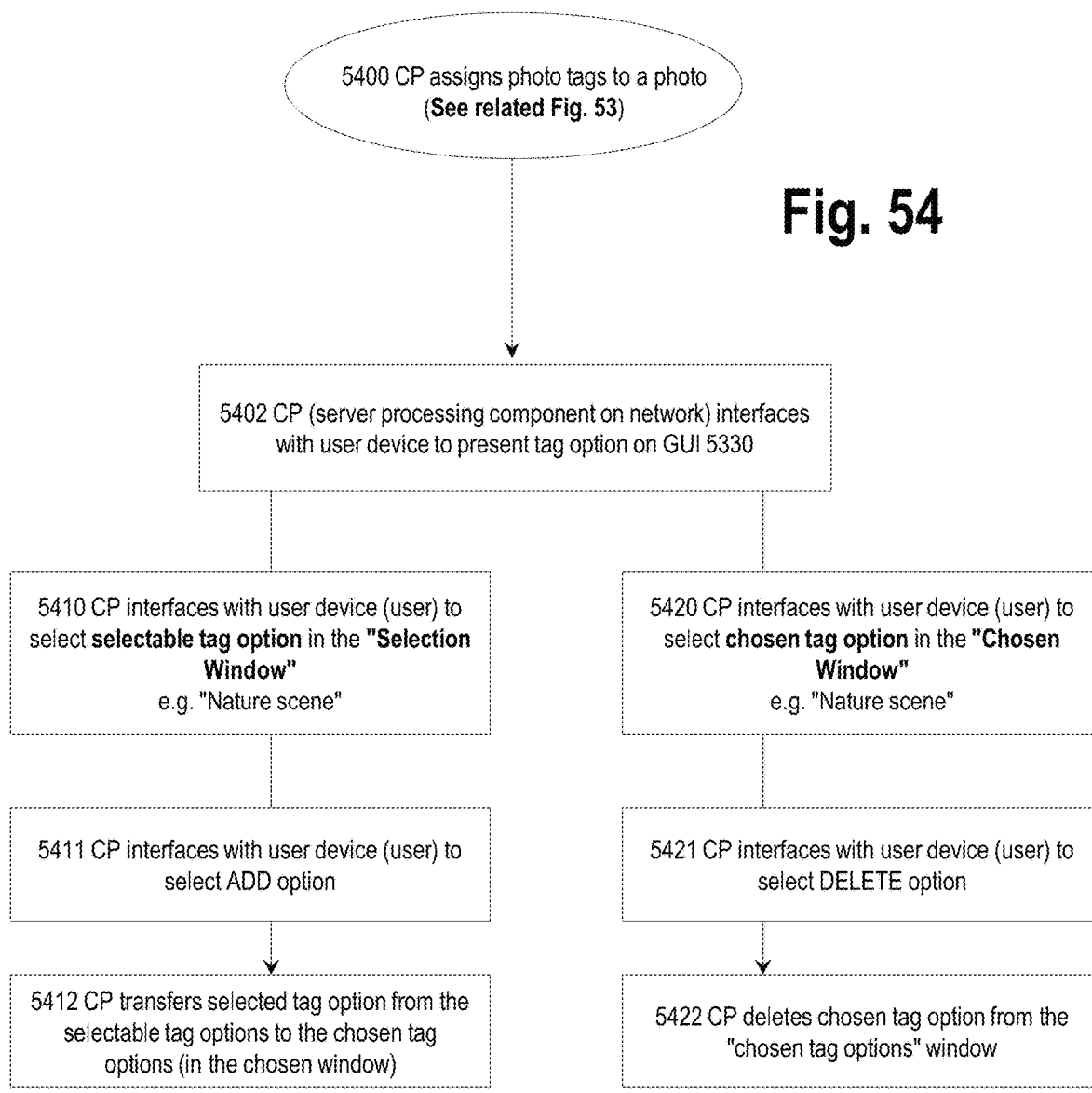
FIG. 54 is a flowchart showing processing that can be used in conjunction with the GUI 5330 of FIG. 53, in accordance with principles of the disclosed subject matter.

FIG. 54 is a flowchart showing processing that can be used in conjunction with the GUI 5330 of FIG. 53. The process of FIG. 54 is launched in step 5400. Such process can be launched, invoked, or called upon as a result of the user accessing the GUI 5330, for example. The GUI 5330 can be accessed via a suitable GUI option or menu option, for example. Once the process is launched, the process passes onto step 5402. In step 5402, the CP interfaces with the user device to present a tag option on the GUI 5330. The tag option might be "nature scene" or a freeform tag option, which can be created by tapping the "Other" button 5362. The freeform tag option can be a "hashtag" such as "#Deer" as described above. The CP can be a server processing component disposed on a network and in communication with user device. In step 5410, the processor interfaces with the user device, i.e. interfaces with a user, to select a selectable tag option in the selection window 5350. Then in step 5411, the CP interfaces with the user device to select the add option 5321. Then in step 5412, the CP transfers the selected tag option from the selection window 5350 to the chosen window 5360. Alternatively, in step 5420, the CP can interface with the user to select a chosen tag option in the chosen window 5360. In step 5421, the CP interfaces with user device to select the delete option 5322. Once selected, in step 5422, the CP deletes the chosen tag option from the chosen window 5360. Accordingly, the processing of FIG. 54 can be used to enable the GUI 5330 of FIG. 53.

Additional features of the disclosure are described below relating to "filtered following" processing. The disclosure provides a methodology that allows users to accumulate data that can be used to validate or verify data presented by the system of the disclosure. At a high level, users can select a "Location Type" as identified in FIG. 12 (in step 613) to filter and tag photos. Photos can be collected into established formal "channels" or "channels" of grouped photos.

To explain further, as reflected at 612" in FIG. 12, processing can be performed that includes (a) the creation of "channels" and (b) the association of photo(s) to a respective channel. The created channels can be created and stored, as a digital framework, in the database portion 120. Accordingly, the system of the disclosure can include viewable channels of photos. For example, a food channel can be provided that includes photos tagged with "To Eat" or other food related tags. Other channels might include a "Nature Channel" (containing nature related photos) or a "sports channel" (containing sports related photos). As described herein, censorship power ratings may be used in the processing of the disclosure. Censorship power ratings, as well as other parameters used in the processing of the disclosure, can be tracked based upon such channels of photos, i.e. so as to potentially be different (for a given photo) for different channels. Accordingly, parameters can be different for different channels. Censorship power ratings and other parameters can be different for different user groups that follow or view certain "channels". For example, censorship expectations based upon mature content, etc., can vary between different user groups.

In a more complex example, filtered following processing can be used to test or validate the truth of ratings preferences with regard to a particular photo or other media content, such as a posting. Filtered following processing allows a user to readily change their perspective or viewpoint. The perspective can be seen through different users or through different groups of users. Filtered following processing can allow for a user to view the perspective of an established trusted critic(s), an affinity group, followed users, friends, groups of friends, trusted specialty groups, or other persons or groups, for example. Processing to achieve such objectives is described below.

Figure 55:
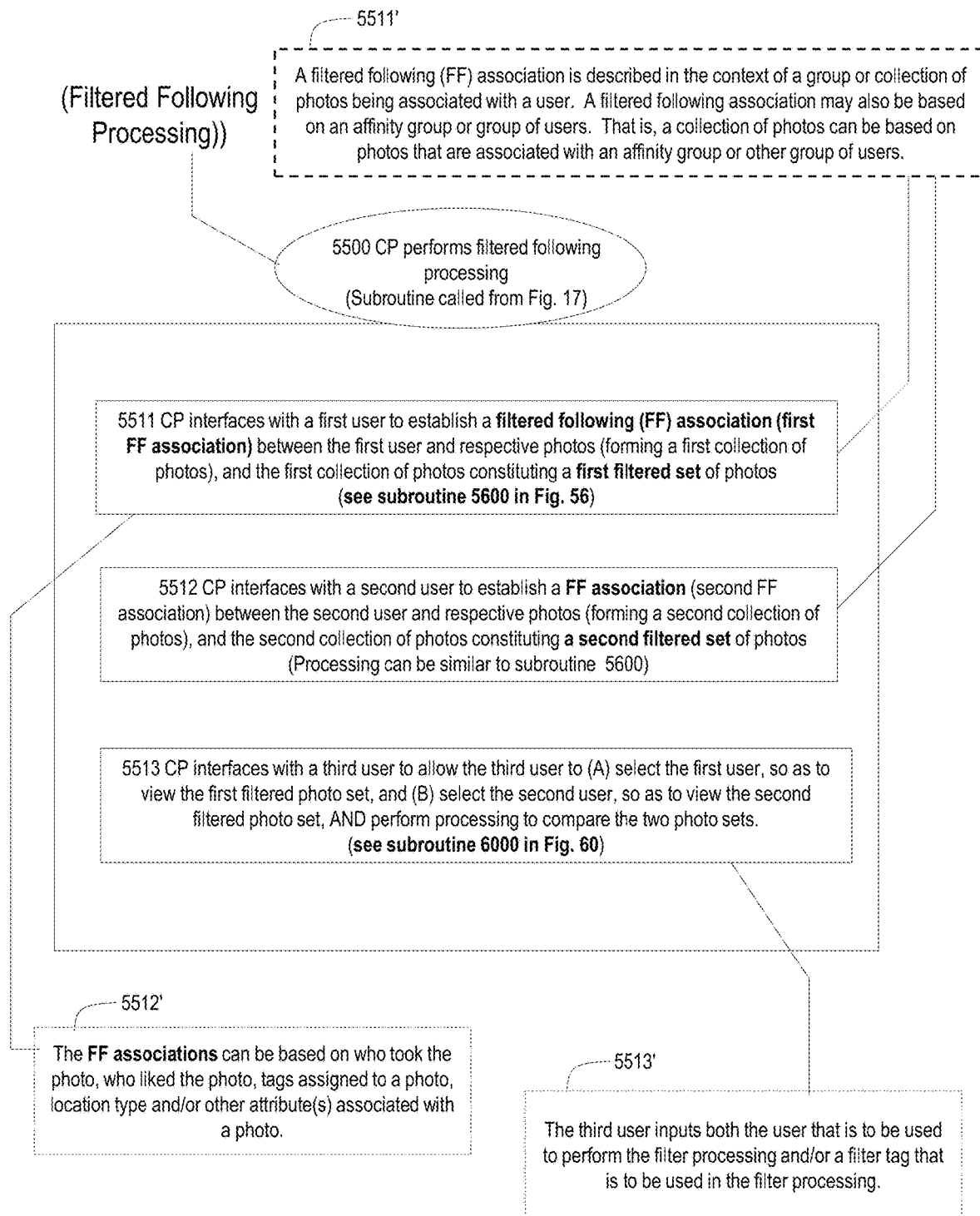
FIG. 55 is a flowchart showing filtered following processing, in accordance with principles of the disclosed subject matter.

FIG. 55 is a flowchart showing filtered following processing, in accordance with principles of the disclosed subject matter. The filtered following processing of FIG. 55 can be called or invoked utilizing a suitable option presented on a GUI of a user device. For example, filtered following processing could be called upon or invoked as part of the processing of step 763 of FIG. 17. The process of FIG. 55 is launched in step 5500. Upon the filtered following processing being launched, any of the processing of steps 5511, 5512 and 5513 can be performed as called upon through user interaction with a user, i.e. with a user device.

In step 5511, the CP interfaces with a first user to establish a filtered following (FF) association (i.e. a first FF association) between the first user and respective photos (forming a first collection of photos), and the first collection of photos can constitute a first filtered set of photos, i.e. a first filtered photo set of photos. Details are described below with reference to subroutine 5600 of FIG. 56. As reflected at 5512', the FF associations can be based on who took the photo, who liked the photo, tags assigned to a photo, location type and/or other attribute(s) associated with a photo. The FF associations can be based on a person or a group. As reflected at 5511' in FIG. 55, a filtered following (FF) association is described in the context of a group or collection of photos being associated with a user, such as in the processing of step 5511 and step 5512. A filtered following association may also be based on an affinity group or other group of users. That is, a collection of photos can be based on photos that are associated with an affinity group or other group of users.

In step 5512 of FIG. 55, the CP interfaces with a second user to establish a FF association (i.e. a second FF association) between the second user and respective photos (forming a second collection of photos), and the second collection of photos can constitute a second filtered set of photos, i.e. a second filtered photo set of photos. Processing can be similar to subroutine 5600, described above. Rather than photos, other media can be processed, such as electronic messages or other content.

In step 5513, the CP interfaces with a third user to allow the third user to (A) select the first user, so as to view the first filtered photo set, and (B) select the second user, so as to view the second filtered photo set. Processing can be performed so as to compare the two photo sets. Details are described below with reference to subroutine 6000 of FIG. 60. As reflected at 5513 the third user can input or select both the user that is to be used to perform the filter processing (i.e. a first user whose perspective will be viewed by the third user) and/or a filter tag that is to be used in the filter processing. For example, the first filtered photo set can be based on an association of photos with one or more users. For example, the second filtered photo set can be based on an association of photos with one or more users. For example, a second filtered photo set might be a collection of photos that are associated with all users in the system and/or a collection of photos that have been input into the system.

FIG. 56 is a flowchart showing details of subroutine 5600 as called from FIG. 55, in accordance with principles of the disclosed subject matter. The process is launched and can include any of the processing of steps 5610, 5620 and 5630. In step 5610, the CP establishes filtered following (FF) association based on photos that were "taken" by the first user. Such processing can include interfacing with the first user, i.e. a first user device. Subroutine 5700 can be called, as described with reference to FIG. 57 below. In step 5620, the CP interfaces with the first user to establish FF association based on photos that were "liked" by the first user. Subroutine 5900 can be called, as described with reference to FIG. 59 below. In step 5630, the CP establishes a filtered following (FF) association based on photos that were "tagged" in a particular manner by the first user. Subroutine 5900 can be called, as described with reference to FIG. 59 below.

FIG. 57 is a flowchart showing details of "CP establishes filtered following (FF) association based on photos that were "taken" by the first user" of subroutine 5700 as called from FIG. 56, in accordance with principles of the disclosed subject matter. The process of FIG. 57 can include interfacing with the first user device, i.e. interfacing with the first user. The subroutine is launched in step 5700 and passes onto step 5701. In step 5701, the processor retrieves or creates a user ID number or other identifying number or identification that is associated with the first user device, i.e. the first user. Then, in step 5702, the processor inputs photos from the first user device. Alternatively, the processor could retrieve photos from memory or data store that were previously input from the user. The photos can be associated with the user via a data association, such as is shown in the data architecture FIG. 64. Accordingly, in step 5703, the processor assigns the user ID to such photos as the photos are input from the user device. The CP can write the user ID to a data record 6422 that is part of the metadata of the photo (see FIG. 64). As reflected at 5703, if the photo already includes user identifying indicia in the metadata of the photo, the CP can map such user identifying indicia to a system created user ID, and insert such system created user ID in data record 6422. Then the process passes onto step 5704.

In step 5704, the system saves the photo, with modified metadata, into an accessible database of the server—so that the photo can be accessed by other users. Accordingly, as reflected at 5704' the photo is thus searchable based on the user ID number of the user device that was used to take the photo. Accordingly, photos in the system can be aggregated based on the photographing user, and presented to the third user as a filtered following. Then, in step 5705, the process is terminated, i.e. the subroutine has been completed.

FIG. 58 is a flowchart showing details of "CP establishes filtered following (FF) association based on photos that were "liked" by the first user" of subroutine 5800 as called from FIG. 56, in accordance with principles of the disclosed subject matter. The process of FIG. 58 can include interfacing with the first user device, i.e. interfacing with the first user. The subroutine is launched in step 5800 and passes onto step 5801. In step 5801, the processor receives a request (from a third user) to generate a FF association based on "liked" relationship of photo with a first user. In step 5802, the processor interfaces with the third user to input the user name of the first user. The first user name can then be mapped to a user ID of the first user. Then, in step 5803, the processor identifies data records 6410' (in photo ID table 6410 (FIG. 64)) representing respective photos that contain the ID (of the first user) in the "liked" data field 6428. Then in step 5804, the processor saves photos that were identified in the search (of step 5803) as a collection of photos, which form a filtered set of photos. The process then passes onto step 5804.

In step 5804, the processor provides the third user with access to the collection of photos, which form the requested filtered set of photos. Then, in step 5805, the process is terminated, i.e. the subroutine has been completed.

Figure 59:
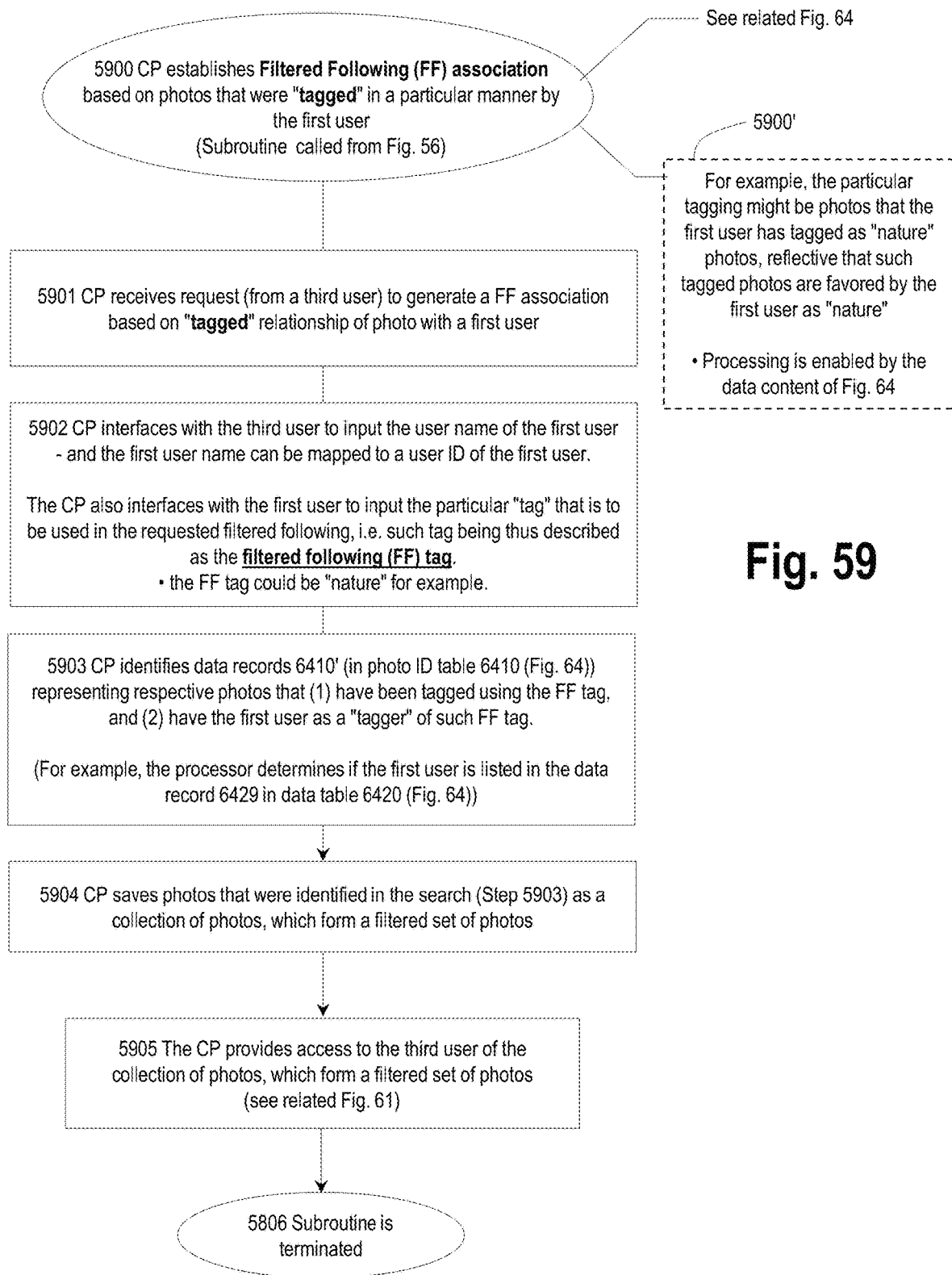
FIG. 59 is a flowchart showing details of "CP establishes filtered following (FF) association based on photos that were "tagged" in a particular manner by the first user" of subroutine 5900 as called from FIG. 56, in accordance with principles of the disclosed subject matter.

FIG. 59 is a flowchart showing details of "CP establishes filtered following (FF) association based on photos that were "tagged" in a particular manner by the first user" of subroutine 5900 as called from FIG. 56, in accordance with principles of the disclosed subject matter. As reflected at 5900', for example, the particular tagging might be photos that the first user has tagged as "nature" photos. Such tagging can be indicative that such tagged photos are favored by the first user as nature photos. Accordingly, a perspective via the first user's eyes can be provided to other users. The processing of FIG. 59 is enabled by the data content of FIG. 64.

Figure 64:
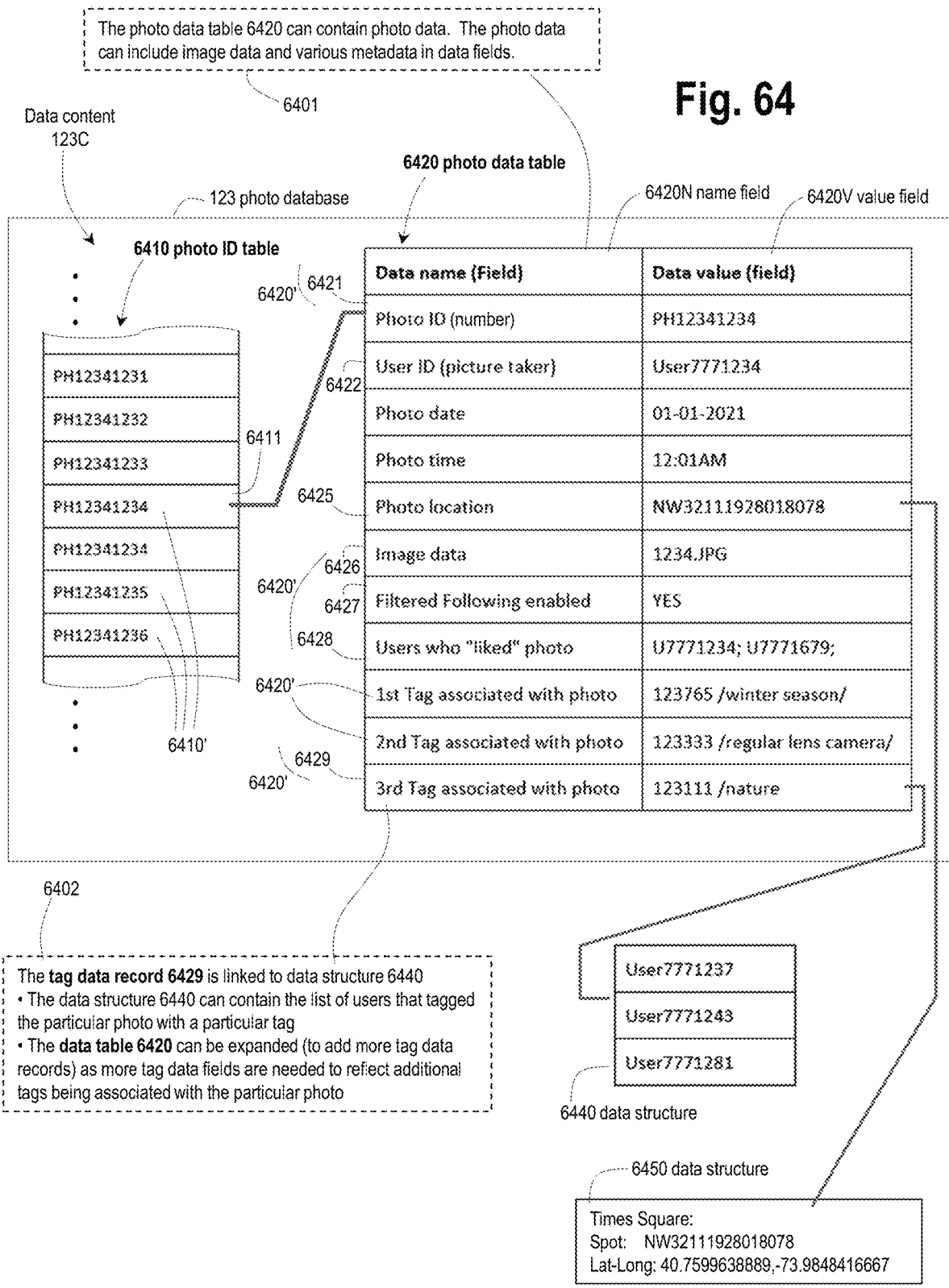
FIG. 64 is a schematic diagram showing data content 123C, in accordance with principles of the disclosed subject matter.

The processing of subroutine 5900 starts in step 59 and passes onto step 5901. In step 5901, the processor receives a request, from the third user in this illustrative example, to generate a filtered following association based on "tagged" relationship of photos with the first user. Then, the process passes onto step 5902. In step 5902, the processor interfaces with the third user to input username of the first user to be used in the filtered following. Then, the first user name can be mapped to a user ID of the first user. The CP also interfaces with the first user to input the particular "tag" (i.e. the FF tag) that is to be used in the requested filtered following. The tag could be "nature" for example. Then, in step 5903, the processor identifies data records 6410' (in photo ID table 6410 (FIG. 64)) representing respective photos that (1) have been tagged using the FF tag, and (2) have the first user as a "tagger" of such FF tag. For example, the processor determines if the first user is listed in the data record 6429 in data table 6420 (FIG. 64).

Then in step 5904, the processor saves photos that were identified in the search (of step 5903) as a collection of photos, which form a filtered set of photos. The process then passes onto step 5905.

In step 5905, the processor provides the third user with access to the collection of photos, which form the requested filtered set of photos. Then, in step 5906, the process is terminated, i.e. the subroutine has been completed.

Figure 60:
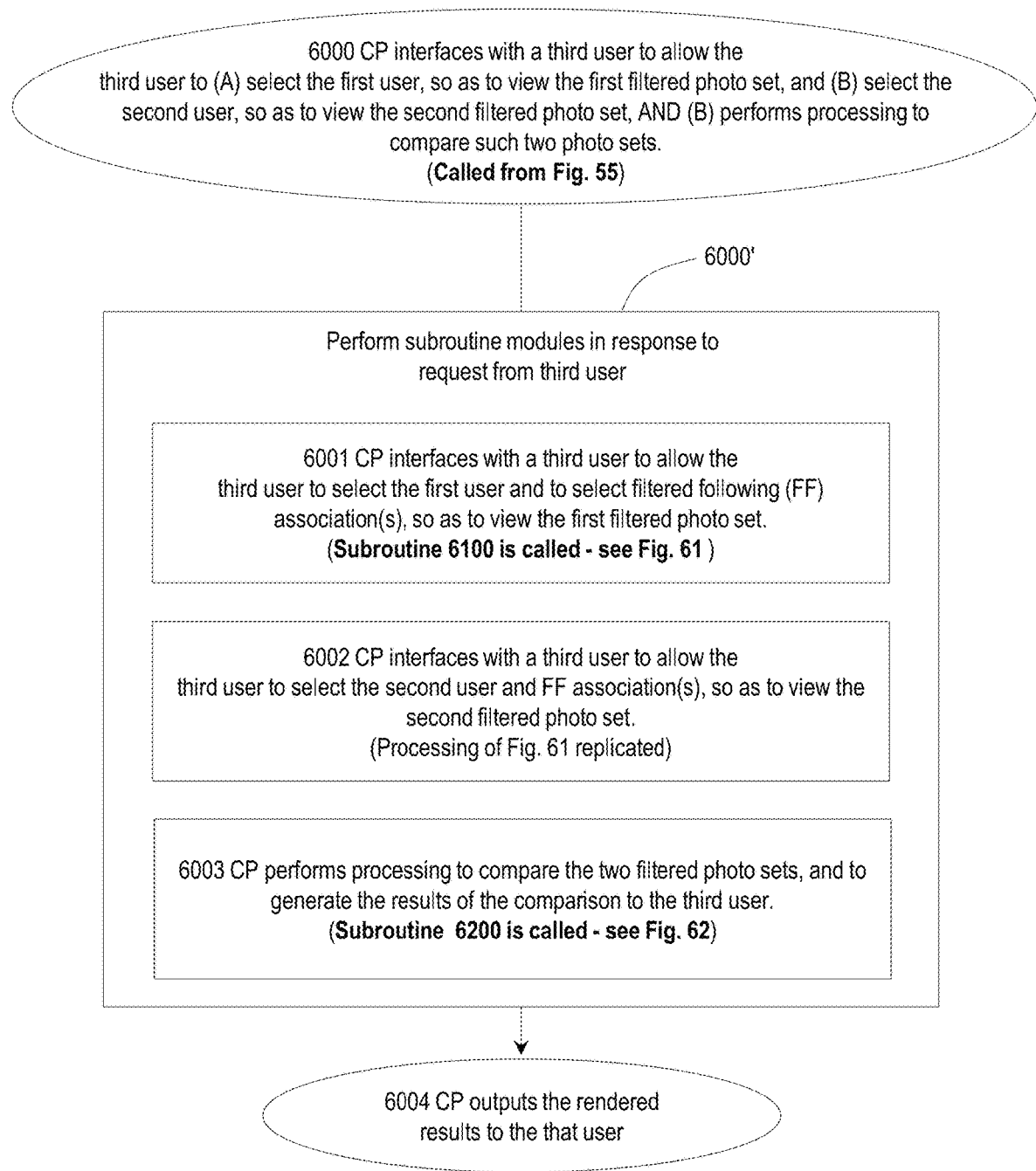
FIG. 60 is a flowchart showing details of "CP interfaces with a third user to allow the third user to (A) select the first user, so as to view the first filtered photo set, (B) select the second user, so as to view the second filtered photo set, AND (C) perform processing to compare the two photo sets" of subroutine 6000 as called from FIG. 55, in accordance with principles of the disclosed subject matter.

FIG. 60 is a flowchart showing details of "CP interfaces with a third user to allow the third user to (A) select the first user, so as to view the first filtered photo set, (B) select the second user, so as to view the second filtered photo set, AND (C) perform processing to compare the two photo sets" of subroutine 6000 as called from FIG. 55, in accordance with principles of the disclosed subject matter. The subroutine is launched in step 6000 and passes to Step 6000'. In step 6000', the processor performs subroutine modules in response to request from a user, in this case a user described as a third user. Accordingly, the processing provides for any of the modules 6001, 6002 and 6003 to be performed.

In the module 6001, the CP interfaces with a third user to allow the third user to select the first user and to select filtered following (FF) association(s), so as to view the first filtered photo set. Subroutine 6100 is called, as described below with reference to FIG. 61. In the module 6002, the CP interfaces with the third user to allow the third user to select a second user and FF association(s), so as to view the second filtered photo set. Module 6002 is provided to reflect that the third user can select additional users in filtered following processing. As otherwise described herein, the additional users can be selected so as to allow the third user to view different perspectives. The processing of module 6002 can be similar to the processing described below with reference to module 6001.

In the module 6003, the CP can perform processing to compare the two filtered photo sets that were generated in modules 6001 and 6002. Module or step 6003 can also generate results of the comparison for the third user. Module 6003 can be performed by subroutine 6200 as described below with reference to FIG. 62. After the desired processing is performed in step 6000', the process can pass onto step 6004. In step 6004, the processor can output the rendered results to the user, here the third user.

Figure 61:
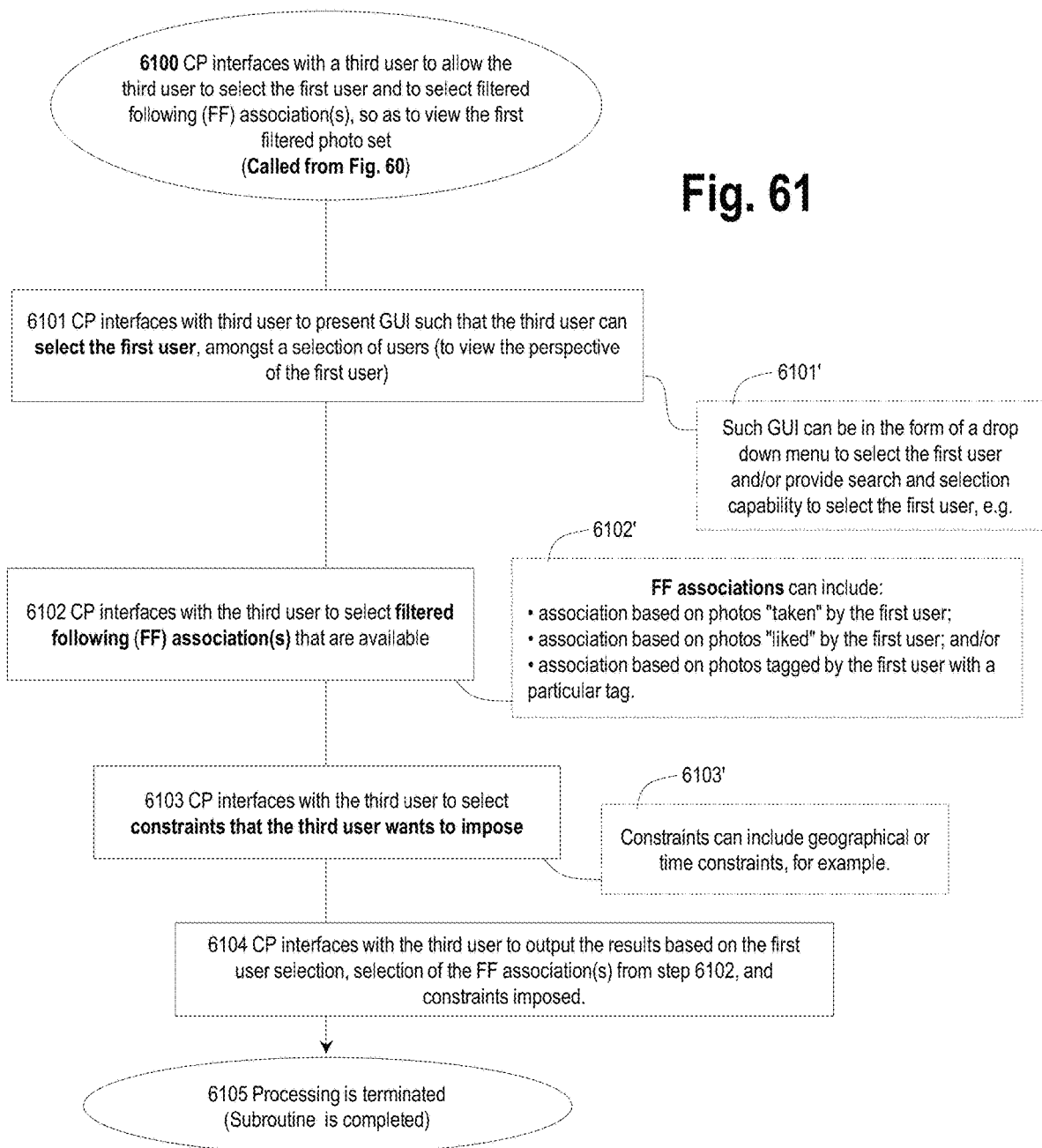
FIG. 61 is a flowchart showing details of "CP interfaces with a third user to allow the third user to select the first user and to select filtered following (FF) association(s), so as to view the first filtered photo set" of subroutine 6100 as called from FIG. 60, in accordance with principles of the disclosed subject matter.
Figure 63:
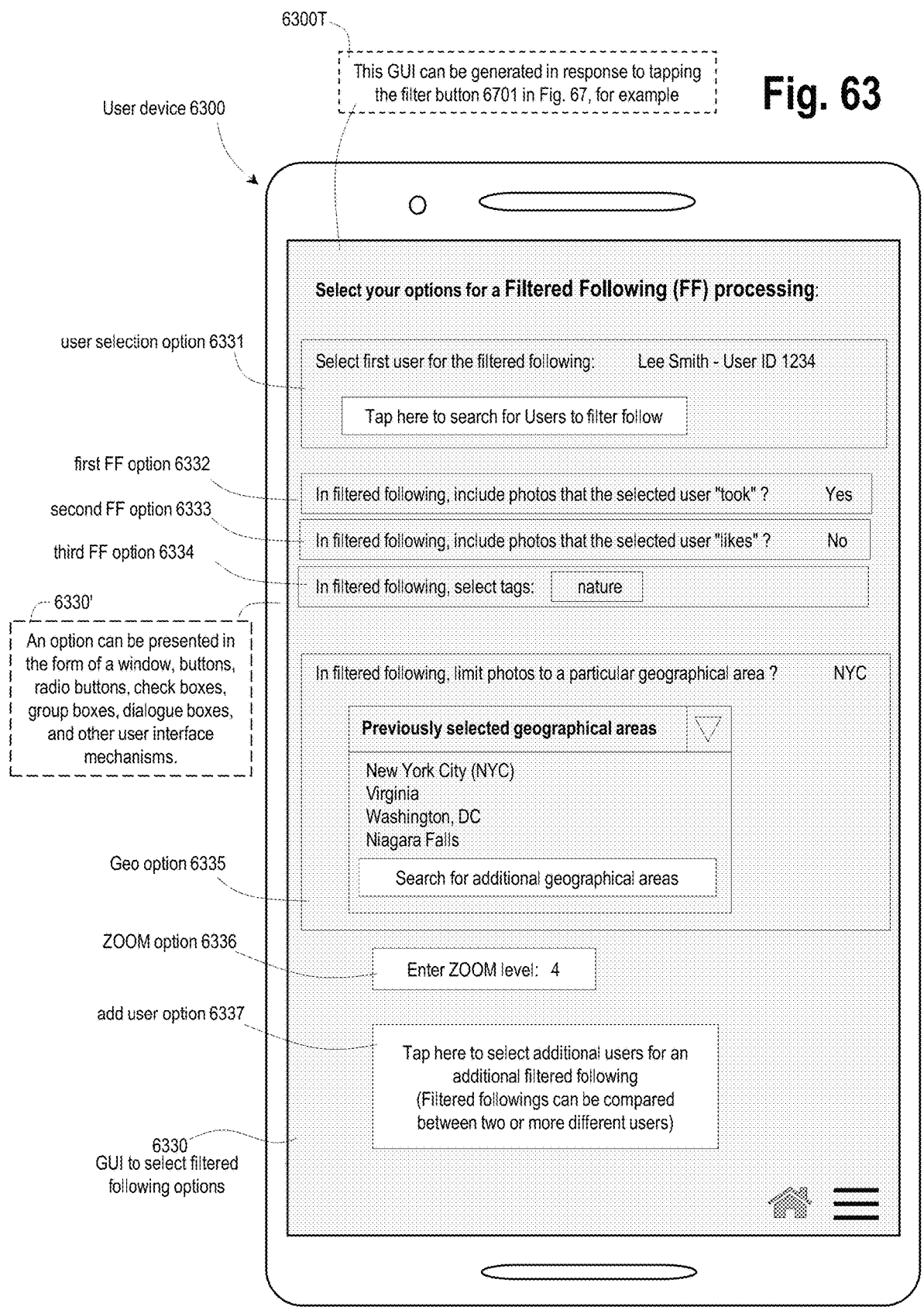
FIG. 63 is a diagram that shows a user device 6300 displaying a GUI 6330, in accordance with principles of the disclosed subject matter.

FIG. 61 is a flowchart showing details of "CP interfaces with a third user to allow the third user to select the first user and to select filtered following (FF) association(s), so as to view the first filtered photo set" of subroutine 6100 as called from FIG. 60, in accordance with principles of the disclosed subject matter. Relatedly, FIG. 63 shows a user device 6300 displaying a GUI 6330, in accordance with principles of the disclosed subject matter. The GUI 6330 is provided to select filtered following options.

Note FIGS. 57-59 relate to establishing filtered following associations based on input data. On the other hand, FIG. 61 relates to the actual inputting of the data from the user, i.e. and once such data is input, the data can be used in the processing of FIGS. 57-59.

With further reference to FIG. 61, the subroutine is launched in step 6200 and passes onto step 6101. In step 6101, the processor interfaces with the third user to present a GUI such that the third user can select the first user, amongst a selection of users, so as to view a perspective of the first user. Such a GUI can be in the form of a drop-down menu to select the first user and/or provide certain selection capability to select the first user, for example. The GUI 6330, of FIG. 63, can include a user selection option 6331. The option 6331 allows the third user to tap and search for users, such as a first and second user for example, to filter follow. Other selection mechanisms could be utilized as desired. For example, the user selection item 6331 can provide a user with the ability to select a group of users to filter follow. The group of users, which may be selected, may be an affinity group; "friends"; or "users followed," for example. Accordingly, a user can be selected, i.e. the "first user" is selected for purposes of this description. After step 6101, the process passes onto step 6102. In step 6102, the processor interfaces with the third user to select filtered following (FF) association(s) that are available. As noted at 6102', the filtered following associations can include (1) association based on photos taken by a first user, (2) association based on photos "liked" by a first user, and/or (3) association based on photos that were tagged by the first user with a particular tag. More specifically, with regard to the association based on tags, note related step 5902 of FIG. 59. The processor can interface with the user to input the filtered following (FF) options via the first FF option 6332, the second FF option 6333, and/or the third FF option 6334, as shown in the GUI 6330 of FIG. 63. Various other FF options can be provided for selection by the user. Indeed all the photos that are available to the user and/or all the photos that are on the system (and satisfy selected criteria), for example, can be provided as an FF option.

With further reference to FIG. 61, after step 6102, the process passes onto step 6103. In step 6103, the processor interfaces with the third user to select constraints that the third user wants to impose upon the filtered following. Note at 6103', constraints can include geographical constraints, time constraints, or other constraints as may be desired. Such constraints can be selected and imposed upon the filtered following so as to limit photos contained and presented to the third user in the filtered following. For example, such a constraint can be selected by the third user utilizing the Geo option 633 of the GUI 6330 of FIG. 63. With such Geo option 6335, the third user has limited the photos to the particular geographical area of New York City. As noted at 6330', an option or selection of the GUI 6330 (FIG. 63) can be presented in the form of a window, buttons, radio buttons, checkboxes, group boxes, dialogue boxes and other user interface mechanisms. The GUI 6330 can also provide a zoom option 6336. The zoom option allows the third user to render results of the filtered following to a particular zoom level and/or to particular longitude-latitude coordinates, for example. Additionally, the GUI 6330 includes an add user option 6337. Such option allows the third user to select additional users for an additional filtered following. Filtered followings can be generated and compared between two or more different users. Also, a filtered following can be generated and viewed in and of itself.

Figure 67:
FIG. 67 is a representation of a GUI with filtering options, in accordance with principles of the disclosed subject matter.

FIG. 67 is a representation of a GUI 6700, in accordance with principles of the disclosed subject matter. The GUI 6700 can include various "filter" icons 6701 for selection by a user, e.g. the "third" user as described herein. By tapping on one of the displayed filter icons 6701, a user can access a previously set up filtered following. Also, a displayed filter icon 6701 can be mapped to a traditional filter. Such a traditional filter could include a filter that renders only "city" photos, for example, from a collection of photos. Such a traditional filter is distinct from the filtered following processing as described herein. The filters of GUI 6700 can be enabled to be scrolled left and right—by the user "swiping" their finger—so as to "roll" through different filters. Accordingly, by swiping in the area 6710, the user can access more filters. As many filters can be provided as may be desired. After step 6103, the process passes onto step 6104. In step 6104, the processor can interface with the third user to output the results based on the first user selection, selection of the FF association(s), and any particular constraints imposed. Then, in step 6105, the subroutine is terminated. As reflected at 6300T in FIG. 63, the GUI of FIG. 63 can be generated in response to a user tapping the filter button 6701 in FIG. 67, for example.

Figure 62:
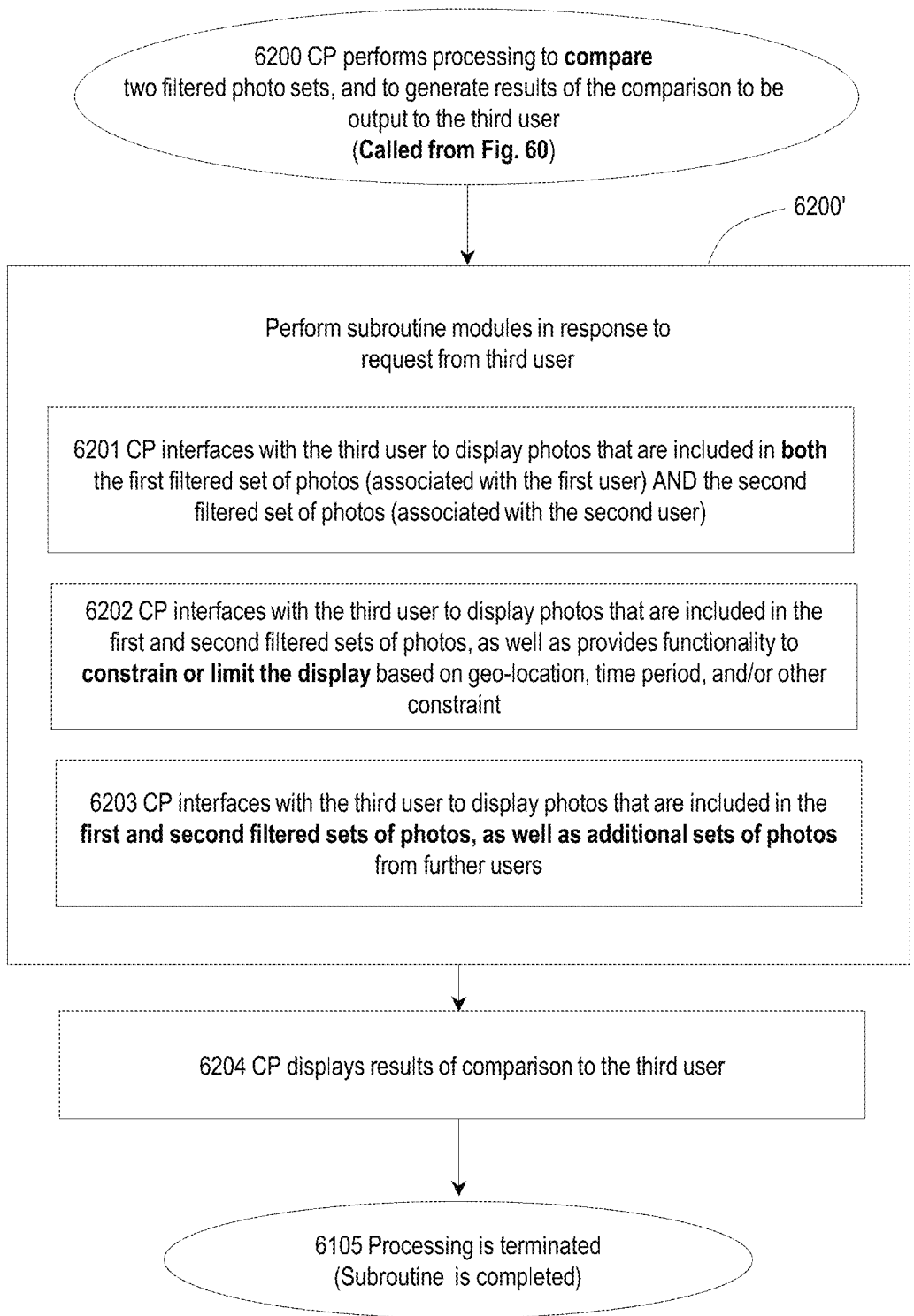
FIG. 62 is a flowchart showing details of "processor performs processing to compare two filtered photo sets, and to generate results of the comparison to be output to the third user" of subroutine 6100 as called from FIG. 60, in accordance with principles of the disclosed subject matter.

FIG. 62 is a flowchart showing details of "processor performs processing to compare two filtered photo sets, and to generate results of the comparison to be output to the third user" of subroutine 6100 as called from FIG. 60, in accordance with principles of the disclosed subject matter. The subroutine can be launched and pass onto step 6200'. In step 6200', various modules can be provided so as to be selectable by a user, in this example the third user. In general, it is appreciated that filtered following processing that generates a filtered following can relate to a single user. That is, the third user can select a first user whose perspective the third user wishes to observe. However, different filtered followings can be performed so as to generate different filtered photo sets. These different filtered photo sets can then be compared. For example, a user might just mentally compare different filtered photo sets by viewing one set and then viewing the other set. However, processing functionality can also be provided so as to compare different filtered photo sets. FIG. 62 relates to such processing functionality.

FIG. 62 shows the processing module 6201. In processing of such module, the processor interfaces with the third user to display photos that are included in both the first filtered set of photos (associated with the first user) AND the second filtered set of photos (associated with the second user). FIG. 62 also shows processing module 6202. In processing of such module, the processor interfaces with the third user to display photos that are included in the first and second filtered sets of photos, as well as provides functionality to constrain or limit the display based on geo-location (i.e. geographical location), time period, and/or other constraint. FIG. 62 also shows processing module 6203. In processing of such module, the processor interfaces with the third user to display photos that are included in the first and second filtered sets of photos, as well as additional sets of photos from further users. After a module of step 6200 is selected, the process passes onto step 6204. In step 6204, the processor displays results of the selected comparison to the third user. For example, pins (that represent photos) could be color coded so as to indicate which user the particular pin is associated with. Other graphical distinctions could be used. Then, the process passes onto step 6205. In step 6205, the processing is terminated. That is, the subroutine is completed. It is appreciated that comparison processing and other processing related to generated filtered photo sets are not limited to the particular processing shown in FIG. 62. Various other functionality and processing can be provided. In the processing of step 6200' of FIG. 62, the first and second filtered sets of photos can be presented (for comparison by a user) (a) on respective first and second screens that are adjacent to each other or (b) on the same screen. Pins, with photo count, representing photos can be displayed. Pins can be selectively displayed so as to reflect only more dense areas. For example, if viewing at the "local" level, displayed pins might only represent the top 10 patches in any local area being displayed—so as to reflect the top 10 highest points of interest in a particular local area being displayed. Other features can be provided so as to give a user comparison ability. For example, a group of pins might be selected so as to be aggregated or displayed collectively in some manner.

However, as noted above, a filtered following can be generated and viewed in and of itself. That is for example, the processing of step 6200' of FIG. 62 can also include a request to view only one set of filtered photos. That is, the illustrative "third user" can request, through interfacing with the CP (processor), a first filtered set of photos that is associated with a first user. Such processing is illustrated in FIG. 61, for example. The third user can then view such filtered following, so as to look though the perspective or "lens", metaphorically speaking, of the first user. Such processing can be a powerful tool in and of itself. Such processing can provide the user (e.g. the third user) with the ability to "see what you want to see" and the ability to filter out what the third user does not want to see. Such filtered following processing can provide for filtering media content based on user perspective, that can be for editing, viewing, comparison, validation and voting, for example. Thus, in such processing and implementation, there might not be comparison between different filtered sets of photos, but viewing of one filtered set of photos individually.

FIG. 64 is a schematic diagram showing data content 123C, in accordance with principles of the disclosed subject matter. For example, the data content 123C could be contained in the photo database 123 shown in FIG. 1. The data content of FIG. 64 can include a photo ID table 6410 and a photo data table 6420. The photo ID table 6410 can include a plurality of data records 6410'. Each of the data records 6410' can include a photo ID number. For example, the data record 6411 can include the photo ID number PH12341234. The photo ID table 6410 is searchable by a user. Each of the photo ID numbers can be linked, mapped or otherwise associated to a photo data table. As result, a user can access a respective photo data table for data regarding a particular identified photo. The data content of FIG. 64 shows that the data record 6411 is linked to the photo data table 6420, in this illustrative example. As shown, the photo data table 6420 can contain photo data. The photo data can contain image data and various metadata in respective data fields, as reflected at 6401.

The photo data table 6420 can include data records 6420'. Each data record 6420' can include a name field 6420N and a value field 6420V. The photo data table 6420 can include the photo ID number in a photo ID data record 6421. Such data record can be linked to the photo ID table 6410. The table 6420 can include data record 6422. The data record 6422 can include user ID of the user that took the particular photo. Data records can be provided that contain the photo date and the photo time. The location data record 6425 can include photo location. The location data record 6425 can be linked to data structure 6450. The data structure 6450 can contain data regarding the photo location, in addition to the data contained in data record 6425. In this case, the photo location is illustratively Times Square in New York City. Data record 6426 can include the image data. For example, such data can be in the form of a JPEG file that represents the actual picture or photograph that was taken. The data record 6427 can include a variable indicating whether filtered following is enabled or not enabled for the particular photo, e.g. whether filtered following is enabled as to the particular photo. Such selection can control whether or not certain functionality is provided with regard to the particular photo. A liked data record 6428 can contain the user IDs of those users who "liked" the particular photo.

The photo data table 6420 can include various tag data records 6420'. One of these can be tag data record 6429. As described above, processing can include identifying a data record 6410' (in photo ID table 6410 of FIG. 64) that represents a photo that (1) has been tagged using a particular filtered following (FF) tag, and (2) has a first user as a "tagger" of such FF tag. For example, the processor can determine if the first user is listed in the data record 6429 in data table 6420, or associated with the data record 6429 by virtue of being included in data structure 6440. As described above, the "first user" has been described as a user that the "third user" chooses to select, to perform a filtered following. To explain further as noted at 6402 of FIG. 64, the tag data record 6429 can be linked to data structure 6440. The data structure 6440 can contain the list of users that tagged the particular photo with a particular tag. It is this list of users that can be searched in filtered following processing (step 5903 of FIG. 59). The data table 6420 can be expanded (to add more tag data records) as more tag data fields are needed to represent additional tags being associated with the particular photo. Accordingly, one or more users, i.e. first users, can be associated with a first filtered photo set or photo collection. An association can be constituted by a user tag associated with the one or more first users being determined to match a respective photo tag associated with each of the photos in a collection of photos. The photo tag can represent or reflect a group of users to which photos in the first filtered photo set are associated, and the user tag can provide an association between the one or more first users and the group (see FIG. 64 and data structure 6440 and tag data record 6429). The group of users can be in the form of an affinity group that represents an affinity to particular subject matter. The group can be in the form of a friends group that represents a group of friends. The photo tag can designate a preference, and the user tag represents such same preference, such that the photo tag and the user tag are deemed to match and/or the photo tag and the user tag can be determined to be linked to or associated with the same tag.

Accordingly, the data content of FIG. 64 provides storage and access to a variety of data used in filtered following processing. The data content of FIG. 64 can also be used in a wide variety of other processing as described herein.

An example of filtered following may be where the user desires to compare the top 10 photo locations of a selected geographical area such as New York City. In such comparison, the user may desire to compare of the entire Photer user population (i.e. the entire photo collection of the system) vis-à-vis the user's group of friends. Or, for example, the entire photo collection may be compared to a particular affinity group to which the user belongs. The system as described herein may be described as the "Photer" system.

Notification Processing Text

Hereinafter, further embodiments of the disclosure will be described. Systems and methods will be described relating to notification processing. The system can be described as including a notification system (or notification processing portion within a photo system). The system can be described as a "Photer" system, in an embodiment. The system can interface with a user through a suitable user interface, user device, or in some other suitable manner. In an embodiment, the user can interface with the system to set parameters that define a user's location or area of interest, which can be used in notification processing. For example, the user's location of interest can be based upon the user searching for photos in geographic locations that other users have previously identified through the submission of photos. The location, geographic area, location area, geographically segmented area, or some other area (using some geographic demarcation) can be embedded within the data or metadata of each photo. Further, the user can save photos and/or searches on multiple occasions from a particular area, and (based on such activity) such area can be identified as an area of interest. That is, a user's area of interest can also be set by a user saving photos from (or photos otherwise related to) a particular geographical area. Accordingly, the system can identify an area that the user is interested in based on: the user searching for photos in a particular area, saving photos from a particular area, manipulating other user's photos from a particular area, or other manipulation of photos wherein the photos are associated with a particular area. The system can be in the form of or include an application server or server. The server can monitor a user's activity so as to identify that a user has performed photo related activity—so as to generate or identify an area of interest. Such a location or area of interest can be described as an "observed area" or, in other words, as an "interest area". Accordingly, the terms "observed area" and "interest area" have been used herein interchangeably.

The system or server can maintain various geographically segmented areas, geo-fences, or geo-borders. The geographically segmented areas can be described as "responsive areas" in that, if such an area is triggered, such determination will result in the server outputting predetermined content or other notification to the user. That is, the server can determine when an "interest area" (as determined by activity of the user) is sufficiently in proximity or sufficiently matches with a "responsive area". For example, the user may conduct various searching in a first area. The user may save photos of another user from the first area. The photos might be saved into a user's photo gallery. As a result, such area is deemed, by the server, to constitute an interest area. The server can compare the relationship of the interest area to a listing of responsive areas. If a sufficient association is determined between the interest area and any of the responsive areas, then the responsive area(s) that provided the sufficient association is triggered. The triggering of the responsive area results in the server outputting predetermined content to the user, in accord with at least one embodiment.

For example, it may be determined that an interest area indeed corresponds to a responsive area. Based upon such determination, content that is associated with such responsive area can be output to the user. For example, the content might be advertising for a restaurant located in (or near) the responsive area. The content might be information regarding activities which one might participate in, while traveling in or near the responsive area. Notification regarding related equipment, such as rock climbing equipment, might be included in the notification. Various other content can be output to the user. The particular content can depend on the type of interaction that the user had with the interest area. The particular content can be dependent on various constraints, such as time of day or attributes of the user. The content or other information sent to a user can be described as a "notification".

As noted above, an "interest area", as determined by user activity, can correspond to a responsive area, i.e. an interest area can be a responsive area. Also, an interest area can be within a responsive area. An interest area could intersect with or crossover a responsive area. Other associations between an interest area and a responsive area can be utilized. Upon an association being observed (that triggers a responsive area), the predetermined content, i.e. a "notification" can be output to the user. The processing can include the server transmitting instructions to the user device or portable electronic device of the user. The instructions that are transmitted can cause the user device to offer a service to the user. The service to the user may or may not be offered to the general public. Content or service to the user can be described as a notification. In addition to providing a service, the notification can include an advertisement or special offer, representative photo of a popular nearby location, gaming instruction, or other content, for example.

A user interface can be provided by a computer separate from, i.e. instead of, a portable electronic device of the user. The user interface can be in the form of a browser that is displayed on the interface of a computer, cell phone, or other user device of the user. The user can define the parameters of distance or other association between an interest area and responsive area that will trigger the responsive area, i.e. that will trigger content being sent to the user. The user (or an administrator of the system) can set varying distances or different distances for different situations. For example, different distances can be set such that content is sent to a user differently for search activity of the user versus saving photos from an area. Accordingly, a notification can be sent upon determining that an interest area of the user is sufficiently related or associated with a responsive area. A system administrator can set parameters that control when notification is sent. The user can set parameters that control when notification is sent. The user control over when notifications are sent (and the type of notifications that are sent) can be limited in the design of the system. The user can set up one or more geographically segmented areas (geoborders) of interest, i.e. responsive areas.

Accordingly, in embodiments of the disclosed subject matter, content can be output based on activity, for example searching or saving photos, of a user. Additionally, such processing is not limited to only a single human user including user device. Activity by some other external entity that relates to a particular interest area can also trigger the system to output content to the external entity, or to some related system or entity.

Figure 75:
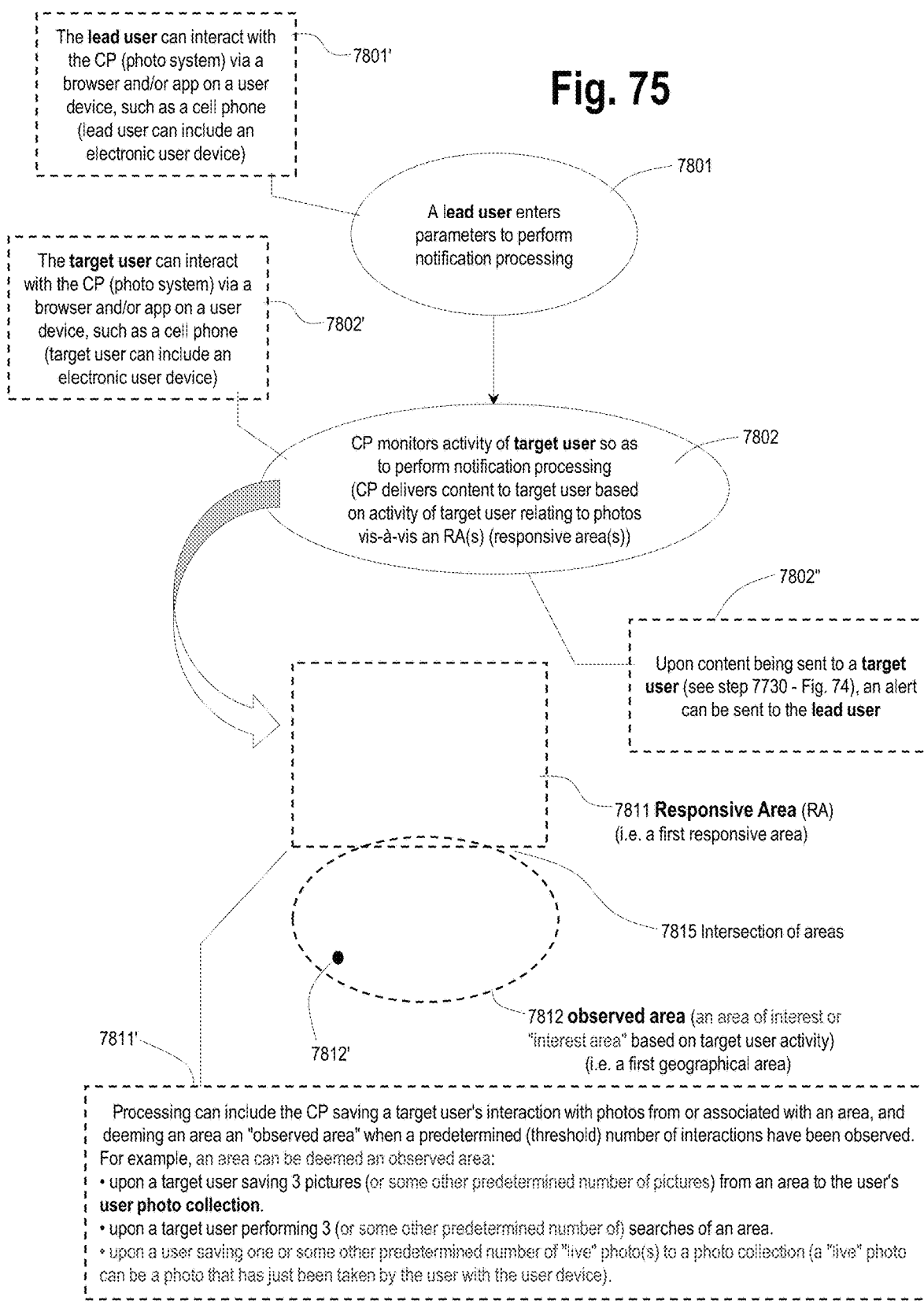
FIG. 75 is a schematic diagram illustrating various aspects and terminology of processing of the disclosure.

For example, as described above, the notification processing can include sending a notification to a portable electronic device when a user searches a location of other users' submitted photos on multiple occasions. Such searched location can be identified as an interest area. The interest area can be determined to correspond to or be sufficiently close to a responsive area, i.e. an observed area, as illustrated in FIG. 75. The responsive area can be mapped to a particular notification to be output to the user. For example, a user might save multiple photos from an area such that the area is deemed an interest area. The interest area can be contained within or intersect with a responsive area. Accordingly, notification can be output to the user based on such observed activity.

In addition to the notification output to the user, other notification can be output to an external entity having an interest in the user's interaction with a responsive area. For example, a user might save a number of photos from a particular area. Thus, the area is deemed an interest area. The interest area can be determined to be sufficiently geographically close enough to a responsive area. The server can map the responsive area to, for example, a restaurant notification. The restaurant notification can be output to the user device. The restaurant notification can provide the user with details regarding a nearby Italian restaurant, for example. The Italian restaurant can also be provided notification, from the server, to advise them that content has been output to a user, i.e. to a possible customer. Accordingly, notification processing of this embodiment can include outputting a wide variety of content to the user and other entities.

The notification processing described herein can also relate to providing a particular software application for a particular period of time. Also, a particular service can be offered to the user. For example, notification processing might include offering a mapping software application to a user upon user activity being associated with a responsive area. The mapping application might include trail maps in a national state park. The mapping application might feature various commercial entities that are in proximity to the responsive area. Suitable alerts, opt in, and opt out options can be provided to the user so as to advise the user regarding notification processing. The software application might be a game or some other type of application. The notification, provided in notification processing, can be availability of a coupon for a limited time frame or time window. The notification can be information regarding availability of an advertised service for a limited time frame.

The responsive area can be a geo-fence in a predetermined shape. Also, the interest area can be a geo-fence in a predetermined shape. The responsive area and the interest area can be any shape as desired. Such areas can be in the shape of a circle, circular, spherical, square, elliptical, rectangle, polygonal or any other shape as desired. The interest areas can include or be in the form of any areas as described herein. For example, an interest area might be in the form of a "patch," as described above. The responsive areas can include or be in the form of any areas as described herein. For example, a responsive area could also be in the form of a patch.

As described herein, a user may define one or more locations of interest. Such a location of interest can be described as an interest area. The user can define any number of interest areas. The user can identify an interest area by searching or saving photos, as described herein. The user can also define an interest area through manual interaction with the system. That is, for example, the user might identify an interest area by identifying an area identifier (of such interest area).

Once a user identifies an interest area, or the server identifies an interest area based on activities of the user, processing can then be performed to identify any responsive areas that are associated with the interest area. If a responsive area is identified as being associated with the interest area, i.e. if a responsive area has been "triggered," then content from the responsive area is output to the user, in accordance with principles of the disclosed subject matter. It may be the case that an identified area is or corresponds to a responsive area. For example, an area, patch 123123, can be identified as an interest area. The system can then determine that patch 123123 is indeed a responsive area. Patch 123123 can be mapped to an associated notification, sponsored by an external entity. The notification is then output to a user.

It might be the situation that patch 123123 is identified as an interest area, as in the prior example. However, patch 123123 is not itself a responsive area. However, patch 123123 is adjacent to patch 123124—and patch 123124 is a responsive area. The server, by applying applicable parameters in the processing, can determine that such proximity indeed triggers the responsive area, i.e. patch 123124. Thus, the user receives the predetermined content output from patch 123124. As noted otherwise herein, the user can define the types of alerts and related offerings that the user wants to receive from external entities. For example, the user might opt to not receive any alerts regarding gas stations, in that the user is walking exclusively. Accordingly, even if the user is adjacent or in a responsive area (and such responsive area is triggered) the user would not receive a notification regarding a nearby gas station. However, the same user might request alerts regarding nearby restaurants, for example Thus, if the user triggers a responsive area that has a notification regarding a restaurant, then the user would receive such notification.

An "interest area" can be identified by the user saving photos from an area, saving the user's own photos from an area, saving other users' photos from an area, when a user takes a "live photo" from an area and submits such photo to the server, and/or when a user otherwise interacts with or manipulates photos from a particular area. A photo that has just been taken, i.e. in the previous 3 minutes, can be described as a "live photo." Taking a "live photo" can include taking a photo using the camera of a user's cell phone. The live photo can then be used in photo processing of the disclosure, for example. If the interest area has a predetermined geographical relationship to a responsive area, then such responsive area will be "triggered". The predetermined geographical relationship can depend on various relationships between the interest area and the responsive area including whether the interest area and the responsive area are one and the same geo area, proximity of the interest area and responsive area, whether the interest area crosses over the responsive area, distance between boundaries of the interest area and responsive area, distance between centroids of the interest area and responsive area, and/or any other spatial relationship, for example.

Hereinafter, further features in accordance with principles of the disclosed subject matter will be described with reference to FIGS. 68-75.

Figure 68:
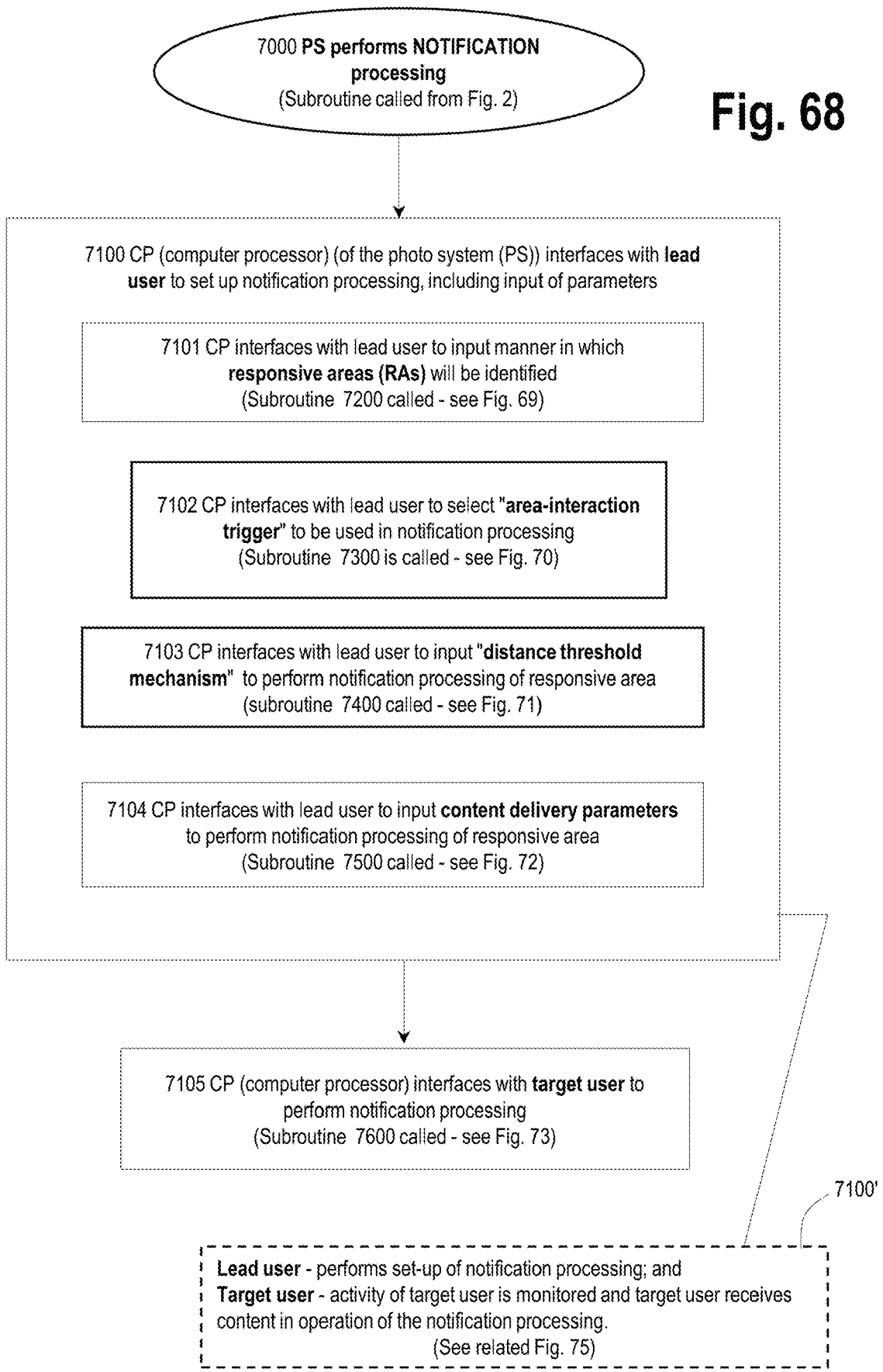
FIG. 68 is a flowchart showing details of the photo system (PS) performs notification processing.

FIG. 68 is a flowchart showing details of the photo system (PS) performs notification processing, in accordance with principles of the disclosed subject matter. The subroutine of FIG. 68 is called or invoked from the processing of FIG. 2. The process is initiated in step 7000 and passes on to step 7100. In step 7100, the computer processor (CP) of the photo system interfaces with a "lead user" to set up notification processing, including input of parameters related to the notification processing. In accordance with one embodiment of the disclosure, the lead user may be described as an administrator. As further illustrated at 7100' in FIG. 68, a "lead user" can be described as a user to perform "set up" of notification processing.

On the other hand, a "target user" can be described as a user whose activity is monitored and who receives content in operation of the notification processing. For example, a lead user and a target user can be respective user devices, which are each associated with a human user. Further details are described below with reference to illustrative FIG. 75. Also, a lead user and a target user can be the same user, in accordance with some embodiments of the disclosure.

The processing of step 7100 can include step 7101. In step 7101, the CP interfaces with the lead user to input the manner in which responsive areas (RAs) will be identified. For example, an RA could be identified by a unique identifier identifying a particular area of land. An RA could be identified by longitudinal/latitude coordinates that correspond to an area or a point in an area, or that are bounded by an area. Other mechanisms to identify a responsive area can be utilized. The processing of step 7101 can be performed by subroutine 7200, which is shown in further detail in FIG. 69 and described below.

The processing of step 7100 can include step 7102. In step 7102, the CP, e.g. the CP 110 shown in FIG. 1, interfaces with the lead user to select an "area-interaction trigger" that will be used in interaction processing. For example, such area interaction trigger can include determining if a "target user" takes and uploads a photo in a particular RA, i.e. such that "interaction" of the user with the RA is: that the user is located in the RA. An area interaction trigger could also include the user taking and uploading a photo sufficiently close or in proximity to an RA, for example. The processing of step 7102 can be performed by subroutine 7300, which is shown in further detail in FIG. 70 and described below.

The processing of step 7100 can also include step 7103. In step 7103, the CP interfaces with a lead user to input a "distance threshold mechanism" to perform notification processing of an RA. The processing of step 7103 can be performed by subroutine 7400, which is shown in further detail in FIG. 71 and described below.

The processing of step 7100 can also include step 7104. In step 7104, the CP interfaces with the lead user to input content delivery parameters to perform notification processing of a responsive area. For example, step 7104 can include a determination of the manner in which a target user interacted or engaged with an RA and, as a result of such interaction, what content is to be output to the target user. That is, if a target user is observed as taking a photo in an RA, then predetermined content may be output to the RA regarding a nearby restaurant or equipment store, for example. The processing of step 7104 can be performed by subroutine 7500, which is shown in further detail in FIG. 72 and described below. Accordingly, with further reference to FIG. 68, notification processing can include various interfacing with a lead user so as to set up parameters to be used in such notification processing. The parameters might also be described as rules or thresholds, for example. After the setup processing of step 7100, the process can pass on to step 7105. In step 7105, the CP interfaces with a "target user" to perform notification processing. The processing of step 7105 can be performed by subroutine 7600, which is shown in further detail in FIG. 73 and described below.

Figure 69:
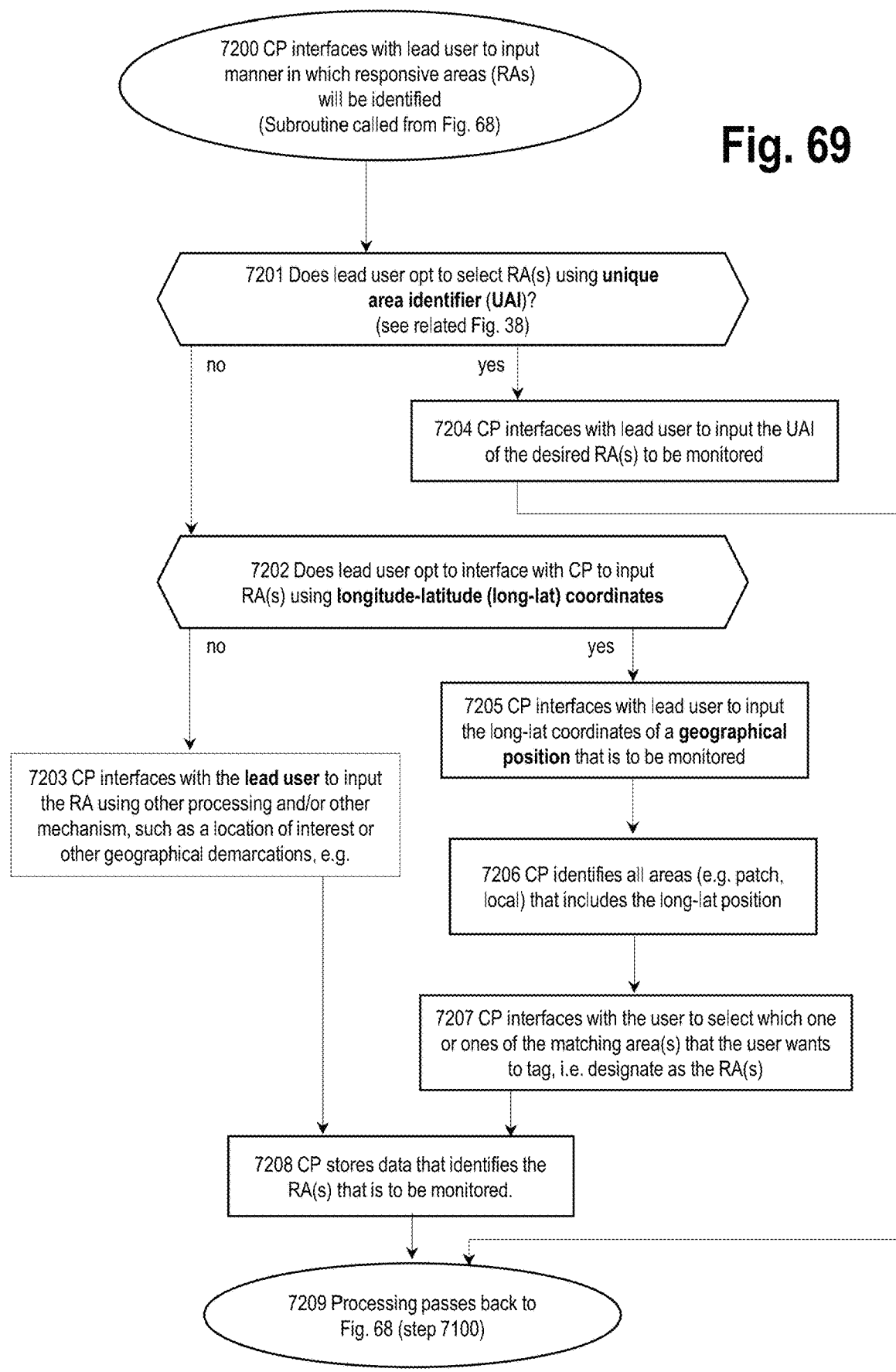
FIG. 69 is a flowchart showing details of "CP interfaces with the lead user to input the manner in which responsive areas (RAs) will be identified".

FIG. 69 is a flowchart showing details of "CP interfaces with the lead user to input the manner in which responsive areas (RAs) will be identified" subroutine 7200 as called from the processing of FIG. 68, in accordance with principles of the disclosed subject matter. As shown, the process is initiated in step 7200 and passes on to step 7201. In step 7201, the CP interfaces with the user to determine if the user opts to select RAs using a respective unique area identifier (UAI) so as to identify an area. The use and association of a UAI to a respective area, so as to represent each respective area, is described herein in detail. If yes in step 7201, the processing passes on to step 7204. In step 7204, the CP interfaces with the lead user to input the UAI(s) of the desired RA(s) to be monitored. After step 7204, the process passes on to step 7209 On the other hand, if no in step 7201, then the process passes on to step 7202.

In step 7202, the CP interfaces with the user to determine if the user opts to select RAs using respective longitude-latitude (long-lat) coordinates so as to identify an area to be monitored. The use and association of long-lat coordinates to a respective area, so as to represent each respective area, is also described herein. If yes in step 7202, the processing passes on to step 7205. In step 7205, the CP interfaces with the lead user to input the long-lat coordinates that can be provided to represent the desired RA(s), i.e. long-lat coordinates to be used to represent the area that is to be monitored. After step 7205, the process passes on to step 7206. In step 7206, the CP can identify all areas that includes, i.e. bounds, the long-lat coordinates that were input by the lead user. For example, such coordinates could include a patch area, a local area, and so forth. It is appreciated that any suitable coordinate system could be utilized. Also, any area demarcation could be utilized as may be desired. Then, in step 7207, the CP interfaces with the lead user to select which one or ones of the matching area(s) the user wants to tag, i.e. to designate as an RA. If an area is designated as an RA, then, as described below, various processing will be performed to assign operating parameters to such RA. For example, such operating parameters can include what activity will trigger an area and what content will be output to a target user if a user's activity triggers the responsive area. After step 7207, the process passes on to step 7208.

On the other hand, if no in step 7202, then the process passes on to step 7203. In step 7203, the CP interfaces with the lead user to input the RA using other processing and/or other mechanism, such as a location of interest or other geographical demarcations, for example. After step 7203, the process passes on to step 7208.

In step 7208, CP stores data that identifies the RA(s) that is to be monitored. Further details are described below. After step 7208, the process passes on to step 7209. In step 7209, the processing passes back to FIG. 68, step 7100. The processing might automatically then initiate the processing of subroutine 7300, of step 7102. Alternatively, the lead user may invoke subroutine 7300 by selection via user interface. The area that is to be monitored and that is saved in step 7208 can be monitored for any of a wide variety of reasons. For example, an owner of a café may want to monitor an area, so that content can be sent to the owner of the café upon a user, i.e. user device being in proximity to the café. Also, a first user may set up an area to monitor so that the first user receives an alert, i.e. a warning, when the first user engages with photos in the particular area. For example, the first user may not want to save or take photos around her house, due to privacy concerns. That is, for example, the first user may not want to submit photos into the system which are saved for others use around her house or where she works, due to privacy concerns. Accordingly, the first owner can receive a warning, i.e. the notification as described in step 7730 of FIG. 74, upon the first user attempting to save a photo in the particular area. Accordingly, purpose of such feature can be to protect the user from submitting and sharing photos into the wider system at large.

Figure 70:
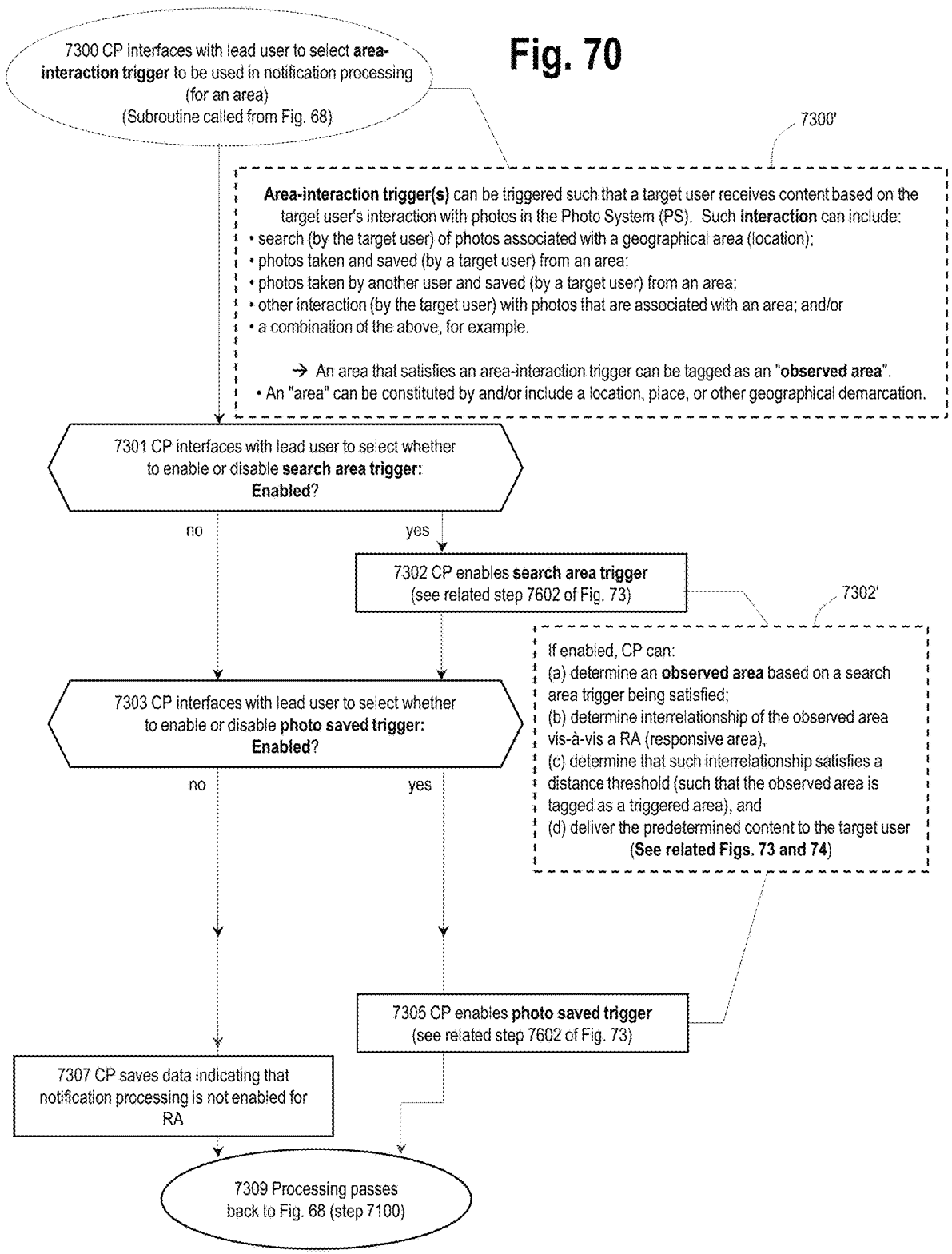
FIG. 70 is a flowchart showing details of "CP interfaces with lead user to select area-interaction trigger to be used in notification processing".

FIG. 70 is a flowchart showing details of "CP interfaces with lead user to select area-interaction trigger to be used in notification processing" subroutine 7300 as called from the processing of FIG. 68. The processing of FIG. 70 can be applied to an area, i.e. a responsive area (RA), that can be selected from a list of RAs that are presented to the user, for example. As shown, processing is initiated in step 7300 and passes on to step 7301. As referenced at 7300', an area-interaction trigger(s) can be triggered such that a target user receives content based on the target user's interaction with photos in the photo system (PS). Such interaction, to trigger content being output to the target user, can include: search (by the target user) of photos associated with a geographical area (location); photos taken and saved (by a target user) from an area; photos taken by another user and saved (by a target user) from an area; other interaction (by the target user) with photos that are associated with an area; and/or a combination of the above, for example. Such interactions can be described a trigger types. Relatedly, an area that satisfies an area-interaction trigger can be tagged as an "observed area". Further, an "area" can be constituted by and/or include a location, place, or other geographical demarcation. An area-interaction trigger(s) can use a decay or age related parameter in respective metadata of a photo, i.e. to factor in how old the photo is. Accordingly, in determining whether an area-interaction trigger is satisfied, a photo can be weighted based on how old the photo is. For example, it might take 10 older photos to satisfy a trigger, whereas it might take only 5 newer photos.

Figure 73:
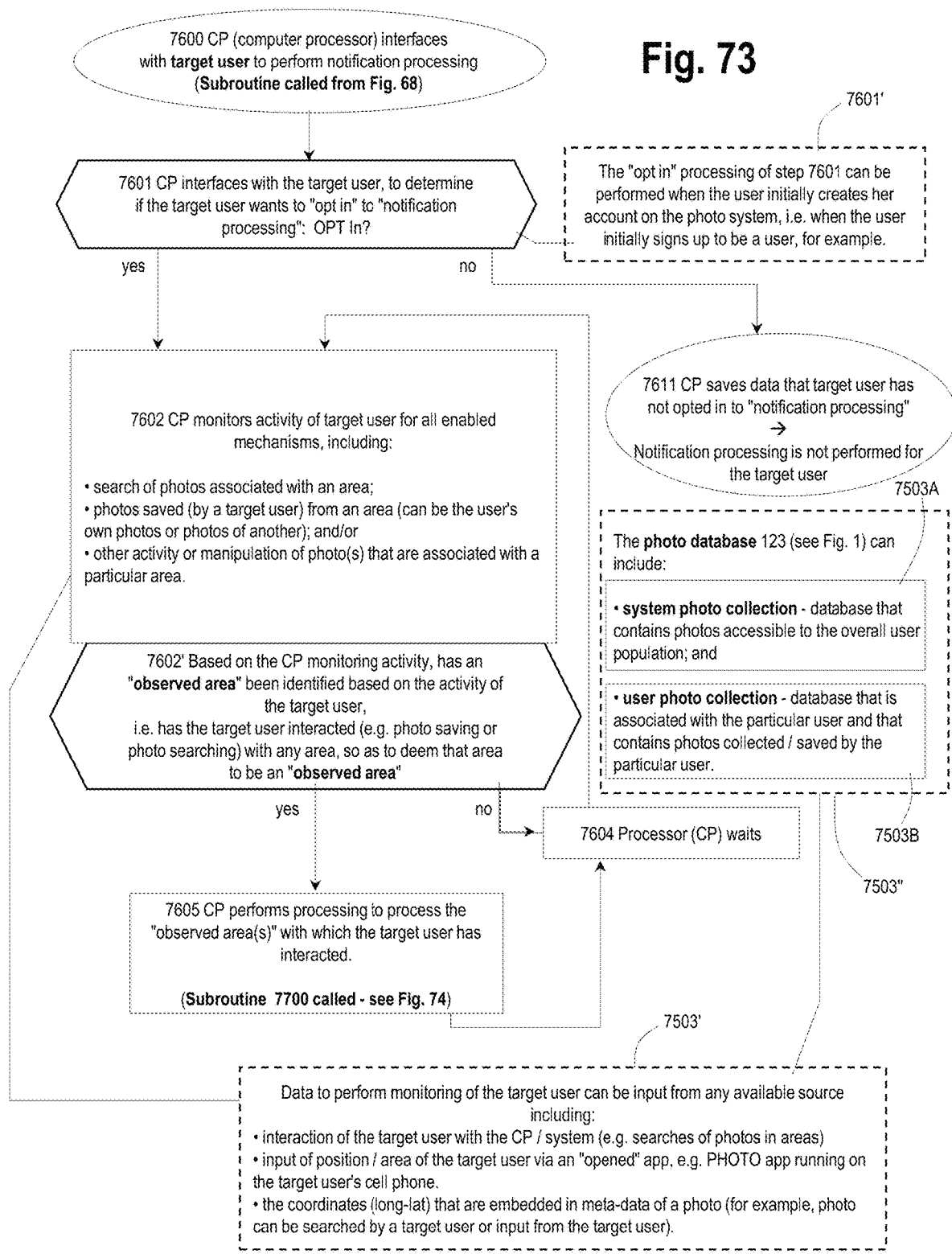
FIG. 73 is a flowchart showing details of "CP interfaces with target user to perform notification processing".
Figure 74:
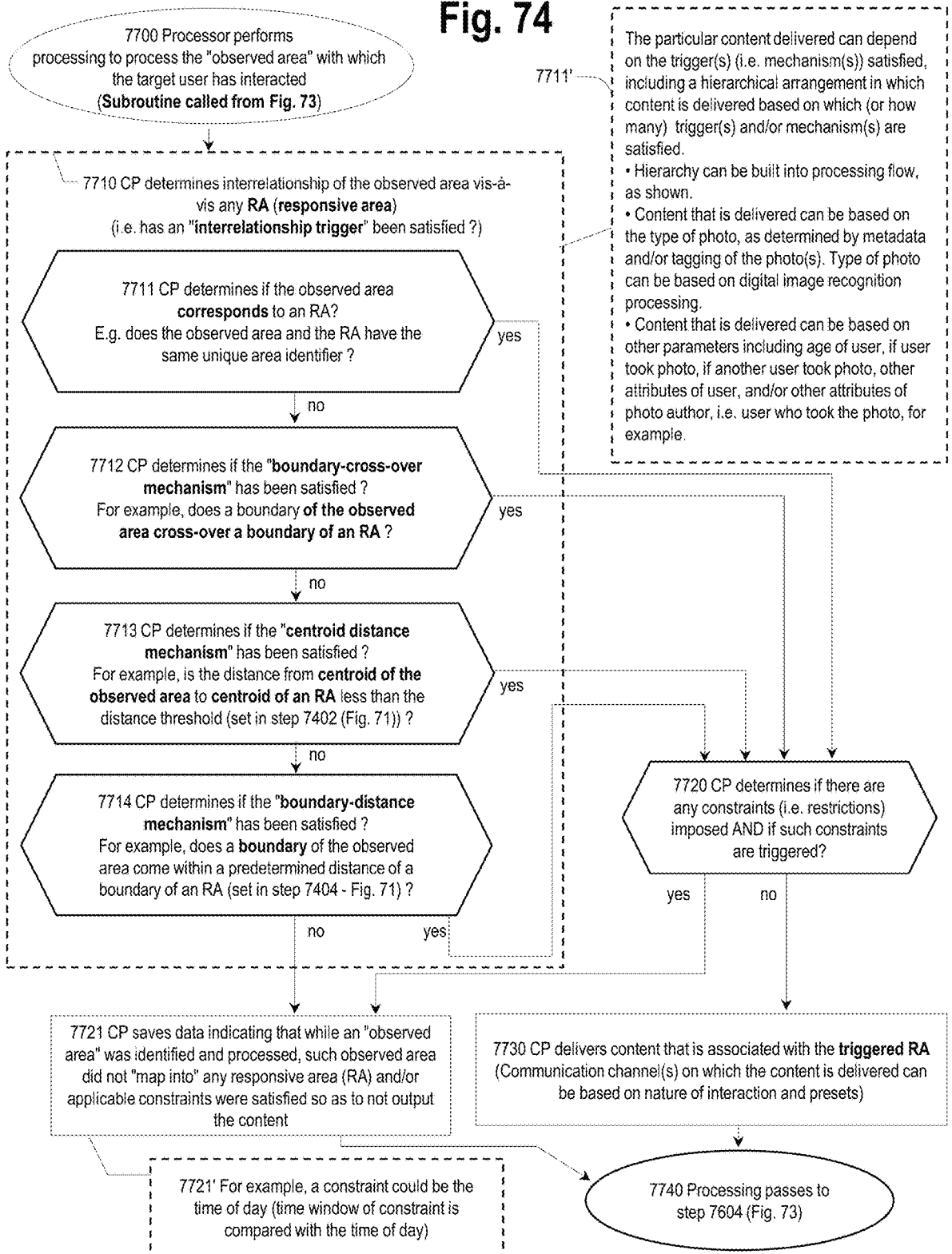
FIG. 74 is a flowchart showing details of "processor performs processing to process the "observed area" with which the target user has interacted".

With further reference to FIG. 70, in step 7301, the CP interfaces with the lead user to select whether to enable or disable a first one of the triggers, such first trigger being a "search area trigger". If yes in the processing of step 7301, the process passes on to step 7302. In step 7302, the CP enables the search area trigger. Step 7602 of FIG. 73 shows related processing. As reflected at 7302', if the search area trigger is enabled, the CP can (a) determine an observed area based on a search area trigger being satisfied (as a result of the target user searching for a photo in the particular area), (b) determine interrelationship of the observed area vis-à-vis a RA (responsive area), (c) determine that such interrelationship satisfies a distance threshold (such that the observed area is tagged as a triggered area), and (d) deliver the predetermined content to the target user. In one embodiment, the observed area could indeed be one and the same as the responsive area. That is, the observed area could be the responsive area. FIGS. 73 and 74 show related processing.

After step 7302, the process passes on to step 7303. Also, if a no determination is rendered in step 7301, the process passes on to step 7303. In step 7303, the CP interfaces with the lead user to select whether to enable or disable the "photo saved trigger". If yes in step 7303, the process passes on to step 7305. In step 7305, the CP enables the photo saved trigger. Step 7602 of FIG. 73 illustrates related processing. After step 7305, the process passes on to step 7309. If a no determination is rendered in step 7303, the process passes on to step 7307. In step 7307, the CP saves data indicating that notification processing is not enabled for the RA. The process then passes on to step 7309. In step 7309, the processing passes back to step 7100 of FIG. 68.

It is appreciated that processing of FIG. 70 can be performed for each RA, i.e. for the lead user to designate an "area interaction trigger" for each RA. Also, groups or batches of RAs can be processed at the same time so that each of such RAs uses the same area interaction trigger.

Figure 71:
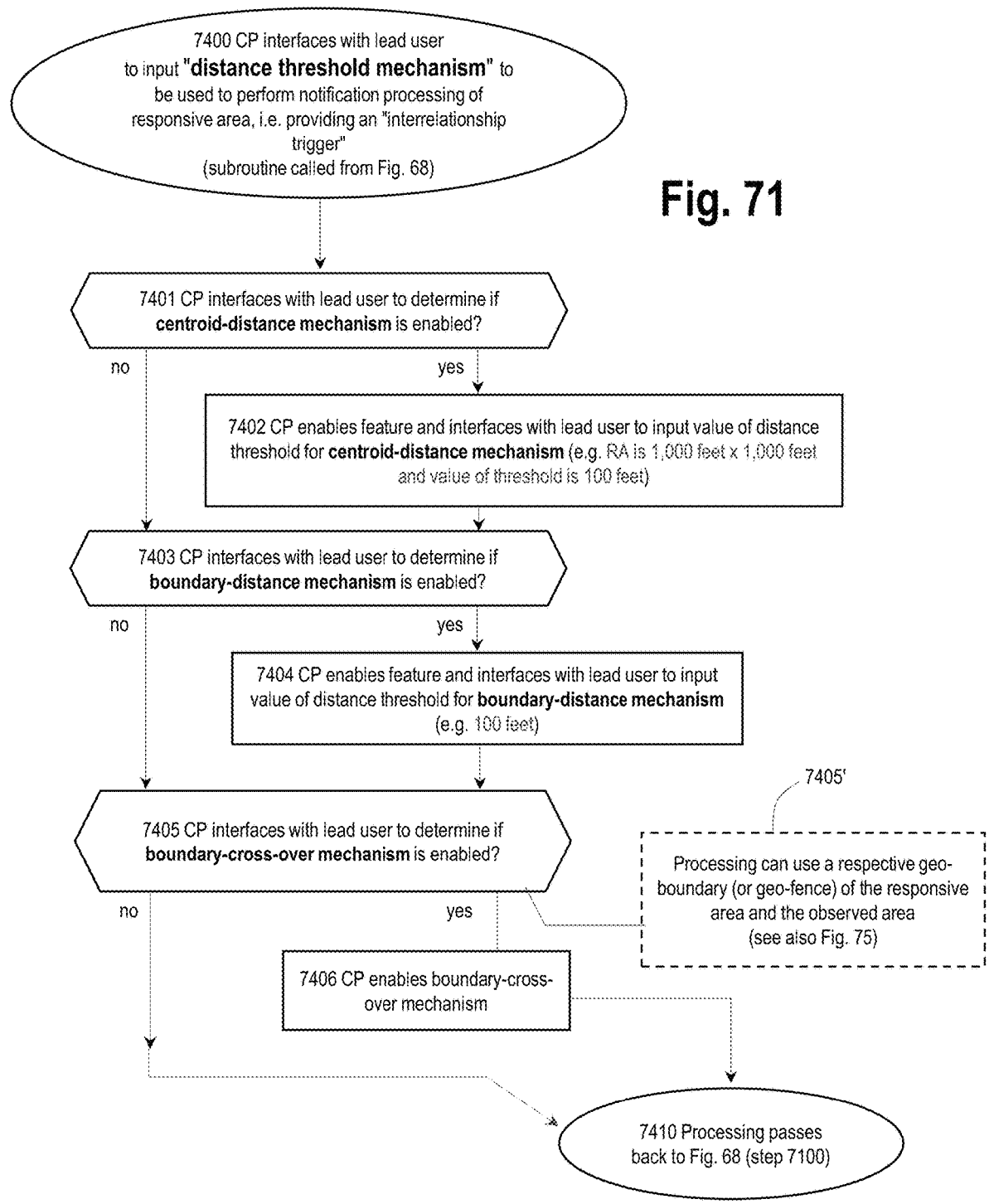
FIG. 71 is a flowchart showing details of "CP interfaces with lead user to input "distance threshold mechanism" to be used to perform notification processing of RA".

FIG. 71 is a flowchart showing details of "CP interfaces with lead user to input "distance threshold mechanism" to be used to perform notification processing of RA" subroutine 7400 as called from the processing of FIG. 68. The distance threshold mechanism can also be described as an interrelationship trigger. As shown, processing is initiated in step 7400 and passes on to step 7401. In step 7401, the CP interfaces with the lead user to determine if centroid-distance mechanism is enabled. Such centroid-distance mechanism is a processing mechanism that measures distance between the centroid of a responsive area (RA) and activity of the user (such activity being for example the user taking and uploading a photo in an area or at a particular location). If yes in step 7401, the process passes on to step 7402. In step 7402, the CP enables such feature and interfaces with the lead user to input a value of distance threshold for centroid-distance mechanism. For example the RA might be 1,000 feet×1,000 feet and value of threshold could be set to be 100 feet. After step 7402, the process passes on to step 7403. If a no is rendered in step 7401, the process passes directly on to step 7403.

In step 7403, the CP interfaces with the lead user to determine if a boundary-distance mechanism is enabled. Such boundary-distance mechanism is a processing mechanism that measures distance between the boundary, i.e. a border, of a responsive area (RA) and activity of the user (such activity being for example the user taking and uploading a photo in an area or at a particular location). If a yes determination is rendered, the process passes on to step 7404. In step 7404, the CP enables the boundary-distance mechanism. Further, the CP interfaces with the lead user to input a value of a distance threshold for the boundary-distance mechanism. That is, the boundary-distance mechanism can be based on: if a target user is within a particular distance threshold from an RA. For example, the boundary-distance mechanism might be satisfied if a target user is within 100 feet of a boundary or boundary line of an RA. After step 7404, the process passes on to step 7405. On the other hand, a no determination may be rendered in the processing of step 7403. If a no determination is rendered, then the process passes directly to step 7405. In step 7405, the CP interfaces with the lead user to determine if a boundary-cross-over mechanism is enabled. Accordingly, the processing of step 7405 determines if a target user is observed to take a photo, for example, while the target user is actually within the boundary of the responsive area, i.e. when the user has crossed over into the RA. As reflected at 7405', processing can use a respective geo-boundary (or geo-fence) of the responsive area and the observed area. Further details are described below with reference to FIG. 75. If yes in step 7405, the process passes on to step 7406. In step 7406, the CP enables the boundary-cross-over mechanism for the particular RA being processed or the group or batch of RAs being processed. Processing then passes on to step 7410. On the other hand, a no may be rendered in step 7405. As a result, the process passes directly to step 7410. In step 7410, the process passes back to FIG. 68 (step 7100).

Figure 72:
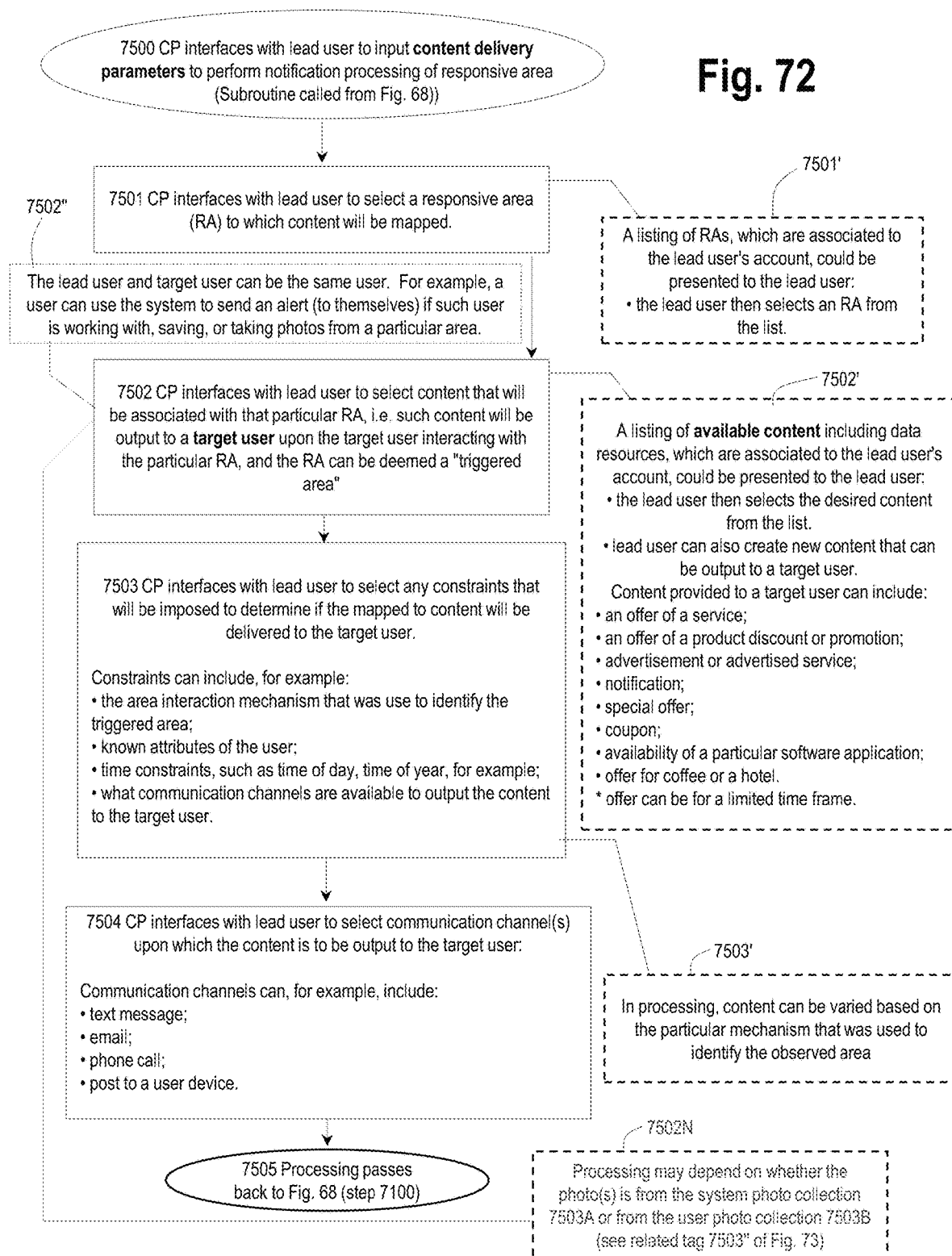
FIG. 72 is a flowchart showing details of "CP interfaces with lead user to input content delivery parameters to perform notification processing of responsive area".

FIG. 72 is a flowchart showing details of "CP interfaces with lead user to input content delivery parameters to perform notification processing of responsive area" subroutine 7500 as called from the processing of FIG. 68. As shown, processing is initiated in step 7500 and passes on to step 7501. In step 7501, the CP interfaces with lead user to select a responsive area (RA) to which content will be mapped. As referenced at 7501', a listing of RAs, which are associated to the lead user's account, could be presented to the lead user, and the lead user could then select an RA (or a plurality of RAs) from the list that is presented to the user. Then, the process passes on to step 7502. In step 7502, the CP interfaces with the lead user to select content that will be associated with that particular RA, i.e. such content will be output to a target user upon the target user interacting with the particular RA, and the RA thus can be deemed a "triggered area".

As referenced at 7502', a listing of available content including data resources, which are associated to the lead user's account, could be presented to the lead user. The lead user could then select the desired content from the list. The lead user can also create new content that can be output to a target user. Content provided to a target user can include: an offer of a service; an offer of a product discount or promotion; advertisement or advertised service; notification; special offer; coupon; availability of a particular software application; and/or an offer for coffee or a hotel, to name only a few illustrative examples. The offer can be for a limited time frame.

As referenced at 7502", the lead user and target user can be the same user. For example, a user can use the system to send an alert (to themselves), i.e. to send an alert in the future upon the predetermined criteria being satisfied, for example if such user is working with, saving, or taking photos from the particular area. As reflected at 7502N in FIG. 72, such processing may depend on whether the photo(s) is from the system photo collection 7503A or from the user photo collection 7503B (see related tag 7503" of FIG. 73). For example, an alert might only be sent if the photo is from the user photo collection 7503B. Such alert can be to provide the user with a warning regarding privacy concerns.

After step 7502, the process passes on to step 7503. In step 7503, the CP interfaces with the lead user to select any constraints that will be imposed to determine if the mapped to content will be delivered to the target user. Constraints can include, for example: the area interaction mechanism that was used to identify the triggered area; known attributes of the user; time constraints, such as time of day, time of year, for example; and/or what communication channels are available to output the content to the target user, to name only a few illustrative examples. As reflected ay 7503', in processing, content can be varied based on the particular mechanism that was used to identify the observed area and/or content can be varied based on any other attribute associated with the user, user device, human user, activity in which the user has engaged and/or other attribute. After step 7503, the process passes on to step 7504.

In step 7504, the CP interfaces with lead user to select communication channel(s) upon which the content is to be output to the target user. Communication channels can, for example, include: text message; email; phone call; and/or post or push to a user device. After step 7504, the process passes on to step 7505. In step 7505, the process passes back to FIG. 68 (step 7100).

FIG. 73 is a flowchart showing details of "CP interfaces with target user to perform notification processing" of subroutine 7600 as called from the processing of FIG. 68, in accordance with principles of the disclosure. As shown, processing is initiated in step 7600 and passes on to step 7601. In step 7601, the CP interfaces with the target user, to determine if the target user wants to "opt in" to "notification processing". As noted at 7601', the "opt in" processing of step 7601 can be performed when the user initially creates her account on the photo system, i.e. when the user initially signs up to be a user, for example. Alternatively, the decision of whether the user wants to opt in to notification processing can be done via interface with the user at any time as desired. If a no is rendered in step 7601, the process passes to step 7611. In step 7611, the CP saves data representing that the target user has not opted in to "notification processing". Accordingly, notification processing is not performed for the user.

If a yes determination is rendered in step 7601, the process passes to step 7602. In step 7602, the CP monitors activity of the target user for all enabled mechanisms, including: (a) search of photos associated with an area; (b) photos saved (by a target user) from an area (can be the user's own photos or photos of another), such as if the user actively takes a photo and the photo is saved in the user's photo collection on the user device, i.e. the user takes a "live" photo in a particular area, and/or (c) other activity or manipulation of photo(s) that are associated with a particular area, for example. The monitoring of step 7602 can include the determination processing of step 7602'. In step 7602', the CP can determine, based on the CP monitoring activity, if an "observed area" has been identified based on the activity of the target user. That is, has the target user interacted (e.g. photo saving or photo searching) with any area, so as to deem that area to be an "observed area". If no in step 7602', then the process passes on to step 7604. In step 7604, the processor waits to observe activity of the target user. The "wait" time of step 7604 can vary between a fraction of a second to minutes, for example. The particular wait time can be based on what communication channels are utilized and communication capabilities and bandwidth. Accordingly, after the wait time of step 7604, the process passes back to step 7602. For example, the processing of step 7602 can include the CP determining if data records have been updated based on activity of the user. With further reference to FIG. 73, a yes may be rendered in the determination processing of step 7602'. If a yes is rendered, the process passes from step 7602' on to step 7605. In step 7605, the CP performs processing to process the "observed area(s)" with which the target user has interacted. To perform such processing, the CP calls subroutine 7700 described below with reference to FIG. 74. After step 7605, the process passes on to step 7604. As described above, in step 7604, the processor, i.e. the CP, waits a predetermined amount of time, after which the processing returns to step 7602. In step 7602, the CP can again check appropriate data records to determine if activity of the target user has been observed. Related to the processing of step 7602 and 7602', as reflected at 7503', data to perform monitoring of the target user can be input from any available source. Such available source can include: interaction of the target user with the CP/system (e.g. searches of photos in an area); input of position/area of the target user via an "opened" app, e.g. an app running on the target user's cell phone; the coordinates (long-lat) that are embedded in meta-data of a photo with which the user engages or saves; the location at which the user takes a photo, i.e. takes a "live" photo, and/or other sources of data regarding activity of the target user.

As reflected at 7503", the photo database 123, of FIG. 1, can include different stores of photos. In particular, the photo database 123 can include a system photo collection 7503A and a user photo collection 7503B. The system photo collection can be a database that contains photos accessible to the overall user population of the photo system. That is, the system photo collection can be available to all users of the photo system or to a limited segment of the photo system users who are provided access to a particular group of photos. The user photo collection 7503B can include a database that is associated with a particular user. The user photo collection can contain photos collected and/or saved by the particular user. Functionality can be provided by which a user searches and identifies a photo in the system photo collection, and then saves such photo in that user's user photo collection. Such identification and saving of the photo can constitute activity that triggers an area to be deemed an "observed area". That is, such saving of a photo from the system photo collection to a user's user photo collection can result in the processing of steps 7602, 7602' deeming the area (from which the photo was taken) to be an observed area. Also, if the user takes a photo with her user device/cell phone, such live photo can be automatically saved in the user photo collection 7503B on the user's cell phone. Such activity can also trigger steps 7602, 7602'.

FIG. 74 is a flowchart showing details of "processor performs processing to process the "observed area" with which the target user has interacted" of subroutine 7700 as called from the processing of FIG. 73, in accordance with principles of the disclosure. As shown, processing is initiated in step 7700 and passes to step 7710. In step 77710, the CP determines interrelationship of the observed area vis-à-vis any RA (responsive area), and if an interrelationship trigger has been satisfied. Such processing can begin with step 7711. In step 7711, the CP determines if the observed area corresponds to an RA. Such correspondence may be constituted by the observed area and the responsive area indeed having the same unique area identifier. In other words, the CP may determine that the observed area and the RA are indeed the same area. Such processing might include the CP determining that a particular area is an observed area, in which activity of the target user has been identified— followed by a determination that such area is a responsive area. Other methodologies may be used to determine if a particular area is an observed area, and that such particular area is indeed a responsive area. If a yes is rendered in step 7711, the process passes on to step 7720. In step 7720, the CP determines if there are any constraints or restrictions imposed on an output of content so as to prevent an output of content (or otherwise vary the output of content in some manner). The CP can also determine if such constraints are satisfied, i.e. are such constraints triggered. If a no is rendered in step 7720, i.e. there are no constraints triggered to prevent the output of content, the process passes on to step 7730. In step 7730, the CP delivers content that is associated with the triggered RA. The particular communication channels in which the content is delivered (to the target user) can be based on the nature of the interaction with the observed area, attributes of the user, attributes of the content, and/or other attributes as desired. After step 7730, the process passes on to step 7740. In step 7740, the process passes back to step 7604 of FIG. 73. Processing then continues on as described above.

With further reference to FIG. 74, it may be the case that a yes is rendered in step 7720, i.e. it may be the case that the CP determines that there is a constraint in place and that the constraint is indeed satisfied. For example, a constraint might be that content is only output to the target user in a time window between 9 AM and 5 PM. Accordingly, for example, if the time is 10 PM, then no content would be output to the user even though a responsive area is triggered by activity of the user. Accordingly, as referenced at 7721', for example, a constraint could be the time of day. If a yes is rendered in step 7720, the process passes to step 7721. In step 7721, the CP saves data indicating that while an observed area was identified in process, such observed area did not "map into" any RA and/or applicable constraints were satisfied so as not to output the content.

With further reference to step 7711 of FIG. 74, a no may be rendered in such step 7711. As result, the process passes on to step 7712. In step 7712, the CP determines if the "boundary-cross-over mechanism" has been satisfied. For example, the CP determines does a boundary of the observed area cross-over a boundary of an RA. If yes, the process passes on to step 7720, and processing continues on as described above. If no in step 7712, the process passes on to step 7713.

In step 7713, the CP determines if the "centroid distance mechanism" has been satisfied. For example, is the distance from centroid of the observed area to centroid of an RA less than the distance threshold set in step 7402 (FIG. 71). If yes, the process passes on to step 7720, and processing continues on as described above. If no in step 7713, the process passes on to step 7714.

In step 7714, the CP determines if the "boundary-distance mechanism" has been satisfied. For example, does a boundary of the observed area come within a predetermined distance of a boundary of an RA, based on input in step 7404, FIG. 71. If yes, the process passes on to step 7720, and processing continues on as described above. If no in step 7714, the process passes on to step 7721. Processing then passes on as described above.

As reflected at 7711' of FIG. 74, the particular content delivered can depend on the trigger(s), i.e. the mechanism(s) satisfied, including a hierarchical arrangement in which content is delivered based on which (or how many) trigger(s) are satisfied. Accordingly, a hierarchy can be built into processing flow, as shown in FIG. 74, for example. As shown in FIG. 74, a hierarchy can include, in order, (a) if an observed area corresponds to an RA, (b) if a boundary-crossover mechanism has been satisfied, (c) if a centroid distance mechanism has been satisfied, and (d) if a boundary-distance mechanism has been satisfied. That is, in the processing of FIG. 74, if correspondence between the observed area and RA is determined in step 7711, then such determination can dictate the content sent to the target user. That is, in the illustrative processing of FIG. 74, satisfaction of the determination in step 7711 will control, and the determination processing of steps 7712, 7713 and 7714 will not be performed. It is appreciated, that the particular hierarchy can be varied as desired, by design of the process flow or code. Further, content that is associated with each level of the hierarchy can be varied based on the hierarchy. In some embodiments, the same content may be delivered regardless of whether one or all of the determination steps 7711, 7712, 7713, 7714 are satisfied. In some embodiments of the disclosure, the particular determination satisfied can control the content and/or each combination or permutation of satisfied determinations (of step(s) 7711, 7712, 7713, 7714) can control the particular content output to the user. That is, the processing of FIG. 74 can be varied such that all of the determination steps 7711, 7712, 7713, 7714 are performed regardless of whether one or all of such determination steps are satisfied.

Further, content that is delivered can be based on the type of photo, as determined by metadata and/or tagging of the photo(s). Type of photo can be based on digital image recognition processing, for example.

Also, content that is delivered can be based on other parameters including time of day, day of week, other time window, location, age of the user (i.e. the target user), if the user took the photo, if another user took the photo, other attributes of the user, and/or other attributes of the photo author, i.e. the user who took the photo, for example.

FIG. 75 is a schematic diagram illustrating various aspects and terminology of the processing of FIGS. 69-74. FIG. 75 illustrates the high level processing flow of notification processing. In step 7801, a lead user enters parameters to perform notification processing. Then, in step 7802, the CP monitors activity of the target user so as to perform notification processing. The CP can deliver content to the target user based on activity of the target user relating to photos vis-à-vis one or more responsive areas. As reflected at 7802", upon content being sent to a target user, such as in step 7730 of FIG. 74, an alert can be sent to a lead user. Such alert can advise the lead user of the delivery of content to the target user and various related information. Processing can also be performed to provide a time delay in the delivery of content. The time delay can be a predetermined number of hours or a predetermined time of day, e.g. For example, if activity of a user triggers a notification at any time in the day, the notification might be sent out at the end of the day, e.g. 6 pm.

As reflected at 7801', the lead user can interact with the CP, of the photo system, via a browser and/or app on user device. The user device can be in the form of a cell phone. Thus, the lead user can include or be in the form of an electronic user device. As reflected at 7802', the target user can interact with the CP, of the photo system, via a browser and/or app on the target user's device. The target user device can include a cell phone. Thus, the target user can include or be in the form of an electronic user device.

FIG. 75 further illustrates a responsive area (RA) 7811, which can be described as a first responsive area. Further, an observed area 7812 is illustrated, i.e. a first geographical area. The observed area 7812 can be an area in which activity of the target user is observed, such as at location or point 7812'. As described herein, notification processing can determine an interrelationship between an observed area 7812 and an RA 7811. As illustrated in FIG. 75, the observed area 7812 crosses over the RA 7811. Accordingly, such interrelationship between the observed area and the RA would at least satisfy the determination steps 7712 and 7714 of FIG. 74.

To explain in other words, as reflected at 7811', notification processing can include the CP saving a target user's interaction relating to photos from or associated with an area, and thus deeming the area an "observed area". One interaction may be sufficient to deem an area to be an observed area. Some other predetermined (threshold) number of interactions may need to be observed so as to deem an area an "observed area".

For example, upon a target user saving 3 pictures from an area to the user's user photo collection, such area can be deemed an observed area. For example, upon a target user performing 3 searches of an area, such area can be deemed an observed area. For example, upon a target user saving a "live photo" of an area, such area can be deemed an observed area. Accordingly, notification processing of the disclosure can provide various functionality related to, for example, photo related activity of a target user and the manner in which such activity interrelates with a responsive area (RA). Based on the interrelationship of the activity with an RA, content can be output to the target user in a predetermined manner.

Figure 76:
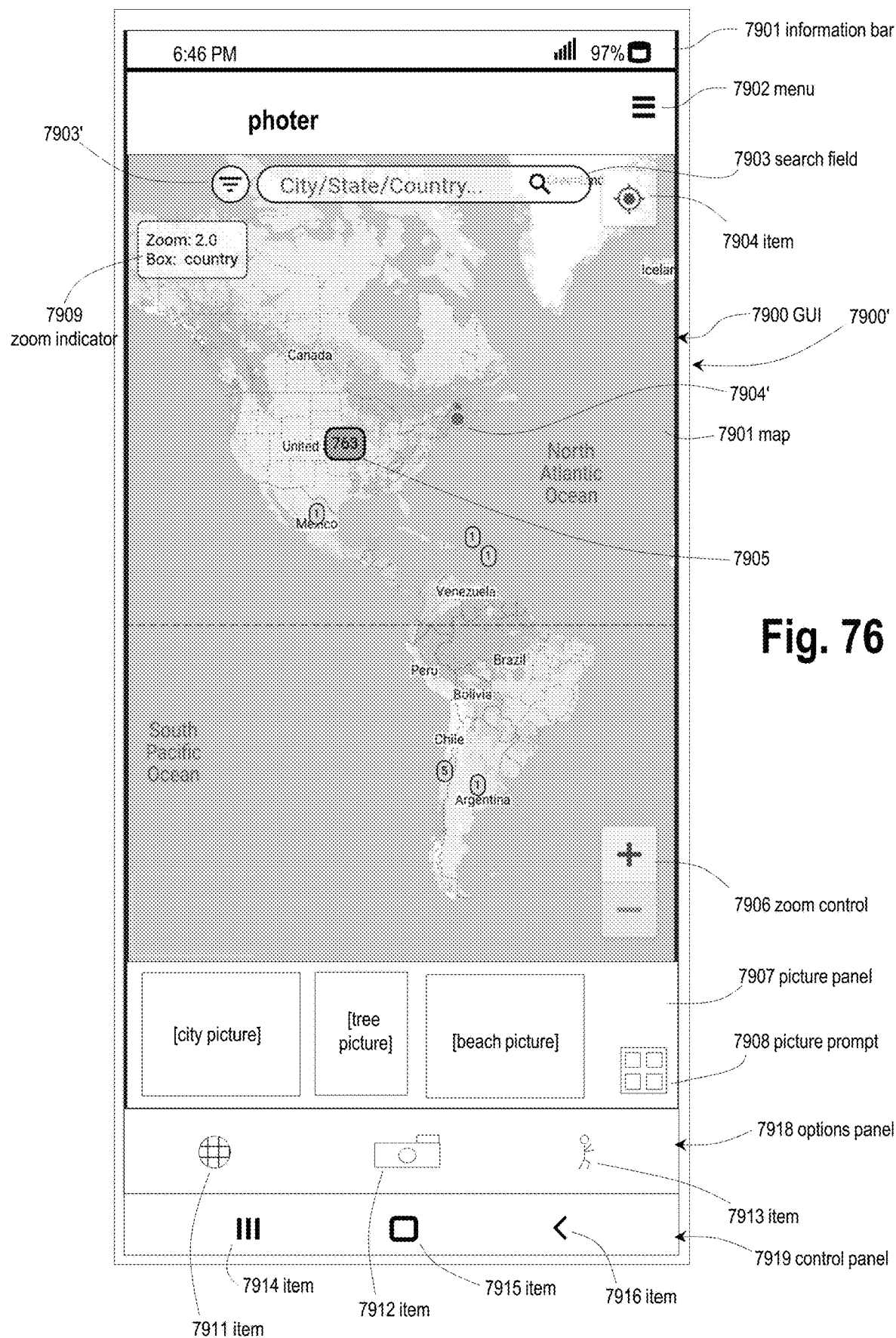
FIG. 76 is a diagram to show an illustrative GUI.

FIGS. 76-79 are diagrams that show illustrative GUIs. In a session between the CP 110 (see FIG. 1) and a user device 7900' shown in FIG. 76, the CP can provide data to the user device to display the various GUIs. FIG. 76 shows GUI 7900 that displays map 7901. A zoom control 7906 can control "zoom" and can allow a user to zoom in or out. A zoom indicator 7909 can indicate a degree of zoom, e.g. at the country level as illustrated in FIG. 76 or any other level. A search field 7903 can allow a user to search using city, state, country or other criteria—and the CP can display a list of search results. The user can choose from the list. Item 7903' can allow a user to display a photo filtering capability. A user can tap item 7904 and have the map 7901 reposition, with the user's position shown in the middle (of the map) by dot 7904' or other indicia. Item(s) 7905 can provide a density indicator of photos in a particular area, which can be based upon the zoom level. For example, map 7901 shows that there are 763 photos in the US.

The GUI 7900 can include a picture panel 7907. The user can select an area in the map 7901 and pictures from such area will display in the picture panel 7907. A picture prompt 7908 can be provided. A user can tap the picture prompt and have pictures (from a selected area) display on the full screen. To select an area, a user might tap an area, and the area might be darkened or shaded differently so as to show selection of such area.

The GUI 7900 can also include a control panel 7919. The control panel 7919 can provide functionality for viewing of photos. Once an area in the map 7901 is selected, item 7916 can be tapped so as to automatically progress through photos from that area. Such viewing of photos can be expanded so as to take up the full area that is consumed by map 7901. Item 7914 can be provided so as to pause the progression through the photos. Item 7915 can be provided to allow a user to stop such review of photos, and return to the GUI shown in FIG. 76, for example. Various other functionality can be provided so as to display, manipulate, and advance through photos from a particular area, and to show different information on map 7901.

Figure 79:
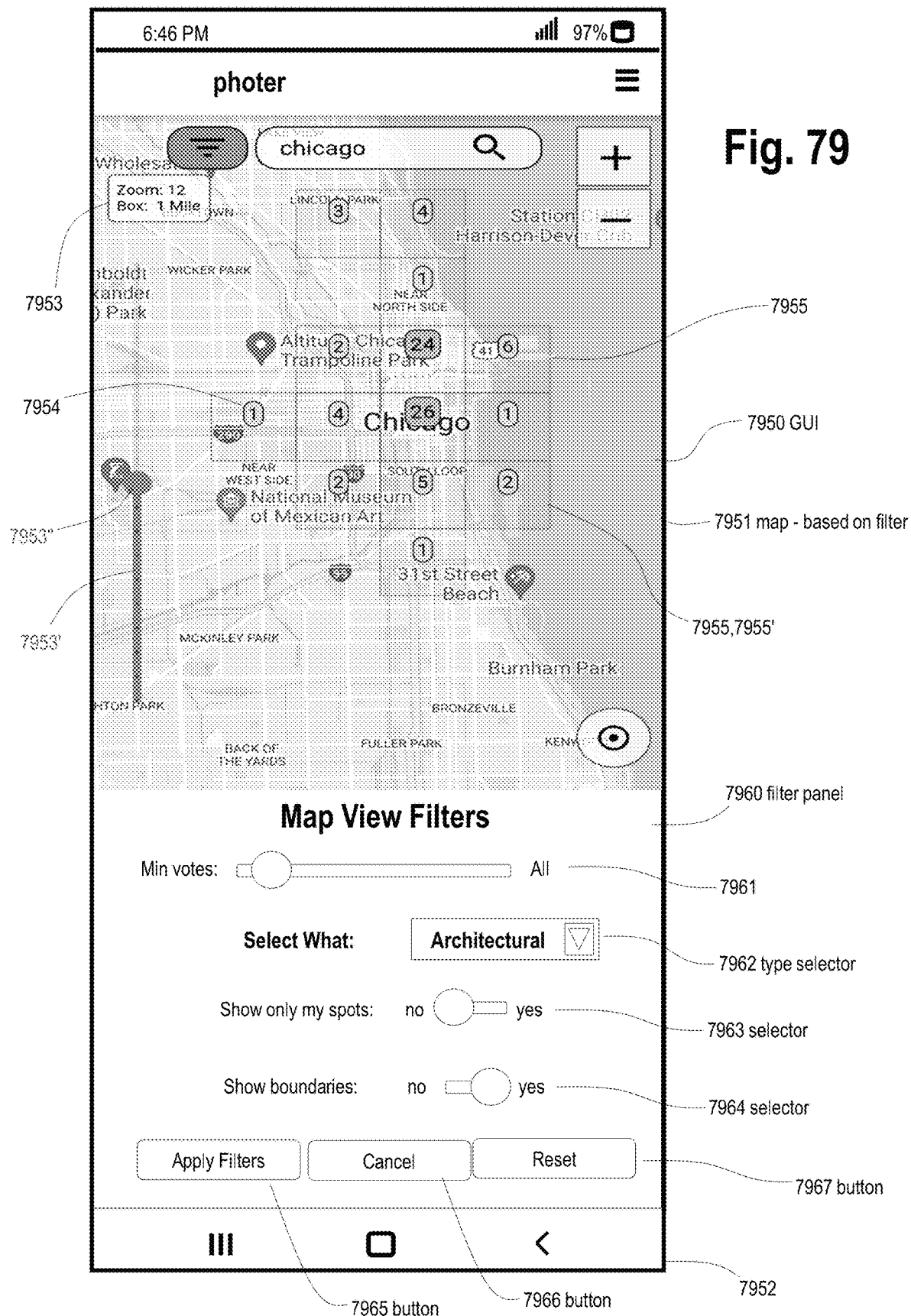
FIG. 79 is a diagram to show a further illustrative GUI.

As shown in FIG. 79, the GUI 7900 can also include various additional options in options panel 7918. A GUI item 7911 can be selected by the user to access photos or other content of the user. The GUI item 7912 can be selected so as to provide functionality to take a photo. The GUI item 7913 can be selected by a user so as to access the user's saved photo walks (group pictures in a concentrated area). Also, the GUI item 7902 can provide the user with a variety of additional menu options. It is appreciated that additional GUI items can be provided so as to provide access to additional functionality. The user device 7900' can include functionality and/or mechanisms of known user devices, such as information bar 7901, to display battery power.

Figure 77:
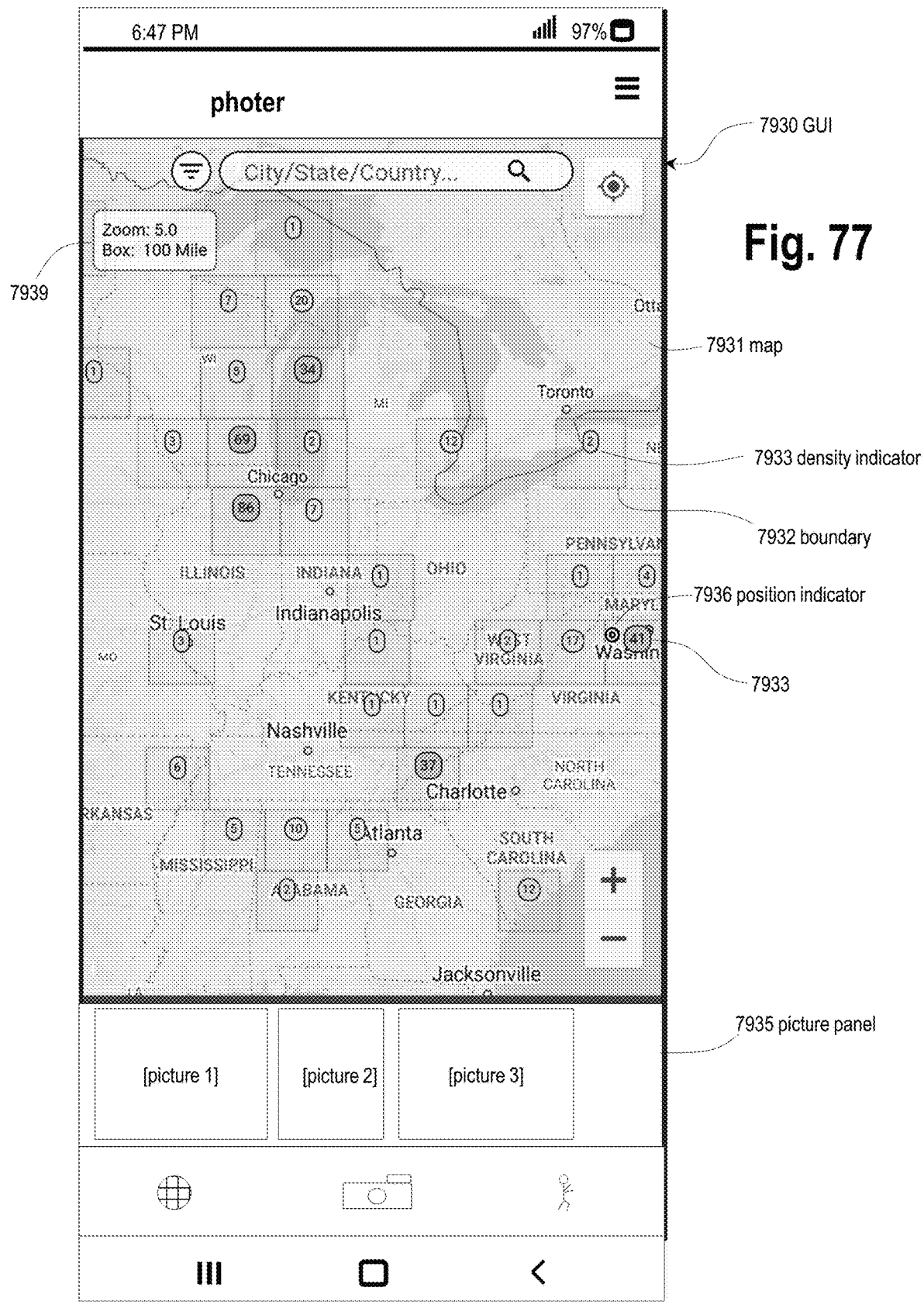
FIG. 77 is a diagram to show a further illustrative GUI.

FIG. 77 is a diagram showing a further GUI 7930. The GUI 7930 is at a different zoom level as compared to FIG. 76. As indicated by zoom indicator 7939, the displayed map 7931 is zoomed to show boxes (of 100 mile×100 mile area), which include at least one photo, in this example. Density indicators 7933 can be displayed on the map to show how many photos are in each area. For example, the area of Washington, DC includes 41 photos. The boxes can be demarcated by boundaries 7932. The position of the user can be shown by indicator 7936. Picture panel 7935 and other features can be provided in the GUI 7930, similar to those described above with reference to FIG. 76.

Figure 78:
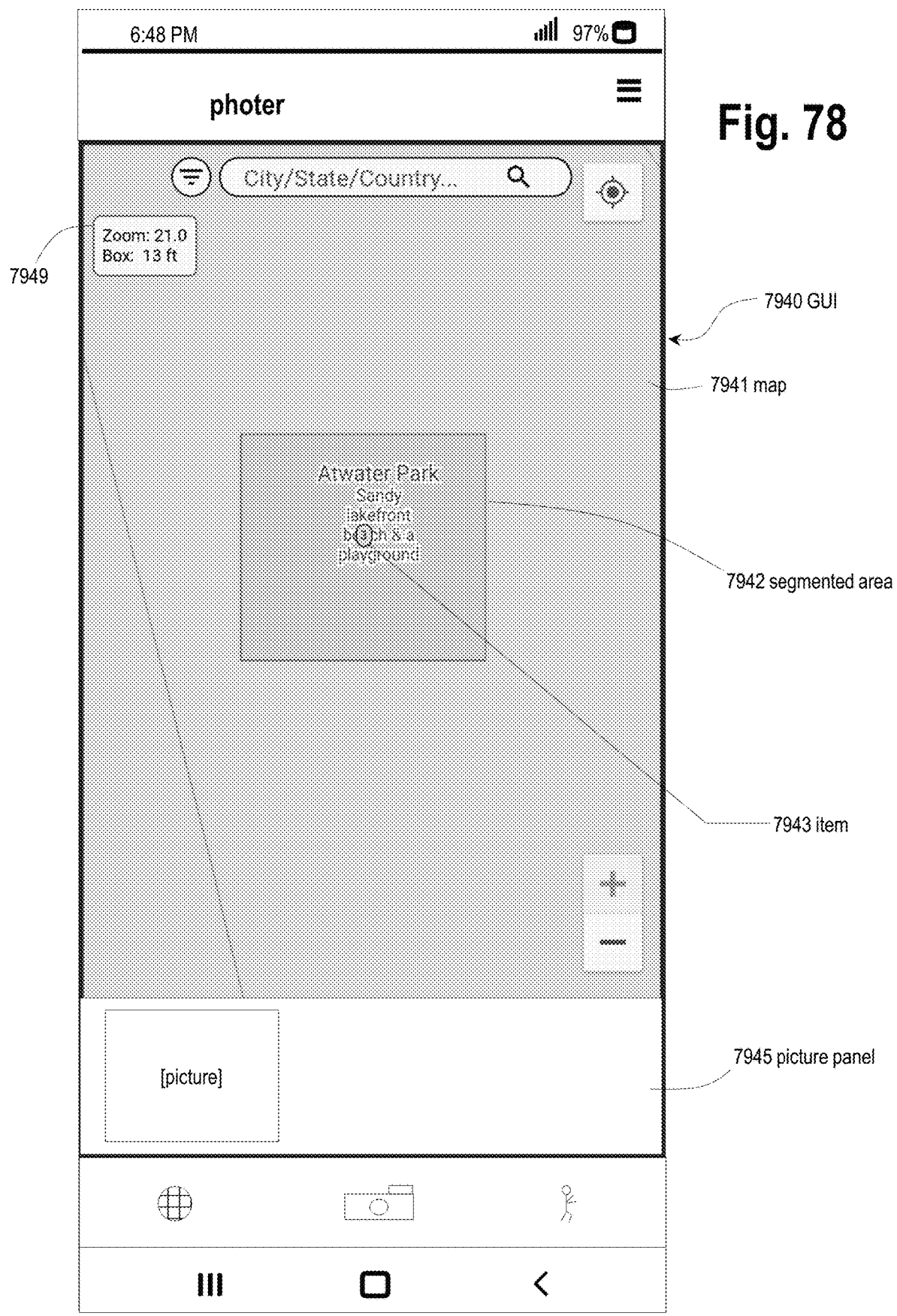
FIG. 78 is a diagram to show a further illustrative GUI.

FIG. 78 is a diagram showing a further GUI 7940. The GUI 7940 is at a different zoom level as compared to FIG. 77. As indicated by zoom indicator 7949, the displayed map 7941 is zoomed to show box, i.e. segmented area, 7942 that is 13 feet square, which photo density indicator 7943 shows to include 3 photos. Density indicators can be displayed on the map to show how many photos are in each area. Picture panel 7945 and other features can be provided in the GUI 7940, similar to those described above with reference to FIG. 76.

FIG. 79 is a diagram showing a further GUI 7950. The GUI 7950 is at a different zoom level as compared to FIG. 76. As indicated by zoom indicator 7953, the displayed map 7951 is zoomed to show boxes (of 1 mile×1 mile), which include at least one photo. Density indicators 7954 can be displayed on the map to show how many photos are in each area.

The GUI 7950 includes a filter panel 7960. The filter panel 7960 can include a vote threshold selector 7961. The vote threshold selector 7961 can be moved, i.e. swiped left or right, by the user so as to vary a threshold number of photos that an area must have to be displayed. As shown in FIG. 79, the selector 7961 is set at the minimum votes, i.e. one vote or photo, required to show a segmented area 7955. For example, the selector 7961 could be set at a value of 5, or any other value as desired. Such value of 5 indicates that 5 photos, i.e. votes in this example, would be required so as to show the segmented area on the map 7951. In this illustrative functionality, if the selector 7961 is slid all the way to the right, then all the segmented areas that have been identified, in the area of the map 7951, will be displayed. The filter panel 7960 can include a type selector 7962, which can be set by the user. The type selector can be set to control what types of photos are reflected in the map 7951. Accordingly, with the setting of "architectural", only photos that are tagged as "architectural" will be considered in the display of map 7951. Accordingly, for example, the South Loop area shown in map 7951 includes five (5) photos that are tagged as architectural. Selector 7963 allows a user to show spots based on all users or spots based on just the particular user's own spots. That is, if the "show only my spots" is set to "yes" then only photos of the particular user will be considered in the generation of map 7951, and if set to "no", then photos of all users will be considered. A show boundaries button 7964 can be provided so a to control whether boundaries 7955', of a segmented area 7955, are shown in the map 7951.

The filter panel 7960 can include an apply filters button 7965, which can be tapped so as to apply any filters that are enabled, including the filters provided in filter panel 7960. Button 7966 can be tapped so as to cancel any applied filters. Thus, map 7951 would be displayed without any filters applied. Button 7967 can be provided so as to reset filters to a default setting and/or reset filters to some predetermined setting or some other setting. Various other functionality as described herein can be provided to the user. A control panel 7952 and other features can be provided in the GUI 7950, similar to those described above with reference to FIGS. 76-78. Also, an additional "zoom" control 7953' can be provided, so that the user can slide a control button 7953" up and down—so as to control the zoom of the displayed map 7951.

Figure 80:
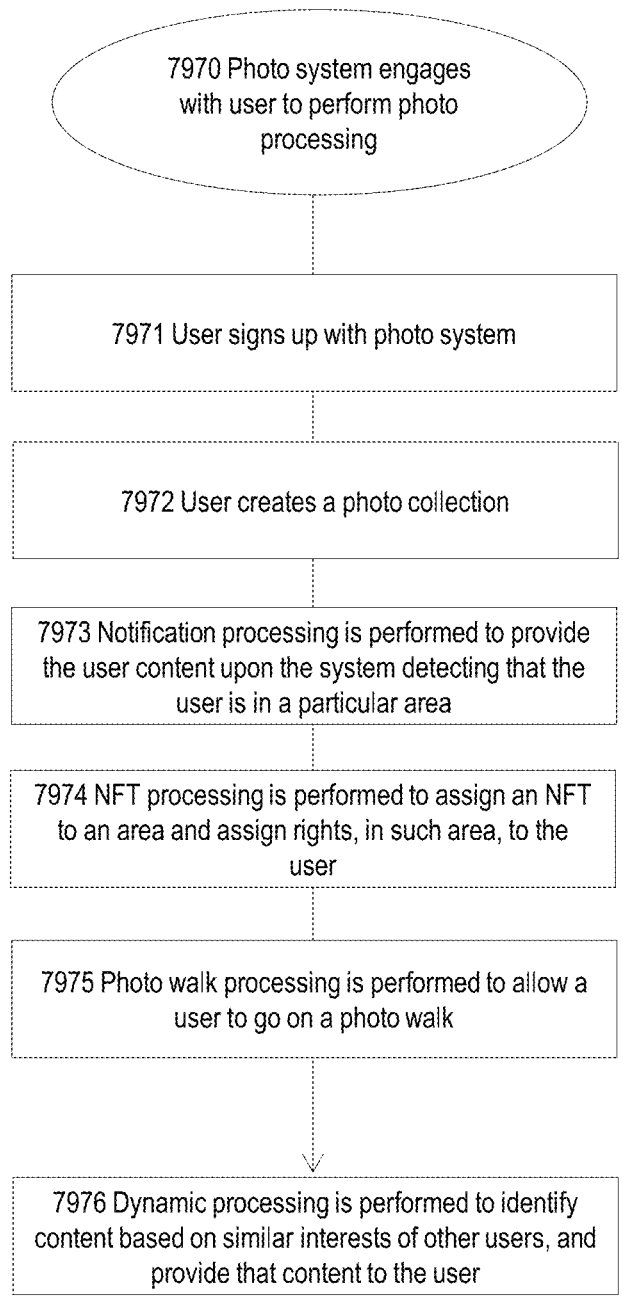
FIG. 80 is a flowchart provided to shown various photo processing that can be performed by a user.

FIG. 80 is a flowchart provided to shown various photo processing that can be performed by a user through interaction with the photo system 110. As shown, the processing starts in step 7970 and passes onto step 7971. In step 7971, the user signs up with photo system. Then, in step 7972, the user creates a photo collection. Then, in step 7973, notification processing is performed to provide the user content upon the system detecting that the user is in a particular area. Then, in step 7974, NFT processing is performed to assign an NFT to an area and assign rights, in such area, to the user. Then, in step 7975, photo walk processing is performed to allow a user to go on a photo walk. Then, in step 7976, dynamic processing is performed to identify content based on similar interests of other users, and provide that content to the user. Various other processes described herein, which are not shown in FIG. 80, can be used in conjunction with the processing shown in FIG. 80.

Hereinafter, further embodiments of the disclosure will be described. In an embodiment of the disclosure, systems and methods will be described relating to non-fungible token (NFT) processing, or more generally as "token" processing. The system can be described as including an NFT system. The system can perform NFT processing and can interface with a user through a suitable user interface, user device, or in some other suitable manner Processing can include (a) geographic segmentation that links uniquely identified physical locations and (b) associating each uniquely identified physical locations to a respective NFT. An NFT can be described as a non-interchangeable unit of data stored on a blockchain, a form of digital ledger, that can be sold and traded. Further details are described below.

Figure 86:
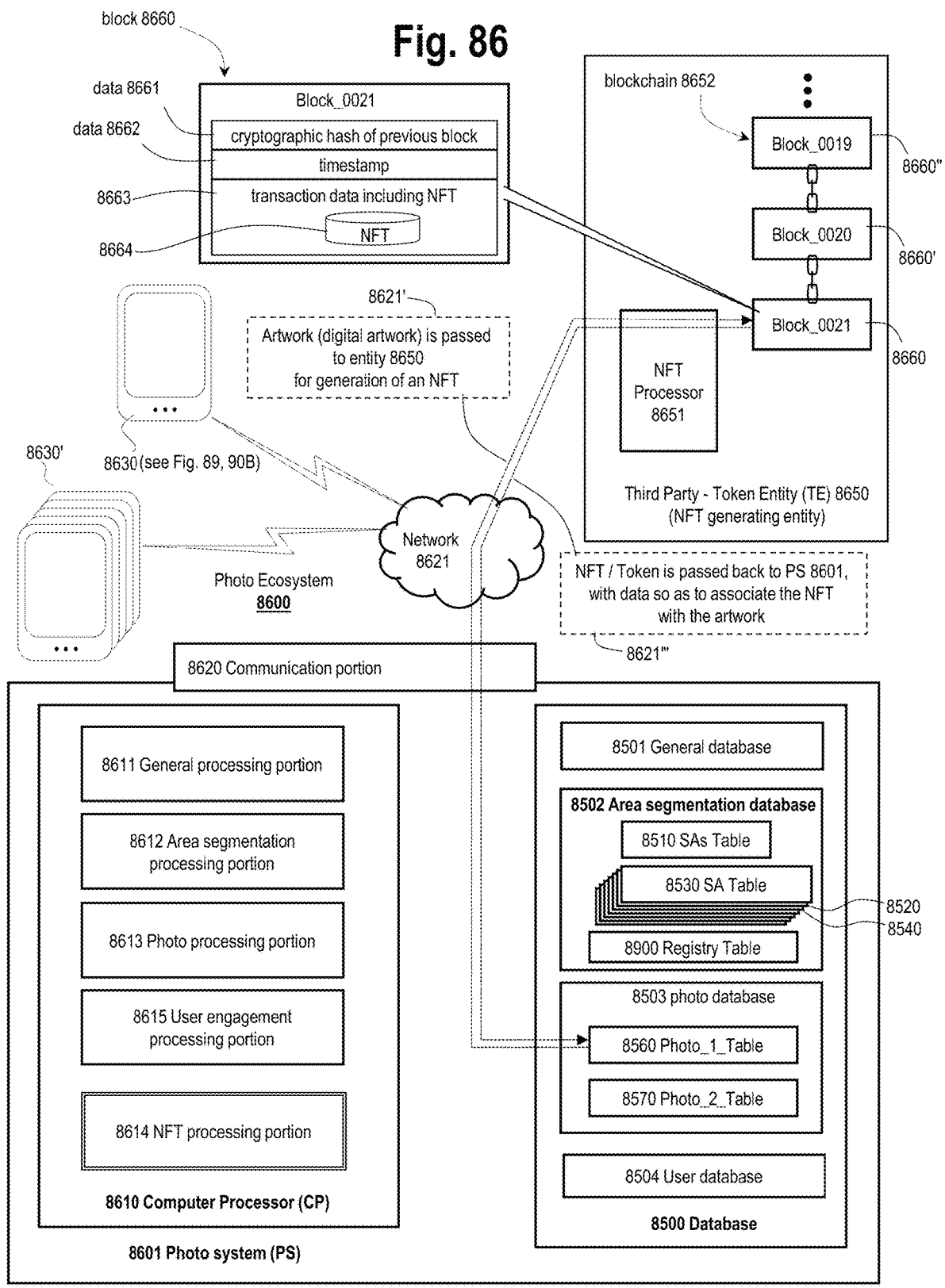
FIG. 86 is a schematic diagram showing details of a photo ecosystem 8600.

The NFT processing can provide a service to facilitate the identification, reservation, recordation, exchange, or other transaction of a segmented area or area. The "segmented area" or "area" can be a geographical area and can also be described as a "site". The exchange of an area, for example, can be through sale, lease, use or other claim to the area. The transaction can include optioning or lining up for a future reservation. Such various processes that can be effected on an area can be described as a transaction of a segmented area (SA) or area. A particular segmented area (SA) can be described as a virtual asset (VA) or as a virtual property. A user can interact with the system to perform NFT processing via a user interface on a portable electronic device, such as a cell phone. The system or photo system, as illustrated in FIG. 86, can be disposed on a server or application server. The SA or area can be determined in any manner as described herein. Also, the user can determine the SA, i.e. the geographic demarcations of an area that constitutes the SA. The SA, including borders of the SA, can be presented on a user device of the user. The SA can be presented in the form of a map, outline, or geo-border. The SA can be associated with one or more photos that were taken within the boundaries of the SA. That is, the geographic location (GPS coordinates) at which the photo or picture was taken, such as using the camera of a cell phone, is within the boundaries of the particular SA and is embedded in the photo. The photo constitutes artwork that is associated with the SA. The photo, i.e. the artwork, can be output to an external entity. The external entity can associate an NFT or other token with the photo or artwork. Accordingly, the NFT is associated with and represents the artwork. In turn, the NFT can be associated with and represent the SA in which the artwork is located. Accordingly, a one-to-one relationship can be provided between and SA and a respective NFT that is associated with the SA.

The photo, upon which the NFT is based, can be a photo that was taken for the purpose of creating an NFT. Also, the photo might be retrieved from a gallery of photos that corresponds to the particular SA. The SA can be associated with a unique area identifier or identification. The SA can be associated with any identifier described herein, including an alphanumeric identifier. The SA, i.e. the geographically segmented area, can be identified and flagged by a user via a user device. Illustratively, in a transaction of the disclosure using the SA associated with an NFT, the SA can be reserved, claimed, or optioned for future action or used by a user. Such transaction can be saved in a registry or spreadsheet, such as is shown in FIG. 91, so as to provide a permanent record of the transaction. Processing can be performed so as to document a purchase of a SA, wherein the SA is represented by the associated NFT. The user who purchases the SA can be identified, in a registry, as the owner of the SA. A user can lease a SA, for example. Also, the NFT processing allows a SA to be tagged for development or use in such applications as software, games, advertisements, artistic endeavors, business endeavors, or other functionality by a user. The SA can be exchanged, whether by sale or trade, from one user to another user, such that the subsequent user is deemed the "owner" of the SA. The NFT processing can include the generation of an alert or notification. The alert can be set up by a first user so as to be sent, upon a triggering event being observed, to the first user or some other user. The triggering event can be a predetermined action that is experienced by the SA. For example, the predetermined action can be sale of a SA. Accordingly, upon sale of the particular SA, the owner of the SA and other users can be notified.

As described herein, the NFT processing relates to generating an NFT (through a third party) based on artwork that is associated with a particular segmented area (SA) which can include or be associated with a unique area identifier. As a result, the NFT is associated with the particular SA and can serve to represent the SA. It is appreciated that the SA may be in a wide variety of shapes, such as rectangular, circular, spherical, or any other shape as desired. Multiple SAs can be combined to form a SA, or in other words, multiple child SAs can be combined to form a parent SA. Also, in other words, multiple lower level SAs can be combined so as to form a higher level SA. An SA might also be described as a "site". For example, multiple child SAs can be combined so as to form a parent SA or site. Such processing is further described with reference to FIGS. 90A, 90B, and 90C as described below, for example.

As described above, a SA used in NFT processing of the disclosure can be any of a wide variety of shapes. The SA can be identified using any identification system, such as those described herein. The SA can be formed using any methodology, such as those described herein for forming or demarcating a geographical area or segmented area. The SA used in NFT processing can also be based on identifiable demarcations or boundaries, for example. For example, the SA might be based on a province, state, county, city, town, venue, point of attraction, or some other identifiable thing. The SA used in NFT processing can be a contiguous uninterrupted geographical area. Alternatively, the NFT processing can allow for the removal of smaller, lower level areas within a higher level area. In other words and or similarly, a larger SA can be permeated with smaller SAs, so as to provide a "Swiss cheese" arrangement. The larger SA and the smaller SAs can all be represented by respective photos, upon which are based respective NFTs. As described above, the NFT processing can include various transactions associated with a SA. For example, a transaction might be sale of a SA. An SA might include reserving an area, for a limited time frame, for a future transaction. The future transaction might include to buy, lease, sublease, or make other claim to the SA. An option might be provided if the particular SA is not currently available for sale or for other desired transaction. Transactions performed in the NFT processing described herein can be based upon and/or contingent upon a photo being generated in the particular SA at some predetermined time, so as to be able to generate an associated NFT in some predetermined time or select an existent representative NFT if desired. Transactions performed in NFT processing can be based upon and or contingent upon an NFT being generated for the particular SA and/or for a photo within the SA. As described herein, a first SA can include a photo, i.e. a first photo, within its boundaries, i.e. the location at which the photo is taken or otherwise associated is within the boundaries of the first SA. The photo, as a piece of artwork, can be associated with an NFT, i.e. a first NFT. In turn, the first SA can be associated with the first NFT via the photo. The first SA can then be selected by a user to be broken into 2 parts, which might be described as a second SA and a third SA. The first SA might be described as the parent SA. The second and third SA might be described as the children SA. Once the first SA is broken up, the photo will be either in the second SA or the third SA. Say, for example, the photo is in the second SA. Then, the photo with associated NFT can be used to represent the second SA. A new photo, i.e. a second photo, can then be identified so as to represent the third SA. This new photo can be associated with a new NFT, i.e. a second NFT. As result, the third SA can be also associated with the new NFT. Accordingly, the first NFT can be used to represent both the first "parent" SA and the second "child" SA. The second NFT can be used to represent the second "child" SA. In this manner, there can be provided one-to-one correspondence between each SA and a corresponding NFT.

Alternatively, in some embodiments, the parent SA (with a first photo within its boundaries) can be associated with a first NFT based on the first photo; the first child SA (with a second photo within its boundaries) can be associated with a second NFT based on the second photo; and the second child SA (with a third photo within its boundaries) can be associated with a third NFT based on the third photo. Accordingly, in this embodiment, each of the parent SA, the first child SA, and the second child SA can be respectively associated with first, second, and third NFTs.

For example, a user might be described as a property owner of a parent SA. Through the processing of the disclosure, the user might divide the parent SA into a first child SA and a second child SA. The first child SA can be associated with the first NFT. The second child SA can be associated with a second NFT. The user, property owner, can opt to offer the second child SA for sale, with the second child SA being represented by the second NFT. The user might opt to retain or not sell the first child SA. Through the processing of the disclosure, the second child SA, as represented by the second NFT, can then be sold to a second user. The second user can then be described as a property owner of the second child SA. In similar manner, other transactions can be performed instead of sale of the property, such as lease, use, some other claim, an optioning of the SA, dedication of the property from some specified use, preclusion of the property of some specified use, a limitation on future transaction regarding a property, or some other constraint, for example.

In accord with an aspect of the disclosure, a first SA can be displayed on a map that can be viewed on a user device, such as a user's cell phone. A graphical representation can be provided to show a particular disposition of the first SA. For example, if the first SA is being offered for sale, then the first SA could be shown in a particular color and/or be provided with a particular type border. For example, a dashed border might indicate that the particular SA is for sale. A code or legend can be provided and displayed on the user device. The code or legend can indicate that properties shown in a particular color are for sale. Accordingly, a SA can be provided with coding to reflect a particular disposition of the SA (e.g. that the SA is for sale) and a legend can be provided on the user device so as to inform the user of the meaning of the coding. Accordingly, various information regarding disposition of the SA can be provided to the user in the form of a map that is visually displayed on the user's cell phone, or other user device.

In embodiments of the disclosure, the processing can include an alert being (1) set up, and (2) sent to one or more users upon certain activity being observed with regard to a particular SA. For example, if a SA is "put on the market" for sale by a first user, then an alert can be sent to a second user. For example, an alert can be set up so as to be triggered upon a SA being subject of a particular transaction, and then, the alert being sent to predetermine user(s) upon that particular transaction being observed. For example, an alert might be set up so as to be triggered upon a transaction being entered into a registry, such as the registry shown in FIG. 91. An alert, which is set up to be triggered and triggered based on some observed transaction (or other activity) of a SA can be output to any user, person, or entity as desired. For example, such an alert could be output to the owner or property owner of the SA and users who are interested in purchasing the SA, for example.

Figure 81:
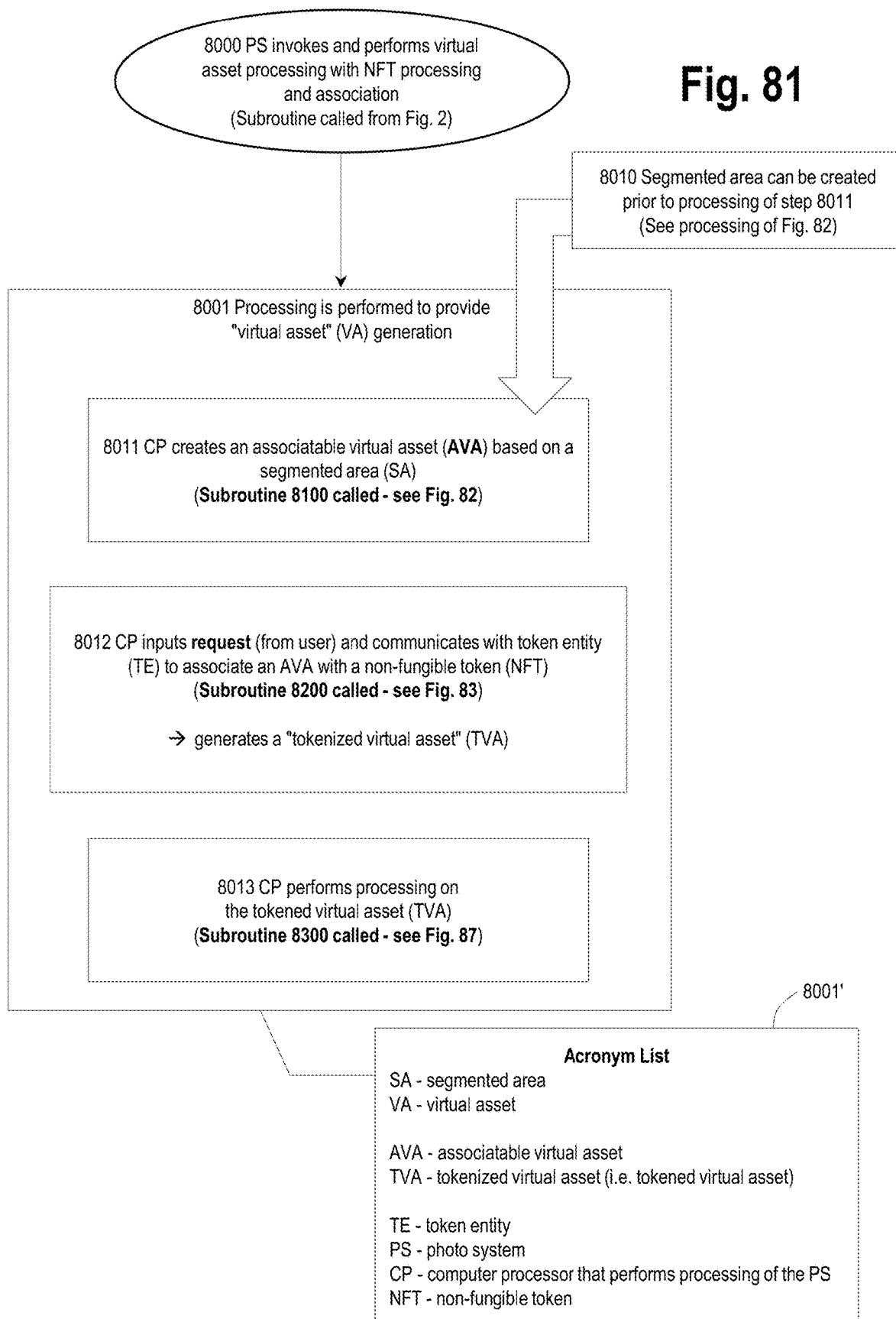
FIG. 81 is a high level flowchart showing features of NFT processing.
Figure 83:
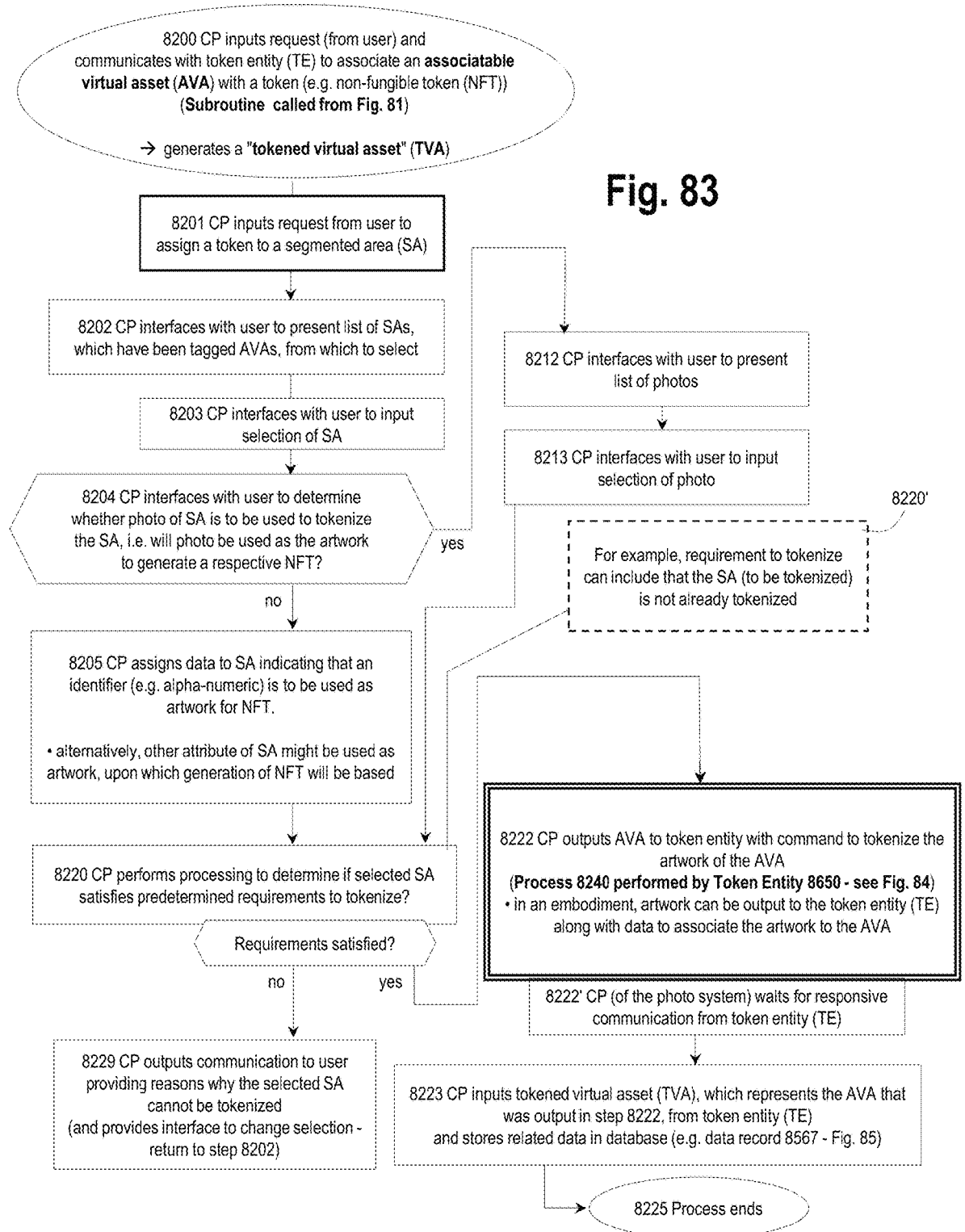
FIG. 83 is a flowchart showing processing to associate an AVA with a token.
Figure 84:
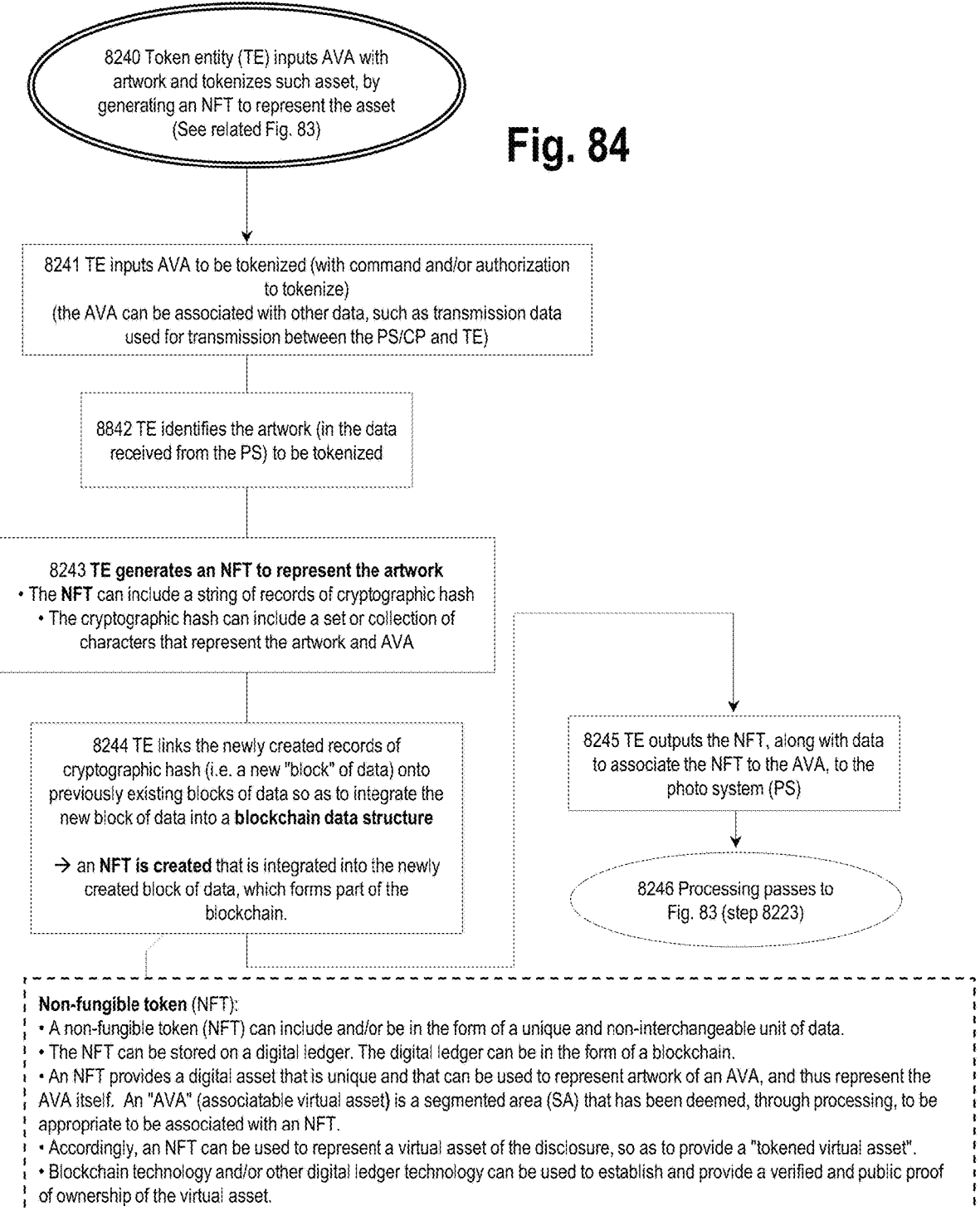
FIG. 84 is a flowchart showing processing in which the token entity (TE) 8650 inputs an AVA from the photo system 8601 and generates an NFT.
Figure 85:
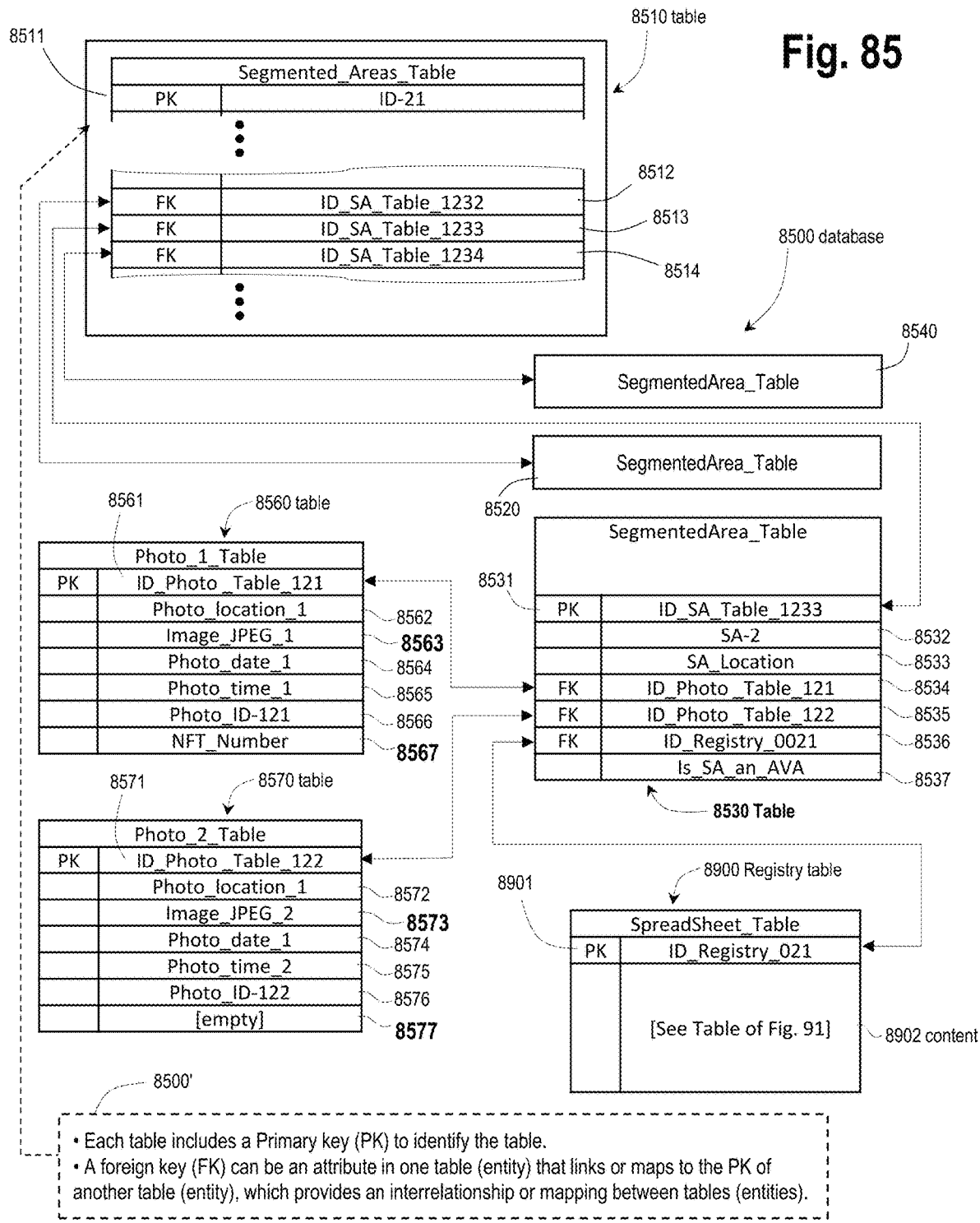
FIG. 85 is a schematic diagram of a database.

FIGS. 81-92, as described below, show various details of systems and methods to provide NFT processing, in accordance with principles of the disclosed subject matter. FIG. 81 is a high level flowchart showing features of NFT processing. FIGS. 82-84 and 87-88 or further flowcharts showing additional details of NFT processing. FIGS. 85 and 86 are schematic diagrams showing a database 8500 and photo ecosystem 8600 that supports NFT processing as described herein.

More specifically, FIG. 81 is a high level flowchart showing "photo system (PS) invokes and performs virtual asset processing with NFT association" step 8000. Such processing can be performed by the photo system (PS) 8601 of FIG. 86. As shown in FIG. 86, the PS 8601 can include a computer processor (CP) 8610 and a database 8500. In one embodiment, the processing of FIG. 81 can be in the form of a subroutine that is called or invoked from the high level processing of FIG. 2. As shown in FIG. 81, the process starts in step 8000, with the invocation of the subroutine, and passes onto step 8001. In step 8001, processing is performed to provide virtual asset (VA) generation. Step 8001 can include step 8012, step 8013, and step 8014. In step 8011, the CP creates what is described herein as an associatable virtual asset (AVA) based on a segmented area (SA). Such processing can be performed by subroutine 8100 being called or invoked. Further details are described with reference to FIG. 82. Relatedly, the processing of step 8010 can be performed. As shown in FIG. 81, in step 8010, a segmented area (SA) is created. Such a SA can be created using any of the processes described herein. Further details are described below with reference to FIG. 82.

Figure 87:
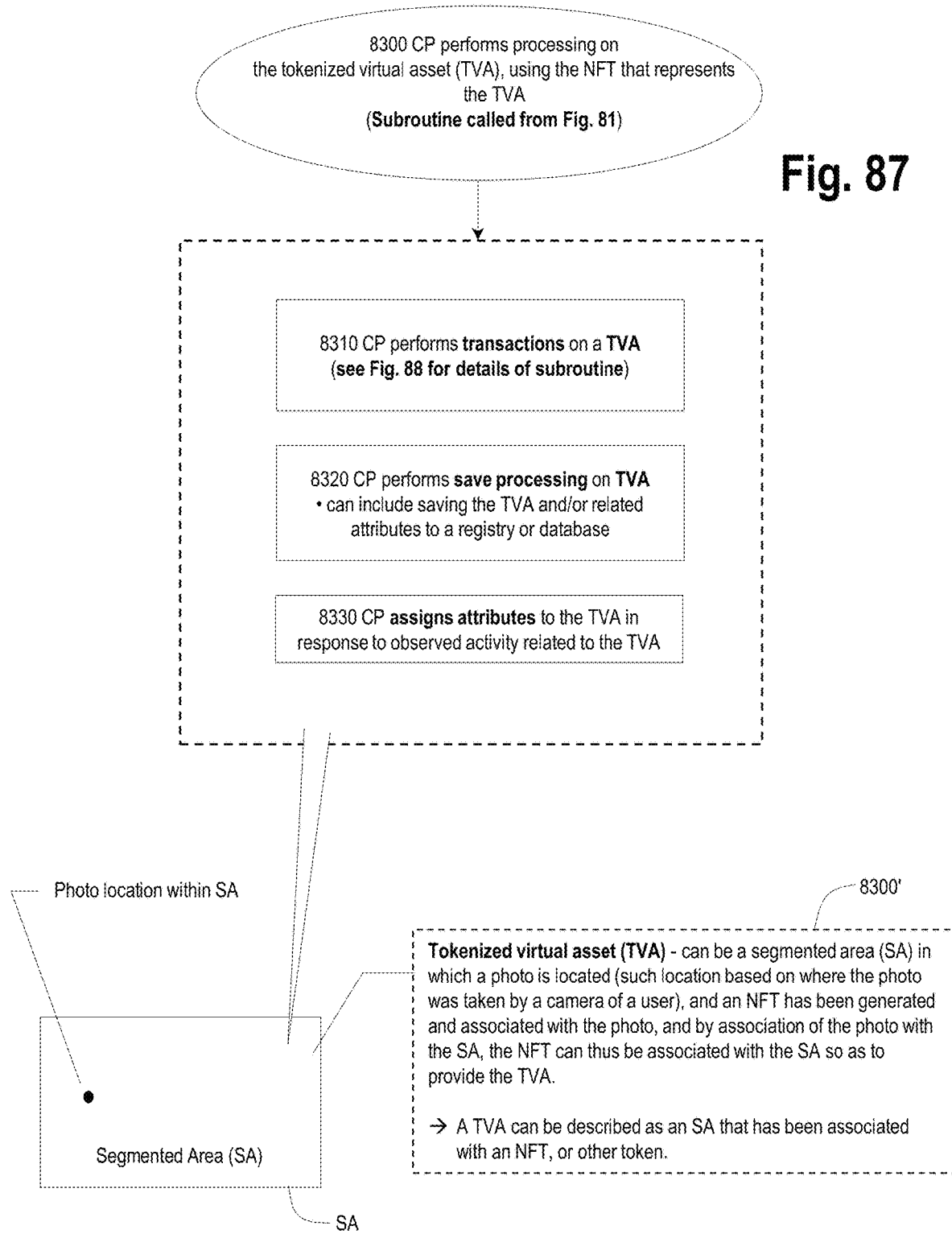
FIG. 87 is a flowchart showing in further detail processing performed on the tokenized virtual asset (TVA).

Also, the processing of step 8001 can include step 8012. In step 8012, the CP, of the photo system, inputs a request from a user to associate an NFT with an AVA. The AVA can have a unique identifier associated therewith, in the photo system. The CP then communicates with a token entity (TE) to generate the NFT. Accordingly, an NFT can be associated with the AVA, by virtue of the NFT being associated with a photo in the particular SA. That is, such photo has GPS coordinates that are within the boundaries of a SA, and the AVA is based on such SA. As a result of the processing of step 8002, a tokened virtual asset or tokenized virtual asset (TVA) can be generated by the token entity (TE) if a representative TVA does not already exist or is not already used. To perform step 8012, the CP calls or invokes subroutine 8200. Details of subroutine 8200 are shown in FIG. 83. Also, the processing of step 8001 can include step 8013. In step 8003, the CP performs processing on the tokened virtual asset (TVA). To perform step 8013, the CP calls or invokes subroutine 8300. Details of subroutine 8300 are shown in FIG. 87.

FIG. 81 shows acronym list 8001'. The acronym list lists various acronyms used in the description of NFT processing described herein. The list includes: SA—segmented area; VA—virtual asset; AVA—associatable virtual asset; TVA—tokenized virtual asset (i.e. tokened virtual asset); TE—token entity; PS—photo system; CP—computer processor that performs processing of the PS; and NFT—non-fungible token.

Figure 82:
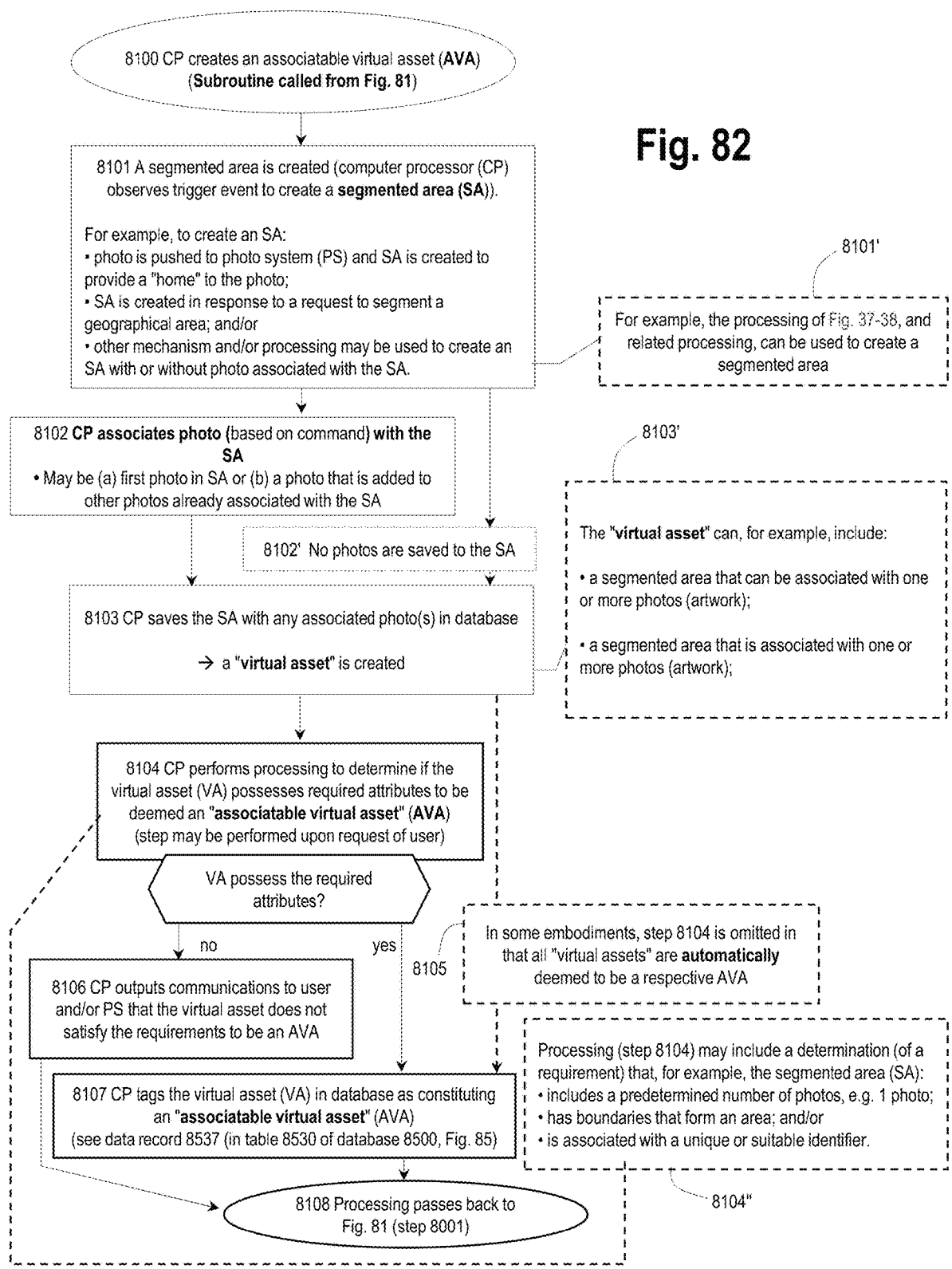
FIG. 82 is a flowchart showing in further detail the "CP creates an associatiable virtual asset (AVA)" processing.

FIG. 82 is a flowchart showing in further detail the "CP creates an associatable virtual asset (AVA)" processing of subroutine 8100, as called or invoked from the processing of FIG. 81. As shown in FIG. 82, the subroutine is initiated in step 8100, with the call of the subroutine, and passes to step 8101. In step 8101, a segmented area (SA) is created. Creation of the CP can include the CP observing a trigger event to create a SA. Any of the processes described herein can be used to create to create a SA. As reflected at 8101', the processing of FIGS. 37-38 and related processing, can be used to create a segmented area. For example, to create a SA (segmented area), a photo can be pushed to photo system (PS) and a SA is created to provide a "home" to the photo; a SA can be created in response to a request to segment a geographical area; and/or other mechanism and/or processing may be used to create a SA with or without a photo associated with the SA. In some embodiments, the SA may be created prior to the processing of subroutine 8100, as reflected in step 8010 of FIG. 81. After step 8101, the processes passes to step 8102. In step 8102, the CP can associate a photo (based on a command input from a user or from another processing component, for example) with the SA. The input photo may be (a) first photo in SA or (b) a photo that is added to other photos already associated with the SA, for example. The process then passes on to step 8103. Alternatively, as reflected at 8102', the processing can advance to step 8103 without any photos being saved to the SA. In step 8103, the CP saves the SA with all associated photo(s), if any, in a database, such as the database 8500 shown in FIG. 86. Accordingly, a "virtual asset" is created in accordance with an embodiment of the disclosure. As reflected at 8103', the "virtual asset" can, for example, include: a SA that can be associated with one or more photos (artwork), but no photo is currently associated with the VA; or a SA that is associated with one or more photos (artwork), for example. The SA can be associated with an identification number, an alphanumeric, or other indicia so as to uniquely identify the SA. Any of the processes described herein can be used to provide an identifier or identification to the SA.

After step 8103, the process passes to step 8104. In step 8104, the CP performs processing to determine if the virtual asset (VA) possesses required attributes to be deemed an "associatable virtual asset" (AVA). Such step 8104 may be performed upon request of user, such as in anticipation of (or in conjunction with) the user requesting that an NFT be associated with the VA. As reflected at 8104', the processing (of step 8104) may include a determination of whether or not a requirement is satisfied. For example, requirement(s) may include, for example, that the segmented area (SA): (a) includes a predetermined number of photos, e.g. 1 photo; (b) has boundaries that form an area; and/or (c) is associated with a unique or suitable identifier. Any other requirement(s) can be imposed as desired. That is, the processing can determine whether a SA possesses predetermined attributes that are imposed for a SA to qualify to be an AVA. In accordance with some embodiments, as reflected in step 8105 of FIG. 82, step 8104 can be omitted in that all "virtual assets" are (or can be) automatically deemed to be a respective AVA. Also, a SA can be deemed an AVA, i.e. deemed to satisfy the requirements to be an AVA by (a) having a photo associated with the SA and/or (b) having an identifier associated with the SA.

With further reference to FIG. 82, if no in step 8104, the process passes to step 8106. In step 8106, the CP outputs a communication to the user that the virtual asset does not satisfy the requirements to be an AVA. Accordingly, the particular SA cannot be associated with an NFT, in accordance with an embodiment of the disclosure. However, users can specifically select a particular SA to qualify to be an AVA. In an embodiment, a user can be provided the ability to override a recommendation by the system (that a VA should not be an AVA). Accordingly, the user can be provided the ability to designate any VA to be an AVA, regardless of attributes of the VA.

If yes in step 8104, the process passes to step 8107. In step 8107, the CP tags the SA, which is the basis of the virtual asset (VA), in the database as constituting an "associatable virtual asset" (AVA). For example, a value Is_SA_an_AVA in data record 8537 (in table 8530 of database 8500 of FIG. 85) can be changed from no or null to "yes". In the processing as described below to secure an NFT, a yes value may be required in data record 8537, else an NFT cannot be secured for the SA. For example, in the processing of step 8202 (FIG. 83), the list of AVAs that is presented to the user can be based on the value of data record 8537 for each SA. That is, the CP can provide only SAs with a YES value in data record 8537 in step 8202 (FIG. 83). With further reference to FIG. 82, after step 8106 and after step 8107, the process can pass to step 8108. In step 8108, the processing passes back to FIG. 81, and step 8001.

FIG. 83 is a flowchart showing in further detail the "CP inputs request (from user) and communicates with token entity (TE) to associate an associatable virtual asset (AVA) with a token (e.g. non-fungible token (NFT))" processing of subroutine 8200, as called or invoked from the processing of FIG. 81. As shown in FIG. 83, the subroutine is initiated in step 8200, with the call of the subroutine, and processing passes to step 8201. In step 8201, the CP inputs request from the user to assign a token to a segmented area (SA).

That is, a user wants to "tokenize" a SA. The processing of FIG. 83 reflects processing in which an NFT can be externally generated, with digital uniqueness, and such NFT can be tied to an internally generated unique identifier for the SA. Accordingly, the NFT and the internal SA (represented by a unique number or other indicia) can be linked/related to create a correspondence between the internal SA and the external NFT.

After step 8201, the process passes to step 8202. In step 8202, the CP interfaces with user to present a list of SAs, for example in response to search criteria, which have been tagged AVAs, from which the user can select. For example, the user can perform a search using the GUI of FIG. 89. For example, the user might enter "Reston, VA" as search criteria. In response, the CP can perform a search of all SAs that are located within the Reston, Virginia area, in conjunction with determining whether data associated with each of the SA reflect that the SA is an AVA. For example, such processing can include determining whether a value of a data record associated with the SA, such as data record 8537 of FIG. 85, represents that the SA is an AVA. Accordingly, the user is presented with a list of SAs that are AVAs. Then, in step 8203, the CP interfaces with the user to input the selection of a particular SA that can be chosen from the list of SAs, as presented to the user. Then, in step 8204, the CP interfaces with the user to determine whether a photo, associated with the SA, is to be used to tokenize the SA. In other words, will one of the photos of the SA be used as artwork, upon which to generate a respective NFT. If yes, then the processing passes to step 8212. In step 8212, the CP interfaces with the user to present a list of photos that are associated with the selected SA. Then, in step 8213, the CP interfaces with user to input selection of the photo. If only one photo is indeed present in the particular SA, then the user may simply be provided with a message that such sole photo will be used to represent the SA in generation of the NFT. After step 8213, the process passes onto step 8220.

On the other hand, a no may be rendered in step 8204. Such a "no" result in step 8204 indicates that a photo, of the particular SA, will not be used as artwork to generate the NFT. Rather, another attribute of the SA can be used as artwork. In this embodiment, if a no is generated in step 8204, the process passes onto step 8205. In step 8205, the CP assigns data to the SA indicating that an identifier, such as an alphanumeric identifier, is to be used as artwork for generation of the NFT. Alternatively, an other attribute of the SA might be used as artwork, upon which to generate the NFT. Then, the process passes onto step 8220.

In step 8220, the CP performs processing to determine if the SA satisfies predetermined requirements to tokenize the SA, i.e. to generate an NFT (based on artwork associated with the SA) to represent the SA. For example, as reflected at 8220', a requirement to tokenize can include that the selected SA is not already tokenized. Alternatively, step 8220 may include a determination that if the SA has already been tokenized, then some attribute of the SA has changed—such that it is appropriate to again tokenize the particular SA. Various requirements and/or constraints can be imposed as desired. Also, the processing of step 8204 and step 8220 can be combined into collective processing that determines whether a selected SA satisfies predetermined requirements to be tokenized. In general, it is appreciated that there can be a determination of whether a selected SA satisfies minimum requirements such that the SA is appropriate to be associated with an NFT. If these minimum requirements are satisfied, then the SA can be deemed an associatable SA, i.e. an AVA, and thus be deemed appropriate to be associated with an NFT. As described below, an NFT can be created to represent an AVA or an existent representative NFT can be associated with a SA if desired by the user. If a no is rendered in step 8220, the process passes on to step 8229. In step 8229, the CP outputs a communication to the user providing reasons why the selected SA cannot be tokenized. The CP may also provide an interface so as to change the selected SA to a different SA. Accordingly, the process can return to step 8202 and/or 8203, for example, or the process can pass to step 8225 and end.

Alternatively, a yes may be rendered in step 8229. Accordingly, the process passes onto step 8222. In step 8222, the CP outputs the AVA including artwork to a token entity, such as token entity 8650, shown in FIG. 86. A process 8240 can be performed as illustrated in FIG. 84. In some embodiments, only a part of the data that makes up the AVA is output to the token entity 8650. In other embodiments, the entire AVA is output to the token entity, including the artwork. In some embodiments, the artwork can be output to the token entity 8650 with merely associative data, which associates the artwork to the AVA. Once the artwork with associated NFT is returned to the photo system 8601, from the token entity 8650, the associative data can be used to link or matchup the returned NFT with the appropriate AVA, which is in turn associated with a respective SA. However, other matching mechanisms can be utilized so as to associate a returned NFT with the appropriate AVA/SA. In the situation that only one artwork is output to the token entity, in a dedicated communication, then it may not be necessary to have associative data, since it can be determined that a returned NFT corresponds to the one AVA. In step 8222, after the CP outputs the AVA with artwork to the token entity, the process passes onto step 8222'. In such step, the CP 8610 (of the photo system 8601) waits for a responsive communication from the token entity. Then, the process passes to step 8223. In step 8223, the CP receives a responsive communication from the token entity. The CP inputs the tokened virtual asset or tokenized virtual asset (TVA), which represents the AVA that was output in step 8222, from the token entity. The NFT, of the TVA, can then be saved in an appropriate database or data record so as to associate the NFT with the SA. For example, the NFT can be saved in a data record 8567 as shown in FIG. 85. The data record 8567 can be an attribute of the particular photo that was used, as artwork, to generate the NFT. That is, in this example, the particular photo that was used to generate the NFT is represented in the table 8560 of FIG. 85. Further details are described below. After either of step 8229 or step 8223, the process passes onto step 8225. The processing to associate the NFT with the SA is completed, and such processing terminates.

FIG. 84 is a flowchart showing processing in which the token entity (TE) 8650 inputs an AVA from the photo system 8601, and generates an NFT that can be selected to represent the AVA. Alternatively, the TE can associate an existing NFT, which is already associated with an existing photo, with an AVA or segmented area. That is, the TE can tokenize the AVA by generating an NFT or selecting an existent (or existing) NFT that can be used to represent the AVA or segmented area. The process of FIG. 84 is referenced in step 8222 of FIG. 83. Accordingly, upon the TE receiving the AVA with artwork from the photo system, the processing of FIG. 83 is executed.

With further reference to FIG. 84, the process is initiated in step 8240 and passes onto step 8241. In step 8241, the TE inputs the AVA with artwork to be tokenized. Alternatively, the TE inputs the artwork with some data to associate the artwork with the AVA. That is, the AVA can be associated with other data, such as transmission data used for transmission of the artwork between the photo system 8601 and the TE 8650. The data input by the TE can include a command and/or authorization to tokenize the artwork. It is appreciated that various data may be requested, required, and/or mandated such that the TE 8650 can generate an NFT to represent the artwork. In the schematic diagram of FIG. 86, the transmission of artwork from the photo system 8601 to the token entity 8650, for generation of an NFT by the token entity 8650, is represented at 8621'.

After step 8241 of FIG. 84, the process passes onto step 8242. In step 8842, the TE identifies the artwork (in the data received from the PS) to be tokenized. Then, in step 8243, the TE generates an NFT to represent the artwork. The NFT can include a string of records of cryptographic hash. The cryptographic hash can include a set or collection of characters that represent the artwork and AVA. Any known NFT processing, technique, or methodology can be used by the TE 8650 so as to generate an NFT based on the artwork that is provided to the TE 8650. As described above, the artwork can include a photo, and more specifically image data of the photo. Alternatively, the artwork might include an identification number, an identification character string, an alphanumeric character string, or any other identification that is associated with the SA. As otherwise described herein, rather than create an NFT, an existing NFT can be used to represent the artwork associated with the SA. That is, an existing photo may have already been associated with an NFT. Subsequently, that photo can be associated with a segmented area. For example, the photo might be located in the segmented area. As a result, the NFT can thus be associated with the segmented area. After step 8243, the process passes onto step 8244. In step 8244, the TE links the newly created record(s) of cryptographic hash (i.e. a new "block" of data) onto previously existing blocks of data so as to integrate the new block of data into a blockchain data structure. Accordingly, an NFT is created that is integrated into the newly created block of data, which forms part of the blockchain.

Relatedly, FIG. 86 shows transaction data 8663 that includes the NFT 8664. The transaction data 8663 is part of a block 8660. The block 8660 can possess an identifier such as Block_0021, as shown in FIG. 86. The block 8660 is formed to be part of a blockchain 8652.

With further reference to FIG. 84, after step 8244, the process passes onto step 8245. In step 8245, the TE 8650 outputs the NFT, along with data to associate the NFT to the AVA, to the photo system 8601. In the schematic diagram of FIG. 86, the transmission of the NFT from the token entity 8650 to the photo system 8601 is represented at 8621". After step 8245, in step 8246, the process returns to FIG. 83 (step 8223) with the communication of the token back to the photo system 8601. As described herein, the token entity 8650 can generate the token that is output in the communication 8621". Alternatively, a user may request that the TE 8650 associate an existing NFT, that is already associated with a photo or other artwork, so as to represent the AVA, i.e. so as to represent the SA.

With further reference to FIG. 84, as reflected at 8244', a non-fungible token (NFT) can include and/or be in the form of a unique and non-interchangeable unit of data. The NFT can be stored on a digital ledger. The digital ledger can be in the form of a blockchain. An NFT provides a digital asset that is unique and that can be used to represent artwork of an AVA, and thus represent the AVA itself. An "AVA" (associatable virtual asset) is a segmented area (SA) that has been deemed, through processing, to be appropriate to be associated with an NFT. Accordingly, an AVA can be described as being a type of SA, which is a virtual asset (VA). An NFT can be used to represent a virtual asset (VA) of the disclosure, so as to provide a "tokened virtual asset". Blockchain technology and/or other digital ledger technology can be used to establish and provide a verified and public proof of ownership of the virtual asset, i.e. of the AVA/SA.

FIG. 85 is a schematic diagram of a database 8500 containing a segmented areas table 85101 and various related tables. FIG. 86 is a schematic diagram showing details of a photo ecosystem 8600. Further details are described below. FIG. 87 is a flowchart showing in further detail the "CP performs processing on the tokenized virtual asset (TVA), using the NFT that represents the TVA" processing of subroutine 8300, as called from the processing of FIG. 81. The processing of subroutine 8300 can include any of steps 8310, 8320 and 8330 as shown in FIG. 87. In step 8310, the CP performs transactions on a TVA. Further details are described in FIG. 88 and subroutine 8310. In step 8320, the CP performs save processing on a selected TVA. For example, the save processing can include saving the TVA and/or related attributes to a registry or database, such as the registry or registry table 8900 as shown in FIG. 91. In step 8330, the CP can perform processing in which the CP assigns attributes to the TVA in response to observed activity related to the TVA. An attribute of a TVA can be saved to a registry or database, such as the registry 8900 as shown in FIG. 91. An attribute of a TVA can be saved to some other database or record, such as database record 8537 in table 8530, of FIG. 85. For example, an attribute can be saved so as to represent changes to the SA upon which the TVA is based. For example, if a photo is added to the particular TVA, i.e. added to the SA, such can be saved in a photo table, such as 8570 of FIG. 85. Accordingly, in summary as noted at 8300' in FIG. 87, a tokenized virtual asset (TVA) can be described as a SA that has been associated with an NFT, or other token.

Figure 88:
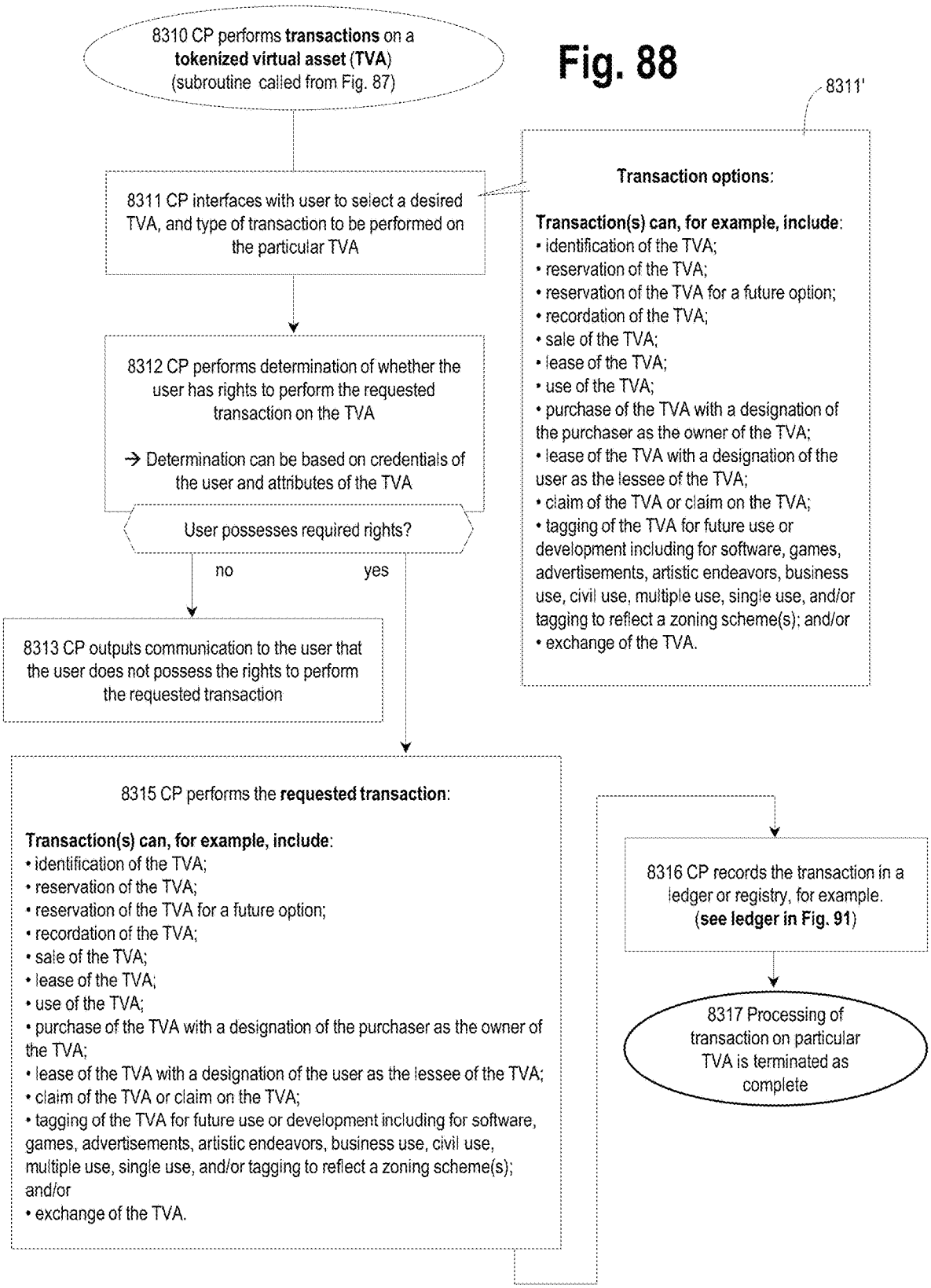
FIG. 88 is a flowchart showing in further detail the "CP performs transactions on the TVA" processing.

FIG. 88 is a flowchart showing in further detail the "CP performs transactions on the tokenized virtual asset (TVA)" processing of step 8310, as called from the processing of FIG. 87. The processing of step 8310 can be in the form of a subroutine that is called by the CP. The process starts in step 8310 and passes to step 8311. In step 8311, the CP interfaces with user to select a desired TVA, and type of transaction to be performed on the particular TVA. For example, the user may interface with the GUI 8710 of FIG. 89. The button 8714 may be selected by the user, and in response, the CP can generate a list of TVAs to choose from and/or the CP can generate a search option by which the user can search for (and choose) a TVA. Once the particular TVA is chosen, the user can then choose the particular transaction that is to be performed on the TVA. Illustrative transactions are shown in box 8311' of FIG. 88. After step 8311 of FIG. 88, with the TVA selected and the transaction, to be performed on the TVA, selected, the process then passes onto step 8312.

In step 8312, the CP performs determination of whether the user has rights to perform the requested transaction on the TVA. Determination can be based on credentials of the user and attributes of the TVA. If no, then the process passes to step 8313. In step 8313, the CP outputs communication to the user that the user does not possess the rights to perform the requested transaction. If a yes is rendered in step 8312, the processes passes to step 8315. In step 8315, the process performs the requested transaction. The particular transaction can include various transactions, as illustratively listed in step 8315. The transactions can include any of the transactions shown at 8311' of FIG. 88, for example. After step 8315, the process passes to step 8316. In step 8316, the CP records the transaction in a ledger or registry, for example. For example, the transaction can be recorded in a registry table 8900 as shown in FIG. 91. After step 8316, the process passes to step 8317. In step 8317, the processing of the requested transaction on the particular TVA is terminated as complete.

As described above, FIG. 86 is a schematic diagram showing details of a photo ecosystem 8600. The photo ecosystem 8600 can include a photo system (PS) 8601. The photo ecosystem 8600 can also include a token entity 8650. The token entity 8650 can be a third party entity that is distinct and different from the photo system (PS) 8601. The token entity (TE) 8650 can be an NFT generating entity or repository of NFTs, in accordance with one embodiment of the disclosure. However, it should be appreciated that any suitable token could be used in the processing of the disclosure, and the disclosure is not limited to specifically an "NFT". The PS 8601, working with the TE 8650, can perform various processing of step 8001 (see FIG. 81), as described herein.

With further reference to FIG. 86, the PS 8601 can include a computer processor (CP) 8610 and a database 8500. The CP 8610 can include various processing components. The CP 8610 can include a general processing portion 8611, an area segmentation processing portion 8612, a photo processing portion 8613, a user engagement processing portion 8615, and an NFT processing portion 8614. The general processing portion 8611 can perform processing so as to handle any general processing of the PS 8601 not otherwise handled by the more specialized processing portions. The area segmentation processing portion 8612 can perform any of a wide variety of processing related to segmentation of an area, and related processing described herein. The photo processing portion 8613 can perform any of a wide variety of processing related to input of photos, and related processing described herein. The user engagement processing portion 8615 can perform any of a wide variety of processing relating to user engagement, and related processing described herein. For example, the user engagement processing portion 8615 can perform processing so as to provide the user functionality illustrated in the GUI of FIG. 89. Any of the processing components in the PS can interface with other processing components so as to provide desired functionality, including functionality described herein. The CP 8610 also includes the NFT processing portion 8614. The NFT processing portion 8614 can perform various NFT related processing, including the processing described with reference to FIGS. 81-85 and 87-92. The NFT processing portion 8614 can handle the preparation of data and related communications with the third party token entity 8650. In particular, the NFT processing portion 8614 can handle the communications 8621' and 8621" as described herein and shown in FIG. 86. That is, the NFT processing portion 8614 can handle the processing to prepare the data and output the digital artwork to the token entity 8650, for generation of an NFT or selection of an existent NFT if desired by the user. The NFT processing portion 8614 can handle, for example, processing to associate the artwork with a segmented area (SA), which has been tagged as an associatable segmented area (AVA). The NFT processing portion 8614 can also handle the input of an NFT that is output from the token entity 8650 to the PS. Various other processing performed by the NFT processing portion 8614 and functionality provided by the NFT processing portion 8614 are described herein. The PS can also include a communication portion 8620. The communication portion 8620 can provide communication between the PS 8610 and various entities external to the PS, including the token entity 8650.

The PS can include the database 8500. Various details of the database 8500 are described further below with reference to FIG. 85. As shown in FIG. 86, the database 8500 can include a general database 8501. The general database 8501 can store various data used in various operations of the PS. The database 8500 can also include a user database 8504. The user database 8504 can store various user related data, user profiles, associations between photos and user(s) in various other data.

As described further below with reference to FIG. 85, the database 8500 can also include an area segmentation database 8502. The store and retrieval of data to the segmentation database 8502, and various manipulation of data in such database, can be performed by the area segmentation processing portion 8612. The area segmentation database 8502 can include a segmented areas table 8510. The segmented areas table 8510 can include a listing of segmented areas (SAs). The particular SAs listed might be limited to a particular geographic area. For example, the SAs listed in the table 8510 might be all the SAs in a particular state, town, city, or those SAs that are associated with some other geographic boundary or geographic marker. Accordingly, the segmented areas table 8510 can include data records or other data architecture that includes a plurality of SAs. Further details are described below. The diagram of FIG. 86 also includes SA table 8530. The SA table 8530 contains data relating to one of the SAs that are listed in the SAs table 8510. As shown in FIG. 85, a reference or pointer can provide the interrelationship between the table 8510 and the table 8530. As shown, other SA tables can be provided including table 8520 and table 8540. Such other tables can be in the tens, hundreds, thousands, or more. The SA table 8530 is shown in further detail in FIG. 85.

The area segmentation database 8502 also includes a registry table 8900. The registry table 8900 provides a registry, ledger, or spreadsheet that can track various transactions associated with a SA or group of SAs. A registry table 8900 is illustratively shown in FIG. 91, and described below. The database 8500 also includes a photo database 8503. The photo database 8503 can include various data (including image data and various metadata associated with the image data including GPS location of photo, time of photo, user device that took the photo, and other data) associated with photos that are stored in the PS. Illustratively, FIG. 86 shows that the photo database 8503 includes Photo_1_Table 8560 and Photo_2_Table 8570. The photo database 8503 can include a respective table for each photo stored. The photo database 8503 can include tens, hundreds, thousands, or more tables to store the data of respective photos. Further details are described below with reference to FIG. 85.

The PS can communicate with the token entity 8650 over a network 8621. The photo ecosystem 8600, as shown in FIG. 86, can also include numerous and likely many user devices 8630'. For example, such user devices can be smart phones or cell phones. One of such user devices can include user device 8630. The user device 8630 can allow a human user to interface with the PS so as to perform various functionality described herein. Such functionality can include the processing of FIGS. 81-85 and FIGS. 87-92. The photo ecosystem 8600 also includes the token entity 8650. The token entity 8650 can be a third-party that is external to the PS. The token entity 8650, and in particular an NFT processor 8651 of the token entity, can provide processing in which artwork is input from the PS, processed by the token entity 8650 so as to generate an NFT based on the input artwork or select an existent NFT if desired by the user, and output the generated NFT to the PS, along with associative data. That is, the associative data is provided by the token entity 8650 so as to allow the PS to determine which artwork the particular NFT corresponds to. In one embodiment, the NFT and the artwork is output to the PS in a data package, such that the association between the NFT and artwork is clearly established. Other data or techniques can be provided so as to link the generated NFT with the corresponding artwork. In turn, the artwork can be associated with or linked to a SA that has been deemed an AVA. The token entity 8650 can maintain a block chain 8652. As shown, the block chain can maintain a plurality of blocks, and likely hundreds, thousands, or more blocks. The blocks can include block 8660" (bearing block identification: "Block_0019"), block 8660' (bearing block identification: "Block_0020"), and block 8660 (bearing block identification: "Block_0021"). The block chain 8652 can be generated by the token entity so as to provide an ever-increasing list of data records, which can be described as the blocks. Each block, including illustrative block 8660, can contain cryptographic hash or data 8661 of the previous block that was generated. For example, the block 8660 can contain cryptographic hash of the block 8660'. Each of the blocks can also include a timestamp 8662. Of note, each of the blocks can also include data or transaction data 8663. The data or transaction data can include an NFT 8664 that was generated for respective artwork. The NFT 8664 can provide a one-of-a-kind, unique digital asset or unit of data that can be associated with and represent a digital item, such as a photo. Other digital items that can be represented by NFTs include digital audio files and digital video files, for example. The NFT 8664 can be stored on a block chain, such as the block chain 8652 shown in FIG. 86. Accordingly, an NFT stored on the block chain 8652 provides unique and non-interchangeable data that represents artwork or other digital asset.

As described above, FIG. 85 is a schematic diagram of a database 8500 containing a segmented areas table 8511 and various related tables, in accordance with principles of the disclosed subject matter. The table 8510 includes a reference record 8511 with a primary key (PK), ID-21. Such PK can be used to identify the table 8510 in the database 8500. As noted at 8500' in FIG. 85, each table (in the database 8500) can include a Primary key (PK) to identify the table. As shown, some of the tables are provided with a foreign key (FK). The FK can be an attribute in one table (entity) that links or maps to the PK of another table (entity), so as to provide an interrelationship or mapping between tables (entities). The tables of FIG. 85 are linked as shown. Each of the tables in the database 8500 can include a reference record, which includes an ID (identification) of the particular table. The tables in database 8500 can also include a plurality of content records. The content records can include (a) a foreign key (FK), which references another table as described above, or (b) other content. For example, the database 8500 of FIG. 85 might be disposed in or associated with photo system 8601 of FIG. 86. Table 8510 includes a listing of SAs that each references a segmented area, i.e. table 8510 is provided to include references to data relating to respective segmented areas, which are listed in the table 8510. In particular, the table 8510 includes references (FKs 8512, 8513, 8514) to respective segmented area tables 8520, 8530, 8540. Various other, i.e. many more, segmented areas can be referenced in the table 8510.

Accordingly, each of the tables 8520, 8530, 8540 contain data for a respective segmented area (SA). The tables 8520, 8530, 8540 can have similar structure and contain similar data. Illustratively, the table 8530, shown in detail, can include a reference record 8531 with PK for the table 8530. The PK 8531 can reference back to the table 8510. The table 8530 can include a plurality of content records 8531, 8532, 8533, 8534, 8535, 8536, 8537.

The content record 8532 can include a segmented area (SA) identifier, here SA-2, which can be a unique identifier (and can be an identifier as described above with reference to FIGS. 37-38) that is used to identify the particular SA. In this example, the segmented area (SA) is identified as area SA-2. In some embodiments, the PK (in record 8531) and the identifier for the SA (in record 8532) can be the same value, i.e. the values of records 8531 and 8532 can be the same value. Also, the content record 8533 can include data regarding the location of the particular SA, such as a geographic location. The table 8530 can also include content records 8534, 8535, 8536. The record 8534 can include a FK to reference the table 8560, i.e. Photo_1_table. Such table can include data regarding a first photo that is associated with the SA represented by table 8530. The record 8535 can include a FK to reference the table 8570, i.e. Photo_2_table. Such table can include data regarding a second photo that is associated with the SA represented by table 8530. It is appreciated that additional content records can be added, i.e. dynamically added, to the table 8530 if additional photos are added to the particular SA. The record 8536 can include a FK to reference the table 8580 (data record 8901), i.e. a registry_table. Such table can act as a ledger and can include data regarding transactions and other information that are related to the area SA-2, i.e. the area that is represented by table 8530. Details of the registry table are described below with reference to FIG. 91.

As shown in FIG. 85, the database 8500 includes table 8560. The table 8560, the Photo_1_table, contains data regarding a first photo in the segmented area SA-2. The table 8560 can include a PK in reference data record 8561, which can be referenced by the FK in record 8534 of table 8530. The table 8560 can include photo location, image data, photo date, photo time, and photo ID, respectively, in content data records 8562, 8563, 8564, 8565, 8566 (and any other metadata or other data can also be saved as desired). The image data in data record 8563 can be in the form of a JPEG file, i.e. a "Joint Photographic Experts Group" file. The JPEG file can provide a standard image format, used in digital photography, for containing lossy and compressed image data, for example. For example, the image may be input using a camera of a cell phone. However, it should of course be appreciated that any of a wide variety of digital file formats and/or digital photography techniques can be used to input and save a desired image. For example, the input image might be of an ocean view or a view of a vacation location. The CP or other processor can generate the table 8560 in conjunction with the particular photo being associate with the particular segmented area, SA-2.

Accordingly, the data in the data record 8563 can provide the artwork that is output to a third party so as to tokenize the artwork, i.e. so as to generate an NFT (or other token) that represents the artwork or process that allows for the selection of an existent NFT if desired. Relatedly, the table 8560 also contains data record 8567. The data record 8567 is initially empty or null when the table 8560 is initially generated, i.e. when the photo (bearing photo ID of Photo_ID-122 is input into the database 8500 (and associated with the segmented area SA-2). However, in the processing described herein, the data record 8567 is populated. Specifically, illustratively, in step 8223 of FIG. 83, the data record 8567 is populated with the NFT. Accordingly, the state of the database 8500 (as shown in FIG. 85) is subsequent to the NFT being input from the third party that tokenized the artwork represented in the data record 8563.

As shown in FIG. 85, the database 8500 can also include the table 8570. The table 8570, i.e. the Photo_2_table, contains data regarding a second photo in the segmented area SA-2, i.e. a second photo that is associated with the segmented area SA-2. The table 8570 can include a PK in data record 8571, which can be referenced by the FK in record 8535 of table 8530. The table 8570 can include photo location, image data, photo date, photo time, and photo ID, respectively, in content data records 8572, 8573, 8574, 8575, 8576.

Also, the table 8570 includes the data record 8577. As shown, the data record 8577 is empty or null. As described above, in an embodiment of the disclosure, image data, i.e. artwork, from only one photo might be used to generate an NFT, which is then used to represent a particular segmented area. In this example, SA-2 is represented, i.e. the photo represented in table 8560 can be used to generate the NFT. In this example, the photo represented by table 8570 is not used to generate an NFT. As a result, the data record 8577 is left empty or null. Also, the NFT that represents the representative photo, here the photo having Photo_ID-121, can be stored in another location. For example, the NFT might be stored in the table 8530 and associated with or mapped to the particular photo, upon which the NFT is based, in some suitable manner.

However, as otherwise described herein, it may be the case that at a point in time, the segmented area SA-2 is broken up into segmented areas or areas (e.g. first and second areas), and that the photo of table 8560 is in the first area and the photo of table 8570 is in the second area. The NFT in data record 8567 can continue to be used, i.e. so as to represent the first area. Additionally, the image data in data record 8573, can be output to the tokenizing entity so as to generate a unique NFT that represents the artwork in data record 8573. Such further NFT can then be used so as to represent the second segmented area. Accordingly, in such situation, the data record 8577 would be populated with a further NFT from a tokenizing entity.

In processing of the database 8500, data in the various tables of the database 8500 can be retrieved by a call to the particular table, which specifies the particular record, field and/or member within the particular table. Also, in processing, data can be written to a particular table by outputting the data to the particular table, and specifying the particular record, field and/or member (within the particular table) to which the data should be written. It is appreciated that data, as described herein, may be stored in a database, retrieved from a database, and/or otherwise manipulated using known computer processing techniques. Further, it is appreciated that various additional data can be included in any of the tables shown in FIG. 85, including any of the data described herein.

Figure 89:
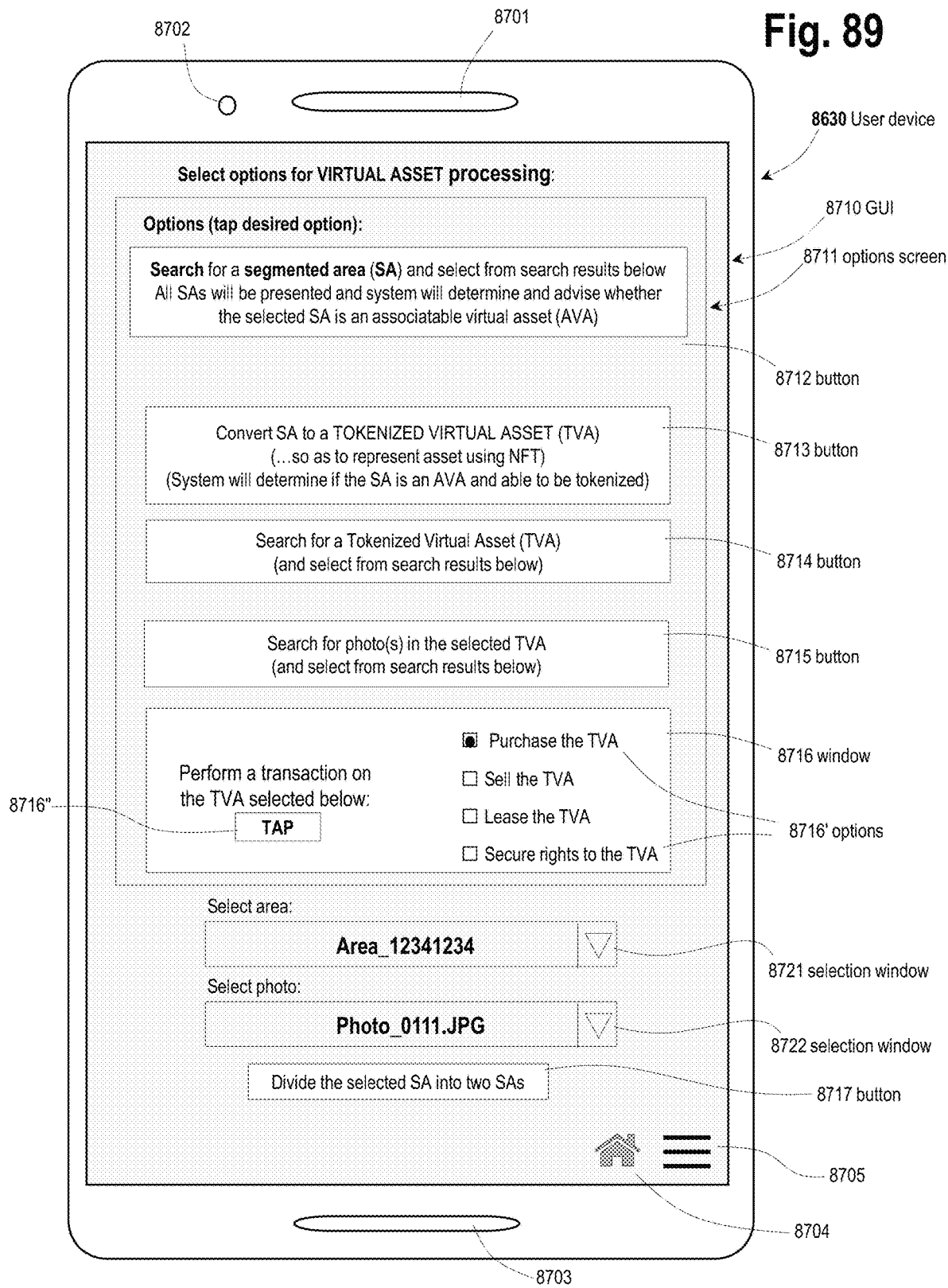
FIG. 89 is a schematic diagram of a user device with GUI.

FIG. 89 is a user device 8630 with GUI 8710 in accordance with principles of the disclosed subject matter. For example, the user device 8630 can be the user device illustrated in FIG. 86. Relatedly, FIG. 90A is a schematic diagram showing further aspects of SA processing. FIG. 90A shows map 8801. The map 8801 shows SA 8821. An SA, such as SA 8821, can include a plurality of lower level SAs. For example, as shown in FIG. 90A, the SA 8821 can include lower level SAs 8810. Such lower level SAs 8810 can include lower level SA 8811, lower level SA 8812, and other lower level SAs (as shown in dimple in map 8801). The SA 8821 can be described as constituting a first SA. Also, the SA 8821 can be described as a "site" 8821 or "property" 8821, as reflected at 8802' in FIG. 90A.

Figure 90B:
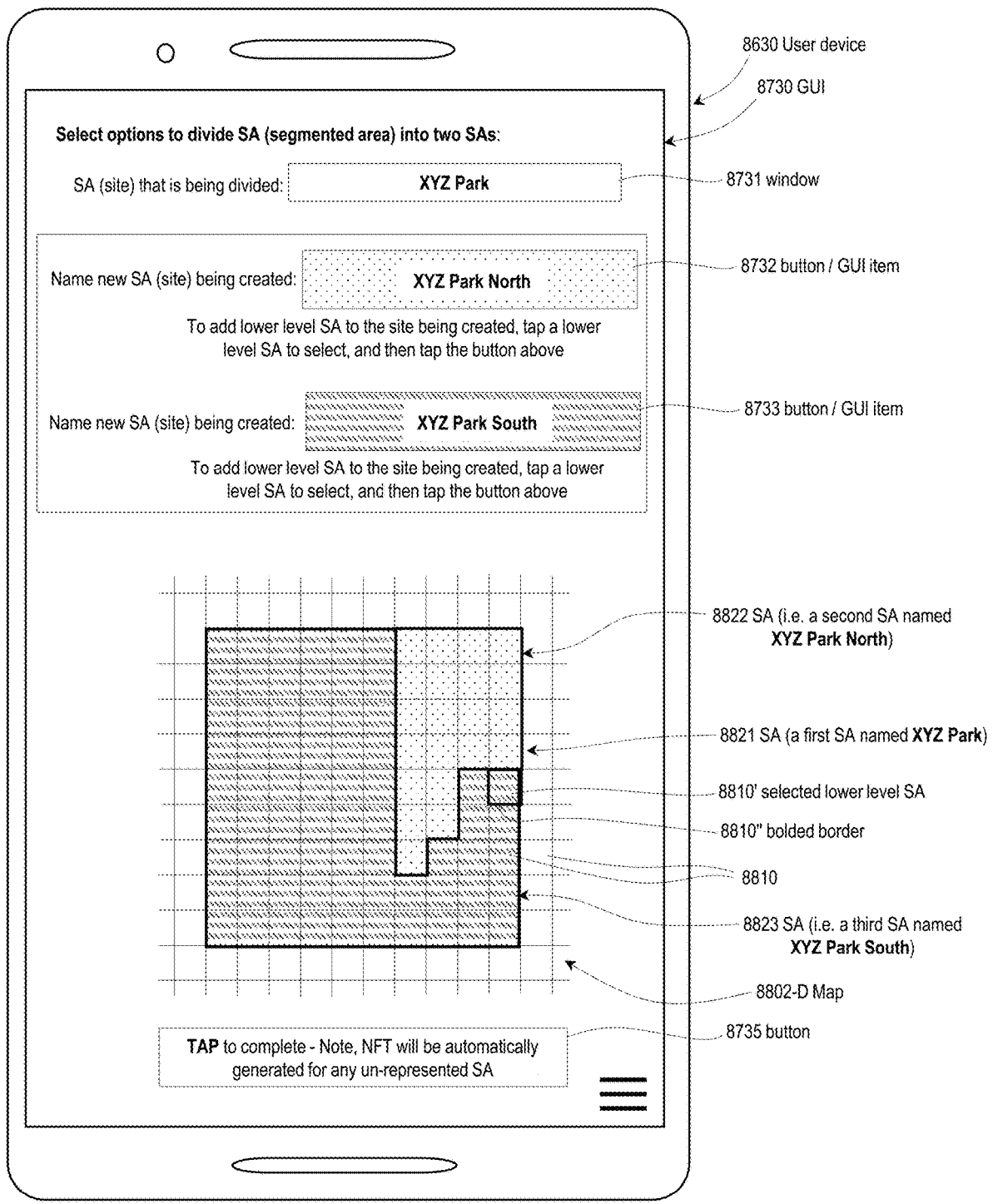
FIG. 90B is a diagram showing a user device with a further GUI.

In NFT processing, a photo with GPS location in SA 8812 (and inherently in the higher level SA 8821 that encompasses SA 8812) can be used to generate an NFT, so as to represent the SA 8821, i.e. so as to represent the site 8821. The NFT can be created using the processing described above. At a later point in time from when the SA 8821 was created, a user can request that the SA/site 8821 be divided up into two or more parts, i.e. into two SAs. Such processing can be performed by the process illustrated in FIG. 90C and by the GUI 8730 of FIG. 90B, as invoked by a user tapping button 8717 in the GUI 8710 in FIG. 89. FIG. 90A also shows map 8802. As shown in map 8802, as reflected at 8802' in FIG. 90A, a user can interface with the CP to create two new SAs, i.e. SA 8822 and SA 8823. Such two SAs can be described as sites, i.e. site 8822 and site 8823. As shown in FIG. 90A, (a) the user can create SA/site 8822 with lower level SAs, shown in dimple in map 8802, including SA 8812; and (b) the user can create SA/site 8823 with lower level SAs, shown in hash-mark in map 8802, including SA 8811. The photo with photo location 8812PL is in SA/site 8822 (see FIG. 90A), so such photo (and corresponding NFT generated to represent SA/site 8821) can be used to represent the SA/site 8822.

To represent SA/site 8823, the system can generate a new NFT based on a photo with GPS in the SA/site 8823. For example, the photo (e.g. photo with location 8811PL) can be used. For example, a photo that is most viewed could be automatically selected to represent the SA/site 8823. For example, a most popular photo in a most popular SA can be used to represent the SA, i.e. used to generate an NFT for the SA. Other attributes of photos and/or mechanisms can be used to determine which photo in a SA is to be used for generation of an NFT, to represent such SA. The SA 8821 can be described as a parent SA, and the SAs 8822 and 8823 can be described as child SAs. All of such SAs 8821, 8822, 8823 are comprised of lower level SAs 8810, as illustrated in FIG. 90A. The SA 8821 can be described as a first SA; SA 8822 can be described as a second SA; and SA 8823 can be described as a third SA. See related processing steps 8751, 8752, 8753 of FIG. 90C. Note, in accordance with other embodiments, two new NFTs can be created to respectively represent the SA/site 8822 and the SA/site 8823. It is noted that identification of a SA or other area can use any of the processes or techniques described herein. For example, as noted at 8802", SA identification can include the lowest level identifier (of a representative area in the site) that is generated from the unique identification process, along with a suffix that is added.

With further reference to FIG. 89, the GUI 8710 provides various options and functionality for virtual asset processing, in accordance with principles of the disclosed subject matter. The GUI provides an options screen 8711. The options screen 8711 includes various options to provide different functionality. A button 8712 allows a user to search for a segmented area. Various criteria such as GPS location, city, state, or other location criteria may be used to search for a SA. For example, upon pressing the button 8712 a window can be generated, into which a user can type search criteria. Search results can be presented in the window 8721. Also, SAs that are identified in a search may or may not be an associatable virtual asset (AVA), i.e. a SA that possesses sufficient attributes so as to be tokenized. For example, the system can, in one embodiment, only present SAs that are AVAs. In some embodiments, all SAs can be deemed to be an AVA. In some embodiments, a SA and an AVA can be processed and/or considered to be one and the same, i.e. a SA is the same and/or equivalent to an AVA. In some embodiments, any SA is deemed to be worthy of being tokenized by associating such SA with an NFT. The GUI 8710 also includes photo selection window 8722. Based on the area displayed in the selection window 8721, all the photos in such area can be listed via the photo selection window 8722. The user can select a particular photo for NFT processing. Relatedly, the GUI 8710 may also include button 8713. The button 8713 can be tapped or otherwise selected by the user. That is, an area can be selected and displayed in selection window 8721. A photo can be displayed in the window 8722. If button 8713 is then tapped, the CP can then convert the SA displayed in window 8721 to a tokenized virtual asset (TVA). That is, the CP can forward the selected photo, displayed in the window 8722, out to the token entity 8750, as described above. Based on the photo, the token entity 8750 can then generate an NFT associated with the photo, so as to represent the SA which is also associated with the photo or select an existent representative NFT if desired. The GUI 8710 also includes the button 8714. The button 8714 allows a user to search for a TVA. The CP can prompt the user for search criteria by which to search for the TVA. The user can select a TVA and have that TVA displayed in the window 8721. Also, button 8715 can be provided. Button 8715 can allow a user to search for photos in the selected TVA. Search results can be displayed in the window 8722 via pop up menu, and a particular photo selected. Other mechanisms and/or techniques can be utilized so as to search and select an SA, a TVA, a photo, and other items.

Figure 90C:
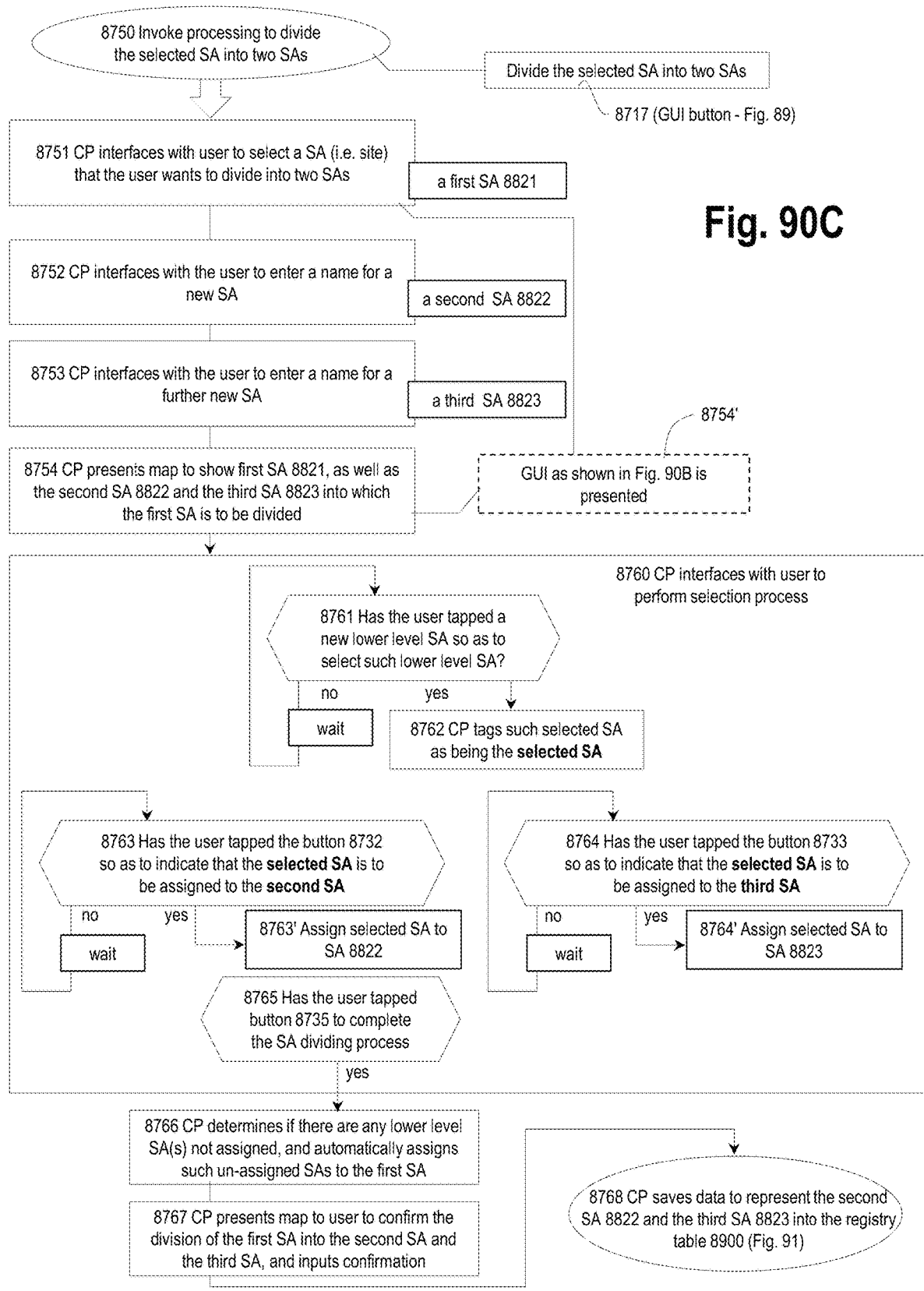
FIG. 90C is a flowchart showing processing to divide a selected SA.

Relatedly, the GUI 8710 can include the window 8716. The window 8716 allows a user to perform transactions on an area listed in window 8721. The window 8716 allows a user to perform a transaction on a TVA listed in window 8721. A user can select one of the options 8716' as illustrated in FIG. 89. Other options can be provided. Once an option is selected, the user can then tap the button 8716". The CP can then present various options and functionality associated with a requested transaction. For example, if "purchase the TVA" is selected and button 8716" tapped, the CP can present the user with various options and information associated with a purchase of the area displayed in window 8721. The GUI 8710 can also include the button 8717. The button 8717 can be tapped if a user wishes to divide or parcel out a selected SA, shown in window 8721, into two SAs. Upon a user tapping button 8717, the GUI of FIG. 90B can be displayed and a processing subroutine as shown in FIG. 90C can be initiated or invoked. The user device 8630, can also include operational attributes, such as a camera 8702, a speaker 8701, a microphone 8703, a "home" button 8704 to access additional functionality, and menu items 8705 to access additional functionality. The window 8721 can be a drop-down menu that can list out the various SAs associated with a search, and allow a user to pick a selected SA from the list. Also, the window 8722 can be a drop-down menu that can list out the various photos that are associated with the SA, shown in window 8721, and allow a user to pick a selected photo from the displayed list.

FIG. 90B is a diagram showing the user device 8630 with a further GUI 8730. As noted above, the GUI 8730 can be generated upon a user selecting an area in window 8721, in FIG. 89, and tapping the button 8717, shown in FIG. 89. The GUI 8730 can provide functionality and options to divide an SA into two SAs. The GUI 8730 can include window 8731. Window 8731, can display the particular SA being divided. The SA displayed in window 8731 can be transferred or populated based on the SA displayed in window 8721, from the originating GUI 8710. The GUI 8730 can also include GUI items 8733 and 8732. Items 8733, 8732 provide various functionality as described in further detail with reference to the processing of FIG. 90C. The item 8732 allows a user to type in a name for a new SA that is being created, i.e. a first new SA. As shown, indicia can be displayed indicating "To add lower level SA to the site being created, tap a lower level SA to select, and then tap the button above". Similarly, button 8733 can be provided with regard to the second SA being created. The button 8733 can be provided with similar functionality as the button 8732. Further details are described with reference to FIG. 90C.

Note, the button 8732 can display the name of a first SA being created, and allow a user to dynamically change or edit the name. The button 8733 can display the name of a second SA being created and allow the user to dynamically change or edit such name. Accordingly, a first SA and a second SA can be created based on a division of a parent SA shown or displayed in the window 8731. For purposes of description, the SA displayed in window 8731 can constitute a first SA; the SA displayed in window 8732 can constitute a second SA; and the SA displayed in window 8733 can constitute a third SA. The GUI 8730 can be provided in display a map 8802-D. The map 8802-D can be similar in content to the map 8802 shown in FIG. 90A. The map 8802-D can display the first SA 8821, i.e. the parent SA as described above with reference to FIG. 90A. As displayed, the SA can be in the form of a square. The first SA can be named XYZ Park, for example. As described above with reference to FIG. 90A, the SA 8821 can be composed of lower level SAs 8810. As shown in the map 8802-D, the SA 8821 is being divided (by the user) into the SA 8822 and the SA 8823. The SA 8822, can be named XYZ Park North. The SA 8823 can be named XYZ Park South, for example. The button 8732 can be color-coded, pattern coded, or have other indicia so as to match with the graphic display of the SA 8822 on the map 8802-D—such as using the dimples shown. The button 8733 can be color-coded, pattern coded, or have other indicia so as to match with the graphic display of the SA 8823 on the map 8802-D—such as using the hash or dash marks shown.

In dividing the SA 8821, the user can select a particular lower level SA 8810. For example, FIG. 90B illustrates that a lower level SA 8810' has been selected. Such selection can be identified to the user via a bolded border 8810", or in some other suitable manner. For example, the color tone or shading of a selected lower level SA 8810 might be varied so as to be distinguishable. Once selected, the user can tap either button 8732 or button 8733, so as to control which new SA the particular lower level SA will belong to. More specifically, in such processing, the user can tap either button 8732, 8733 outside the displayed name (whereas a tap in the center of either button 8732, 8733 (on the name) can allow the user to change the name of the particular SA) For example, as shown in FIG. 90B, the user may have just tapped the button 8733 such that the lower level SA 8810' now belongs to the XYZ Park South area. Further details are described below.

Related to the GUI of FIG. 90B, FIG. 90C is a flowchart showing processing to divide a selected SA into two SAs. As noted above, the processing of FIG. 90C can be called in response to the user tapping button 8717 in the GUI of FIG. 89. As shown in FIG. 90C, the process is initiated in step 8750 and passes onto step 8751. In step 8751, the CP 8610 interfaces with the user to select a SA 8821, i.e. a site or property, that will be divided into two SAs. Then, the process passes onto step 8752. In step 8752, the CP interfaces with the user to enter a name for a new SA 8822. This processing can be performed using the button 8732 in GUI 8730. Then, in step 8753, the CP interfaces with the user to enter a name for a further new SA 8823. This processing can be performed using the button 8733. The SA 8821 can be described as a first SA, the SA 8822 can be described as a second SA, and the SA 8823 can be described as a third SA. Then, the process passes onto step 8754.

In step 8754, the CP presents a map 8802-D, as described above, to show first SA 8821, as well as the second SA 8822 and the third SA 8823 into which the first SA is to be divided. Such map 8802-D is illustrated in FIG. 90B, as reflected at tag 8754' in FIG. 90C. Then, the process passes to step 8760. Step 8760 can include a plurality of executable functions including step 8761, 8763, 8764, 8765. In step 8760, the CP interfaces with user to perform a selection process. Step 8760 performs the processing of SA selection described above with reference to map 8802-D. In step 8761, the CP determines: has the user tapped a new lower level SA so as to select such lower level SA. If no, the CP waits. If yes, in step 8762, the CP tags such selected SA is being the selected SA. In step 8763, the CP determines has the user tapped the button 8732 (in GUI 8730) so as to indicate that the selected SA is to be assigned to the second SA, i.e. in this example, is the selected SA to be assigned to the XYZ Park North area/site? If no, the CP waits. If yes in step 8763, then in step 8763', the CP assigns the selected SA to the SA 8822, as illustrated in FIG. 90B. In step 8764, the CP determines has the user tapped the button 8733 so as to indicate that the selected SA is to be assigned to the third SA, i.e. in this example, is the selected SA to be assigned to the XYZ Park South area/site? If no, the CP waits. If yes in step 8764, then in step 8764', the CP assigns the selected SA to the SA 8823, as illustrated in FIG. 90B.

At a point in time, the user will all perform his or her desired selections. Then, the user can tap button 8735 in the GUI 8730 of FIG. 90B. Step 8765 monitors for the tapping of such button. That is, in step 8765, the CP determines if the user has tapped button 8735 so as to complete the dividing process. If yes in step 8765, i.e. the user has tapped the button 8735, the process passes to step 8766. In step 8766, the CP determines if there are any lower level SA(s) not assigned, as displayed and represented by the map 8802-D of FIG. 90B. In other words, are there any lower level SAs 8810 which the user has not assigned to either SA 8822 or SA 8823. By default, any such unassigned SAs can be assigned to the first SA. Other default mechanisms can be used. In one embodiment, the map 8802-D can start with assigning all the lower level SAs 8810 to the SA 8822. Such areas will stay assigned to the SA 8822, unless the user opts to assign such lower level areas to the SA 8823, using the GUI of FIG. 90B and the processing of FIG. 90C, for example. Then, in step 8767, the CP presents the map 8802-D to the user to confirm the division of the first SA into the second SA and the third SA. The user can then confirm the division. A restart option can be provided if the division is not confirmed by the user. Then, the process passes onto step 8768. In step 8768, the CP saves the data to represent the second SA 8822 and the third SA 8823. Such data can be saved in the format of the registry table 8900 shown in FIG. 91. The processing of FIG. 90C shows the SA being divided into two SAs 8822 and 8823. However, it is appreciated that processing can be performed so as to divide the SA 8821 into any number of SAs, as may be desired. Additional buttons akin to buttons 8732/8733 can be added so as to accommodate further SAs being created.

As described above, FIG. 91 is a schematic diagram showing a registry table 8900. Various details and processing involving the registry table 8900 is described above. The registry table 8900 is represented in the database 8500 of FIG. 85. FIG. 91 shows details of the content 8902 illustrated in FIG. 85. The registry table 8900 can be in the form of or take on the form of a table, spreadsheet, ledger, data array, data record or other data architecture, for example. The registry table 8900 can represent data (the content 8902 of FIG. 85) associated with a particular segmented area (SA), such as the SA 8821 shown in FIGS. 90A and 90B, as well as the associated child SAs, 8822 and 8823.

In the data architecture illustratively shown, the table 8900 can include various record numbers 8910 and various fields 8920. Record number 1, field A can include a primary key (PK) 8901. The PK 8901 can be mapped into a foreign key (FK) in the segmented area table 8530, as shown in FIG. 85. The tables can be mapper together in some other manner, as may be desired. As reflected at 8901', the registry table can include data that shows transactions relating to a "segmented area" (SA). The "SA", i.e. an area, can constitute a "site" or "property" that can be transacted, i.e. sold, leased, etc. An SA can be broken up in a transaction so as to be two SAs (see related FIGS. 90A-90C). As reflected at 8902' and described in detail herein, a photo that is representative of the SA can be used to secure the NFT for the SA. If the SA is not associated with a photo, digital artwork, e.g. an ID #, can be created or retrieved by the system so as to represent such SA. Also, as reflected at 8903', in some processing embodiments, respective tables can be created for each SA. That is, for example, once a SA is subdivided, a separate table (akin to the table shown in FIG. 91) can be generated for each of the one or more "child SA(s)". Such created table can be linked back to the "parent" SA table. A relational database can be used to store such data.

As otherwise described herein, a wide variety of transactions can be performed on a SA and a wide variety of attributes can be associated with a SA. FIG. 92 illustrates the various data that can be stored in the registry table 8900. Box 9601' describes various information regarding fields 8920 of the registry table 8900. Box 9602' describes various information regarding data records of the registry table 8900. Accordingly, various disclosure is provided herein relating to NFT processing. NFT processing can provide a service to facilitate the identification, reservation, recordation, exchange, or other transaction of a segmented area or area using an NFT or other token.

Figure 93:
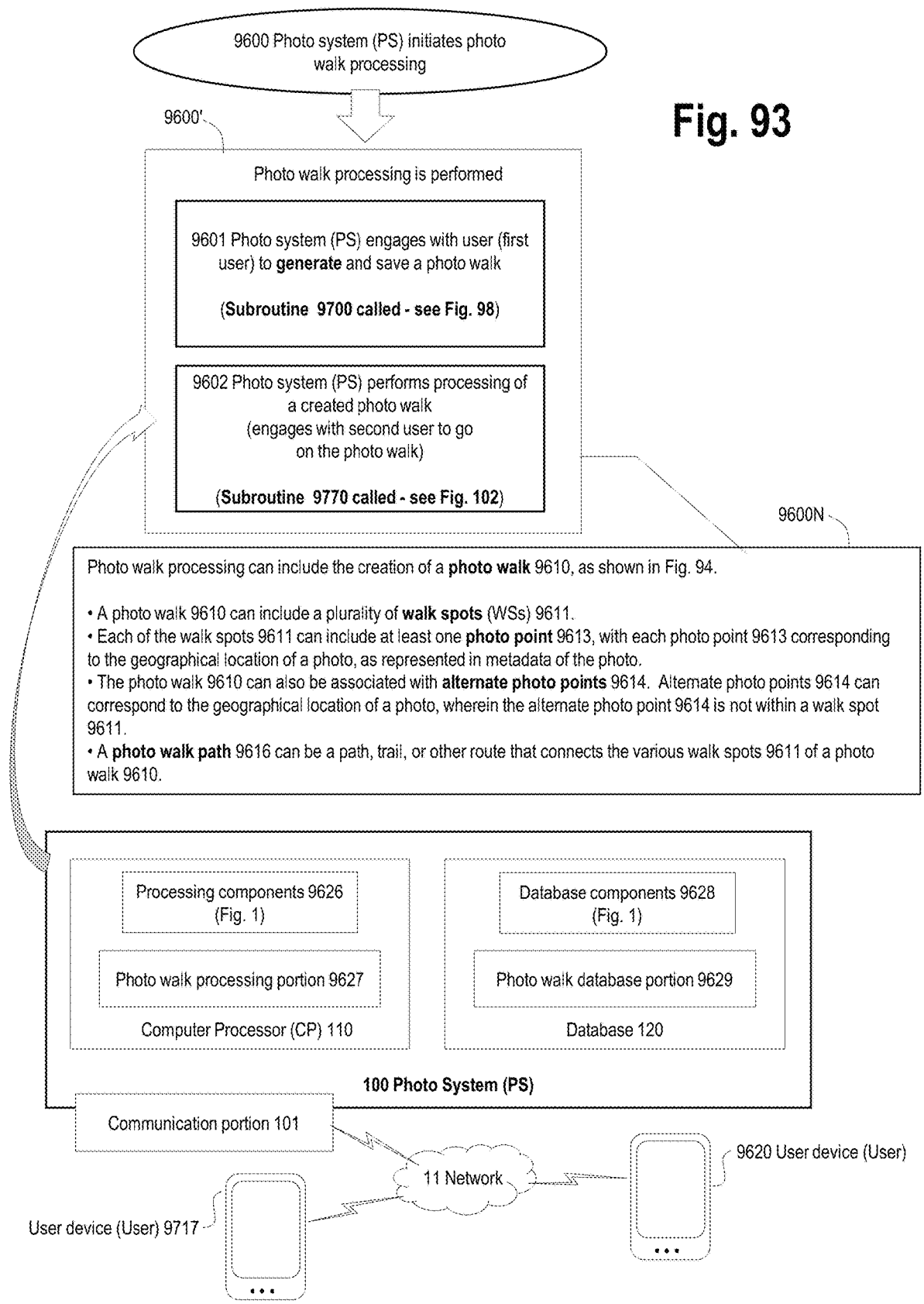
FIG. 93 is a high level flowchart showing photo walk processing as performed by a photo system (PS).
Figure 94:
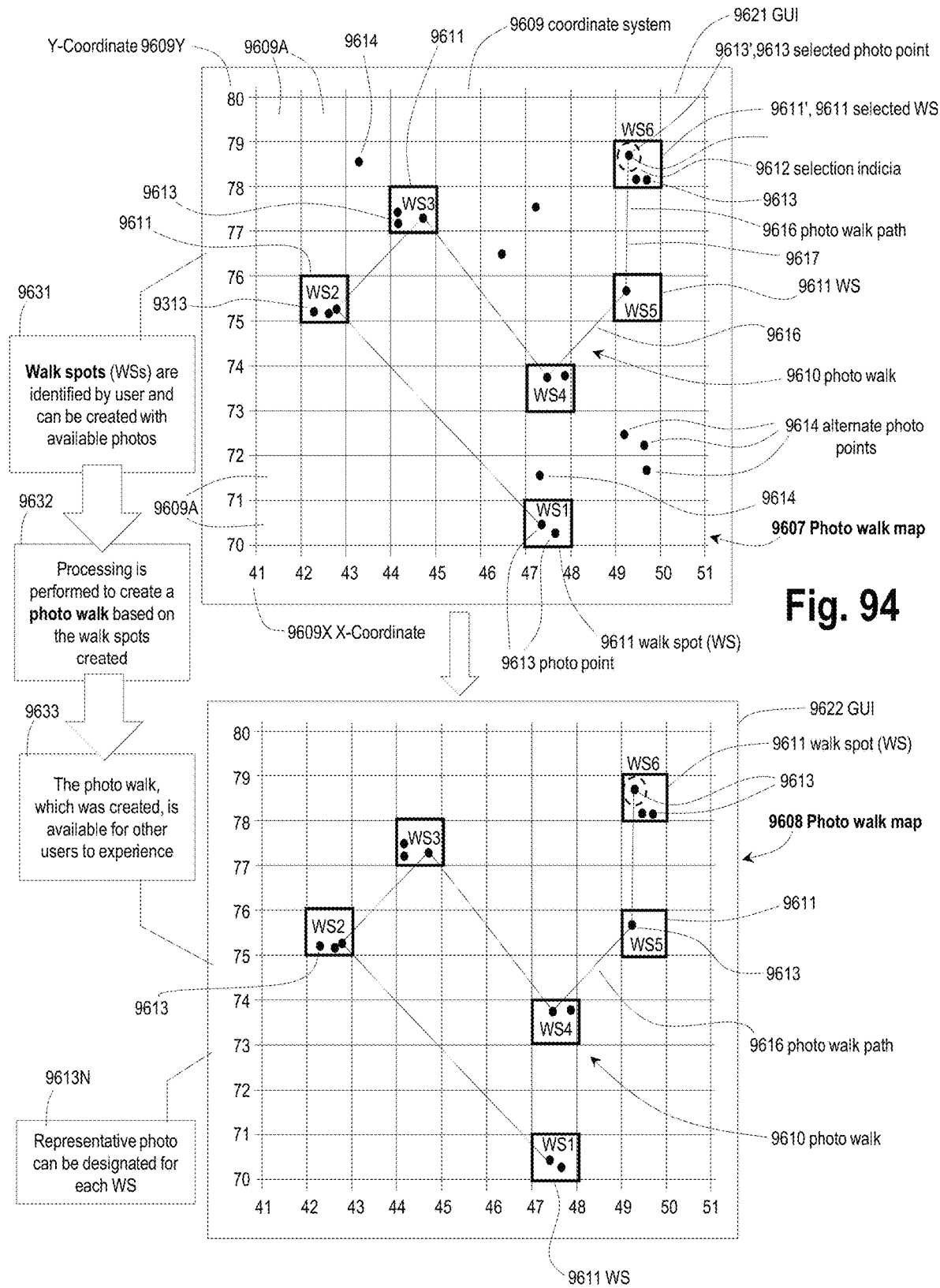
FIG. 94 is a schematic diagram, with GUIs, showing features of photo walk processing.

Hereinafter, features of "photo walk" processing will be described. FIG. 93 is a diagram including a high level flowchart showing photo walk processing, of an embodiment, as performed by a photo system (PS). Relatedly, FIG. 94 is a schematic diagram, including GUIs, showing various features of photo walk processing. The schematic diagram of FIG. 94 includes a photo walk map 9607. The photo walk map 9607 can include a plurality of areas 9609A. The areas 9609A can be defined by a coordinate system 9609, with an X coordinate 9609X and a Y coordinate 9609Y. An area 9609A can be any desired size, such as 100 feet by 100 feet, for example. As shown in FIG. 94, a GUI 9621 can display the photo walk map 9607, such as on a user device 9620 shown in FIG. 95. The coordinate system 9609 can define a plurality of areas 9609A as shown in FIG. 94. An area 9609A can contain one or more photos, e.g. a GPS location of one or more photos can be contained within the boundary of an area. As described below, an area can be tagged or selected as a "walk spot" 9611. The photos that are contained in such a walk spot 9611 can, based on each photo's respective GPS location, define a photo point. A series of walk spots 9611, each containing photo points, can form a photo walk 9610. A user can be provided with functionality to "zoom" in or out so that the size of areas, presented as shown in FIG. 94, can be varied. In general, other demarcations of areas or shapes of areas can be used instead of the particular configuration shown in FIG. 94, for example.

Figure 95:
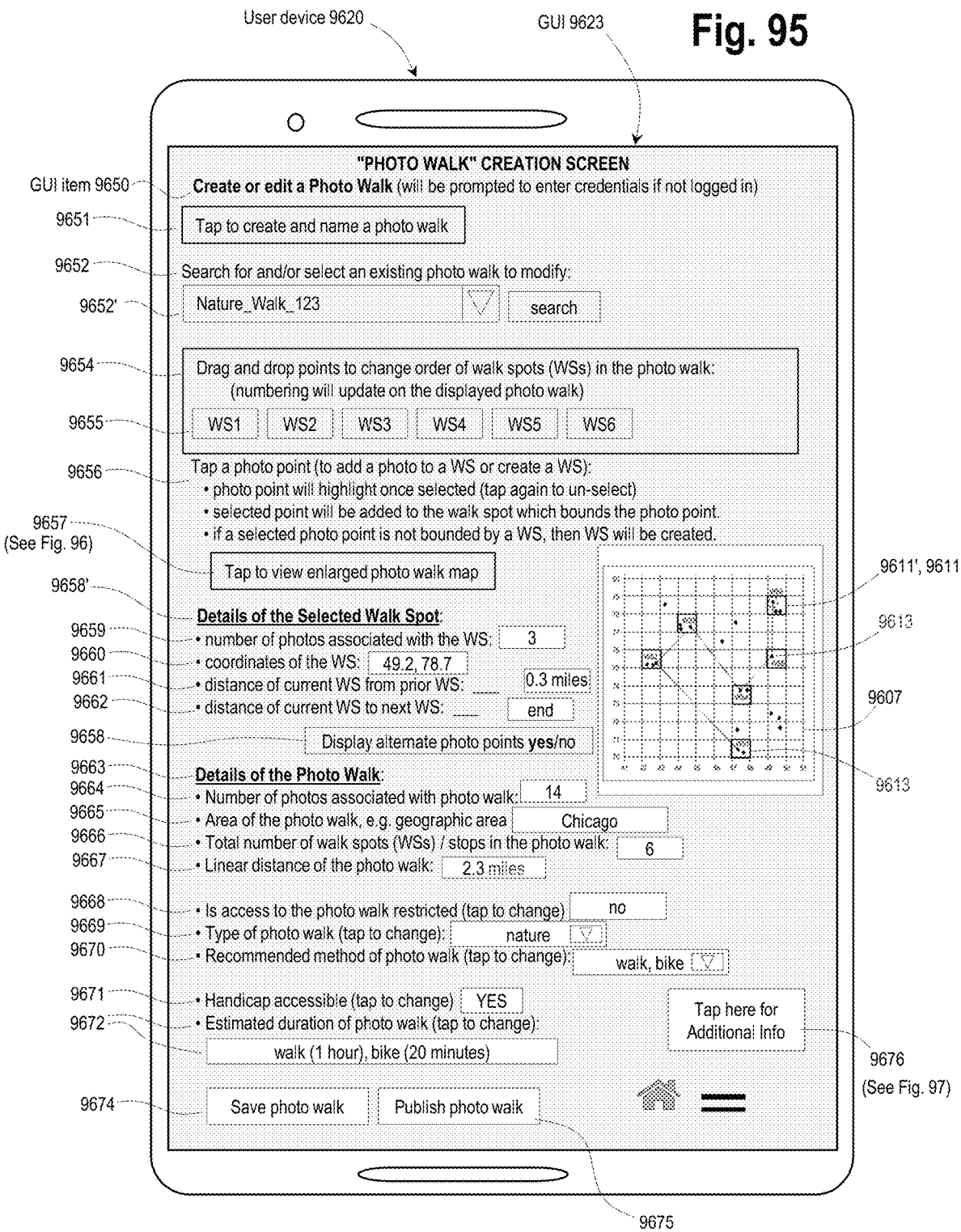
FIG. 95 is a diagram of a GUI for creation, by a first user on a first user device, of a photo walk.
Figure 96:
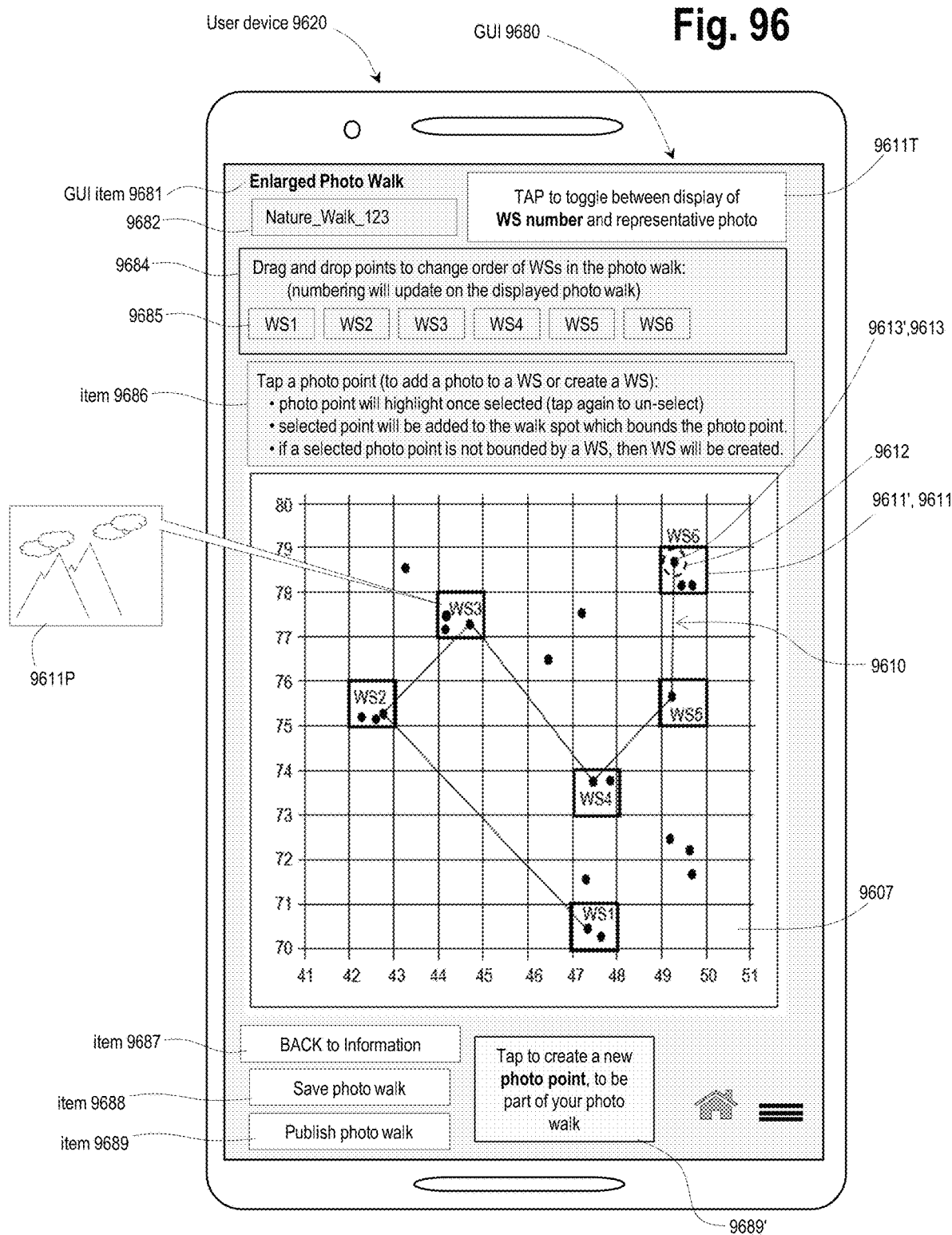
FIG. 96 is a diagram of a further GUI (with map) for creation, by the first user, of the photo walk.

To explain further, with reference to FIG. 93 (see tag 9600N) and FIGS. 94-96, photo walk processing can include the creation of a photo walk 9610, as shown in FIG. 94. A photo walk 9610 can include a plurality of walk spots (WSs) 9611. Each of the walk spots 9611 can include at least one photo point 9613, with each photo point 9613 corresponding to the geographical location of a photo, as represented in metadata of the photo. The photo walk 9610 can also be associated with alternate photo points 9614. Alternate photo points 9614 can correspond to the geographical location of a photo, wherein the alternate photo point 9614 is not within a walk spot 9611, but is about or around the photo walk. A photo walk path 9616 can be a path, trail, or other route that connects the various walk spots 9611 of a photo walk 9610. The photo walk path can include legs 9617. A photo point 9613 can be deemed a representative photo point 9613R, which can be a representative photo of a walk spot 9611. Also, a photo point, i.e. photo. can be designated as a representative photo and/or photo point for the entire photo walk 9610.

In the context of FIG. 94, photo walk processing can include high-level steps 9631-9633. In step 9631, walk spots (WSs) can be identified by a user and can be created with available photos. For example, photos can be displayed on a scrolling view or grid view that is presented to the user. Photos can be selected by the user and such photos can be associated with a particular walk spot (WS) It is noted that photo walk processing is not limited to photos, and other media including media to support a virtual reality experience and/or augmented reality experience, inclusive of a virtual gaming experience, may be used. Then, in step 9632, processing is performed to create a photo walk based on the walk spots created. For example, a sequence and various attributes can be assigned to the walk spots. Once the photo walk is created, as reflected in step 9633, the photo walk can be made available to other users to experience. FIG. 94 also shows a photo walk map 9608. Such photo walk map 9608 illustrates how the photo walk map may be displayed, so as to be viewed on the creating user device or other user devices/other users. Specifically, FIG. 94 shows a photo walk map 9608. The photo walk map 9608 shows the photo walk 9610 displayed on a GUI 9622. In the photo walk map 9608, the alternate photo points are not displayed.

Rather, only the photo points 9613 within a walk spot 9611 are displayed. However, in other embodiments, the display of the walk map 9608 can include alternate points being displayed.

The photo walk processing can include variations of the methodology as described above. For example, creation of the walk spots and creation of the overall photo walk can be integrated and/or combined. Related processing is described below. With further reference to FIG. 93, such diagram includes a high level flowchart showing photo walk processing, in accordance with an embodiment. As shown, the process starts in step 9600 in which photo walk processing is initiated by a photo system 100, shown in FIG. 93. Then, photo walk processing is performed in step 9600'. In step 9600', the CP 110 performs the processing of step 9601 and/or step 9602. Such steps can be done serially, in parallel, or contemporaneously, for example. In step 9601, the photo system (PS) 100 engages with user/user device (which is described herein as a "first user") to generate and save a photo walk. In performing such processing, subroutine 9700 can be called, as described below with reference to FIG. 98. In step 9602, the PS 100 performs processing of a created photo walk. For example, the PS 100 engages with a user/user device (which is described herein as a "second user") to "go on" a photo walk and perform related processing. In performing such processing, subroutine 9770 can be called, as described below with reference to FIG. 102.

The processing of FIGS. 93-103, can be performed by the photo system 100 including CP 110, shown in FIG. 93. The CP 110 can include a wide range of processing components 9626 as described above with reference to FIG. 1. In particular, as related to photo walk processing, the CP 110 can include a photo walk processing portion 9627 (as shown in FIG. 93), which can perform photo walk processing as described herein. The photo system 100 can also include database 120. The database 120 can include various database components 9628 as described above with reference to FIG. 1. Additionally, the database 120 can include a photo walk database portion 9629, which can store various data used by the photo walk processing portion 9627, as described herein. The PS 100 can include a communication portion 101 as described herein. The communication portion 101 can provide communication to a network 11. Accordingly, communication can be provided between the PS 100 and the user device (e.g. first user) 9620 and the user device (e.g. second user) 9717.

FIG. 95 is a diagram showing a user device 9620 with GUI 9623 for creation of a photo walk. The user device 9620 can include basic functionality and components including a speaker, microphone and one or more cameras. The GUI 9623 can be described as a photo walk creation screen. The GUI 9623 can include a variety GUI items as shown. The GUI 9623 can include item 9650, indicating that a user can utilize the GUI to create or edit a photo walk. The GUI also reflects that a user can be prompted to submit credentials, such as a password, to use the functionality shown. The GUI 9623 further includes an item 9651, which the user can tap to create a photo walk. The user can enter a name for a new photo walk and tap the item 9650. The CP 110 can then initiate processing to create a photo walk. For example, selection of the item 9650 can initiate the processing of FIG. 98, described below. A GUI item can be presented in the form of a window, field, button, radio buttons, check boxes, group boxes, dialogue boxes, and other user interface mechanisms.

Item 9652 allows a user to search for and/or select an existing photo walk to modify. The user can type text into the field 9652', and once a photo walk map is displayed in the field 9652', the CP 110 can display such photo walk map 9607 on the GUI 9623 of FIG. 95. That is, the photo walk map 9607 of FIG. 94 can be displayed by the CP 110 outputting render data to the user device, such that the render data renders the photo walk map 9607. In general, different render data can be output from the CP 110 to a user device so as to render photo walk maps, or other maps, on a GUI of a user device. The version of the map 9607 can be modified as compared to the version shown in FIG. 94, i.e. less details can be displayed in the GUI of FIG. 95 as compared to FIG. 94, given the smaller display size. The GUI of FIG. 96 also can display the photo walk map 9607 and provide additional options, as described below.

In FIG. 95, item 9654 allows a user to drag and drop walk spots (with selectable buttons 9655) to change the order or sequence of walk spots (WSs) in the selected photo walk, as shown in map 9607. For example, the human user could hold her finger on WS6 and slide such WS6 in front of WS5. As a result, the order of the walk spots can be changed and the photo walk map 9607 can be updated to reflect the updated order. Other methodology can be used to change the order or sequence of walk spots (WSs) in a displayed photo walk. Item 9656 provides indicia that instructs the user how the user can interact with the photo walk map 9607 displayed in the GUI 9623 (which is the photo walk map 9607 shown in FIG. 94). As indicated, a user can tap a WS (to add a photo point, i.e. a photo, to a WS or create a WS). That is, a photo point can highlight once selected. And, if the user wants to un-select the photo point, the user can tap the photo point again to un-select.

With further reference to FIGS. 94-96, a selected photo point can be added to the walk spot which bounds such selected photo point. If a selected photo point is not bounded by a WS, then a WS can be created to bound the photo point. That is, if a photo point is the first photo point to be selected in an area 9609A, then such area 9609A can be tagged or converted so as to constitute a walk spot (WS). A selected photo point, which is currently selected, can be designated by selection indicia 9612, such as selected photo point 9613', shown in FIG. 96. Once the user selects a further photo point, such further photo point can then be designated by the selection indicia 9612, with the previously selected photo point being indicated in some way as having previously been selected, such as by a bolded or heavier dot. Accordingly, there can be photo points within the boundaries of a WS that have not been selected, and are thus alternate photo points.

Various photo walk processing can be further described as follows. A WS can be deemed by the CP as being selected if a photo point within the WS is selected. Color coding and/or bolding may be used to indicate (in a photo walk map displayed to the user) that a photo point is selected. Color coding, bolding and/or other indicia may be used to indicate that a WS (walk spot) is selected. If a user unselects the last photo point in a WS, then such WS is unselected in an embodiment. The order of walk spots (WS) (as shown in the photo walk map 9607 of FIG. 96, e.g.) can be initially based on the order in which the WSs are created, for example. Other methodologies may be used to add photo points, to delete photo points, to add WSs and to delete WSs. In an embodiment, once a photo point is selected within a WS, all photo points in such WS will be selected. In another embodiment, as described above, photo points are not considered as part of the WS unless such photo points have been specifically selected, i.e. individually selected.

In FIG. 95, button 9658 can be provided so as to toggle between the photo walk map 9607 displaying alternate photo points (as shown in FIG. 95) and a photo walk map not displaying alternate points. That is, such button can toggle between the photo walk map 9607 of FIG. 94 and the photo walk map 9608 of FIG. 94. Button 9657 can be tapped by a user so as to view an enlarged image or rendering of the photo walk map 9607. A user can tap the button 9657 and the CP can render the GUI 9680 as shown in FIG. 96. The GUI 9680 can provide a larger view of the photo walk map 9607, but may provide less functionality and less information. It is appreciated that information and functionality displayed on a particular GUI can be varied as desired. The GUI 9623 of FIG. 95 can also provide various details of the photo walk map 9607, the various walk spots (WSs) 9611 that make up a photo walk shown in the map 9607, the various photo points 9613, and details or other attributes of (or associated with) the displayed photo walk.

As reflected at 9658', details of a selected walk spot 9611', of photo walk 9610, can be displayed. GUI item 9659 includes a data field that is populated by the CP with data indicating the number of photos associated with the walk spot 9611' (as shown in FIG. 96). In this example, all the photo points, i.e. 3 photo points, in the walk spot 9611' have been selected to be part of the photo walk 9610. That is, in this example, there are no alternate photo points inside the walk spot 9611'. However, if the user un-selects one of the photo points (inside the walk spot 9611') then there would be an alternate photo point 9614 in the walk spot 9611' (see FIG. 94 showing alternate photo points 9614. GUI item 9660 includes a data field that is populated by the CP with data indicating the coordinates of the selected walk spot 9611. For example, GPS coordinates or any suitable coordinate system could be provided, with the GPS of a particular corner of the WS designated to represent location of the WS, for example. GUI item 9661 includes a data field that is populated by the CP with data regarding a distance of the current walk spot 9611 from the prior walk spot. GUI item 9662 includes a data field that is populated by the CP with data indicating a distance of the current walk spot to the next walk spot. In this example, the current walk spot 9611 is the end of the photo walk. Accordingly, the data field of 9662 can be populated with "end". As reflected at 9663, details of the displayed photo walk 9610 can be populated by the CP 110 and rendered on the GUI 9623 by the CP 110. It is appreciated that data displayed and rendered in the GUI 9623 may also be populated by a user interfacing with the CP 110. For example, a user might be able to "override" data that is automatically populated in a particular field of a GUI. The CP can be provided with the ability to set upper and lower tolerances of values. GUI item 9664 includes a data field that is populated by the CP with data regarding the number of photos associated with the photo walk, which is 14 photos in this example. The value in item 9664 can be based on the number of selected photo points in the walk spots; all the photo points in the walk spots even if such photo points are not selected; all the photo points shown in the photo walk map 9607; or some other variation of such values. Text indicia could be presented on the GUI so as to advise the user of the basis of the value in GUI item 9664. GUI item 9665 includes a data field that is populated with data regarding the area of the photo walk. For example, the area might be Chicago, as shown. GUI item 9666 includes a data field that is populated with data regarding the total number of walk spots 9611 in the photo walk 9610. In this example, there are six walk spots 9611 in the photo walk 9610. GUI item 9667 includes a data field that is populated by the CP with data regarding the linear distance of the photo walk. Such distance can be based on various attributes. For example, such distance can be based on the "line of sight" distance between the various walk spots of the photo walk. Such distance can be generated by a user actually walking the photo walk, and recording the distance via GPS location from start to finish of the photo walk. Such distance could be utilized using and/or interfacing with existing map data, such as from "Google Maps". The distance of a photo walk may be constrained by upper and lower limit tolerances. For example, in order to be accepted into the photo system, the photo walk may be required to be greater than 15 minutes and less than six hours.

GUI item 9668 includes a data field that is populated with data regarding whether or not the particular photo walk is restricted in terms of access. For example, it might be that only friends, based on associations in the photo system, is allowed access to the particular photo walk 9610. Access might be based on groups to which a user belongs. Access might be provided to all users of the photo system. GUI item 9669 includes a data field that can be populated by the CP with data regarding a type or category of the particular photo walk. Such data could be automatically populated by the CP or could be input via interface with the user. In this example, the type of photo walk is "nature". A data field can be provided for a hashtag(s) for the photo walk. Also, GUI item 9670 includes a data field that is populated by the CP with data regarding a recommended method of the photo walk. A plurality of options can be provided. For example, the recommended method of a photo walk might be to walk, jog, bike, motorized bike, drive, climb, or some other option. GUI item 9671 includes a data field that can indicate whether the particular photo walk is handicapped accessible. For example, if the photo walk can be traveled on a paved surface, then such photo walk can be indicated as handicapped accessible.

GUI item 9672 includes a data field that is populated by the CP with data regarding the estimated duration of a photo walk. Such data can be based on and/or related to item 9667 that provides a linear distance or other distance of a photo walk. As shown, item 9672 can provide estimated duration for walking the photo walk, biking the photo walk, jogging the photo walk, or some other mode of travel. Also, the duration can include wait times or dwell times estimated for each of the walk spots based upon the selected method of a photo walk. For example, a photo walk could be 1 mile long; the estimated time to walk could be estimated to be 20 minutes (a 3 mile per hour walking pace estimate); and the dwell time at each walk spot could be estimated to be five minutes. Thus, if there are six walk spots, then the estimated duration to "go on" the photo walk would be 50 minutes. The CP 110 can factor in other variations and/or adjustments to duration of the photo walk, as well as other attributes shown in the GUI 9623 and other GUI is described herein. Such variations and/or adjustments can be factored and/or related to the selected method of a photo walk.

Figure 97:
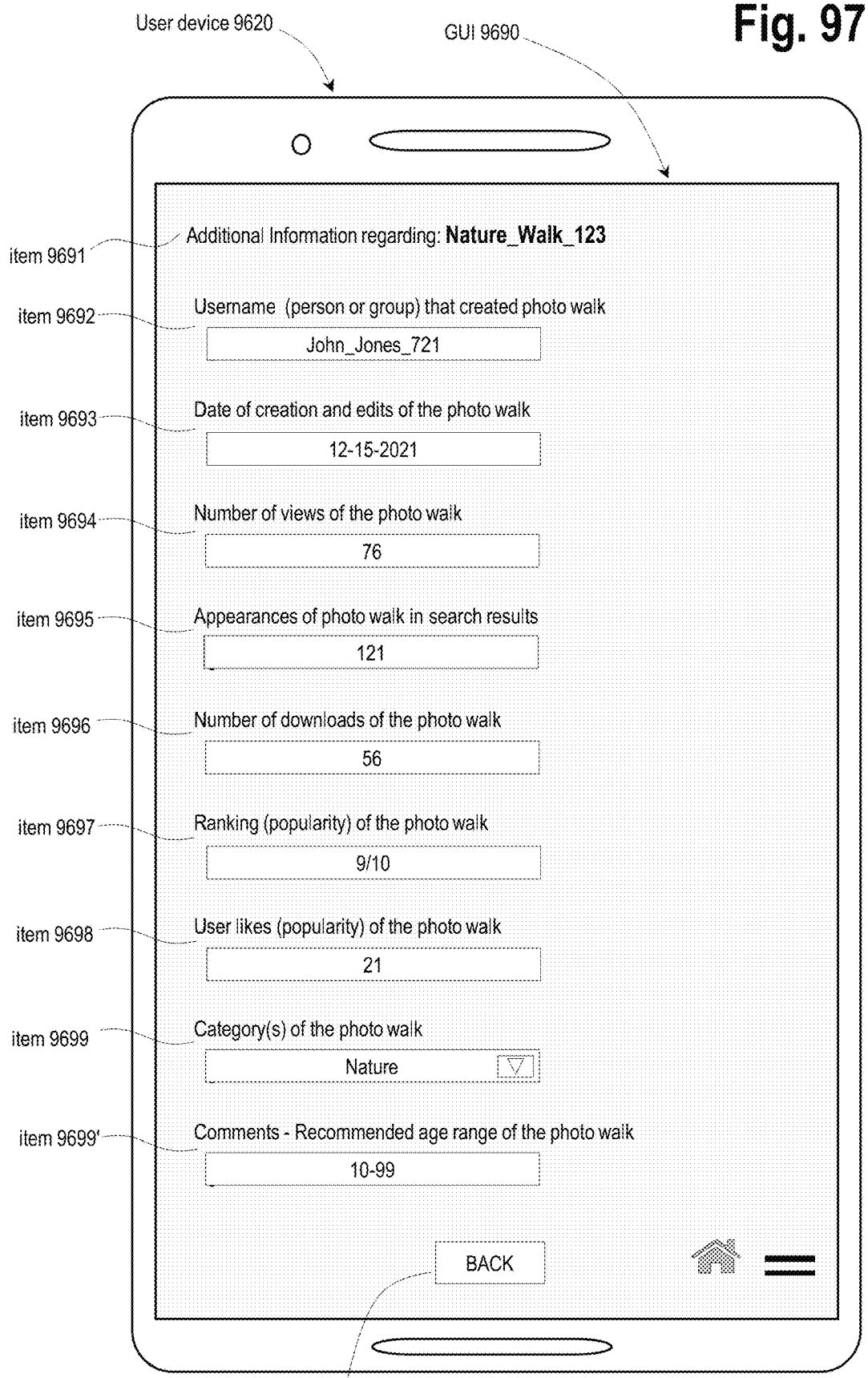
FIG. 97 is a diagram of a further GUI for creation, by the first user, of the photo walk.

GUI item 9674 can be provided in the form of a button, which can be selected by the user to save a photo walk that has been created. Relatedly, GUI item 9675 can be provided in the form of a button, which can be selected by the user to publish a photo walk that has been created. Accordingly, in an embodiment, the save feature can allow the user to go back and perform further edits to a photo walk at a future time. On the other hand, the publish option can allow a user to publish a photo walk and/or finalize a photo walk for distribution to other users. A photo walk might be published for distribution, as well as saving a copy of data of a photo walk for further edits. As shown in FIG. 95, the GUI 9623 can also include button 9676. The button 9676 can be tapped to display additional information regarding a photo walk that is in the process of being created. Illustratively, FIG. 97 shows a GUI which can be rendered (by the CP 110) upon button 9676 being selected or tapped by the user. An option or functionality, rendered on a user device in the form of a GUI (by the CP 110), can be presented in the form of a window, button, radio buttons, check boxes, group boxes, dialogue boxes, and other user interface mechanisms.

As referenced above, FIG. 96 shows user device 9620 with a further GUI 9680 rendered by the CP 110. The GUI of FIG. 96 can be rendered by the user tapping the button 9657 in GUI 9623, of FIG. 95. The GUI 9680 can include indicia 9681 reflecting that the GUI is an enlarged photo walk, as compared to that shown in FIG. 95. Item 9682 can display the name or other identification information of the photo walk being displayed. Any of the functionality and/or data provided by the GUI 9623 of FIG. 95 could be provided in the GUI of FIG. 96.

In similar manner to the GUI item 9654 with selectable buttons 9655 (shown in GUI 9623 in FIG. 95), the GUI 9680 of FIG. 96 can include GUI item 9684. Item 9684 allows a user to drag and drop walk spots (with selectable buttons 9685) to change the order or sequence of walk spots (WSs) 9611 in the photo walk 9610 that is displayed, in the GUI 9680. As the order of WSs is changed, numbering of the WSs on the photo walk 9610 can be updated by the CP 110.

In similar manner to GUI item 9656 (of GUI 9623), the GUI 9680 can include the GUI item 9686. The item 9686 provides indicia that instructs (the user) how the user can interact with the photo walk map 9607 displayed in the GUI 9680 (which is the photo walk map 9607 shown in FIG. 94 and FIG. 95). As indicated, a user can tap a photo point to add such photo point, i.e. a photo, to a WS (or create a WS). That is, a photo point will highlight once selected. And, if the user wants to un-select the photo point, the user can tap the photo point again to un-select. Functionality can be provided as described above. As shown in FIG. 96, the GUI 9680 can include GUI item 9687. The item 9687 can provide a button "BACK to information" that the user can tap to "go back" to the GUI 9623 shown in FIG. 95. The GUI 9680 can also include items 9688 and 9689. Such items can provide a "save" photo walk option and a "publish" photo walk option. Such options are described above. Additionally, the GUI 9680, of FIG. 96, can include an item 9689'. The user can tap such item to create a new photo point, to be part of the user's photo walk. In an embodiment, a photo point can be created in anticipation of future photos being taken at such photo point. That is, a photo point can be created without a currently existing photo. Relatedly, functionality can be provided to create a walk spot (WS) even though no photo exists in such WS. Similarly, a WS can be created when associated with an existing system that ranks the popularity of photo locations. Based on the popularity of one or more areas, a photo system or server can add a recommended WS(s) that are within the existing geography or general area. Also, photo points and/or WSs can be presented to a user, based on criteria such as popularity, for addition into a photo walk, to provide a reminder.

FIG. 97 is a diagram of a further GUI 9690 for creation, by the first user, of the photo walk. In the GUI 9690, further details of the photo walk (in this example Nature_Walk_123 with photo walk map as shown in FIGS. 95 and 96) can be provided. The GUI items of the GUI 9690 can be populated by the CP 110 (and/or by the user) and rendered on the GUI 9690 by the CP 110.

The GUI 9690 of FIG. 97 can be rendered (by the CP 110) upon button 9676 (shown in the GUI of FIG. 95) being selected or tapped by the particular user. The GUI item 9691 can provide the name or other identifying information of the particular photo walk 9610. The GUI 9690 can be presented to various users, including the user device, that is creating the photo walk. Such user can be described as a first user, whereas, a second user can be a user who accesses and/or uses a photo walk that is created by the first user.

The GUI item 9692 can provide the username (or other indicia) indicating the user that is creating the photo walk. The GUI item 9693 can provide the date of creation and date of edits of the photo walk. The GUI item 9694 can provide the number of views of the photo walk by others and/or other data regarding views of the photo walk. The GUI item 9695 can provide data regarding the number of appearances of the photo walk in search results. The GUI item 9696 can provide data regarding the number of downloads of the photo walk. The GUI item 9697 can provide data regarding ranking (or other popularity attributes) of the photo walk. The GUI item 9698 can provide data regarding user likes (or other popularity attributes) of the photo walk. The GUI item 9699 can provide data regarding the category(s) or type(s) of the photo walk. The GUI item 9699' can provide data regarding comments or other information regarding a recommended age range of the photo walk and other related information regarding the photo walk. The GUI 9690 can provide various other data regarding the particular photo walk. Such displayed data can be automatically populated by the CP 110, displayed data can be populated by the user selecting from a drop down menu, and/or the displayed data can be entered by the user into the particular data field or other data input mechanism. The GUI item 9699' can also be provided as shown. The GUI item 9699' can be selected or tapped by the user to "go back" such that the CP renders the GUI 9623 of FIG. 95.

In general, as described herein, searching, filtering (and other processing such as crowd-sourcing) of photos, photo walks, and other items can be based on attributes such as: where (location); what (category (architecture, diners, tourist, urban) or hashtags); who (user, users, user group, creating user, tagging user); when (time ranges); volume (popularity by number of photos taken in a concentrated area); quality (popularity by user "likes"); volume (popularity of downloads) and—as to photo walks in particular—method of photo walk (walk, bike, drive); and estimated duration of photo walk (hours, days), for example.

Figure 98:
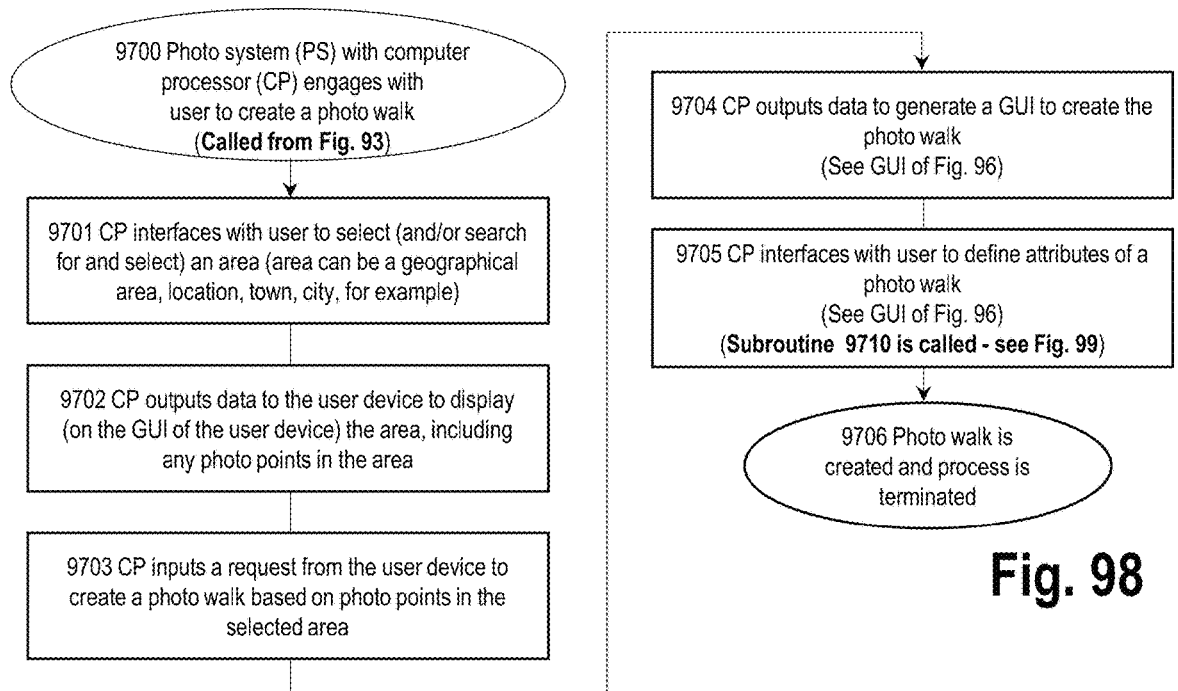
FIG. 98 is a flowchart showing a subroutine "photo system (PS) engages with user to create a photo walk" as called from FIG. 93.

FIG. 98 is a flowchart showing a subroutine "photo system (PS) with computer processor (CP) engages with user to create a photo walk" as called from FIG. 93. The processing can be performed by the CP 110 of the PS 100 as illustrated in FIG. 93. The subroutine starts in step 9700 and passes onto step 9701. In step 9701, the CP interfaces with a user, i.e. a user device 9620 (shown in FIGS. 93 and 95) to select (and/or search for and select) an area. The area can be a geographical area, location, town, city, for example. Then, in step 9702, the CP outputs data to the user device 9620 to display (on the GUI of the user device) the area, including any photo points in the area. The process then passes to step 9703. In step 9703, the CP inputs a request from the user device to create a photo walk based on photo points in the selected area. For example, a button "CREATE PHOTO WALK" could be rendered on the user device, alongside an area that is displayed on the user device. Then, in step 9704, the CP outputs data to generate or render a GUI, to provide the user the functionality to create the photo walk. For example, the GUI of FIG. 95 can be rendered on the user device.

Figure 99:
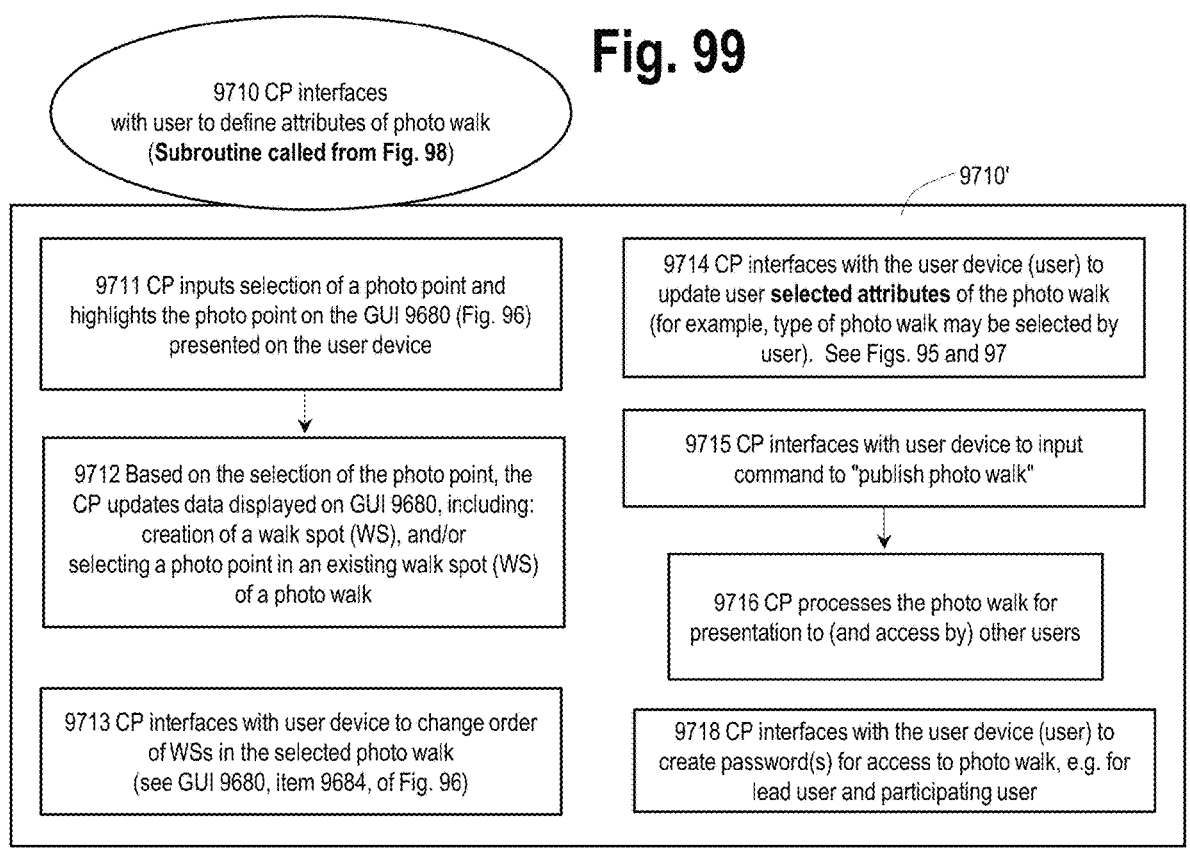
FIG. 99 is a flowchart showing a subroutine "PS interfaces with user to define attributes of photo walk" as called from FIG. 98.

Then, in step 9705, the CP interfaces with the user to define attributes of a photo walk, including to provide the various functionality described herein. Step 9705 can be provided by the processing of subroutine 9710 of FIG. 99. Accordingly, in step 9705, subroutine 9710 of FIG. 99 can be called or invoked so as to perform the further processing related to creation of a photo walk. Then, the process passes on to step 9706. In step 9706, the photo walk has been created and the process is terminated. FIG. 99 is a flowchart showing "CP interfaces with user to define attributes of photo walk" of subroutine 9710 as called from FIG. 98. The subroutine 9710 can include any of the processing shown in step 9710' of FIG. 99. The subroutine 9710 can use the GUIs of FIGS. 95-97, for example. For example, the processing of FIG. 99 can include the various photo walk processing described above with reference to FIGS. 93-97. Illustratively, in step 9711, the CP inputs selection of a photo point and highlights or indicates (with selection indicia 9612) the photo point. See, for example, the GUI 9680 (of FIG. 96). Then in step 9712, based on the selection of the photo point, the CP updates data displayed on the GUI 9680. Such processing can include (a) creation of a walk spot (WS) if a user selects a photo point that is not already bounded by a photo point, and/or (b) selecting a photo point that is within the bounds of an existing WS of a photo walk. Also, in step 9713, the CP can interface with the user, i.e. the user device, to change order of a WS 9611 in the selected photo walk 9610. Such processing is described above with reference to the GUI items 9684, 9685 of the GUI 9680 of FIG. 96.

Further, in step 9714, the CP interfaces with the user device (user) to update user selected attributes of the photo walk. For example, the type of photo walk may be selected by user. The GUI of FIGS. 95 and 97 can be used to provide such processing. For example, attributes can include subject matter within photos of a "type" or "category" tag related to photos, such as Restaurants, or Nature or Bars, etc. Various criteria can be entered, via a GUI similar to that shown in FIG. 97, so as to support levels of filtration, and to support filtering photos as described herein, such as filtering photos based on some time window, e.g. the last 1, 2, 3, 4, 5, or 6 months from when the photo was taken. Also, hashtags can be associated with photos and/or photo walks, and used to filter photos and/or photo walks. In step 9715, the CP interfaces with user device to input a command to "publish photo walk". Then, in step 9716, the CP processes the photo walk for presentation to (and access by) other users, as described above.

Figure 100:
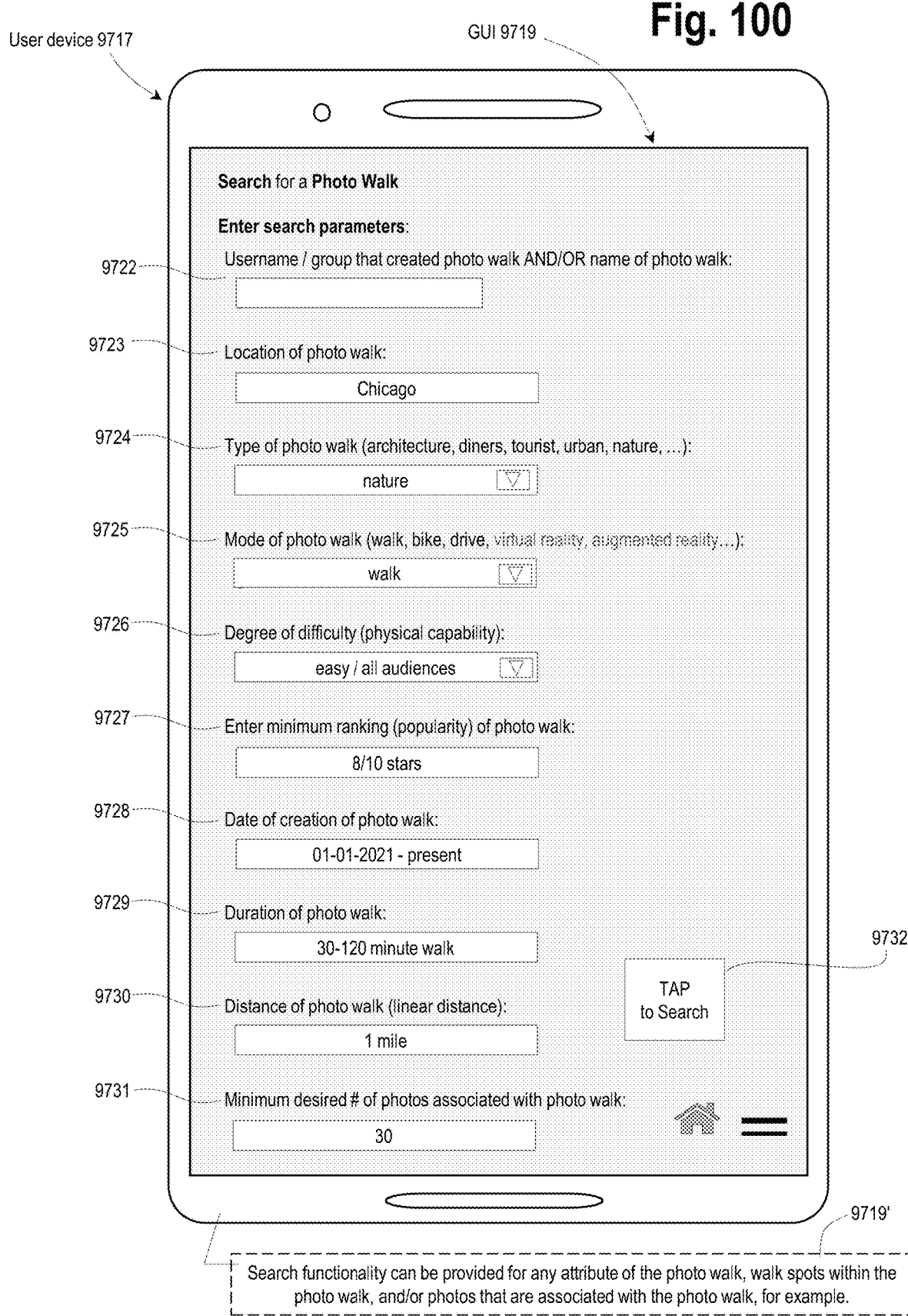
FIG. 100 is a diagram of a further GUI for performing a search for a photo walk, by a second user on a second user device.

Hereinafter, further aspects of searching for a photo walk and using a photo walk will be described with reference to FIGS. 100-103. FIG. 100 is a diagram of a user device 9717 with GUI 9719 for performing a search for a photo walk, by a second user on a second user device. That is, for purposes of description, a first user/first user device can be one that creates a photo walk; and a second user/second user device can be one that searches for and "goes on" the photo walk that was created by the first user.

Accordingly, FIG. 100 includes various functionality for a user, e.g. a second user, to search for a photo walk of interest. As reflected at 9719', search functionality can be provided for any attribute of the photo walk, walk spots within the photo walk, and/or photos that are associated with the photo walk, for example. For example, the GUI 9719 can include search functionality for username/group that created photo walk AND/OR name of photo walk (GUI item 9722); location of photo walk (GUI item 9723); type of photo walk, such as architecture, diners, tourist, urban, and nature (GUI item 9724); mode of photo walk, such as walk, bike, drive, virtual reality, and augmented reality (GUI item 9725); degree of difficulty (GUI item 9726); minimum ranking (popularity) of photo walk (GUI item 9727); date of creation of photo walk (GUI item 9728); duration of photo walk (GUI item 9729); distance of photo walk (GUI item 9730); and minimum desired # of photos associated with photo walk (GUI item 9731), for example. Such items can be provided with pop-up menu or a field into which data can be entered. For example, the item 9726 can be provided with pop-up options: easy/all audiences; moderate; difficult/strenuous, for example. Once the user enters or selects the search criteria that is desired, the user can tap the search button 9732. The CP 110 can perform the search, based on the search criteria, and return the search results to the user in the form of a list, for example.

Figure 101:
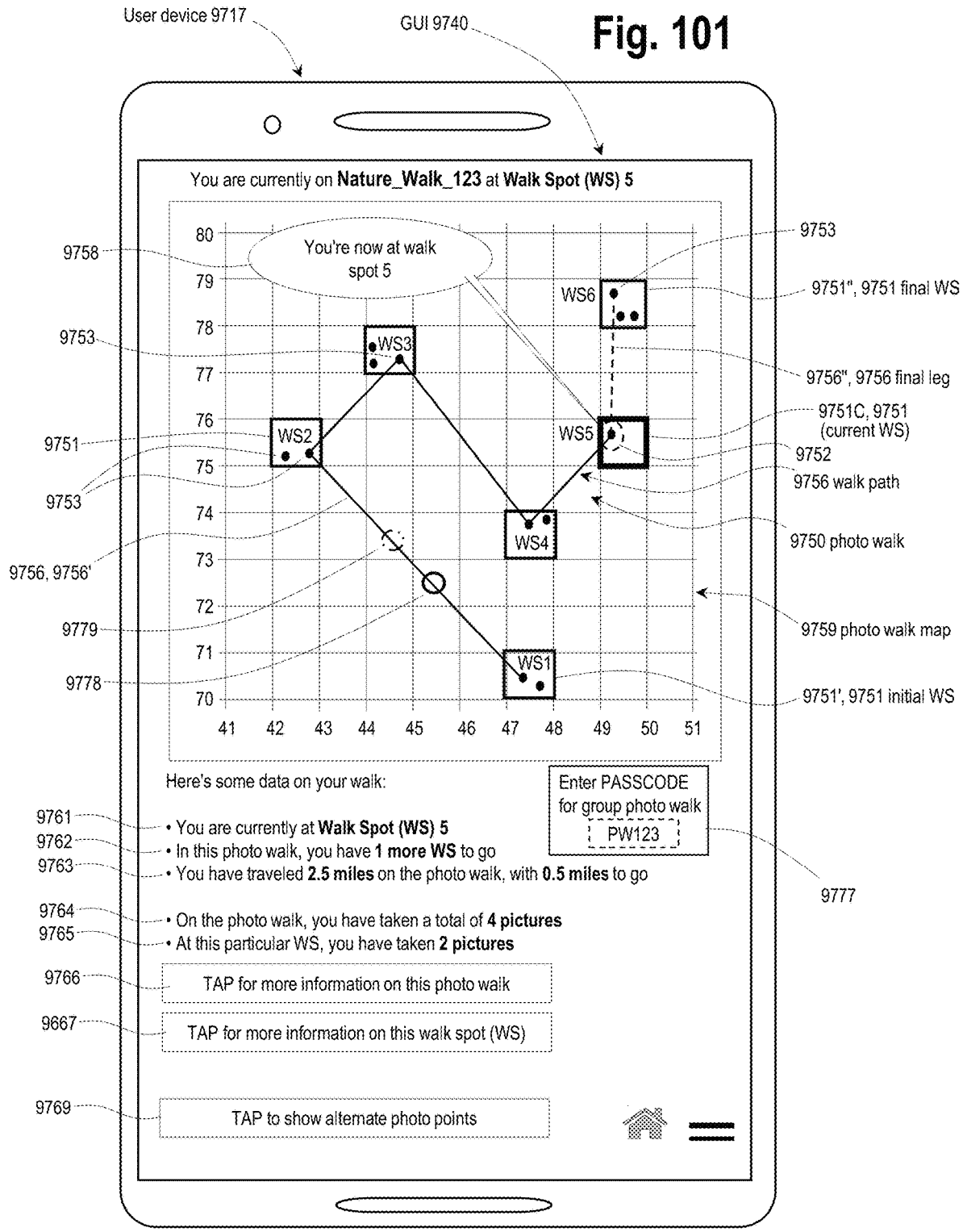
FIG. 101 is a diagram of a GUI that can be rendered on the user device (of the second user) as the second user is going on the photo walk.

FIG. 101 is a diagram of a GUI 9740, which can be displayed on the user device 9717, as the second user is going on the photo walk. The GUI 9740 can render, based on data input from the CP 110, a photo walk 9750. The photo walk shown can be the same as or similar to the photo walk shown in FIG. 96. The photo walk 9750 can include a plurality of walk spots (WSs) 9751. The photo walk 9750 can include a first walk spot 9751' and an end or final walk spot 9751". In this example, the user, i.e. the second user as described herein, is currently at a current walk spot 9751C. The current walk spot 9751C can be indicated by current location indicia 9752 (which can encompass the representative or dominant photo point of the particular walk spot) and/or a heavier boundary line as shown in FIG. 101. Other indicia or text can be used to convey to the user what walk spot (WS) the user is currently on or near. Each of the walk spots can include one or more photo points 9753. For each walk spot there can be a representative walk spot as described above. The photo walk 9750 can include a walk path 9756, i.e., a path 9756 of the photo walk. The walk path 9756, and other walk paths described herein, can include legs that extend between the various walk spots 9751. The walk path 9756 can include a first leg 9756', as well as a final leg 9756". The GUI 9740 can also display various alerts that convey data or information to the user. For example, as shown in FIG. 101, an alert 9758 can alert the user that she is currently at walk spot 5. Data or information can be provided using various GUI items. As shown in FIG. 101, GUI item 9761 can also advise the user device of the current walk spot. Item 9762 can advise the user of how many walk spots the user has to go to complete the photo walk, as well as how many walk spots the user has already passed by or completed. Item 9763 can advise the user of the distance the user has traveled, as well as distance still to go. Item 9764 can advise the user of how many pictures the user has taken on the current photo walk. Pictures that are taken by the user can be automatically added into the photo walk map 9759, i.e. so as to update the map 9759. Such updated map 9759, with photos added, may or may not be shared with other users. For example, if the user taking the pictures is with the group, then the user can opt to share newly added pictures with persons in the group. Relatedly, item 9765 can indicate the number of pictures that the user has taken in the current walk spot. A user can tap another walk spot so as to display similar information relating to such other walk spot. For example, a user can tap a walk spot, and then tap item 9767 for more information on the particular walk spot. Also, item 9766 can be provided for the user to select or tap so as to provide additional information on the photo walk in general.

Also, functionality can be provided such that the user is provided access or viewing of the various photos, associated with each of the photo points 9753 respectively. For example, the user can be provided the ability to double-click (or hover over) a particular photo point 9753 and have the corresponding photo appear. Also, photos associated with the photo walk, a particular walk spot, and/or a particular walk point can be displayed on the GUI. For example, if the user is currently geographically located on a walk spot, then all photos associated with that walk spot could be displayed on the GUI. For example, thumbnails of each of such photos in the particular walk spot could be displayed on the GUI. Also, alternate photo points are not shown in FIG. 101. However, the user can select to show alternate photo spots by tapping button 9769. The walk spots can be labeled as shown in FIG. 101, with the WS # inside a bolded boundary, or in any other desired manner. The current walk spot 9751C can be provided with heavier bolding. Also, color coding could be used to convey the current walk spot, walk spots already passed by, walk spots that are still to come on the walk path, walk spots that exceed a certain threshold number of photos, and other information.

Figure 102:
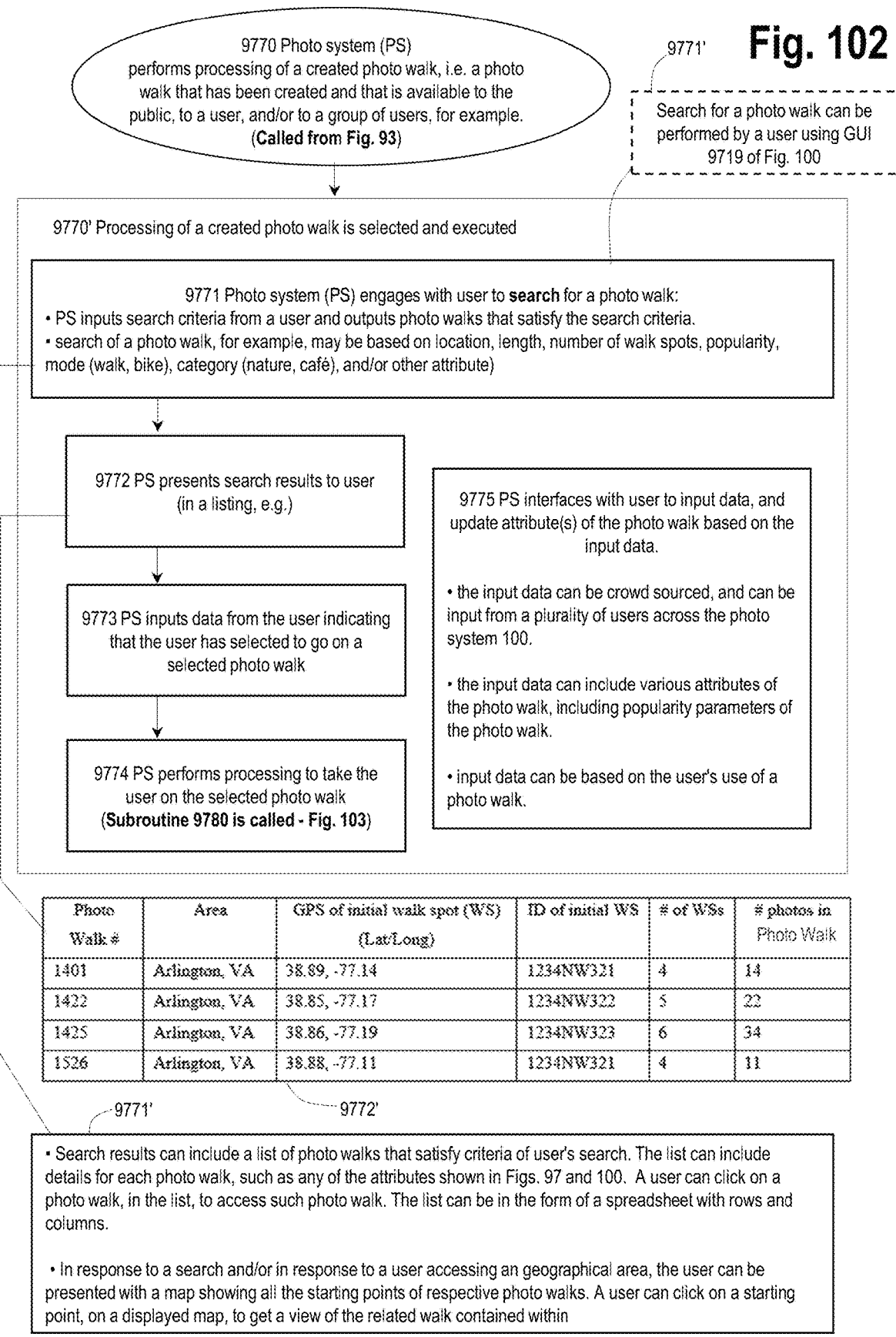
FIG. 102 is a flowchart showing a subroutine "PS performs processing of a created photo walk" as called from FIG. 93.

FIG. 102 is a flowchart showing a subroutine "photo system (PS) performs processing of a created photo walk" as called from FIG. 93. The CP 110, and in particular the portion 9627, of the PS 100 (of FIG. 93) can perform the processing of FIG. 102. As shown in FIG. 102, the subroutine can be initiated in step 9770, and pass to step 9770', in which processing of a created photo walk is selected and executed. In step 9771, the photo system (PS) engages with the user to search for a photo walk. As reflected at 9771', search for a photo walk can be performed by a user using GUI 9719 of FIG. 100. The PS 100 can input search criteria from a user and output photo walk(s) that satisfy the search criteria. Search of a photo walk, for example, may be based on geographical location, length or distance of the photo walk, number of walk spots, popularity, mode (walk, bike), category (nature, café), and/or other attributes. Then, in step 9772, the PS, i.e. the CP 110, presents the search results to the user, such as in a listing 9772', for example. Then, in step 9773, the PS inputs data from the user indicating that the user has selected to go on a selected photo walk. For example, the user can select from a photo walk listing that the user is presented with on the user device 9717 of FIG. 101. Relatedly, a photo "walk" as described herein is not limited to the physical act of "walking", but can be applied to any mode of transportation as desired, such as biking, running, jogging, and driving, for example.

As reflected at 9771', search results can include a list (such as list 9772') of photo walks that satisfy criteria of a user's search. The list can include details for each photo walk, such as any of the attributes shown in FIGS. 97 and 100. A user can click on a photo walk, in the list, to access such photo walk. The list can be in the form of a spreadsheet with rows and columns. In response to a search and/or in response to a user accessing a geographical area, the user can be presented with a map showing all the starting points of respective photo walks. A user can click on a starting point, on a displayed map, to get a view of the corresponding photo walk. After step 9773, in step 9774, the PS performs processing to take the user on the selected photo walk, i.e. to engage with the user and guide the user through the selected photo walk. To perform such processing, the user can invoke subroutine 9780, described below with reference to FIG. 103. In step 9770' of FIG. 102, step 9775 can also be performed. In step 9775, the PS can interface with the user to input data, and update attribute(s) of the photo walk based on the input data. The input data can be crowd sourced, and can be input from a plurality of users across the photo system 100. The input data can include various attributes of the photo walk, including popularity parameters of the photo walk. The input data can be based on the user's use of a photo walk.

Hereinafter, further aspects of photo walk processing will be described. As described above, FIG. 95 shows various functionality associated with creation of a photo walk. To start a photo walk, such as in the processing of FIG. 98, a user can start from scratch and begin with a grid view of photos in a selected area. A user can start with a user's own saved photos. Photos can be filtered in various manner, for example to include all users' photos or only "my photos", i.e. the photos of the user creating the photo walk. Photos that are presented to the user, in creation of a photo walk can be filtered based on type, e.g. "architectural". Photo location of a photo can be based on the GPS location of the photo, e.g. the location of a cell phone taking the photo, with such location being embedded into the metadata of the particular photo. A second user can create a photo walk based on a first user's photo walk. For example. The second user might add photos to a first user's photo walk. The second user can be limited in ability to copy the first user's photo walk. A first user can be provided the ability to block other users from copying or viewing the first user's photo walk. Other constraints can be implemented.

Further, photos can be selected and saved for a photo walk, as described above. A photo walk and photos in the photo walk can be named and associated, by the user, with other attributes, such as comments. In general, in creation of a photo walk and in use of (i.e. "going on") a photo walk, a user may tag and/or otherwise associate information to the photo walk including: photos in the photo walk, alternate photo points (associated with respective photos) that are not yet a part of the photo walk, and a photo walk path and legs, of the photo walk (see FIG. 101), for example. Saved photos can have embedded GPS data in anticipation of future photo walk points or "alternate walk points". A user can tag a photo in anticipation of using the photo in a future photo walk. Accordingly, the user can select an area to view on her user device (e.g. cell phone) and select an option to view all the photos that she has saved. Other mechanism can be provided to save a photo and tag such photo for future generation, i.e. creation, of a photo walk and/or to view photos in creation of a photo walk. As described with reference to FIG. 96, a user can save and publish a photo walk. A user can edit a saved photo walk so as to create a new photo walk. For example, a user might add new photos to a saved photo walk.

As shown in FIGS. 96 and 101, for example, a photo walk can be displayed as a sequence of walk spots (WSs) on a photo walk map. As shown in FIG. 96, the GUI 9680 can be provided with a button 9611T that can provide functionality such that the user can toggle between (a) the GUI 9680 displaying WS numbering as shown in FIG. 96 and (b) the GUI 9680 displaying a respective photo (for example, photo 9611P) that is respectively associated with each WS providing a visual representation of the WS. Such respective photo could be a representative photo as described above. The representative photo can be chosen, e.g. based on popularity, to represent the particular WS, as reflected at 9613N in FIG. 94. Also, upon the user selecting a particular WS (such as by tapping the WS) a panel or palette of photos, i.e. thumbnails of photos, can be presented, such as in a bottom portion of the GUI screen. Also, the representative photo of the selected WS can be rendered in a bottom portion or panel of the GUI. In an embodiment, a user can click a WS (or click the photo walk) multiple times so as to click through display of: (a) the photo walk map including numbering of the WSs, (b) display of a thumbnail of a representative photo, (c) display of thumbnails of all photos associated with the WS including alternate photos, and (d) display of thumbnails of photos associated with the WS, but not including alternate photos, for example. A user can click a particular photo so as to make the photo larger and click again to render various information regarding the particular photo. Such functionality can also be provided with other GUIs described herein, such as the GUI of FIG. 101. Also, a user can be provided an ability to add or subtract more photo walk points, as well as to add or subtract "alternate walk points". Also, data regarding a photo walk can be selected and exported so as to be used for printing a photo book. Aggregated data from a photo walk can be used in other applications. In general, functionality provided with one of the GUIs described herein can also be provided with other GUIs described herein.

Figure 103:
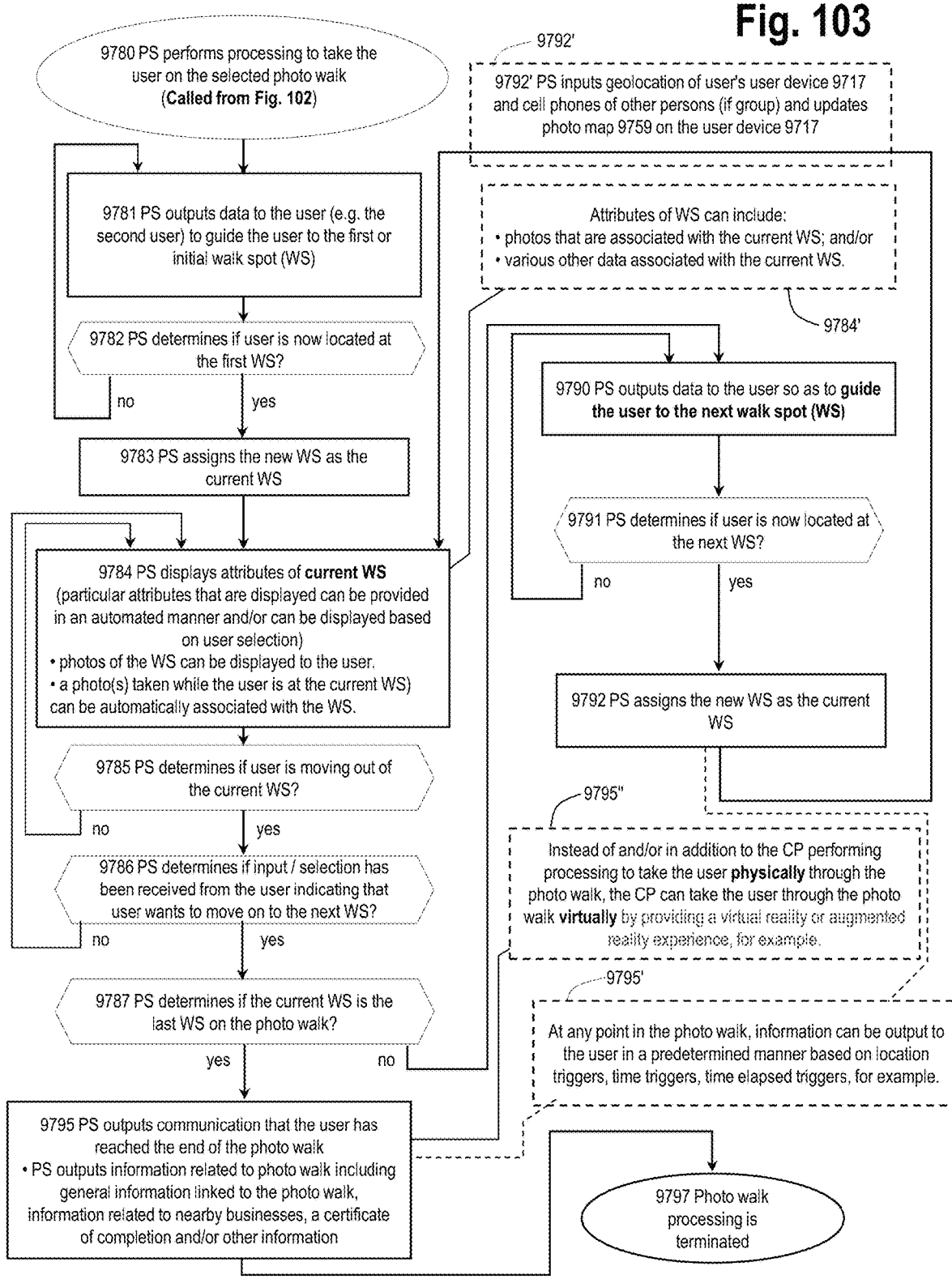
FIG. 103 is a flowchart showing a subroutine "PS performs processing to take the user (a second user) on the selected photo walk" as called from FIG. 102.

FIG. 103 is a flowchart showing the subroutine "PS performs processing to take the user on the selected photo walk" as called from FIG. 102. The subroutine starts in step 9780 and passes to step 9781. In step 9781, the PS outputs data to the user (e.g. the second user) to guide the user to the first or initial walk spot (WS). Then, in step 9782, the PS determines if the user is now located at the first WS. If no, then the process returns to step 9781. If yes, the process passes onto step 9783. In step 9783, the PS assigns the new WS as the current WS. Then, in step 9784, the PS displays attributes of current WS (particular attributes that are displayed can be provided in an automated manner and/or can be displayed based on user selection). Photos of the WS can be displayed to the user. Also, a photo(s) taken while the user is at the current WS) can be automatically associated with the WS, and displayed to the user. As reflected at 9784', attributes of a WS can include photos that are associated with the current WS; and/or various other data associated with the current WS. After step 9784, in step 9785, the PS determines if the user is moving out of the current WS. If no, the process returns to and continues with the processing of step 9784. If yes in step 9785, the process passes onto step 9786. In addition to the geo determination of step 9785, in step 9786, the PS determines if an input or selection has been received from the user that indicates the user wants to move on to the next WS. If no, the process returns to and continues with the processing of step 9784. If yes, the process passes onto step 9787. In step 9787, the PS determines if the current WS is the last WS on the photo walk. If no, then in step 9790, the PS outputs data to the user so as to guide the user to the next WS. Then, in step 9791, the PS determines if the user is now located at the next WS. If no, the process passes back to step 9790. The processing of subroutine 9780 in FIG. 103 can include various processor "wait" times as desired, so as to conserve processing resources. For example, in step 9791, the PS could check every 0.5 seconds, every second, every 30 seconds, every minute, or other duration of time to determine if the user has advanced to the next WS. If yes in step 9791, the process advances to step 9792, in which the PS assigns the new WS as the current WS. Then, the process returns to step 9784. Processing continues as described above.

As reflected at 9795' in FIG. 103, at any point in the photo walk, information can be output to a user in a predetermined manner based on location triggers, time triggers, time elapsed triggers, for example. Information can be output to a first user who created the photo walk, and to the second user who is going on or participating in the photo walk. Comments can be associated with options such as to agree, update, and delete; push to the creator only and/or push to the general public; and can include memoirs or representations that can be saved for user specific memories. Comments can be pushed to the first user (who created walk) via a blog type communication channel, such as "Need to adjust the path of this walk since bridge is out." In general, various assistance and data can be provided to the second user and other users that are going on the photo walk or otherwise engaging in the photo walk. For example, data can include direction guidance, tour information regarding surrounding items of interest, and other information.

As reflected at 9792' in FIG. 103, the PS can input geo-location of (a) the second user device 9717 that is participating in the photo walk and (b) cell phones of other persons (if in a group context with plural persons going on the photo walk); and can update photo walk map 9759 of GUI 9740 (FIG. 101) on the user device 9717. For example, the second user can view her position on photo walk map 9759 (FIG. 101) by blip or spot 9778. A leader of a photo walk group, i.e. the leader's user device, can be represented by blip, spot or other graphic item 9779. Other indicia can be used instead of such blips or spots. A participant in the photo walk might be provided only her own location and the location of the leader user device. However, the leader of the photo walk may be provided with location information, i.e. blips, of all the user devices that are on the photo walk in the group. Accordingly, the GUI 9740 of FIG. 101 could be provided with a blip for each participant, so that the leader user can track all the users/user devices in the group and identify stragglers. Relatedly, the GUI 9740 of FIG. 101 can be provided with a credential or password entry item 9777 with text field, as shown on the left side of the GUI 9740. The participating user can enter a passcode for access to a photo walk, and the lead user can enter a different passcode, to access additional information including participant(s) location. For example, creation of such credentials can be performed in the processing of FIG. 99, in step 9718. The photo walk can then be initiated by the lead user and various information can be provided to participants of the photo walk.

With further reference to FIG. 103, a yes can be rendered in step 9787, indicating that the user has reached the last WS. Accordingly, the process passes onto step 9795. In step 9795, the PS outputs communication that the user has reached the end of the photo walk. The PS outputs information related to the photo walk including general information linked to the photo walk, information related to nearby businesses, a certificate of completion and/or other information, for example. As reflected at 9795", instead of and/or in addition to the CP performing processing to take the user physically through the photo walk, the CP can take the user through the photo walk virtually including presentation of other media with virtual reality and/or augmented reality, inclusive of a virtual gaming experience. Such virtual processing can include interfacing with the user to advance through the various WSs on a user device. At each WS, the user could be presented with various photos that are associated with the particular WS. After step 9795, the process passes to step 9797. In step 9797, the photo walk processing is terminated.

As described herein, systems and methods are described for processing digital photos. However, as otherwise described herein, the systems and methods described herein are not limited to digital photos. Various other media can be processed, such as video media, podcasts, and what is described herein as "reality experience media" (REM).

REM can include virtual reality media and augmented reality media. Relatedly, (a) virtual reality media can support a virtual reality experience, i.e. virtual reality (VR), and (b) augmented reality media can support an augmented reality experience, i.e. augmented reality (AR). REM can include metadata, and such metadata can include various attributes such as time data (time of creation), location data (location of creation), as well as any other type of metadata described herein. Virtual reality (VR) can include a digital experience that provides an imagined scenario that is viewed within a closed visual environment. VR may also include physical elements from the outside world such as sound. Augmented reality (AR), can include an overlay of computer-generated objects or imagery upon the real world environment including real world elements. AR can recognize elements in the real world environment and then position imagined objects in relation to the real world elements, with varying levels of interactivity.

A user device to support VR and AR can include a headset and mobile phone, with the mobile phone integrated within and supported by the headset. Such user device can leverage processing of the CP 110 and/or a stationary desktop, for example. A virtual reality experience, provided in the context of photo walk processing, could include the user being presented with (1) a series of photos associated with a first walk spot (WS), (2) a video to capture imagery of walking a first leg of the photo walk, (3) a series of photos associated with a second WS, (4) a further video to capture imagery of walking a second leg of the photo walk, and so forth. Such imagery (presented in steps 1-4) could be presented by using the display of a mobile phone, while a surrounding view area is transparent showing the outer real world, which could be a forest in which the user is physically present. Alternatively, a computer generated forest scene could be generated to surround the imagery of steps 1-4. Accordingly, a virtual reality experience and/or an augmented reality experience can be provided. Such reality experiences, as described herein, can include, a virtual gaming experience. Other processing in an embodiment can include: when a user is searching on a particular location, the user can see graphic visual presentation of created content "virtual reality" that is tagged to the particular location, for viewing and listening. Other processing in an embodiment can include: when a user is in a particular location and is searching for "what's near me now", i.e. the CP is performing a search for content that is near the user, the user can find and view/listen to augmented reality on their device.

In accordance with further aspects of the disclosed subject matter, systems and methods are provided for processing media with filtration and distillation for dynamic viewing of content and dynamic grouping of users. In accordance with embodiments, dynamic viewing gives a user the ability to select filtration or filter options that allow the user to distill media to find, view or stream the media that the user wants to see. The universe of media entered by users into the described photo and media processing system provides a substantial amount of stored data. The stored data includes associated metadata embedded in the media. As described below, a user can choose a feature like "Filter," "Find," or "Stream" which allows the users to build filters that identify, distill, find and present media or content to the user for viewing, streaming, saving or other use and is based upon any or all of the following user selected criteria:

(1) Location (where)—for example City, State/Province, Country, Named Site, such as Statue of Liberty. (2) Category/Type (what)—for example, Architectural, Diners, Bars, Mountains, Sunsets. (3) Users or Groups of users (who)—for example, the universe or all users, groups, friends, users, followers of the user, those followed by the user, one user, or the content or photos of the user only. (4) Date/Date Range—for example, today, this week, this month, less than 6 months, up to one year, and up to 2 years. (5) Popularity of the location—for example, top areas based upon relative photographic density, minimum photos in an area; or top 5, 10, 20, or some other measure of popularity. (6) Quality of the pictures—for example based upon most liked photos, most liked photographer, power user strength of the photographer, or some other measure of the quality of the image of the photo or photographer. Other criteria may also be used.

Dynamic grouping, in accordance with embodiments, gives a user the ability to participate in a group based upon primary interests of a group. The interests of users in a group can be based on any one of representative criteria (1-6) above or the convergence of two or more criteria. Users can choose a "Group" feature which organizes and presents users' content for viewing, streaming or other functionality, based on criteria inclusive of the illustrative criteria listed above. This group functionality dynamically creates a grouping of users, described herein as a Dynamic Group Library group (DGL group), who share common criteria. Members of the DGL group share media content from users (in the DGL group) and present to users (in the DGL group) so as to provide a Dynamic Group Library (DGL). The sharing of media, including photos, in one method can be based upon permissions that users have granted for sharing media content. Permissions for sharing can include sharing universally, friends only, followers or all members of an identified group, for example. Given the flexibility of individual user sharing permissions, the total shared media content that may be available for a particular DGL group is not necessarily fully available to every member of the group. Specifically, there is not a one to one correlation between what an individual DGL group member shares with others, the information that other DGL group members are willing to share with the individual DGL group member, and the content that the individual DGL group member wants to utilize. Therefore, DGL group members may not have the same exact experience; nor access to the same content.

As such, the group or DGL group can be dynamic. The processing of the disclosure can include a variety of features that are associated with the commonality of primary interests and convergence of selected criteria. For example, if a user has identified NYC as a location of interest and "café" as a category or type, the user can be provided access to the dynamic grouping of other users with these interests. Users can post and share BLOGS, VLOGS, Podcasts, virtual reality; augmented reality; virtual gaming, Events, links and other content. Content can be presented based upon user permissions: universally to all users; friends and approved followers only; or friends only, for example. The system can add sponsors or associate sponsors to a particular Dynamic Group Library (DGL) and/or DGL group. Functionality can be provided for users to rate presented content, including presented photos or other media. Content presentation can be further filtered or subfiltered by hashtags and can be prioritized by date, quality or other manner.

Figure 111:
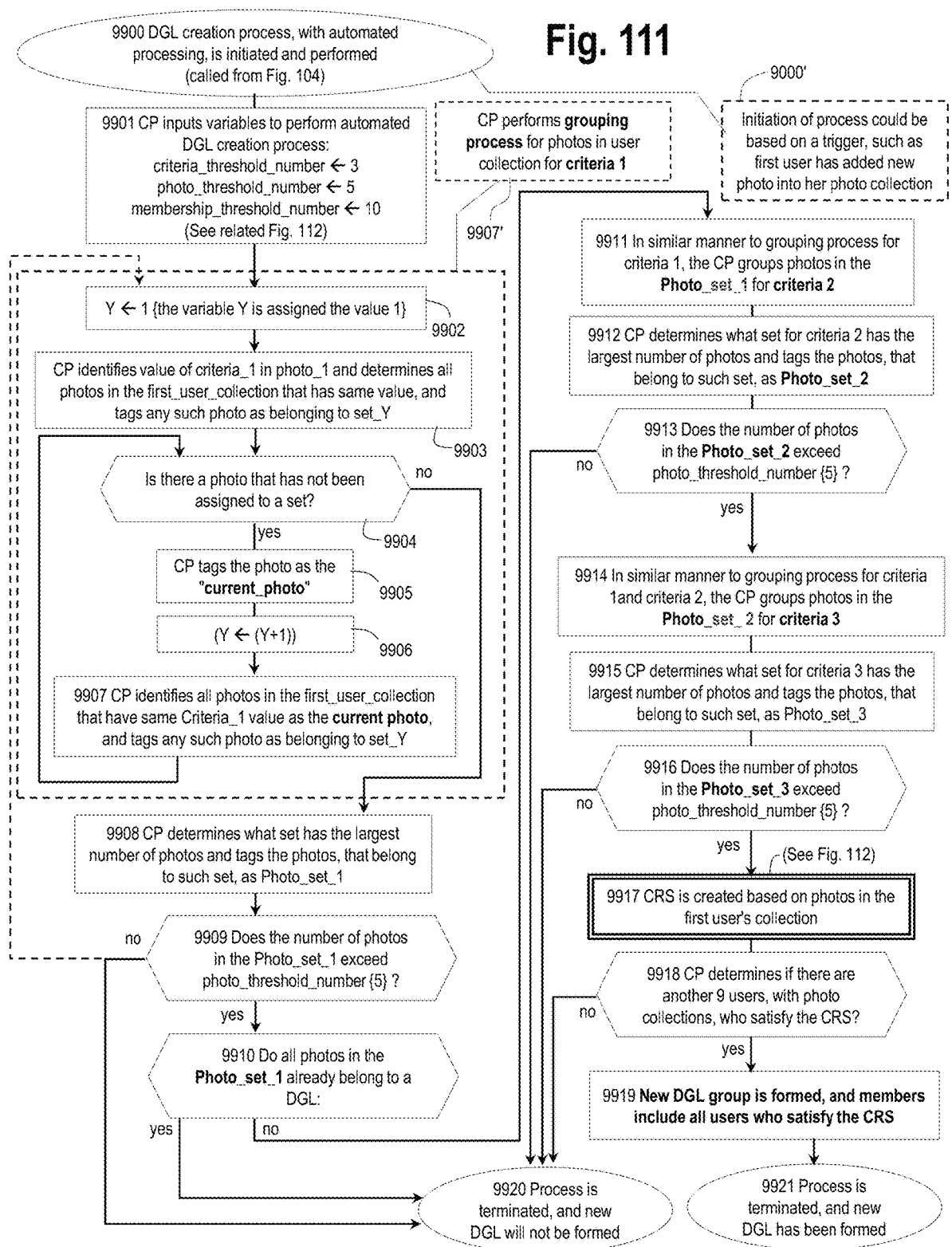
FIG. 111 is a flowchart showing a DGL creation process, with automated processing.

Groups can be established by the system, as shown in FIG. 111 and described below, or by users, such as shown in FIG. 113 and described below. Groups can be monitored and curated by a system administrator, other administrator, user curator, or other user. User curation of the group, i.e. the DGL group, can be by a committee of users with rules and permissions provided or imposed by the system. Users can request and receive notification of group content updates, group additions, or other updates.

Figure 104:
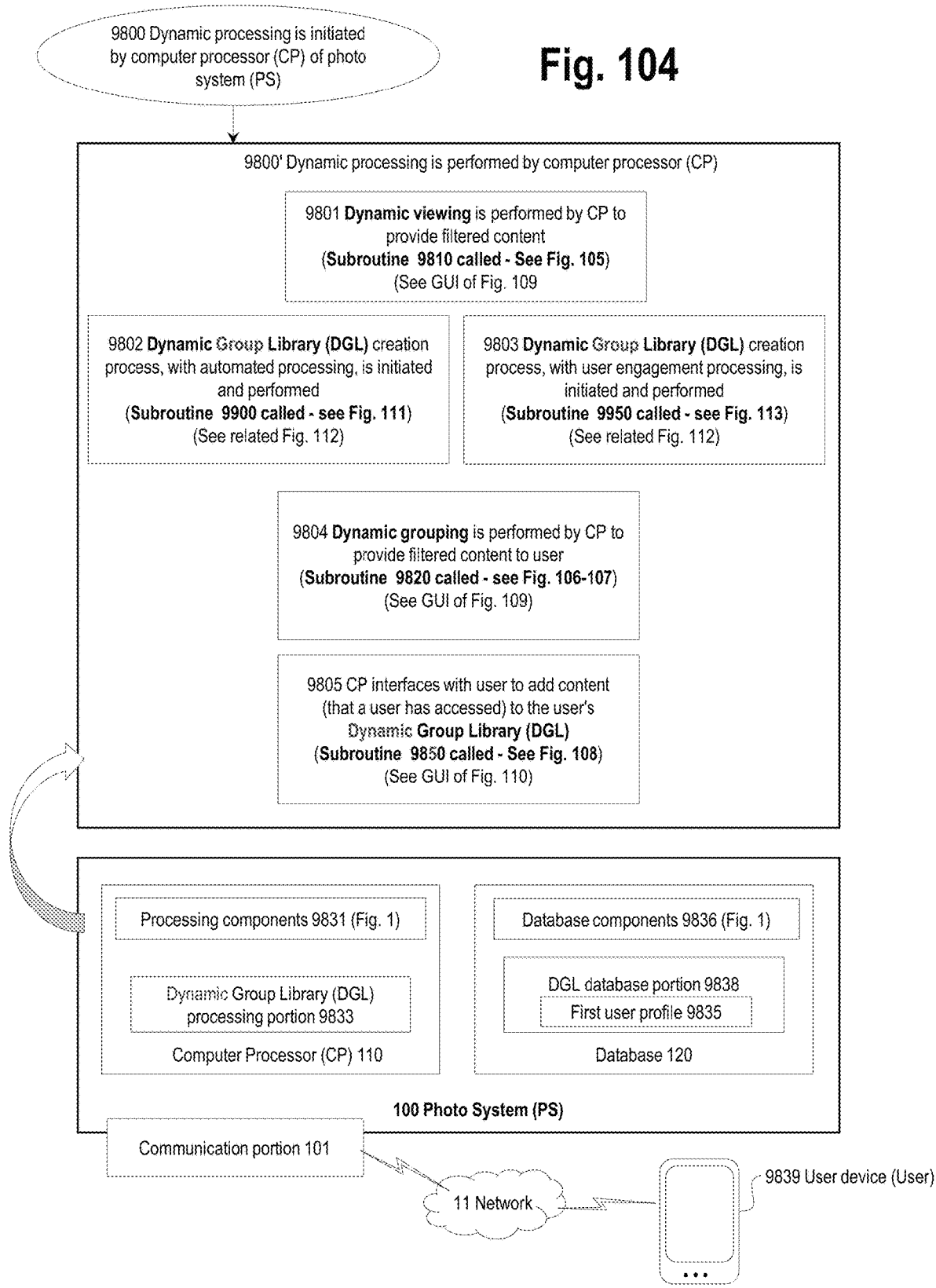
FIG. 104 is a diagram showing a high-level flowchart, showing features of dynamic processing, with system diagram.

Hereinafter, further aspects of dynamic viewing of content and dynamic grouping of users of the disclosure will be described. FIG. 104 is a diagram showing a high-level flowchart, showing features of dynamic processing, with system diagram in accordance with principles of the disclosed subject matter. As shown, the process starts in step 9800. In step 9800, dynamic processing is initiated by a computer processor (CP) 110 of a photo system (PS) 100, as shown in FIG. 104. Then, the process passes on to step 9800', in which dynamic processing is performed. A user device, i.e. a user, 9839 can select the various illustrated processing through interfacing with the CP 110, such as over a network 11.

The processing of FIG. 104 can include steps 9801, 9802, 9803, 9804, and 9805. In step 9801 dynamic viewing is performed by the CP 110 to provide filtered content to a user. Subroutine 9810 can be called, with details described below with reference to FIGS. 105 and 109. In step 9802, a dynamic group library (DGL) creation process, with automated processing, is initiated and performed by the CP 110. Subroutine 9900 can be called, with details described below with reference to FIGS. 111 and 112. In step 9803, a dynamic group library (DGL) creation process, with user engagement processing, is initiated and performed by the CP 110. Subroutine 9950 can be called, with details described below with reference to FIG. 113 and FIG. 112. In step 9804 dynamic grouping is performed by the CP to provide filtered content to a user. Subroutine 9820 can be called, with details described below with reference to FIGS. 106-107 and 109. In step 9805 the CP interfaces with the user to add content (that a user has accessed) to the user's dynamic group library (DGL). Subroutine 9850 can be called, with details described below with reference to FIG. 108 and the GUI shown in FIG. 110.

The processing 9800', of FIG. 104, can be performed by the photo system 100 and CP 110, as shown in FIG. 104. The CP 110 can include a wide range of processing components 9831 as described above with reference to FIG. 1. In particular, as related to dynamic group processing, the CP 110 can include a DGL processing portion 9833. The DGL processing portion 9833 can perform the various processing shown in FIG. 104. The photo system 100 can also include database 120. The database 120 can include various database components 9836 as described above with reference to FIG. 1. Additionally, the database 120 can include the DGL database portion 9838. The DGL database portion 9838 can store various data used by and generated by the DGL processing portion 9833, as described herein. In particular, the DGL database portion 9838 can include a first user profile 9835, which can store various data associated with a first user. The profiles of many other users can, of course, also be stored. The PS 100 can include the communication portion 101. The communication portion 101 can provide communication to a network 11. Accordingly, communication can be provided between the PS 100 and the user device (user) 9839. It is appreciated that the user 9839 is one of many users that can communicate and interface with the PS 100.

Figure 105:
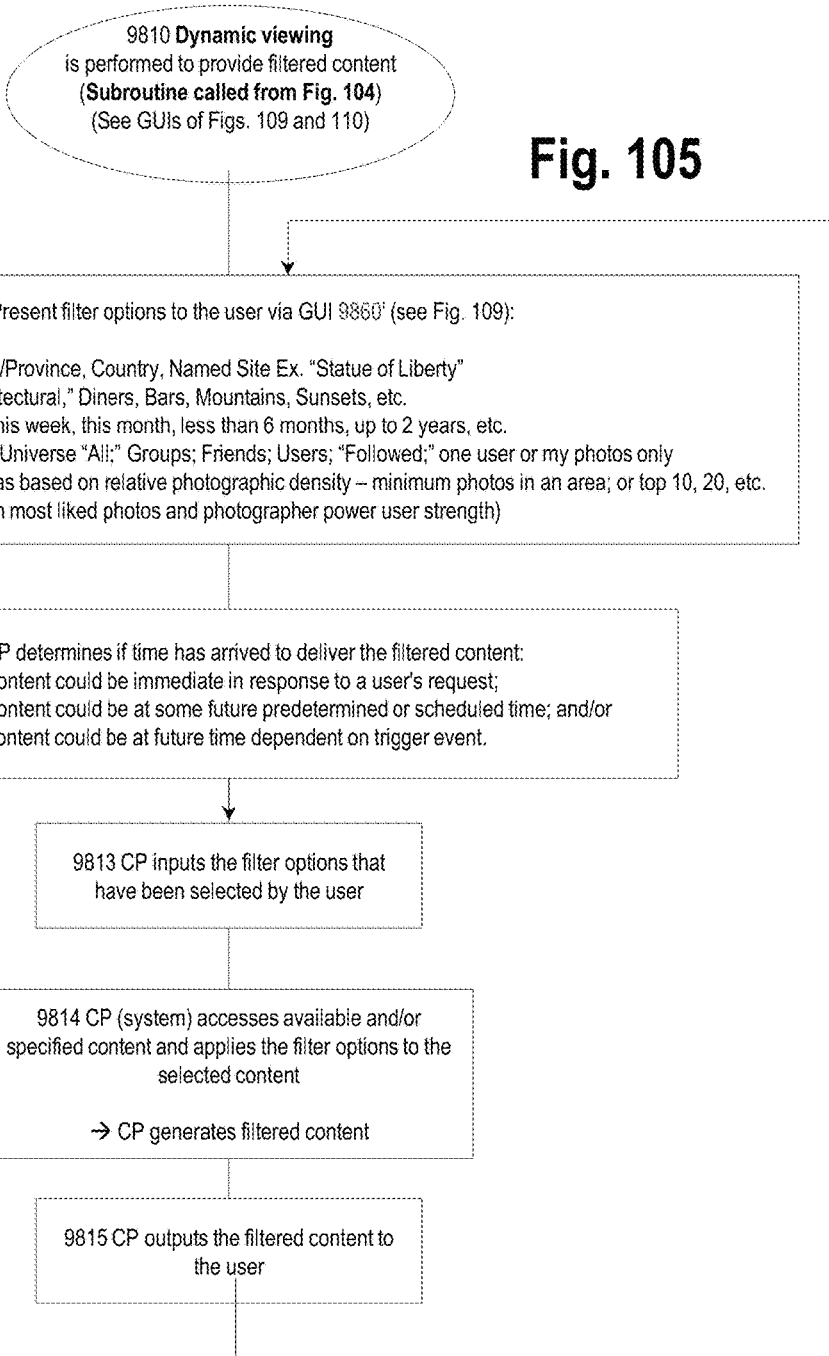
FIG. 105 is a flowchart showing dynamic viewing is performed to provide filtered content to a user processing.

FIG. 105 is a flowchart showing "dynamic viewing is performed by the CP 110 to provide filtered content to a user" subroutine 9810, as called from FIG. 104. As shown, the process starts in step 9810 and passes on to step 9811. In step 9811, the CP 110 presents various filter options to the user, such as via the GUI 9860' of the user device 9860 shown in FIG. 109. The filter options can include location, category/type, date/date range, users or groups of users, popularity of the location, and quality of the pictures or images of the photos, for example. Other filters can be utilized as desired. Then, in this embodiment, the process passes to step 9812. In step 9812, the CP 110 determines if the time has arrived to deliver the filtered content. Delivery of the content could be immediate in response to a user's request. Delivery of filtered content could be at some future, predetermined time or schedule time; and/or delivery of filtered content could be at some future time, dependent on a trigger event. For example, the trigger event could be the uploading of some threshold number of photos into the user's photo collection.

Figure 109:
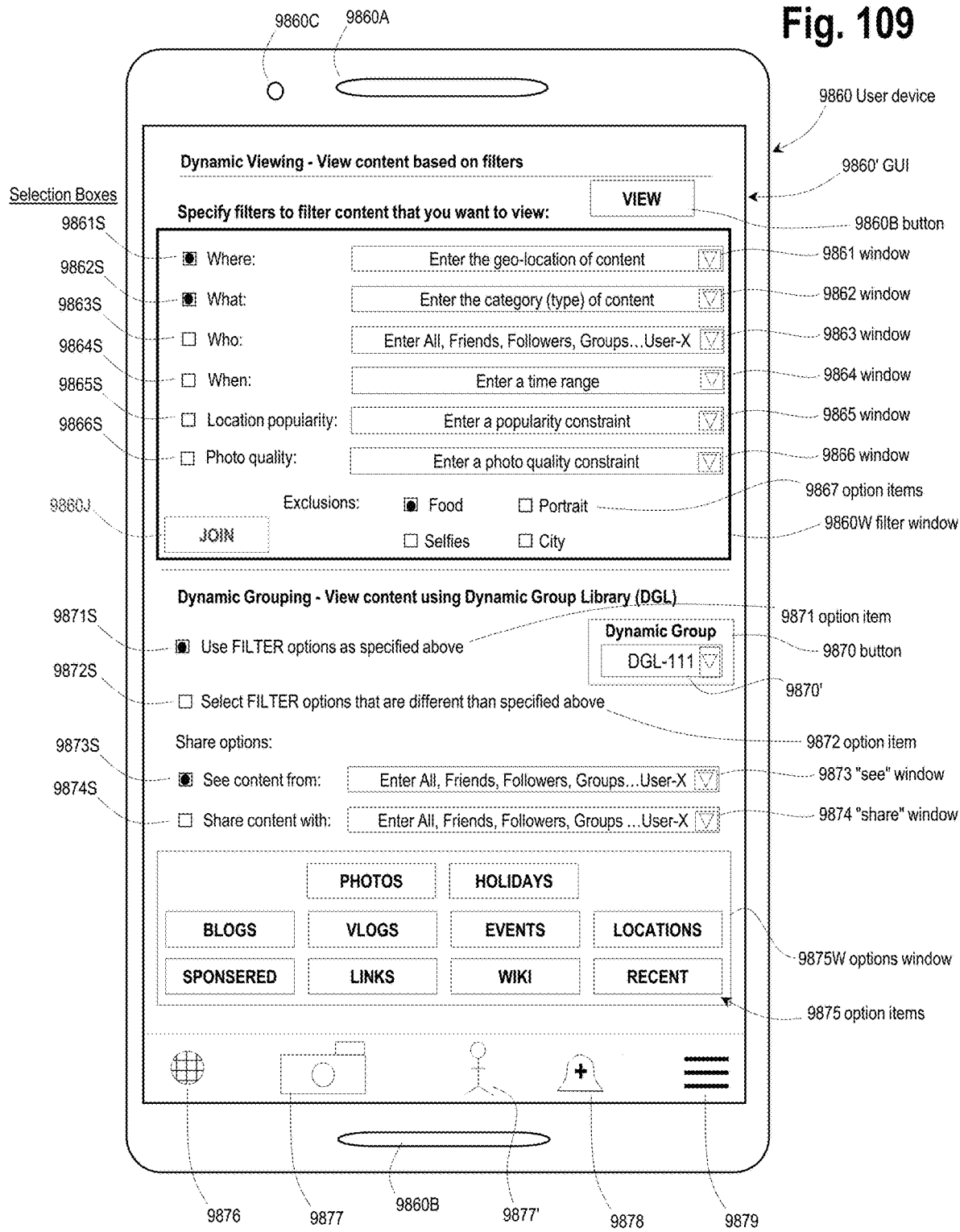
FIG. 109 is a diagram of a user device with GUI.

For example, the processing of FIG. 105 can be performed using the GUI 9860' of FIG. 109. As shown in FIG. 109, the GUI 9860' can include a filter window 9860W. The filter window can include filters that the user can opt to enable, so as to enable the processing of step 9811. Each filter option can include a filter window into which the user can enter data, upon which the filter will be based. The user can enter data randomly or the user can choose from presented options, for example. Various particulars associated with a user can be stored in a user profile, such as first user profile 9835, in the DGL database portion 9838 of FIG. 104. The filter windows can include windows 9861, 9862, 9863, 9864, 9865, and 9866 of FIG. 109. Also, each filter can include a selection box indicating that corresponding filter criteria should be performed in a requested search. Accordingly, if a selection box is checked, such as selection box 9861S, then the "where" filter will be used in a requested search. On the other hand, if a selection box is not checked, such as selection box 6865S, then that filter will not be utilized. As shown, the selection boxes can include 9861S, 9862S, 9863S, 9864S, 9865S, and 9866S. The filter window 9860W can also include option items 9867. Such option items 9867 can include exclusions as illustrated. For example, if a particular photo passes through a selected filter, based on the criteria shown in FIG. 109, such content could still be excluded from the results, i.e. if an exclusion applies. For example, in the example of FIG. 109, if a photo is tagged as relating to food, then such photo would not be returned in search results. For example, the CP 110 could determine that a user has tapped the VIEW button 9860B as shown in FIG. 109. Such interaction with the user provides the user request for filtered content as referenced in step 9812 of FIG. 105. Then, the process passes to step 9813. In step 9813, the CP inputs the filter options that have been selected by the user, i.e. the filter options 9861S, 9862S, 9863S, 9864S, 9865S, and/or 9866S that have been checked or selected by the user, interfacing with the GUI of FIG. 9. Then, in step 9814, the CP 110 accesses available content and/or specified content selected by the user. The CP applies filter options to the selected content. In response, the CP generates the filtered content. Then, in step 9815, the CP outputs the filtered content to the user. For example, the results of the filtered content could be provided on a suitable GUI on the user device 9860. Thereafter, the process can pass back to step 9811. Thereafter, processing can continue as described above. For example, the user can select different selection boxes in the filter window 9860W; tap the VIEW button 9860B; and in response the CP provides the user with additional filtered content. In accordance with an embodiment, the content accessed in step 9814, and to which the selected filter is applied, can be Dynamic Group Library (DGL) content as described herein. The content that is filtered could be the user's own collection of photos or other content as desired.

Figure 106:
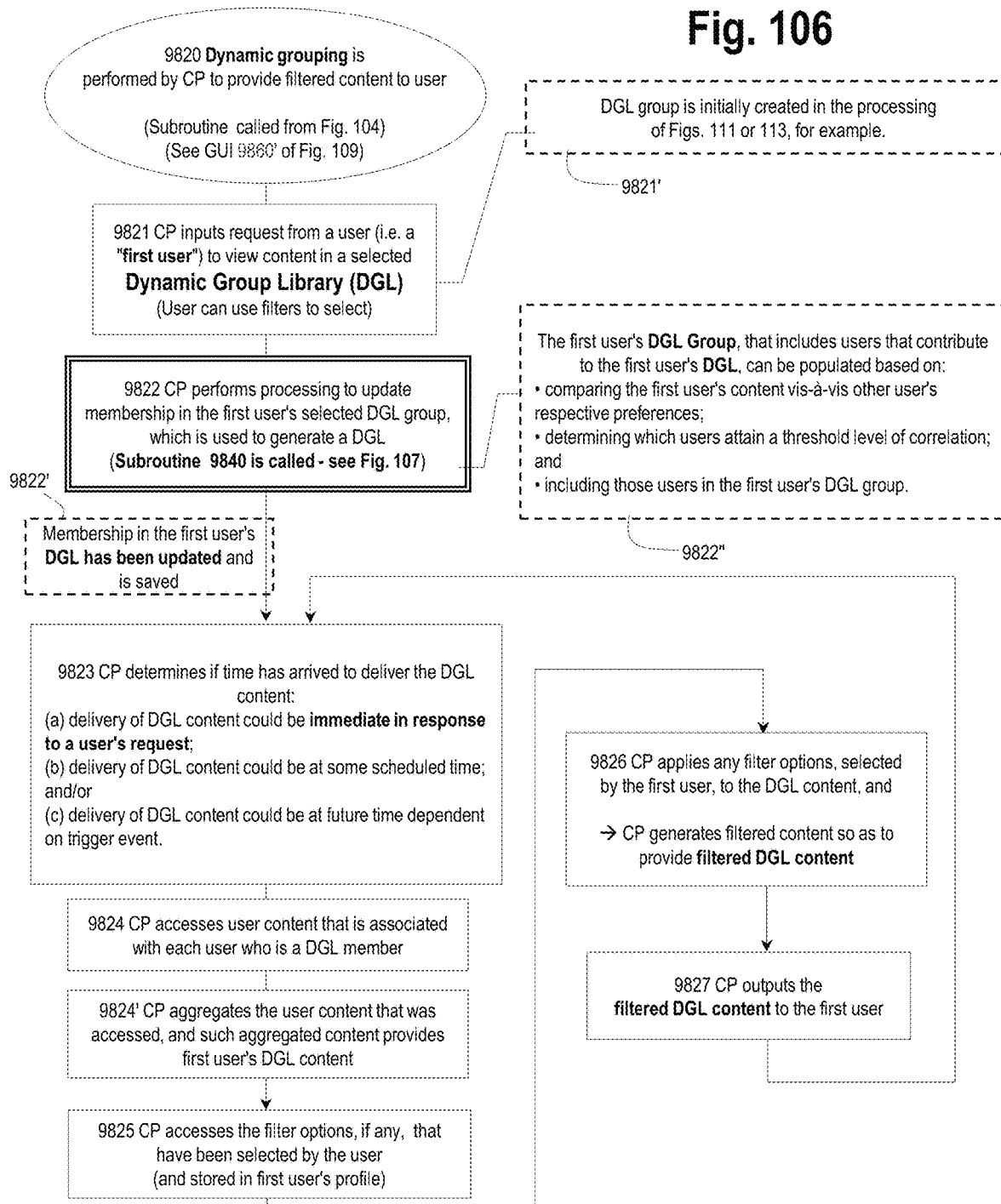
FIG. 106 is a flowchart showing dynamic grouping is performed to provide filtered content.

FIG. 106 is a flowchart showing "dynamic grouping is performed by CP to provide filtered content to user" subroutine 9820, as called from FIG. 104. The GUI 9860' can be utilized to implement the processing of FIG. 106 as shown, the process starts in step 9820 and passes on to step 9821. In step 9821, the CP inputs a request from a user to view content in a selected dynamic group library (DGL). For example, the user can be described as a first user. As noted at 9821', the DGL group can be initially created in the processing of FIG. 111 or 113, for example. As described herein, a DGL is a collection of content that is based on preferences of a user/user device, which can be called a first user, and preferences of other users. As described in detail below, a correlation of preferences between such users can be utilized so as to generate a DGL. Further details of the processing of FIG. 106 will be described in detail below.

Relatedly, FIG. 111 is a flowchart showing a DGL creation process. More specifically, FIG. 111 is a flowchart showing a "DGL creation process, with automated processing, is initiated and performed" of subroutine 9900 as called from the processing of FIG. 104. As shown, the process starts in step 9900 and passes on to step 9901.

Figure 112:
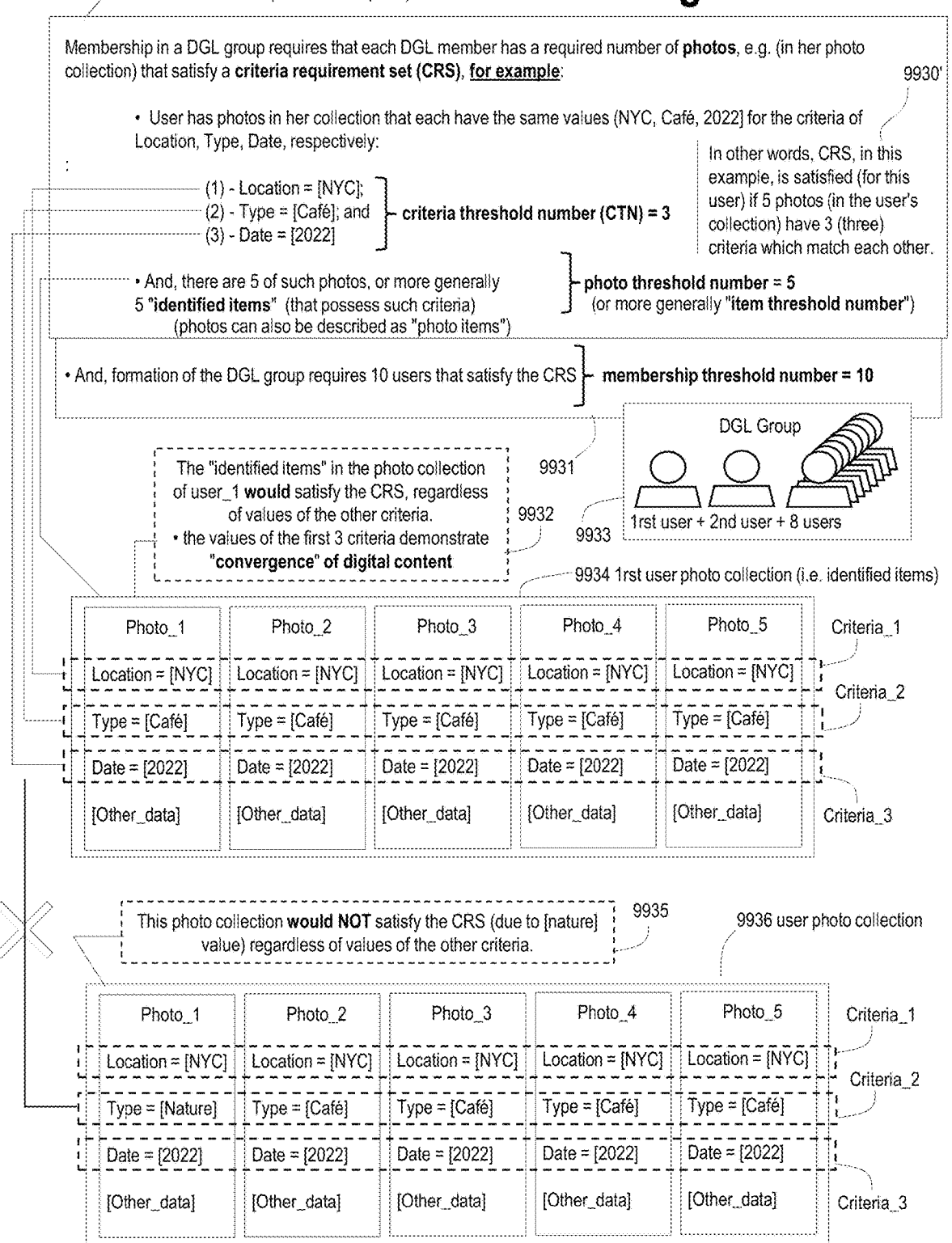
FIG. 112 is a schematic diagram illustrating aspects of dynamic grouping.

Relatedly, FIG. 112 is a schematic diagram illustrating aspects of dynamic grouping. Dynamic grouping can create a grouping of users based on commonalities in content, which members (in such group) share. For example, the content can be photos that are stored in a database as discussed in detail in this disclosure. Each of the photos can be associated with criteria or tags, i.e. metadata, that represent aspects of each photo. In dynamic grouping, the photo system (PS) 100 can identify that content, for example photos in this example, possesses criteria that are similar to each other. That is, photos can be identified that all display similar criteria, or in other words display similar attributes. Such photos might be described as displaying a convergence on a single criteria or a collection of criteria. A user, e.g. a first user for purposes of description, can be identified as displaying photos that collectively possess such convergence. The system can then check for other users that also display respective photo collections that possess a same convergence. These users can then be collectively designated as a group. More specifically, these users can be identified as a Dynamic Group Library group (i.e. a DGL group). Once the DGL group is formed up, then content can be shared amongst users of the DGL group. The content that is shared is not limited to the content that was initially used to form the DGL group. That is, other content can also be shared in an ongoing manner A theory behind the DGL processing is that a group can be formed based upon commonalities within that group, and then other content can be shared based on a thought that there may be common interest in such other content.

As noted above, FIG. 112 is a schematic diagram illustrating aspects of dynamic grouping. FIG. 112 illustrates a criteria requirements set (CRS) 9930. To explain, in accordance with an embodiment, membership in a DGL group requires that each DGL member has a required number of photos that satisfy a criteria requirements set (CRS). For example, each user's respective photo collection could be processed or scanned to determine if sufficient photos satisfy a CRS. As illustratively shown in FIG. 112, a user has photos in her collection that each have the same values for the criteria of location, type and date. That is, the photos all have a "NYC" value for location, a "café" value for type, and a "2022" value for date. The criteria that is utilized in such processing can include various criteria, such as the criteria shown in the GUI 9860', in filter window 9860W, of FIG. 109. While the criteria of location, type, and date are the same, thus reflecting a convergence, other criteria of the photos might well be different. The CRS can include two operational parameters. Such parameters can include a criteria threshold number (CTN) and a photo threshold number. In this example, the CTN is 3, and the photo threshold number is 5. In other words, CRS, in this example, is satisfied (for this user) if 5 photos (in the user's collection) have 3 criteria which match each other by having the same respective value, as reflected at 9930'. Thus, a convergence is demonstrated. To explain further, the illustrative CRS requires that there are 5 of such photos with 3 criteria which have matching values. Such 5 photos can also be described as "identified items" and/or "photo items" in the case that the content is indeed photos. In order to further illustrate content that satisfies the CRS, FIG. 112 shows a first user photo collection 9934. This photo collection of user 1 would satisfy the CRS, regardless of values of the other criteria, as reflected at 9932. That is, the photo collection 9934 shows that the values of the first 3 criteria demonstrate convergence of the content, i.e. the dynamic content. That is, each of photo 1, photo 2, photo 3, photo 4, photo 5 possess location, type, and date criteria that are the same. That is, value for the location criteria are all NYC. Value for the type criteria are all café. And value for the a date criteria are all 2022. The "other data" may vary amongst the photos, but such variance would not impact that the photo collection 9934 satisfies the CRS as illustrated.

On the other hand, FIG. 112 also shows a user photo collection 9936. As to the criteria values shown, this photo collection would not satisfy the CRS, due to a "nature" value for the "type" criteria of photo 1, as reflected at 9935. That is, the CRS requires that 5 photos possess 3 criteria, and that such 3 criteria have the same respective value for each of the photos. The user photo collection 9936 only shows that four (4) photos have 3 criteria with the same values. Accordingly, the photo threshold number=5 is not satisfied for such photo collection.

As shown in FIG. 112, at 9931, to form a DGL group, a certain number of users have to possess photo collections that satisfy the CRS. In this example, formation of the DGL group requires that 10 users satisfy the CRS. This threshold value can be described as a "membership threshold number". Relatedly, as noted above, FIG. 111 is a flowchart showing a DGL creation process, with automated processing, called from FIG. 104. The processing of FIG. 111 utilizes the CRS and membership threshold number parameters of FIG. 112. As shown, the process of FIG. 111 starts in step 9900 and passes on to step 9901.

In step 9901, the CP 110 CP inputs variables to perform an automated Dynamic Group Library (DGL) creation process. The CP can interface with the user to input a criteria threshold number (criteria_threshold_number), a photo threshold number (photo_threshold_number) and a membership threshold number (membership_threshold_number), as described above. As shown in FIG. 112, these parameters can provide core threshold values upon which DGL processing can be performed. As reflected at 9000', initiation of the DGL creation process can be based on a trigger such as—that a user has added a new photo into her collection and/or can be based on a request from a user.

After step 9901, the process passes on to step 9902. The processing of FIG. 111 utilizes a variable Y. In step 9902, the variable Y is assigned or "gets" a value of 1. Then, in step 9903, the CP identifies the value of criteria_1 in photo_1 (i.e. the first photo in the first user's collection to be processed) and determines all photos in the first_user_collection that has that same value for criteria 1. The CP 110 then tags any such photo as belonging to set_Y, i.e. set_1 given that the value of Y is currently 1. Accordingly, the CP has thus aggregated and tagged all the photos in the first user's collection that have the same value for criteria 1. Then, in step 9904, the CP determines: is there a photo that has not been assigned to a set? If yes, then the process passes on to step 9905. In step 9905, the CP tags the photo as the current_photo. Then, in step 9906, the CP increments the value of Y by 1. Then, in step 9907, the CP identifies all photos in the first_user_collection that have that same value for criteria_1 as the current photo. In other words, the CP aggregates all the photos that have the same value as the current photo. Such aggregation thus constitutes a second set of photos. Then, the CP tags any such photo as belonging to set_Y, i.e. set_2 since Y now has a value of 2. Then, the process passes back to step 9904.

So long as step 9904 renders a yes value, the processing will loop through steps 9905, 9906, 9907. However, at a point, all the photos in the user's collection will be assigned to a particular set based on the value of criteria_1, i.e. the first criteria in each photo. At a point in the processing, the determination 9904 of "is there a photo that has not been assigned to a set?" will render a no value. Then, the process passes on to step 9908. As reflected at 9907', the steps of 9902-9907 can be described as the CP performing a grouping process for photos in the user collection for criteria 1. Accordingly, when the process advances to step 9908, all photos in the user's collection have been associated or tagged to a set based on the value of criteria 1, i.e., criteria_1, in each photo.

In step 9908, the CP determines what set (of photos) has the largest number of photos and tags the photos, that belong to such set, as photo_set_1. Then, in step 9909, the CP determines does a number of photos in the photo_set_1 exceed the photo threshold number. Further utilizing the example shown in FIG. 112, the photo threshold number is 5. If no in step 9909, in this embodiment, the process passes on to step 9920. In step 9920, the process is terminated and a new DGL will not be formed.

However, in other embodiments, the processing of FIG. 111 similar to that described above could be performed for each of the criteria, such as each of the criteria illustrated in the GUI 9860' of FIG. 109. However, if the criteria threshold number is 3, then only the first 4 of the criteria need to be processed as shown in the grouping process 9907'. The reason is that: if convergence is required for 3 criteria, and 4 of 6 criteria are "proved out" to not satisfactorily converge, then it becomes impossible to satisfy the criteria threshold number.

However, in some embodiments, it may be determined that a particular criteria may be deemed a dominant, or alternatively a set of criteria may be deemed dominant and controlling. Accordingly, in the example of FIG. 112, the location, type, date criteria may be deemed dominant, controlling, or most relevant. Thus, the processing might only determine whether there is convergence in the location, type, date criteria—and if there is not convergence therein, then any convergence in other criteria is moot or irrelevant.

With further reference to FIG. 111, a yes may be rendered in step 9906. Such a yes being rendered in the photo_set_1 means that at least one set of photos (in the first user's collection) possessed convergence such that at least 5 photos had the same value, e.g. NYC, for the "location" criteria. It is noted that there may be other photo sets that satisfy such convergence in criteria 1. Such other photo sets can be processed using iterative processing of the DGL creation process shown in FIG. 111.

Relatedly, if yes in step 9909, the process passes on to step 9910. In step 9910, the CP determines if all the photos in the photo_set_1 already belong to a DGL. If yes, then the process passes to step 9920, and the process is terminated. However, in this embodiment, even if one photo does not already belong to a DGL, then a new DGL can be formed. Accordingly, if no in step 9910, then the process can pass to step 9911. Other limitations can be imposed relating to how many DGLs a particular photo can support.

In step 9911, further processing is performed to determine if the first user's photo collection has sufficient convergence, in criteria 1, 2, 3, to trigger or support a new DGL. In step 9911, in similar manner to the grouping process for criteria 1, the CP can group photos in the photo_set_1 for criteria 2. Note, only the photos in the photo_set_1 are grouped in the processing of step 9911, i.e. a limited set as compared to the user's overall photo collection. Then, in step 9912, the CP determines what set for criteria 2 has the largest number of photos and tags the photos, that belong to such set, as Photo_set_2. Photo_set_2 is a sub-part of Photo_set_1. Then, in step 9913, the CP determines does a number of photos in the Photo_set_2 exceed the photo threshold number, i.e. 5 in this example. If no, the process passes to step 9920, and the DGL process is terminated. However, in another embodiment, the processing could go back to the second largest set, to supplement the processing of step 9908, and determine if the second largest set might display convergence in the first, second, and third criteria as required by this example CRS. That is, the processing of step 9908 can also include saving each of the photo sets determined in the grouping process 9907'. For any determined set in which at least 5 photos had the same value for criteria 1, processing can be performed as shown in FIG. 111.

If yes in step 9913, such determination indicates that there was sufficient convergence in criteria 1 and criteria 2 of the user's photos to support or trigger a DGL. Thus, processing is continued to check if the third criteria also satisfies the photo threshold number. That is, processing advances to step 9914. In step 9914, in similar manner to the grouping process for criteria 1 (as well as criteria 2) the CP groups the photos in the Photo_set_2 for criteria 3. Then, in step 9915, the CP determines what set, of photos, for criteria 3 has the largest number of photos and tags such photos as Photo_set_3. Photo_set_3 is a sub-part of Photo_set_2. Then in step 9916, the CP determines does a number of photos in the Photo_set_3 exceed the photo threshold number of photos, in this example, 5. If no, then the process passes to step 9920, and the process is terminated. If yes in step 9916, then the process passes on to step 9917. In step 9917, a criteria requirements set (CRS) is created based on the photos in the first user's collection. Such CRS is shown in FIG. 112, as described above. Accordingly, the processing has determined that indeed the first user's photo collection does support a DGL. However, the processing now determines if the photos/content of other users also support a DGL. That is, is the membership threshold number attained? In this illustrative example, the membership threshold number is 10, meaning that the first user and 9 other users, as reflected at 9933 of FIG. 112, must satisfy the CRS so as to trigger or support the generation/formation of a DGL.

Accordingly, the processing passes from step 9917 to step 9918 in FIG. 111. In step 9918, the CP determines if there are another 9 users who possess photo collections who support the CRS. In other words, are there 9 other users who possess a photo collection having attributes of the photo collection 9934, as shown in FIG. 112. If no, then the process again passes to step 9920 with termination of the process. If yes in step 9918, then the process passes on to step 9919. In step 9919, a new DGL group is formed, and members of the new DGL group include all users who satisfied the CRS. The process is then terminated in step 9921.

In an embodiment, the system can determine that there are a minimum number of users to establish a new DGL. Then, additional members beyond the "Founder(s)", i.e. the initial user(s) that combined to meet the quota of users needed to establish a DGL group, may be able to join/become a "member" of the DGL group. Accordingly, the GUI 9860' of FIG. 109 can include a "JOIN" button 9860J. A further user, on a further user device, can tap the JOIN button 9860J to join a DGL group that satisfies the criteria selected or indicated in the criteria selection options in the GUI 9860'. Accordingly, such functionality allows a user to join an existing DGL group. Accordingly, the CP can perform processing including interfacing with a further user to perform processing including: (a) inputting selection criteria from the further user, (b) determining that a DGL group satisfies the selection criteria—and presenting such DGL group to such user, and (c) providing for the further user to join the DGL group in response to a "join" request from the further user, e.g. in response to such user tapping the JOIN button 9860J.

It is appreciated that FIG. 111 is illustrative of processing that can be utilized so as to check convergence in the content, for example photos, of users—and determine if such content supports a DGL. The illustrated process of FIG. 111 uses criteria 1, 2 and 3 in that order. The same process could be used with other permutations of criteria, and/or different sequences of criteria. For example, the processing of FIG. 111 could be performed on criteria 2, criteria 3, and criteria 1 in that order, or in other order. Such processing could result in a further DGL. Additional thresholds could also be imposed. For example, if a photo is counted in the generation of some threshold number of DGLs, then such photo might be disqualified or tagged so as to not support additional DGLs.

In a further embodiment, if a no is rendered in step 9909, then the process might loop back to step 9902, with the grouping process 9907' assessing criteria 2—so as to determine if criteria 2 might satisfy the criteria threshold number. If such processing results in a yes being rendered in step 9909, then criteria 3 could be processed in step 9911. Also, criteria 4 could be processed in step 9914. It is appreciated that any number of criteria could be assessed in similar manner. Accordingly, it is appreciated that the processing described with reference to FIG. 111 and FIG. 112 are illustrative, and various adaptations of such processing can be performed.

In the processing of FIG. 111, the CP can automatically determine if a DGL should be generated based on an input of criteria threshold number (CTN), a photo threshold number, and a membership threshold number. That is, in the embodiment shown in FIG. 112, the CP 110 can automatically determine the value of criteria to be used in generation of a CRS and/or what criteria can be used in generation of a CRS. The processing of FIG. 113 shows a further embodiment in which less automation is provided, i.e., in that the CP is provided what criteria to be used as a CRS and the value of those criteria. In some implementations of the processing, the "where" and "what" criteria, e.g. 9861S and 9862S of FIG. 109, may be required to be considered in the DGL processing. That is, such criteria may be viewed as being so central to the attributes of content, such as photos, that DGL related processing requires consideration of such two criteria. Also, various features of the disclosure are described herein in the context of processing photos. However, as otherwise noted herein, other content can also be processed, as desired. It is appreciated that the values of: criteria threshold number (CTN), photo threshold number, and membership threshold number can be varied as desired.

FIG. 113 is a flowchart showing a "DGL creation process, with user engagement processing, is initiated and performed" of subroutine 9950 as called from the processing of FIG. 104. The processing of FIG. 113 can apply various mechanics as described with reference to FIG. 112. However, in contrast to the processing of FIG. 111, in the processing of FIG. 113, parameters of the criteria requirement set (CRS) are provided to the CP in step 9951. That is, after the process is initiated in step 9950, the process passes on to step 9951. In step 9951, the CP interfaces with the first user to input or select parameters of the CRS. That is, the CP inputs from the user a value for each criteria that is to be a part of the CRS, and, relatedly, inputs the CTN (criteria threshold number)=3. In the example of step 9951, the CP would input the value of location as NYC, i.e. New York City. The CP would input the value for type as Café. The CP would also input the value of 2022 for date. Step 9951 is of course illustrative. Additional criteria and associated values could be entered (or input) so as to be a part of the CRS. Also, fewer criteria (i.e. a lower CTN) than is shown could be utilized to constitute the CRS. In an embodiment, a single criteria could be utilized to constitute the CRS. In other embodiments, 2, 3, 4, 5, 6, 7 or any number of criteria (with its respective value) could be utilized to be included in a CRS, i.e. the CTN could be any of such numbers. After step 9951, the process passes on to step 9952. In step 9952, the CP interfaces with the first user to also input the other component of the CRS 9930 (see FIG. 112), the photo threshold number, in this example 5. Then, in step 9953, the CP interfaces with the user, i.e. the first user in this example, to input the membership threshold number, in this example 10. Then, the process passes on to step 9954. In step 9954, the CP performs a check of how many of the first user's photos satisfy the CRS dictated by the first user, and sends an alert of whether the first user will satisfy the DGL, i.e. the DGL that the first user has requested to create. In other words, does the first user herself satisfy the CRS (in terms of the criteria threshold number being satisfied and the photo threshold number being satisfied). If the user does not satisfy the CRS, then the user might prompt the creation of a DGL that the user is indeed not a member of. In addition to the processing of step 9954, the user can be provided functionality to list her top favorite locations, her top favorite categories, or other top favorites. Such attributes can also be used to compare a user vis-à-vis other users, to determine convergence of interests, and to provide further attributes that can be used in filtering content. Then, the process passes on to step 9955. In step 9955, the CP performs processing to determine how many users in the system satisfy the CRS. In other words, the CP runs a scan of all users who are available to potentially be a part of the DGL. The users who are included in such group could be limited in such manner, such as geographically, age, or limited in some other manner or based on some other attribute. For example, a first user might only want a DGL formed with users in the first user's geographical area, e.g. city.

Accordingly, in step 9956, the CP determines if there are 10 users, with photo collections, who satisfy the CRS 9930 (see FIG. 112). If no, then the process passes on to step 9959 and the processing is terminated in this embodiment. If yes in step 9956, then the process passes on to step 9957. In step 9957, a new DGL group is formed, and members include all users who satisfy the CRS. As described in FIG. 112, a CRS can be satisfied by a particular user satisfying (a) the criteria threshold number (i.e. by having photos that have specified values for specified criteria), and (b) the photo threshold number, i.e. the users have a sufficient number of photos that satisfy the criteria threshold number. After step 9957, the process passes on to step 9958, and the process is terminated with a new DGL group being formed, and a new DGL being supported, which is associated with the new DGL group. The DGL group and DGL can both be updated, as described below.

Accordingly, a DGL group can be formed using the processing of FIGS. 111-113. Once the DGL group is formed, then further aspects of dynamic grouping can be performed in which content is generated based on user membership in the DGL group.

Relatedly, with further reference to FIG. 106, such figure is a flowchart showing "dynamic grouping is performed by CP to provide filtered content to user" of subroutine 9820, as described above. The processing of FIG. 106 can start in step 9820 and pass on to step 9821. In step 9821, the CP inputs a request from a user to view content in a selected dynamic group library (DGL). For example, each DGL with associated DGL group (that the user has access to) could be presented to the particular user in a listing. Descriptive information could be provided such as an identifier and/or the particulars of the CRS 9930 that supports each DGL. A filter can be utilized to search for a DGL. Once the user, i.e. a first user for purposes of description, selects a DGL in step 9821, the process passes on to step 9822. In step 9822, the CP performs processing to update membership in the first user's selected DGL group, based upon which a DGL is generated. That is, a DGL group can be generated using the processing of FIGS. 111-113. It may be that, in the time since generation of the DGL group, additional users now have photos that possess convergence in content so as to satisfy the particulars of the CRS associated with the DGL that was selected in step 9821. That is, such additional users may not have possessed photos that satisfy the CRS previously, but now do possess photos that satisfy the CRS. Accordingly, subroutine 9840 (FIG. 107) can be called to update the DGL group. Further details are described below with reference to FIG. 107.

As reflected at 9822" and as described with reference to FIGS. 111-113, a first user's DGL group, that includes users that contribute to the first user's DGL library, can be populated based on: (a) comparing the first user's content vis-à-vis other user's respective preferences; (b) determining which users attain a threshold level of correlation; and (c) including those users in the first user's DGL group. After step 9822, the process passes on to step 9822', in which membership in the first user's selected DGL has been updated, and that updated DGL group is saved, such as in the DGL database portion 9838 shown in FIG. 104. Then, the process passes on to step 9823. In step 9823, the CP determines if the time has arrived to deliver the DGL content. Delivery of DGL content could be immediate in response to a user's request. Delivery could be at some scheduled time. Delivery could be in the future and dependent on some predetermined trigger event. After step 9023, the process passes on to step 9824. In step 9824, the CP accesses user content that is associated with each user who is a DGL member. For example, the CP accesses the photo collection of each member of the DGL group. Then, in step 9824', the CP aggregates the user content that was accessed in step 9824. Such aggregated content can provide the first user's DGL content. In some embodiments, the entirety of this content can be output to the first user, who requested his or her DGL. In other words, once the content is aggregated in step 9824', the results of such aggregation can be output to the first user in an unfiltered manner. In the illustrative embodiment of FIG. 106, after step 9824, the process passes on to step 9825. In step 9825, the CP accesses the filter options, if any, that have been selected by the user. For example, the filter options can be selected through interfacing with the user. Illustratively, the GUI of FIG. 109 can be utilized. Such GUI is described further below.

After step 9825, the process passes on to step 9826. In step 9826, the CP 110 applies any filter options, selected by the first user, to the DGL content that was aggregated in step 9824'. In step 9826, the CP then generates filtered content so as to provide filtered DGL content. Then, in step 9827, the CP outputs the filtered DGL content to the first user. After step 9827, the process can pass back to step 9823, in accordance with an embodiment. Processing can then proceed as described above, with the CP determining if the time has arrived to output further DGL content.

The processing of FIG. 106 and dynamic grouping can be performed utilizing the GUI 9860' of the user device 9860, as shown in FIG. 109. The GUI 9860' can provide dynamic grouping functionality so as to allow the user to view content using a dynamic group library (DGL). The GUI 9860' provides for a user to choose filters. For example, the user can choose two filters by populating the selection boxes 9861S and 9862S as shown in the GUI 9860'. Then, the user can check selection box 9871S (of option item 9871) so as to indicate (to the system/CP 110) that the CP should use the filter options shown in the GUI 9860'. Alternatively, the user might check selection box 9872S of option item 9872. Such option allows the user to select filter options than are different than those specified in the GUI 9860'. For example, different filtering options could be provided to the user via a further GUI. The selection boxes 9871S and 9872S can be "radio" buttons such that only one of the boxes can be checked at a time. Step 9821 of FIG. 106 can include the input of filter options, and such functionality can be provided via the GUI 9860'. The GUI 9860' can also include share options. The share options can include a "see content from" window 9873, so as to provide a "see content from" option. Such "see" option can be selected by selection of box 9873S. The user can populate the window 9873 by entering friends, groups, or user(s) for example, so as to designate from who the first user wants to see content. Such "see content from" option can be a mechanism to further filter content, such as photos, in addition to filter options provided by window 9863. The GUI 9860' can also include a "share" option that can be selected by selecting box 9874S. With such option, the window 9874 can be populated—such that the first user can specify who the first user wants to share the first user's DGL content with. For example, the first user could be a member of a DGL group, and another member of such DGL group requests such DGL. The option of window 9874 could be used to control whether such other user can access (or cannot access) content from the first user. Relatedly, sharing options can vary between different DGL content associated with the first user. That is, e.g., first content might be shared with all users, whereas second content might only be shared with friends of the first user. Accordingly, the GUI 9860' may dictate sharing of the DGL displayed in window 9870', and the first user can select sharing options for another DGL by interfacing with another respective GUI akin to that shown in FIG. 109. The GUI 9860' can also include options window 9875W, which can include a plurality of options 9875. In an embodiment, one or more options 9875 can be selected so as to further limit or control the content that is returned in response to a request for a DGL. Once an option is selected, it could be shaded or in some other manner indicated as having been selected.

Further and notably, the GUI 9860' can include "Dynamic Group" button 9870. The button 9870 can be tapped or selected by the first user to request that a DGL be generated. The DGL could be presented to the first user in the form of a list or an ordered list that includes the content in the DGL. Such DGL can be generated based on the various options selected in the GUI 9860'. For example, the button 9870 can be the input received in the processing of step 9823, option (a) in FIG. 106. The button 9870 can also include window 9870'. The window 9870' can provide for the user view a list of available DGLs and to input the particular DGL that the user wants to receive. In this example, the first user has requested to receive the DGL named "DGL-111". As described above, a DGL can be identified and selected in any suitable manner.

As shown in FIG. 109, the GUI 9860' can also include various additional options. A GUI item 9876 can be selected by the user to access photos or other content of the user. The GUI item 9877 can be selected so as to provide functionality to take a photo. The GUI item 9877' can be selected by a user so as to access the user's profile. The GUI item 9878 can be selected by the user to access notifications that have been output from the CP 110 to the user. Also, the GUI item 9879 can provide the user with a variety of additional menu options. It is appreciated that additional GUI items can be provided so as to provide access to additional functionality. The user device 9860 can include functionality and/or mechanisms of known user devices. For example, the user device 9860 can include a speaker 9860A and a microphone 9860B, and one or more cameras 9860C.

Figure 107:
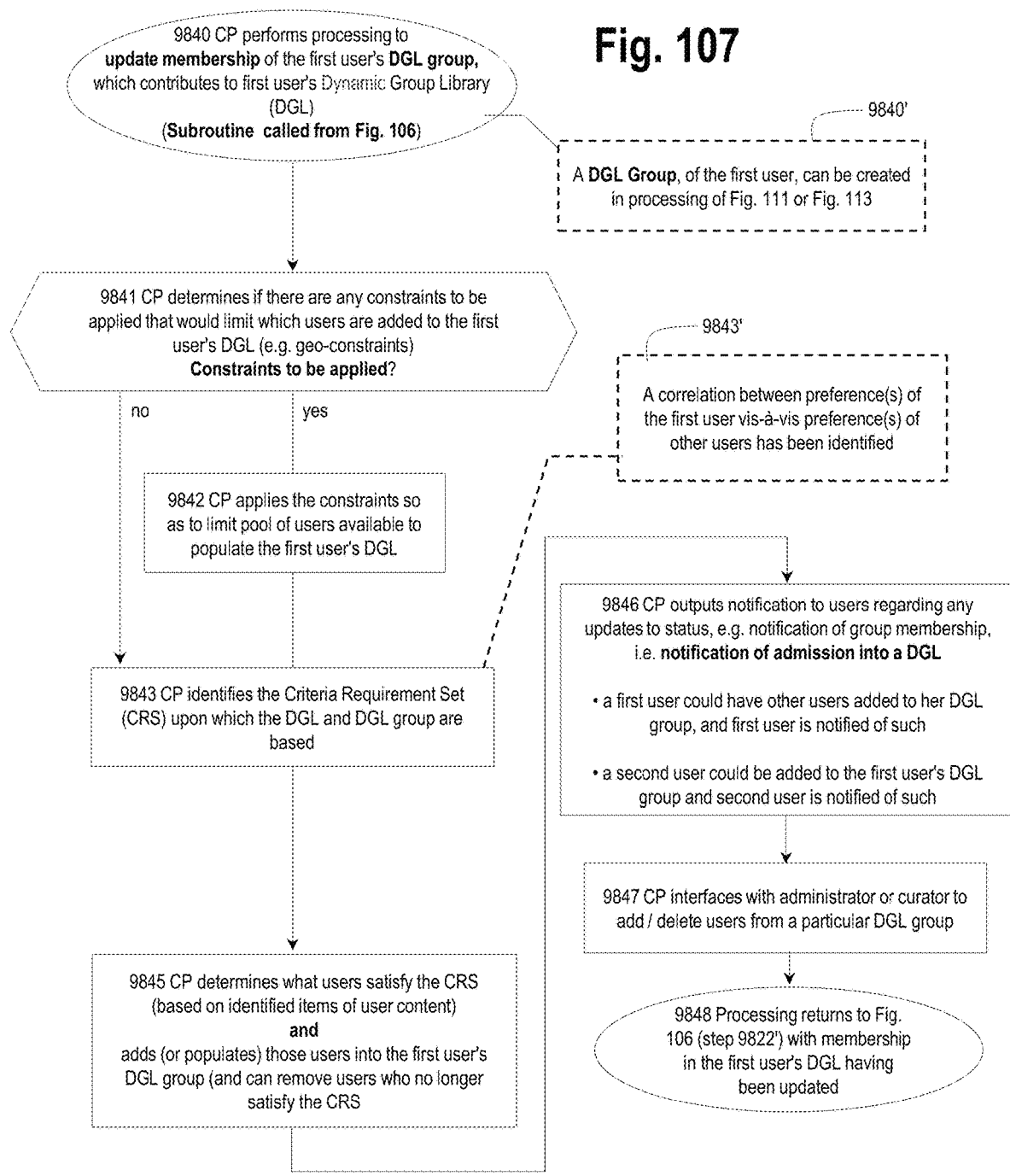
FIG. 107 is a flowchart showing processing to update membership in a Dynamic Group Library (DGL) group.

As described above, in the processing of FIG. 106, dynamic grouping can be performed. In conjunction with such processing, as described above, subroutine 9840 can be called to update the DGL group, i.e. to update the membership of a particular DGL group. Accordingly, FIG. 107 is a flowchart showing processing to update membership in a DGL group. Specifically, FIG. 107 is a flowchart showing "CP performs processing to update membership of the first user's DGL group, which contributes to first user's Dynamic Group Library (DGL)" of subroutine 9840 as called from the processing of FIG. 106. As reflected at 9840', a DGL group, of the first user, can be created in processing of FIG. 111 or FIG. 113, for example. The subroutine of FIG. 107 starts in step 9840 and passes on to step 9841.

In step 9841, the CP determines if there are any constraints to be applied, that would limit which users are added to the first user's DGL. For example, there can be geographical constraints applied, so as to limit membership to users within a geographical distance of a first user. If yes, then in step 9842, the CP applies the constraints so as to limit the pool of users available to populate the first user's DGL. The process then passes to step 9843. If a no is rendered in step 9841, the process passes directly to step 9843.

Figure 108:
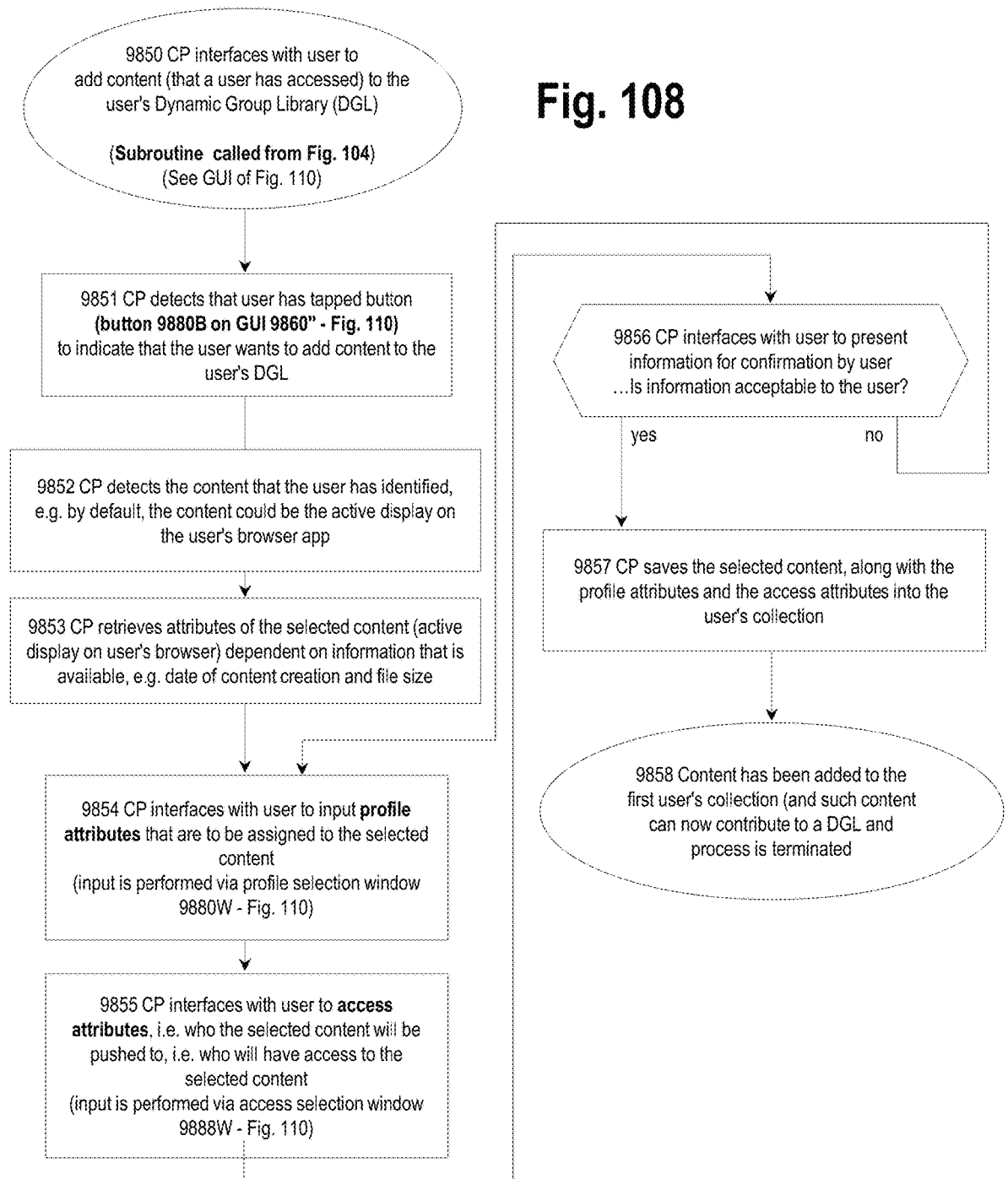
FIG. 108 is a flowchart showing processing to add content to a user's DGL.
Figure 110:
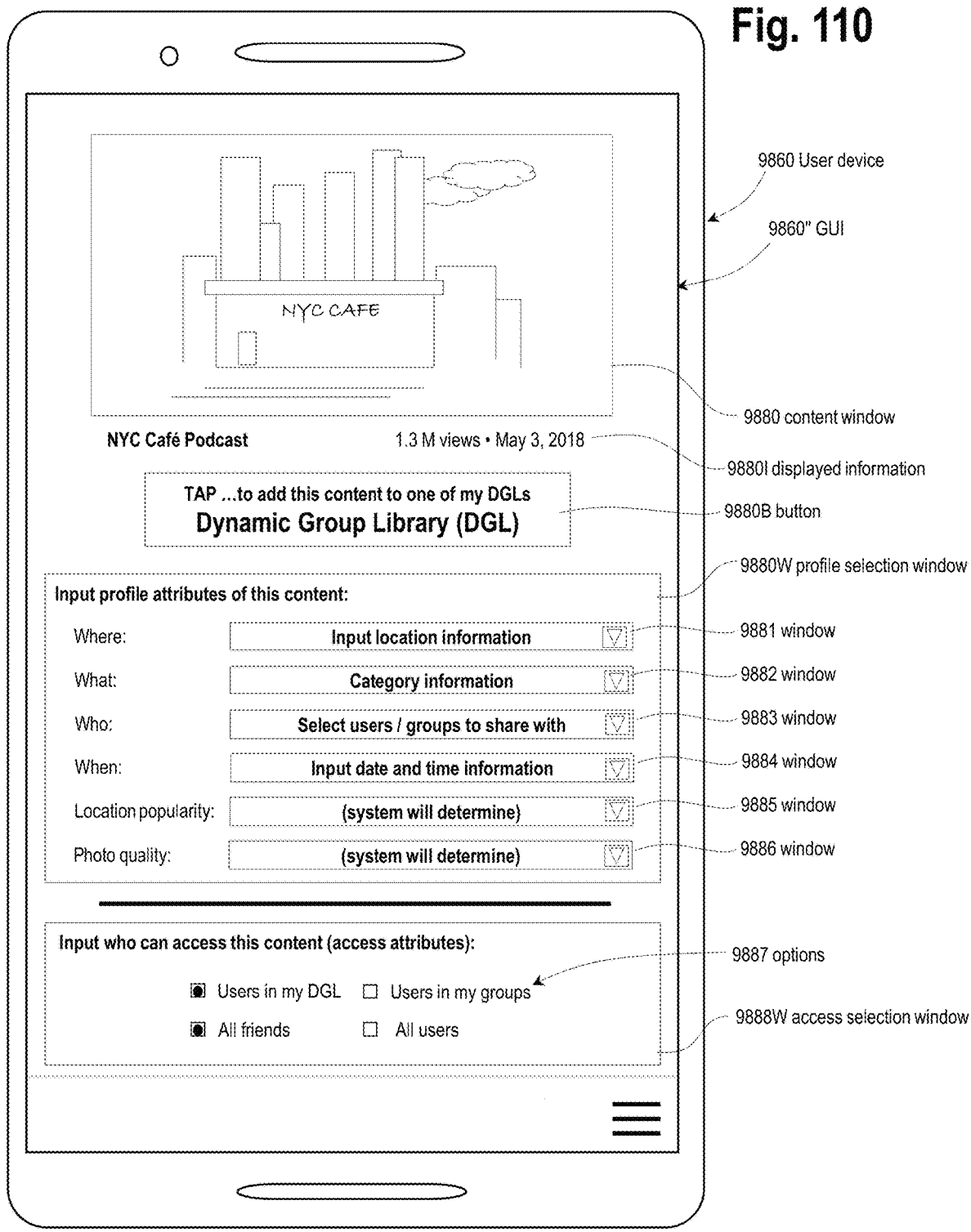
FIG. 110 is a diagram of a user device with further GUI.

In step 9843, the CP identifies the criteria requirement set (CRS) upon which the DGL and the associated DGL group are based. As reflected at 9843' and as described herein, the formation of a DGL group indicates that a correlation (between preferences of a first user vis-à-vis preferences of other users) has been identified. After step 9043, the process passes on to step 9845. In step 9845, the CP determines what users satisfy the CRS (based on identified items of user content, such as based on photos—see related FIG. 112) and adds (or populates) those users into the first user's DGL group. Additionally, the processing of step 9845 can include the removal of users from a DGL group if such users no longer satisfy the CRS. Then, the process passes on to step 9846. In step 9846, the CP outputs notification to users regarding any updates to status, e.g. notification of group membership, such as notification of admission into a DGL. A first user could have other users added to her DGL group, and the first user is notified of such. A second user could be added to the first user's DGL group, and the second user is notified of such. Then, the process passes on to step 9847. In step 9847, the CP can interface with an administrator or curator to add or delete users from a particular DGL group. It is appreciated that, in an embodiment, an administrator/curator can vary membership in a particular DGL group and/or vary content that is associated with a particular DGL group. Such a curator can vary attributes of a DGL group as desired. Then, the process passes on to step 9848. In step 9848, the processing returns to FIG. 106 (step 9822' with membership in the first user's DGL having been updated). In step 9822', such updated DGL group can then be saved to the database 120 in a manner conducive to the processing of FIG. 106. FIG. 108 is a flowchart showing "CP interfaces with user to add content (that a user has accessed) to the user's Dynamic Group Library (DGL)" of subroutine 9850 as called from FIG. 104. For example, the user might be viewing a photo online or listening to a podcast, and decide to associate such content with the user's DGL. The processing of FIG. 108 can be performed with the utilization of the GUI of FIG. 110. The process starts in step 9850 and passes on to step 9851. In step 9851, the CP detects that the user has tapped a button to indicate (or otherwise indicated) that the user wants to add content to the user's DGL. Such content can be displayed on a GUI 9860" of a user device 9860, as shown in FIG. 110. For example, the user can tap the button 9880B on the GUI 9860". Then, the process passes on to step 9852. In step 9852, the CP detects the content that the user has identified. For example, by default, the content could be the active display on the user's browser app or GUI, such as the content displayed in the content window 9880 in FIG. 110. Content can be identified and selected in another manner as desired, such as from a listing or pop up menu. A wide variety of content can be selected for the processing of FIG. 108, and in particular, photos can be processed—so as to be added to a user's DGL. Then, in step 9853, the CP retrieves attributes of the selected content (e.g. the active display on user's browser) dependent on information that is available. In other words, the CP can pull or retrieve metadata regarding the content that the user has identified. For example, the metadata might include the date of content creation and file size. Metadata can also include displayed information 90801, as well as other data that is available. Then, in step 9854, the CP interfaces with user to input "profile attributes" that are to be assigned to the selected content. Such input can be performed via the profile selection window 9880W shown in the GUI 9860" of FIG. 110. The profile selection window 9880W can provide a mechanism to input various profile attributes of the particular content to be added into the user's content. The profile selection window 9880W can include a plurality of windows 9081, 9082, 9883, 9884, 9085, 9086 that correspond respectively to different profile criteria. The user can populate the various windows 9081-9086 to provide values for the various criteria. These values can then be used in the dynamic grouping processing, as is shown in FIGS. 111 and 112, for example. After step 9854, the process passes on to step 9855. In step 9855, the CP interfaces with the user to enter in "access attributes". Such access attributes, entered by the user, can dictate who the selected content will be pushed to. In other words, the user can control what users receive the selected content. The processing of step 9855 can be performed using the access selection window 9888W and the options 9887 provided therein. After step 9855, the process passes on to step 9856. In step 9056, the CP interfaces with the user to present information, regarding the added content, for confirmation by the user. That is, the CP can present the various criteria and associated values to the user for confirmation. If the information is not correct, the user can interface with the system so as to render a no in step 9856. As a result, the process can pass back to step 9854, for example, for the user to reenter values for criteria. If a yes is rendered in step 9056, i.e. the information including the selected criteria for the new content is correct, then the process can pass on to step 9857. In step 9857, the CP saves the selected content, along with the profile attributes in the access attributes, into the user's dynamic group library or collection. Then, in step 9858, the content has been added to the first user's collection. This additional content can now contribute to the generation of a DGL to which the user belongs. That is, another user may request a DGL using the processing of FIG. 106, and the new content shown in window 9080, of FIG. 110, can be included in such DGL, assuming that the various filters that are to be applied would not exclude the content 9080. The processing is then terminated.

Accordingly, systems and methods are provided for processing media with filtration and distillation for dynamic viewing of content and dynamic grouping of users. Functionality can be provided for users to rate presented content. Content presentation can be filtered or subfiltered by hashtags and can be prioritized by date, quality or other manner. This described functionality can dynamically create a grouping of users with the common criteria and shares media content from users. Content can be shared (e.g. for viewing, streaming, saving or other use) based upon the permissions that users have granted for sharing media content, and such sharing can be universally, friends only, followers or all members of an identified group, for example.

Various sets of embodiments (including sets 1-8) of the disclosure are set forth below. Such sets of embodiments describe various systems and methods of the disclosure, including the methods that the described systems perform.

First Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and an electronic user device; (B) the database that includes the non-transitory computer medium, and the database including the instructions, and (C) the CP, and the CP performing processing including: (a) segmenting an area, into a framework, including advancing across the area to assign area identifiers, to remote areas, and respective boundaries that are associated with the area identifiers of each remote area, and the segmenting being performed in the form of a row in a given geo-area, and upon reaching an end of a given row, dropping down so as to segment a next row; (b) inputting a photo from a user device, and the photo including geo-data that represents a photo location at which the photo was generated; (c) determining that the photo location is within a first remote area, of the remote areas, (d) determining that there is not an existing patch area to which the photo can be assigned; and (e) building out the framework including adding a first patch area, associating the first photo with the first patch area, and orienting the first patch area within the first remote area, thereby orienting the first photo in the framework.

Embodiment 2. The apparatus of embodiment 1, the determining that the photo location is within the first remote area, of the remote areas, being performed using global positioning system (GPS) based on longitude and latitude of the first photo.

Embodiment 3. The apparatus of embodiment 1, the CP performing processing further including generating intermediate areas so as to orient the first patch area within the first remote area.

Embodiment 4. The apparatus of embodiment 3, the intermediate areas including territory, sector, quadrant, and local areas, and such intermediate areas disposed between the first remote area and the first patch.

Embodiment 5. The apparatus of embodiment 1, the CP performing processing further including generating a second patch area based on coordinates that are associated with the first patch.

Embodiment 6. The apparatus of embodiment 1, the first remote area represented by a first area identifier.

Embodiment 7. The apparatus of embodiment 6, the first area identifier including specific digits that represent the first remote area.

Embodiment 8. The apparatus of embodiment 7, the first area identifier including specific characters that represent the first patch.

Embodiment 9. The apparatus of embodiment 8, the first remote area further including a second patch, and the second patch being adjacent to the first patch, and the second patch represented by a second area identifier, and the second area identifier being sequential relative to the first area identifier.

Embodiment 10. The apparatus of embodiment 9, the first area identifier and the second area identifier are both respective integers that are sequential in numbering, so as to represent that the first patch is adjacent to the second patch.

Embodiment 11. The apparatus of embodiment 8, the area identifier including a plurality of digits, which respectively represent subareas within the first remote area.

Embodiment 12. The apparatus of embodiment 11, wherein there are 6 areas represented by the area identifier, and the 6 areas including the first remote area and the first patch area, and the area identifier includes at least 14 characters.

Embodiment 13. The apparatus of embodiment 1, the CP performing processing including: generating a photo count of photos in the first patch, including the first photo.

Embodiment 14. The apparatus of embodiment 1 the CP performing processing including: (a) interfacing with a second user device via the communication portion; (b) inputting user geolocation data from the second user device; (c) comparing the user geolocation data with location data of the first patch; (d) determining that the user geolocation data matches with the location data of the first patch; and (e) assigning a second photo, taken with the second user device, to the first patch based on the determining that the user geolocation data matches with the location data of the first patch.

Embodiment 15. The apparatus of embodiment 1, the given geo-area is the world so that the world is segmented into remote areas.

Embodiment 16. The apparatus of embodiment 1, the dropping down so as to segment a next row includes: advancing in the same direction in rows in conjunction with generating a plurality of remote areas in a given row, OR going back and forth in rows in conjunction with generating a plurality of remote areas in a given row.

Embodiment 17. An apparatus to process media items, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and an electronic user device; (B) the database that includes a non-transitory computer medium, and the database including the instructions, and (C) the CP, and the CP performing processing including: (a) segmenting an area, into a framework, including advancing around the area to assign area identifiers, to remote areas, and respective boundaries that are associated with the area identifiers of each remote area, and the segmenting being performed in the form of a row in a given geo-area, and upon reaching an end of a given row, dropping down so as to segment a next row; (b) inputting a media item from a user device, and the media item including geo-data that represents a media item location at which the media item was generated; (c) determining that the media item location is within a first remote area, of the remote areas, (d) determining that there is not an existing patch area to which the media item can be assigned; (e) building out the framework including adding a first patch area, associating the first media item with the first patch area, and orienting the first patch area within the first remote area, thereby orienting the first media item in the framework.

Embodiment 18. The apparatus of embodiment 17, the media item is a photo or an electronic message.

Second Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and electronic user devices; (B) the database that includes the non-transitory computer medium, and the database including the instructions, and the database including a framework that includes a plurality of areas, and the plurality of areas includes a plurality of patches, and the plurality of patches includes a first patch; (C) the CP, and the CP performing processing including: (1) inputting a first photo from a first user, and the first photo including first photo data, and the first photo data including (a) image data, and (b) geo-data, in metadata, that represents a photo location at which the first photo was generated; (2) comparing the geo-data of the first photo with the framework; (3) determining, based on the comparing, that the photo location is in the first patch; (4) associating, based on the determining, the first photo with the first patch; (5) incrementing a photo count of the first patch based on the associating of the first photo with the first patch, and the photo count reflecting popularity of the first patch; and (6) outputting the photo count to a second user; and wherein (a) the first user includes a first electronic user device, and (b) the second user includes a second electronic user device.

Embodiment 2. The apparatus of embodiment 1, the CP performing processing including comparing the photo count of the first patch with a predetermined threshold; determining that the photo count of the first patch exceeds the predetermined threshold; and based, on such determining, designating the first patch as a first spot so as to enable recognition status of the first patch.

Embodiment 3. The apparatus of embodiment 2, the recognition status of the first patch includes identifying the first patch in search results, provided to a user, based on the designation of the first patch as a spot.

Embodiment 4. The apparatus of embodiment 1, the framework is a cascading framework, and the first patch is part of the cascading framework.

Embodiment 5. The apparatus of embodiment 4, the first patch, of the plurality of patches, is a lowest level of the cascading framework.

Embodiment 6. The apparatus of embodiment 1, the first patch, of the plurality of patches, is identified by a unique identifier.

Embodiment 7. The apparatus of embodiment 6, the framework is a cascading framework; and the unique identifier includes a plurality of digits and, of the plurality of digits, respective digits are designated to represent respective areas that are associated with the first patch in the cascading framework.

Embodiment 8. The apparatus of embodiment 1, the CP performing further processing including: (a) interfacing with a third user, which includes a third user device, via the communication portion; (b) inputting search request data from the third user; (c) comparing the search request data with photo data of photos in the plurality of areas in the framework; and (d) outputting, based on such comparing of the search request data with photo data, photo search results to the third user, and the photos includes the first photo, and the photo data includes the first photo data.

Embodiment 9. The apparatus of embodiment 8, the outputting the photo search results includes determining a viewport area being displayed on the third user device.

Embodiment 10. The apparatus of embodiment 9, the outputting the viewport area relating to a degree of zoom being displayed on the third user device.

Embodiment 11. The apparatus of embodiment 9, the outputting the photo search results includes performing pin placement processing, and the pin placement processing including: generating pins, for placement in the viewport area, based on density of photos in the viewport area.

Embodiment 12. The apparatus of embodiment 11, the generating pins, for placement in the viewport area, being further based on an expanded search bounds area that extends around the viewport area.

Embodiment 13. The apparatus of embodiment 12, the generating pins, for placement in the viewport area, further including: (a) identifying that photos in the expanded search bounds area support generation of a further pin in the expanded search bounds area; and (b) moving a representation of the further pin into the viewport area so as to viewable on the third user device.

Embodiment 14. The apparatus of embodiment 11, the generating pins, for placement in the viewport area, including generating a first pin, and the first pin based on photos in a first local area, and the first local area positioned at least in part in the viewport area.

Embodiment 15. The apparatus of embodiment 14, the first pin including indicia that conveys a number of photos in the first local area.

Embodiment 16. The apparatus of embodiment 14, the generating pins including placing the first pin in a center of the first local area.

Embodiment 17. The apparatus of embodiment 14, the first local area including a plurality of patches in the first local area, and the generating pins including placing the first pin based on respective photo density in the plurality of patches, such that the first pin is placed, in the first local area, so as to be positioned in a highest density patch, of the plurality of patches, and the highest density patch having highest photo density, of the parches, in the first local area.

Embodiment 18. The apparatus of embodiment 1, wherein a plurality of patches being the smallest area of the framework, and (a) patches are generated, by the CP, in the framework based on at least one selected from the group consisting of: a predetermined known area, a popular location, a venue, an attraction, a Zip code, and a voting ward; and (b) the first photo data includes a type of photo and other attributes of the first photo in the metadata of the first photo.

Embodiment 19. The apparatus of embodiment 1, the first patch being associated with a corresponding attraction, such that the popularity of the first patch corresponds to popularity of the corresponding attraction, such that the photo count of the first patch constitutes votes for the first patch, and the CP performing processing further includes comparing the photo count of the first patch with respective photo counts of other patches to determine relative popularity.

Embodiment 20. An apparatus to process digital media, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and electronic user devices; (B) the database that includes a non-transitory computer medium, and the database including the instructions, and the database including a framework that includes a plurality of areas, and the plurality of areas includes a plurality of patches, and the plurality of patches includes a first patch; (C) the CP, and the CP performing processing including: (1) inputting a first media from a first user, and the first media including first media data, and the first media data including (a) content data, and (b) geo-data, in metadata, that represents a media location at which the first media was generated, and the first media data can be text; (2) comparing the geo-data of the first media with the framework; (3) determining, based on the comparing, that the media location is in the first patch; (4) associating, based on the determining, the first media with the first patch; (5) incrementing a media count of the first patch based on the associating of the first media with the first patch, and the media count reflecting popularity of the first patch; and (6) outputting the media count to a second user; and wherein (a) the first user includes a first electronic user device, and (b) the second user includes a second electronic user device.

Third Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices, the plurality of user devices including a first user device (UD) and a second UD; (B) the database that includes the non-transitory computer medium, and the database including the instructions, and (C) the CP, and the CP performing processing including: (I) storing a photo in the database; (II) outputting the photo to the first UD, i.e. first user device, for display on the first UD; (III) providing a flag selector to the first UD in conjunction with the outputting of the photo to the first UD, and the flag selector relating to treatment of the photo, and the flag selector including at least one flag option; (IV) inputting selection of a flag option, of the at least one flag option, from the first UD, such that the first UD constitutes a nominator UD, and the flag option is associated with an action; (V) performing, in response to selection of the flag option, ratification processing, and the ratification processing, performed by the CP, including: (1) interfacing with the second UD, i.e. second user device, to input a ratification of the action, such that the second UD constitutes a ratifier, and the input ratification constitutes an input disposition to the action that has been nominated; (2) incrementing an accumulated ratification number (ARN) based on the ratification, so as to provide a tally of ratifications that are accumulated; (3) comparing the ARN with a required ratification number (RRN) to determine if the RRN is satisfied; and (4) rendering a determination, based on the comparing, including: (a) if the RRN is satisfied by the ARN, performing the action, OR (b) if the RRN is NOT satisfied by the ARN, not performing the action and waiting for further ratifications; and (VI) wherein the first user device is associated with and representative of a first human user, and the second user device is associated with and representative of a second human user.

Embodiment 2. The apparatus of embodiment 1, the CP rendering the determination (b) based on that the RRN is not satisfied; and (A) the ratification processing further including interfacing with a third UD, i.e. third user device, to input a negation of the action, and such third UD constitutes a second ratifier; and (B) decrementing the accumulated ratification number (ARN) based on the negation, so as to update the tally of ratifications accumulated.

Embodiment 3. The apparatus of embodiment 2, the ratification processing further including (a) interfacing with a fourth UD to input a further ratification of the action, and such fourth UD constitutes a fourth ratifier; (b) incrementing the accumulated ratification number (ARN) based on the further ratification, so as to further update the tally of ratifications that is accumulated; (c) comparing the updated ARN with the required ratification number (RRN) to determine if the RRN is satisfied; (d) determining that the RRN is satisfied; and (e) performing, based on that the RRN is satisfied, the action.

Embodiment 4. The apparatus of embodiment 2, the ratification processing further including interfacing with a fourth UD to input a further input disposition of the action, and the further input disposition being one of: (a) a ratification of the nominated action; (b) a negation of the nominated action; and (c) an ignoring to the nominated action.

Embodiment 5. The apparatus of embodiment 2, the nominated action being one of censorship and quarantine.

Embodiment 6. The apparatus of embodiment 1, the RRN constituting a threshold number; and (a) the CP performing further processing including determining that a sufficient number of users have negated the input selection of the flag option so that the ARN has fallen below a predetermined threshold, and (b) terminating, based on such determining, the ratification processing.

Embodiment 7. The apparatus of embodiment 1, the flag option includes a photo removal option, and the action includes removing the photo, from an accessible collection of photos, once the RRN has been satisfied.

Embodiment 8. The apparatus of embodiment 1, the performing processing including inputting the photo from a third UD and, subsequently, storing the photo in the database.

Embodiment 9. The apparatus of embodiment 1, the inputting selection of the flag option is performed in conjunction with inputting text, and the text is displayed with the flag option.

Embodiment 10. The apparatus of embodiment 9, the flag option is proposed removal of the photo and the text is an explanation why the photo should be removed.

Embodiment 11. The apparatus of embodiment 1, the flag option is provided, to the first UD, as a menu option for display on the first UD.

Embodiment 12. The apparatus of embodiment 1, the first UD is a first smart phone, and the second UD is a second smart phone.

Embodiment 13. The apparatus of embodiment the photo including geographic data that represents a photo location at which the photo item was generated, and the photo is one of a collection of photos that are stored in the database.

Embodiment 14. The apparatus of embodiment 1, the ratification processing further including determining a censorship power rating (CPR) that is associated with the first UD, and the CPR being an adjuster that adjusts the RRN, such that number of ratifiers required to effect the action can be adjusted up or adjusted down, and (a) the RRN and/or the CPR is flag specific so as to be different for different flags.

Embodiment 15. The apparatus of embodiment 1, the flag selector is in the form of a button that is presented, by data output by the CP to the first UD, on a GUI of the first user device.

Embodiment 16. The apparatus of embodiment 1, the at least one flag option includes at least one selected from the group consisting of a correct photo option, a revise photo option, a remove photo option and a tag photo option.

Embodiment 17. An apparatus to process media items, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices, the plurality of user devices including a first user device (UD) and a second UD; (B) the database that includes a non-transitory computer medium, and the database including the instructions, and (C) the CP, and the CP performing processing including: (I) storing a media item in the database; (II) outputting the media item to the first UD for presentation on the first UD; (III) providing a flag selector to the first UD in conjunction with the outputting of the media item to the first UD, and the flag selector relating to treatment of the media item, and the flag selector including at least one flag option; (IV) inputting selection of a flag option, of the at least one flag option, from the first UD, such that the first UD constitutes a nominator UD, and the flag option is associated with an action; (V) performing, in response to selection of the flag option, ratification processing, and the ratification processing, performed by the CP, including: (1) interfacing with the second UD to input a ratification of the action, such that the second UD constitutes a ratifier, and the input ratification constitutes an input disposition to the action that has been nominated; (2) incrementing an accumulated ratification number (ARN) based on the ratification, so as to provide a tally of ratifications that are accumulated; (3) comparing the ARN with a required ratification number (RRN) to determine if the RRN is satisfied; and (4) rendering a determination, based on the comparing, including: (a) if the RRN is satisfied by the ARN, performing the action, OR (b) if the RRN is NOT satisfied by the ARN, not performing the action and waiting for further ratifications.

Embodiment 18. The apparatus of embodiment 15, the media item is a photo.

Fourth Set of Illustrative Embodiments

Embodiment 1. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes the non-transitory computer medium, and the database including the instructions and a framework for storing a collection of photos, and (C) the CP, and the CP performing processing including: (1) storing the collection of photos, and each photo, in the collection of photos, including (a) image data and (b) metadata; (2) interfacing with one or more first users to identify a first association between the one or more first users and respective photos in a first collection of photos, and the first collection of photos constituting a first filtered photo set of photos; (3) interfacing with one or more second users to identify a second association between the one or more second users and respective photos in a second collection of photos, and the second collection of photos constituting a second filtered photo set of photos; and (4) interfacing with a third user to allow the third user to select the one or more first users, so as to view the first filtered photo set; (5) interfacing with the third user to allow the third user to select the one or more second users, so as to view the second filtered photo set; (6) whereby the third user is provided with access to different filtered photo sets that are representative of (a) a one or more first users perspective of the one or more first users as represented by the first filtered photo set, and (b) a one or more second users perspective of the one or more second users as represented by the second filtered photo set; and (D) wherein the one or more first users, the one or more second users, and the third user each include a respective user device; and the first and second collection of photos is of the collection of photos.

Embodiment 2. The apparatus of embodiment 1, the first association is constituted by that the one or more first users took each of the photos in the first collection of photos; and the second association is constituted by that the one or more second users took each of the photos in the second collection of photos.

Embodiment 3. The apparatus of embodiment 2, the first filtered photo set and the second filtered photo set are from a same geographical area.

Embodiment 4. The apparatus of embodiment 1, the first association is constituted by that the one or more first users liked each of the photos in the first collection of photos; and the second association is constituted by that the one or more second users liked each of the photos in the second collection of photos.

Embodiment 5. The apparatus of embodiment 4, the first filtered photo set and the second filtered photo set are from a same geographical area.

Embodiment 6. The apparatus of embodiment 1, the first association is constituted by a user tag associated with the one or more first users being determined to match a respective photo tag associated with each of the photos in the first collection of photos.

Embodiment 7. The apparatus of embodiment 6, the photo tag represents a group to which photos in the first filtered photo set are associated, and the user tag provides an association between the one or more first users and the group.

Embodiment 8. The apparatus of embodiment 7, the group of users is in the form of an affinity group that represents an affinity to particular subject matter.

Embodiment 9. The apparatus of embodiment 7, the group is in the form of a friends group that represents a group of friends.

Embodiment 10. The apparatus of embodiment 6, the photo tag designates a preference, and the user tag represents such same preference, such that the photo tag and the user tag are deemed to match.

Embodiment 11. The apparatus of embodiment 6, each photo tag represents a geographical location.

Embodiment 12. The apparatus of embodiment 6, each photo tag represents an attribute of the photo, and the attribute including at least one selected from the group consisting of lens type, time of day, location, scene type, and season of the year.

Embodiment 13. The apparatus of embodiment 1, the CP performing processing includes: (a) determining that a first photo (a) is in the first filtered photo set of photos and (b) IS in the second filtered photo set of photos; (b) determining that a second photo (a) is in the first filtered photo set of photos and (b) IS NOT in the second filtered photo set of photos; (c) deeming that a following strength of the first photo is greater that a following strength of the second photo based on (a) and (b).

Embodiment 14. The apparatus of embodiment 1, the first filtered photo set and the second filtered photo set are from a first geographical area; and the third user being provided with access to the first filtered photo set and the second filtered photo allows the user to perform validation of information regarding the first geographical area.

Embodiment 15. The apparatus of embodiment 14, the validation of information regarding the first geographical area relates to popularity of the first geographical area.

Embodiment 16. The apparatus of embodiment 1, the one or more first users is a single user, and the one or more second users is a further single user.

Embodiment 17. An apparatus to process digital photos, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes a non-transitory computer medium, and the database including the instructions and a framework for storing a collection of photos, and (C) the CP, and the CP performing processing including: (1) storing the collection of photos, and each photo, in the collection of photos, including (a) image data and (b) metadata; (2) interfacing with one or more first users to identify a first association between the one or more first users and respective photos in a first collection of photos, and the first collection of photos constituting a first filtered photo set of photos; (3) identifying a second collection of photos that have been input into the system, and the second collection of photos constituting a second filtered photo set of photos; and (4) interfacing with a third user to allow the third user to select the one or more first users, so as to view the first filtered photo set; (5) interfacing with the third user to allow the third user to view the second filtered photo set; (6) whereby the third user is provided with access to different filtered photo sets that are representative of (a) a one or more first users perspective of the one or more first users as represented by the first filtered photo set, and (b) a one or more second users perspective of one or more second users as represented by the second filtered photo set; and (D) the one or more first users, the one or more second users, and the third user each include a respective user device; and (E) the first and second collection of photos is of the collection of photos.

Embodiment 18. The apparatus of embodiment 17, the second collection of photos is constituted by one of: (a) photos, which possess a first attribute, (b) photos, which possess a second attribute, that are accessible by the third user, and (c) photos, which possess a third attribute, that are accessible by the third user, and wherein: (1) the first attribute is accessibility by the third user; (2) the second attribute reflects that each photo, in the second collection of photos, were each taken in a same geographical area, and (3) the third attribute reflects that each photo, in the second collection of photos, were each taken by a same user; and (4) wherein, the one or more first users includes at least one selected from the group consisting of: an individual, group of users, trusted critics group, an affinity group, followed users, friends, groups of friends, trusted specialty groups, persons, and groups.

Embodiment 19. An apparatus to process digital media, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and a plurality of user devices; (B) the database that includes a non-transitory computer medium, and the database including the instructions and a framework for storing a collection of media, and (C) the CP, and the CP performing processing including: (1) storing the collection of media, and each media, in the collection of media, including (a) content data and (b) metadata; (2) interfacing with one or more first users to identify a first association between the one or more first users and respective media in a first collection of media, and the first collection of media constituting a first filtered media set of media; (3) identifying a second collection of media that have been input into the system, and the second collection of media constituting a second filtered media set of media; and (4) interfacing with a third user to allow the third user to select the one or more first users, so as to view the first filtered media set; (5) interfacing with the third user to allow the third user to view the second filtered media set; (6) whereby the third user is provided with access to different filtered media sets that are representative of (a) a one or more first users perspective of the one or more first users as represented by the first filtered media set, and (b) a one or more second users perspective of one or more second users as represented by the second filtered media set; and (D) the one or more first users, the one or more second users, and the third user each include a respective user device; and the first and second collection of media is of the collection of media.

Embodiment 20. The apparatus of embodiment 19, the media includes photos, and the content data for each photo includes data representing a photograph.

Fifth Set of Illustrative Embodiments

Embodiment 1. A photo system to process digital photos, the photo system including a tangibly embodied computer processor (CP) and a tangibly embodied database, the CP implementing instructions on a non-transitory computer medium disposed in the database, and the database in communication with the CP, the photo system comprising: (A) a communication portion for providing communication between the CP and a user, and the user including an electronic user device; (B) the database that includes the non-transitory computer medium, and the database including the instructions, the database including a photo database that stores photos in: (a) a system photo collection that is accessible to various users of the photo system, and (b) a user photo collection that is associated with the user; and each photo, in the photo database, including image data and photo data, and the photo data, for each photo, includes area data that represents a location associated with the photo; and (C) the CP, and the CP performing processing, based on the instructions, including: (i) observing interaction by the user device with a photo relating to a first geographical area, such interaction represented by interaction data; (ii) performing first processing to determine if the interaction data satisfies an area-interaction trigger, and the area-interaction trigger is triggered based on interaction of the user device with the photo that relate to the first geographical area, and the first processing including determining that the interaction data does satisfy the area-interaction trigger; (iii) performing second processing to determine if interrelationship of the first geographical area to at least one responsive area satisfies an interrelationship trigger, and the performing second processing includes determining that the interrelationship trigger is satisfied for a first responsive area, the first responsive area being one of the at least one responsive areas; and (iv) outputting, based on (a) the area-interaction trigger being satisfied, AND (b) the interrelationship trigger being satisfied, a notification to the first user device.

Embodiment 2. The photo system of embodiment 1, the first processing is performed before the second processing; OR the second processing is performed before the first processing.

Embodiment 3. The photo system of embodiment 1, the first processing includes comparing searches, of photos, one of which is the photo, that the user device has performed relating to the first area, to a predetermined threshold number of searches.

Embodiment 4. The photo system of embodiment 3, the predetermined threshold number of searches is three (3) searches, and each of such searches includes the CP receiving search criteria, which has been input from the user device, relating to the first area.

Embodiment 5. The photo system of embodiment 1, the first processing includes: (a) determining a number of saved photos, one of which is the photo, saved to the user photo collection, by the user device, that relates to the first area, and (b) determining if the number of saved photos exceeds a predetermined threshold.

Embodiment 6. The photo system of embodiment 5, the predetermined threshold number of saved photos is three (3) saved photos.

Embodiment 7. The photo system of embodiment 5, the determining the number of saved photos saved is based on photos that are input from the user device.

Embodiment 8. The photo system of embodiment 7, the determining the number of saved photos saved is further based on a determination that such photos, input from the user device, were taken by the user device.

Embodiment 9. The photo system of embodiment 5, the determining the number of saved photos saved is based on photos saved to the system photo collection by another user and then saved, by the user, to the user photo collection, of the user, and such attributes being represented in respective photo data, in the form of metadata, associated with each photo.

Embodiment 10. The photo system of embodiment 1, the photo being one of a plurality of photos, and the area-interaction trigger assesses at least one selected from the group consisting of: (a) photos that were taken by the user device and uploaded to the photo database; (b) photos, satisfying a predetermined decay parameter relating to photo age, that were taken by the user device and uploaded to the photo database; (c) photos that were taken by the user device and uploaded to the user photo collection; (d) photos that were taken by another user and saved by the user to the user photo collection; (e) at least one search, for photos, that relates to the first geographical area, wherein the search is requested by the user device; and each of (a)-(e) constituting a trigger type, each trigger type being mapped to a respective notification option, and the outputting the notification includes: (i) identifying that one of the trigger types was satisfied; (ii) determining the notification option that is mapped to the trigger type that was satisfied; and (iii) designating the mapped to notification option as the notification to be output to the user device.

Embodiment 11. The photo system of embodiment 10, the trigger types are provided with a hierarchy so as to possess a relative priority between the trigger types, and the outputting including identifying that a plurality of the trigger types was satisfied, and the identifying the one of the trigger types including selecting the trigger type, of the plurality of trigger types, having highest priority as the one trigger type, from which the notification will be mapped.

Embodiment 12. The photo system of embodiment 1, the notification, which is output to the first user device, includes information that is related to the responsive area.

Embodiment 13. The photo system of embodiment 1, the notification, which is output to the first user device, includes an advertisement that is related to the responsive area.

Embodiment 14. The photo system of embodiment 1, the determining that the interrelationship trigger is satisfied includes determining that the first geographical area is one of the at least one responsive areas.

Embodiment 15. The photo system of embodiment 1, the determining that the interrelationship trigger is satisfied includes determining that the first geographical area has geographical cross-over with the first responsive area.

Embodiment 16. The photo system of embodiment 1, the determining that the interrelationship trigger is satisfied includes determining that a distance value between the first geographical area and the first responsive area is less than a distance value threshold.

Embodiment 17. The photo system of embodiment 16, the distance value is based on a centroid of the first geographical area and/or the distance value is based on a centroid of the first responsive area.

Embodiment 18. The photo system of embodiment 16, the distance value is based on a boundary of the first geographical area; and/or the distance value is based on a boundary of the first responsive area.

Embodiment 19. The photo system of embodiment 1, the first responsive area is defined by the user, and the notification provides an alert, to the user, that the user has interacted with the first responsive area.

Embodiment 20. The photo system of embodiment 1, the determining that the interrelationship trigger is satisfied for a first responsive area includes determining if a constraint is satisfied, and the constraint being that the photo is a live photo, and the live photo being a part of the interaction that was observed.

Sixth Set of Illustrative Embodiments

Embodiment 1. A photo system to process digital photos, the photo system including a tangibly embodied computer processor (CP) and a tangibly embodied database, the CP implementing instructions on a non-transitory computer medium disposed in the database, and the database in communication with the CP, the photo system comprising: (A) a communication portion for providing communication between the CP and a user, and the user including an electronic user device; (B) the database that includes the non-transitory computer medium, and the database including the instructions, (C) the CP, and the CP performing processing, based on the instructions, including: (a) identifying a segmented area (SA);
  (b) associating artwork with the SA; (c) generating an associatable virtual asset (AVA) that is associated with both the segmented area and the artwork; (d) outputting the artwork to a third party to tokenize the artwork; (e) inputting second data from the third party, and the second data including a token that is associated with the artwork; (f) associating the token to the AVA so as to generate a tokenized virtual asset; and (g) saving the tokenized virtual asset to a data table, so as to update the data table, and the tokenized virtual asset including ownership data that represents an ownership interest of the tokenized virtual asset.

Embodiment 2. The photo system of embodiment 1, the token is in the form of a non-fungible token (NFT). Embodiment 3. The photo system of embodiment 2, the NFT is stored on a digital ledger. Embodiment 4. The photo system of embodiment 3, the digital ledger is a blockchain.

Embodiment 5. The photo system of embodiment 1, the artwork is in the form of image data that is associated with a photo, and the photo including both the image data and photo data, and the photo data including metadata regarding the photo, the metadata including location data that represents a geographical location where the photo was taken.

Embodiment 6. The photo system of embodiment 5, the CP performing processing including: (A) inputting the photo from a user device; and (B) the associating artwork with the SA including: associating, based on the location data, the photo to the segmented area based on a determination that the geographical location, as represented by the location data, is within boundaries of the segmented area.

Embodiment 7. The photo system of embodiment 5, the metadata further including time data that represents a time at which the photo was taken.

Embodiment 8. The photo system of embodiment 1, the SA constituting a first SA, and the CP performing processing further including: (a) inputting a command to divide the first SA into two areas; (b) dividing, based on the command, the first SA into a third SA and a second SA; (c) assigning the NFT to the third SA; and (d) performing processing to assign a second NFT to the second SA.

Embodiment 9. The photo system of embodiment 8, the assigning the NFT to the third SA including determining that the artwork is associated with a location, as represented by location data, that is geographically disposed within a boundary of the third SA.

Embodiment 10. The photo system of embodiment 9, the artwork is in the form of image data that is associated with a photo, and the photo including both the image data and photo data, and the photo data including metadata regarding the photo, the metadata including the location data, and the location being the geographical location where the photo was taken.

Embodiment 11. The photo system of embodiment 9, the associating artwork with the SA including: (a) determining that no photo is associated with the SA; (b) determining an area identifier that is associated with and/or represents the SA; and (c) associating the area identifier to the SA so as to be the artwork for the SA.

Embodiment 12. The photo system of embodiment 11, the associating the area identifier to the SA, so as to be the artwork for the SA, also includes adding a suffix onto the area identifier, such that the area identifier and the suffix constitute the artwork.

Embodiment 13. The photo system of embodiment 8, the performing processing to assign a second NFT to the second SA includes: (a) associating second artwork with the second SA; (b) generating a second associatable virtual asset (AVA) that is associated with the both the second segmented area and the second artwork; (c) outputting the second artwork to the third party to tokenize the second artwork; (d) inputting fourth data from the third party, and the fourth data including a second token that is associated with the second artwork; (e) associating the second token to the second AVA so as to generate a second tokenized virtual asset; and (f) saving the second tokenized virtual asset to the data table, so as to update the data table.

Embodiment 14. The photo system of embodiment 13, the second token is a non-fungible token (NFT).

Embodiment 15. The photo system of embodiment 1, the associating artwork with the SA including: (a) determining that no photo is associated with the SA; (b) determining an area identifier that is associated with and/or represents the SA; and (c) associating the area identifier to the SA so as to be the artwork for the SA.

Embodiment 16. The photo system of embodiment 1, CP performing processing including: inputting a command to change the ownership interest of the tokenized virtual asset from a first owner to a second owner. Embodiment 17. The photo system of embodiment 1, CP performing processing including: inputting a command to assign a right to the tokenized virtual asset, and the right allowing a further user to perform an activity with respect to the tokenized virtual asset.

Seventh Set of Illustrative Embodiments

Embodiment 1. A photo system to process digital photos, the photo system including a tangibly embodied computer processor (CP) and a tangibly embodied database, the CP implementing instructions on a non-transitory computer medium disposed in the database, and the database in communication with the CP, the photo system comprising: (A) a communication portion for providing communication between the CP and users, and the users including a first user and a second user; (B) the database that includes the non-transitory computer medium, and the database including the instructions, (a) the database including a photo database that stores photos, and (b) each photo, in the photo database, including image data and photo data, and the photo data, for each photo, includes location data associated with the photo; and (C) the CP, and the CP performing processing, based on the instructions, including: (a) interacting with the first user, such interacting including performing processing to generate a photo walk, the photo walk including a plurality of walk spots (WSs), the plurality of WSs including a first walk spot (WS) and a second WS, and (i) the first WS associated with a first set of photos, the first WS associated with a first area, and each of the photos in the first set of photos also associated with the first area based on respective location data of each photo; and (ii) the second WS associated with a second set of photos, the second WS associated with a second area, and each of the photos in the second set of photos also associated with the second area based on respective location data of each photo; (b) interacting with the second user, such interacting with the second user including performing processing to guide the second user through the photo walk, including: (i) providing information to guide the second user from the first WS to the second WS; (ii) outputting first information to the second user upon the second user being observed at the first WS; and (iii) outputting second information to the second user upon the second user being observed at the second WS.

Embodiment 2. The photo system of embodiment 1, the performing processing to generate a photo walk includes outputting render data, to a user device of the first user, to render a photo map on the user device, and the first WS and the second WS being graphically represented on the photo map.

Embodiment 3. The photo system of embodiment 2, the performing processing to generate a photo walk further includes: (a) outputting the render data so as to generate photo points on the photo map, and the photo points representing locations at which there are photos; (b) inputting a selection from the first user of one of the photo points; (c) designating, based on the selection, the photo point as the first WS; and (d) the photo points are based on photos that are in the user's own collection of photos and/or in other user's collection of photos.

Embodiment 4. The photo system of embodiment 3, the performing processing to generate a photo walk further includes: (a) inputting a further selection from the first user of a further one of the photo points; and (b) designating, based on the further selection, the further photo point as the second WS.

Embodiment 5. The photo system of embodiment 3, the performing processing to generate a photo walk further includes: determining each photo point based on a threshold number of photos being associated with each photo point, as a requirement for each photo point to be included on the photo map.

Embodiment 6. The photo system of embodiment 5, the threshold number of photos is three (3) photos for each photo point.

Embodiment 7. The photo system of embodiment 1, the performing processing to generate a photo walk further includes: interfacing with the first user to change an order of the WSs in the photo walk.

Embodiment 8. The photo system of embodiment 1, the performing processing to generate a photo walk further includes: interfacing with the first user to provide walk data of the photo walk to the first user, the walk data including at least one selected from the group consisting of: linear distance of the photo walk as measured by a distance to walk the photo walk, number of photos associated with the photo walk, type of photo walk, number of WSs in the photo walk, and estimated duration of the photo walk.

Embodiment 9. The photo system of embodiment 1, the first information includes data regarding the first set of photos; and the second information includes data regarding the second set of photos.

Embodiment 10. The photo system of embodiment 1, the first information includes data regarding activities proximate the first WS; and the second information includes data regarding activities proximate the second WS.

Embodiment 11. The photo system of embodiment 1, the performing processing to generate a photo walk includes interfacing with the first user to save the photo walk, in conjunction with interfacing with the first user to name the photo walk.

Embodiment 12. The photo system of embodiment 1, the first user includes a first user device, and the second user includes a second user device, the providing information to guide the second user includes providing output data based on a user selection to bike, walk, drive, a virtual reality experience, an augmented reality experience and/or a virtual gaming experience.

Embodiment 13. The photo system of embodiment 1, the photo walk further including a third WS and a fourth WS; and (a) the third WS being associate with a third set of photos; and (b) the fourth WS being associate with a fourth set of photos; and (c) data being provided to the user regarding alternate photo points in a surrounding area of the photo walk, and the CP presenting, based on a respective popularity of the alternate photo points, a recommendation to add the alternate photo points to the photo walk.

Embodiment 14. The photo system of embodiment 13, the interacting with the second user includes: determining that the second user is physically departing from the second WS; and outputting, based on such determining, data to guide the second user from the second WS to the third WS.

Embodiment 15. The photo system of embodiment 1, the interacting with the second user includes: interfacing with the second user to input search criteria; and outputting, based on the search criteria, the photo walk and/or data representing the photo walk to the second user.

Embodiment 16. The photo system of embodiment 1, the interacting with the first user is performed over a network; and the interacting with the second user is performed over the network.

Embodiment 17. The photo system of embodiment 1, the performing processing to generate a photo walk includes outputting render data, to the second user, to render a photo walk map on a GUI of the second user, (a) the photo walk map displaying a first indicia to indicate position of the second user, and (b) the CP updating position of the first indicia as the second user moves along the photo walk.

Embodiment 18. The photo system of embodiment 17, the photo walk map also displaying a second indicia, and the second indicia to indicate position of a third user, and the third user being a leader user, and the CP interfacing with a plurality of additional users to guide such additional users on the photo walk, so as to provide a group experience.

Eighth Set of Illustrative Embodiments

Embodiment 1. An apparatus to process user content, the apparatus including a tangibly embodied computer processor (CP) and a tangibly embodied database, the CP implementing instructions on a non-transitory computer medium disposed in the database, and the database in communication with the CP, the apparatus comprising: (A) a communication portion for providing communication between the CP and users, and each user in the form of an electronic user device; (B) the database that includes the non-transitory computer medium, and the database including the instructions, and (C) the CP, and the CP performing processing including: (a) generating a dynamic group library (DGL) group that includes DGL members, the DGL members each having been identified as a user, of the users, possessing identified items, of user content, that satisfy a criteria requirement set (CRS), and the CRS relating to a convergence of the identified items for each user; the generating the DGL group including the CP imposing a requirement that the DGL group satisfy a membership threshold number; (b) maintaining, in the database, a first user profile, associated with a first user, of the users; (c) inputting a request from the first user for DGL content; (d) generating the DGL content based on the DGL group including: (i) identifying the user content associated with the DGL members; and (ii) aggregating the user content to form the DGL content of the DGL; (e) inputting filter data from the first user profile associated with the first user; (f) filtering the DGL content based on the filter data, so as to generate filtered DGL content; and (g) outputting the filtered DGL content to the first user, thereby satisfying the request from the first user.

Embodiment 2. The apparatus of embodiment 1, the generating the DGL group includes: establishing the CRS; and determining that the first user satisfies the CRS, such that the first user is admitted to the DGL group.

Embodiment 3. The apparatus of embodiment 1, the identified items being tagged, by the CP, based on criteria, and the CRS including: a criteria threshold number that indicates how many criteria are required to match, amongst identified items for each user, to form the DGL group.

Embodiment 4. The apparatus of embodiment 3, the criteria threshold number is 3, and the criteria that are required to match includes: a location criteria, a type criteria, and a date criteria.

Embodiment 5. The apparatus of embodiment 3, the criteria threshold number is one selected from the group consisting of the values 2 and 3.

Embodiment 6. The apparatus of embodiment 3, the CRS including an item threshold number, and the item threshold number controls how many identified items, for each user, must possess criteria that satisfy the criteria threshold number.

Embodiment 7. The apparatus of embodiment 6, each identified item is a photo.

Embodiment 8. The apparatus of embodiment 3, each identified item is a photo.

Embodiment 9. The apparatus of embodiment 8, the generating the DGL group includes: (a) storing a photo threshold number that indicates how many photos of a user are required that satisfy the criteria threshold number, for such user to satisfy the CRS; and (b) storing a membership threshold number that indicates how many users that satisfy the CRS are required to form the DGL group.

Embodiment 10. The apparatus of embodiment 9, the generating the DGL group includes: (a) determining a numerical value of photos, for each user, that satisfy the criteria threshold number; and (b) comparing the numerical value vis-à-vis the photo threshold number, to determine if each user satisfies the CRS, which relates to convergence of the user content for each of such users.

Embodiment 11. The apparatus of embodiment 10, the generating the DGL group includes determining whether there are a sufficient number of users, who satisfy the CRS, to satisfy the membership threshold number.

Embodiment 12. The apparatus of embodiment 11, the CP interfacing with a further user to perform further processing including: (a) inputting selection criteria from the further user, (b) determining that the DGL group satisfies the selection criteria, and (c) providing for the further user to join the DGL group in response to a join request from the user.

Embodiment 13. The apparatus of embodiment 1, generating the DGL group includes the CP autonomously determining which criteria, of an identified item, is used to determine if CRS is satisfied.

Embodiment 14. The apparatus of embodiment 1, generating the DGL group includes the CP interfacing with the first user so as to input which criteria, of an identified item, is used to determine if CRS is satisfied.

Embodiment 15. The apparatus of embodiment 1, each of the identified items is at least one selected from the group consisting of a photo, a video and a podcast.

Embodiment 16. The apparatus of embodiment 1, the CP interfacing with the first user to input a further identified item that is added into the identified items, and the further identified item satisfies the CRS, so that the further identified item becomes part of the DGL.

Embodiment 17. The apparatus of embodiment 15, the interfacing with the first user further including inputting an access attribute, and the access attribute controlling whether the further identified item will be a part of other user's DGL.

Hereinafter, further aspects of the disclosure will be described.

[ ]

As used herein, any term in the singular may be interpreted to be in the plural, and alternatively, any term in the plural may be interpreted to be in the singular.

It is appreciated that one or more features of one embodiment of the disclosure as described herein may be used in conjunction with features of one or more other embodiments as may be desired.

Hereinafter, further aspects of implementation of the systems and methods of the disclosure will be described. A field of the disclosure relates to processing photos and other media, and in particular to processing photos and other media in a geographical area.

Various processing is described herein in the context of and/or as being performed upon photos. However, the processing as described herein is not limited to photos. That is, censorship processing, filtered following processing, segmentation processing and other processing as described herein can be applied to any media, which can be described as a "media item" or as "media", as desired including photos, comments, content, video, sound media, text content, posts and/or other media, for example. As described herein, a "user" can include a human user and/or an electronic user device, such as a cell phone or a smart phone, absent context to the contrary. Relatedly, interfacing with a "user", as described herein, can include interfacing with a human user and/or interfacing with an electronic user device, such as a cell phone or a smart phone, absent context to the contrary.

Various naming or nomenclature is used herein for purposes of explanation and discussion. It is appreciated that such naming or nomenclature, as set forth in this disclosure, can be varied as desired. For example, the particular names of the areas or designations described herein, such as "local" and "patch" and "spot" can be varied as desired.

Various processing is described herein so as to generate patches and other areas. Once such an area is generated, such area can be designated as a "spot", or in some other manner designated with elevated status, once the particular area has attained a certain density of media, for example. For example, once a patch has attained a predetermined number of photos, e.g. 10 photos, the patch can be designated as a spot. Various processing can be accorded to such spot, as described herein. Such processing can include providing enhanced user access to such patch/spot and the media associated therewith.

As described herein, various processing is described as being performed in the context of a particular "area" or "geographical area". However, as desired and as suitable, it is appreciated that such processing can also be applied in other contexts such as a popular location, a landmark, a venue, an attraction, a Zip code, a restaurant, a store, and/or a voting ward, for example. For example, an attraction could be linked or associated with a particular patch (or other area). Pictures or photos associated with such particular patch could effectively be "votes" for such attraction. Different areas, associated with respective attractions, could be compared or "voted" on using pictures.

Various processing is described herein as being performed on or with regard to a "spot", wherein the spot is an area that has a predetermined density of photos, for example. Such described processing can be performed on other areas or points of interest, for example, as may be desired.

Various processing associated with segmentation of an area and the world is described herein. It is appreciated that an area may be broken into multiple areas and may be segmented as desired. The size of the areas, the number of areas in a higher level area (e.g. number of patch areas in local areas) may be varied as desired. Also, the number of levels of areas can be varied.

As described herein, at least some embodiments of the system of the disclosure and various processes, of embodiments, are described as being performed by one or more computer processors. Such one or more computer processors may be in the form of a "processing machine" or "processing machines", i.e. a tangibly embodied machine or an "apparatus". As used herein, the term "processing machine" can be understood to include at least one processor that uses at least one memory. The at least one memory can store a set of instructions. The instructions may be either permanently or temporarily stored in the memory or memories of the processing machine. The processor can execute the instructions that are stored in the memory or memories in order to process data. The set of instructions may include various instructions that perform a particular task or tasks, such as any of the processing as described herein. Such a set of instructions for performing a particular task may be characterized as a program, software program, code or simply software. Various processing is described herein as performed by a computer processor (CP). Such computer processor can be constituted by or include the processing machine described herein. Such computer processor (CP) can be described as a computer processor portion (CPP), a computer processing portion, a processor, and/or similar constructs, for example.

As noted above, the processing machine, which may be constituted, for example, by the particular apparatus, apparatuses, system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that can be capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner Additionally, the memory may include two or more portions of memory in two or more physical locations.

To explain further, processing as described above can be performed by various components and various memories. However, it is appreciated that the processing performed by two distinct components as described above may, in accordance with a further embodiment of the disclosure, be performed by a single component. Further, the processing performed by one distinct component as described above may be performed by two distinct components. For example, processing as described herein might be performed in part by the system 100 or other system or server, in part by some third party resource 30, and in part by a user device 20, with reference to FIG. 1. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions can be used in the processing of the disclosure on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the disclosure may be in a suitable form such that the processing machine may read the instructions. For example, the instructions that form a program may be in the form of a suitable programming language, which can be converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the disclosure. Rather, any number of different programming languages may be utilized as can be necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that can be processed by the set of instructions might also be contained on any of a wide variety of media or medium. That is, the particular medium, i.e., the memory in the processing machine, utilized to hold the set of instructions and/or the data used in the disclosure may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as can be desired. Thus, the memory might be in the form of a database to hold data. The database might use any desired arrangement of files such as a flat file arrangement or a relational database arrangement, for example.

In the system and method of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface can be any device that provides communication between a user and a processing machine. The information provided by the user to the processing machine through the user interface may be in the form of a command, a selection of data, or some other input, for example. As discussed above, a user interface can be utilized by the processing machine that performs a set of instructions such that the processing machine processes data for a user. The user interface can be typically used by the processing machine for interacting with a user either to convey information or receive information from the user. However, it should be appreciated that in accordance with some embodiments of the system and method of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be characterized as a user. Further, it is contemplated that a user interface utilized in the system and method of the disclosure may interact partially with another processing machine or processing machines, while also interacting partially with a human user.

In this disclosure, quotation marks, such as with the language "spot", have been used to enhance readability and/or to parse out a term or phrase for clarity.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left", "right", "north", "south", "east", "west", "up", "down", "right", "left", "upper threshold", "lower threshold" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, process steps, operations, elements, and/or components, but do not preclude the presence or addition of one or more other features, integers, process steps, operations, elements, components, and/or groups thereof.

Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety. It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. An apparatus to process user content, the apparatus including a tangibly embodied computer processor (CP) and a tangibly embodied database, the CP implementing instructions on a non-transitory computer medium disposed in the database, and the database in communication with the CP, the apparatus comprising:

a communication portion for providing communication between the CP and users, and each user, of the users, in the form of an electronic user device;

the database that includes the non-transitory computer medium, and the database including the instructions, and the CP, and the CP performing processing including:

generating a dynamic group library (DGL) group that includes DGL members, the DGL members each having been identified as a user, of the users, possessing identified items, of user content, that satisfy a criteria requirement set (CRS), and the CRS relating to a convergence of the identified items for each user, the generating the DGL group including the CP imposing a requirement that the DGL group satisfy a membership threshold number;

maintaining, in the database, a first user profile, associated with a first user, of the users;

inputting a request from the first user for DGL content;

generating the DGL content based on the DGL group including:

identifying the user content associated with the DGL members; and aggregating the user content to form the DGL content of a dynamic group library (DGL);

inputting filter data from the first user profile associated with the first user;

filtering the DGL content based on the filter data, so as to generate filtered DGL content; and outputting the filtered DGL content to the first user, thereby satisfying the request for the DGL content from the first user.

2. The apparatus of claim 1, the generating the DGL group includes:

establishing the CRS; and determining that the first user satisfies the CRS, such that the first user is admitted to the DGL group.

3. The apparatus of claim 1, the identified items being tagged, by the CP, based on criteria, and the CRS including:

a criteria threshold number that indicates how many criteria are required to match for a particular identified item, of the identified items, to satisfy the CRS.

4. The apparatus of claim 3, the criteria threshold number is 3, and the criteria that are required to match includes: a location criteria, a type criteria, and a date criteria.

5. The apparatus of claim 3, the criteria threshold number is one selected from the group consisting of the values 2 and 3.

6. The apparatus of claim 3, the CRS including an item threshold number, and the item threshold number controls how many identified items, for each user, must possess criteria that satisfy the criteria threshold number.

7. The apparatus of claim 6, each identified item, of the identified items, is a photo.

8. The apparatus of claim 3, each identified item, of the identified items, is a photo.

9. The apparatus of claim 8, the generating the DGL group includes:

storing a photo threshold number that indicates how many photos of a user are required that satisfy the criteria threshold number, for such user to satisfy the CRS; and storing a membership threshold number that indicates how many users that satisfy the CRS are required to form the DGL group.

10. The apparatus of claim 9, the generating the DGL group includes:

determining a numerical value of photos, for each user, that satisfy the criteria threshold number; and comparing the numerical value vis-à-vis the photo threshold number, to determine if each user satisfies the CRS, which relates to convergence of the user content for each of such users.

11. The apparatus of claim 10, the generating the DGL group includes determining whether there are a sufficient number of users, who satisfy the CRS, to satisfy the membership threshold number.

12. The apparatus of claim 11, the CP interfacing with a further user to perform further processing including: (a) inputting selection criteria from the further user, (b) determining that the DGL group satisfies the selection criteria, and (c) providing for the further user to join the DGL group in response to a join request from the user.

13. The apparatus of claim 1, the generating the DGL group includes the CP autonomously determining which criteria, of an identified item, of the identified items, is used to determine if the CRS is satisfied.

14. The apparatus of claim 1, the generating the DGL group includes the CP interfacing with the first user so as to input which criteria, of an identified item, of the identified items, is used to determine if the CRS is satisfied.

15. The apparatus of claim 1, each of the identified items is at least one selected from the group consisting of a photo, a video and a podcast.

16. The apparatus of claim 1, the CP interfacing with the first user to input a further identified item that is added into the identified items, and the further identified item satisfies the CRS, so that the further identified item becomes part of the DGL.

17. The apparatus of claim 16, the interfacing with the first user further including inputting an access attribute, and the access attribute controlling whether the further identified item will be a part of other user's DGL.

* * * * *